US012783875B1

(12) United States Patent
Kierat et al.

(10) Patent No.: US 12,783,875 B1
(45) Date of Patent: Nov. 3, 2026

(54) GENERATING NEURAL NETWORK HYPERPARAMETERS

(71) Applicant: NVIDIA Corporation, Santa Clara, CA (US)

(72) Inventors: Slawomir Kierat, Warsaw (PL); Mateusz Sieniawski, Warsaw (PL); Piotr Karpinski, Warsaw (PL); Pawel Morkisz, San Jose, CA (US); Szymon Migacz, Santa Clara, CA (US); Linnan Wang, Pleasanton, CA (US); Chen-Han Yu, Mountain House, CA (US); Satish Salian, Santa Clara, CA (US); Ashwath Aithal, Fremont, CA (US); Alexandru Fit-Florea, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 866 days.

(21) Appl. No.: 17/950,004

(22) Filed: Sep. 21, 2022

(51) Int. Cl.
*G06N 3/08* (2023.01)
*G06V 10/82* (2022.01)

(52) U.S. Cl.
CPC ............... *G06N 3/08* (2013.01); *G06V 10/82* (2022.01)

(58) Field of Classification Search
CPC ................................. G06N 3/08; G06V 10/82
See application file for complete search history.

(56) References Cited

U.S. PATENT DOCUMENTS

| | | | | |
|---|---|---|---|---|
| 2018/0232640 | A1 | 8/2018 | Ji et al. | |
| 2019/0130271 | A1 | 5/2019 | Narang | |
| 2019/0251439 | A1* | 8/2019 | Zoph | G06N 3/08 |
| 2021/0264278 | A1 | 8/2021 | Lui | |
| 2022/0019880 | A1 | 1/2022 | Dasgupta | |
| 2022/0027739 | A1* | 1/2022 | Xue | G06N 3/045 |
| 2022/0092645 | A1 | 3/2022 | Pan | |

OTHER PUBLICATIONS

Bender et al., "Understanding and Simplifying One-Shot Architecture Search," ICML, 2018, 10 pages.
Cai et al., "Once-For-All: Train One Network and Spe Cialize It for Efficient Deployment," Apr. 29, 2020, 15 pages.
Cai et al., "Path-Level Network Transformation for Efficient Architecture Search," Jun. 7, 2018, 12 pages.
Cai et al., "Proxylessnas: Direct Neural Architecture Search On Target Task and Hardware," Feb. 23, 2019, 13 page.
Chen et al., "Constraint-Aware Deep Neural Network Compression," Sep. 8, 2018, 16 pages.
Cubuk et al., "Autoaugment: Learning Augmentation Policies from Data," Oct. 9, 2018, 14 pages.
Dai et al., "ChamNet: Towards Efficient Network Design through Platform-Aware Model Adaptation," CVPR, 2019, 10 pages.

(Continued)

*Primary Examiner* — Pei Yong Weng
(74) *Attorney, Agent, or Firm* — Robert C. Kowert; Kowert, Hood, Munyon, Rankin & Goetzel, P.C.

(57) ABSTRACT

Apparatuses, systems, and techniques to generate one or more hyperparameters to be used by one or more neural networks. In at least one embodiment, one or more hyperparameters to be used by one or more neural networks are generated based on, for example, a neural architecture search (NAS) algorithm.

17 Claims, 61 Drawing Sheets

(56) References Cited

OTHER PUBLICATIONS

Dai et al., "FBNetV3: Joint Architecture-Recipe Search Using Neural Acquisition Function," Jun. 7, 2020, 12 pages.
Deng et al. "Imagenet: A Large-Scale Hierarchical Image Database," ICLR, 2009, 8 pages.
Dong et al., "DPP-Net: Device-aware Progressive Search for Pareto-optimal Neural Architectures," Jun. 21, 2018, 15 pages.
Falkner et al., "BOHB: Robust and Efficient Hyperparameter Optimization at Scale," Jul. 3, 2018, 10 pages.
Github, "Pytorch Image Models," Retrieved from, "https://github.com/rwightman/pytorch-image-models," Aug. 18, 2021, 19 pages.
He et al., "Deep Residual Learning for Image Recognition," CVPR, 2016, 9 pages.
Hinton et al., "Distilling the Knowledge in a Neural Network," Mar. 9, 2015, 9 pages.
Howard et al., "MobileNets: Efficient Convolutional Neural Networks for Mobile Vision Applications," Apr. 17, 2017, 9 pages.
Hu et al., "Network Trimming: A Data-Driven Neuron Pruning Approach Towards Efficient Deep Architectures," 2016, 9 pages.
Hu et al., "Squeeze-and-Excitation Networks," IEEE, May 16, 2019, 13 pages.
IEEE, "IEEE Standard 754-2008 (Revision of IEEE Standard 754-1985): IEEE Standard for Floating-Point Arithmetic," Aug. 29, 2008, 70 pages.
Jang et al., "Categorical Reparameterization with Gumbel-Softmax," Nov. 22, 2016, 12 pages.
Jin et al., "Auto-Keras: An Efficient Neural Architecture Search System," Mar. 26, 2019, 11 pages.
Kingma et al. "Adam: A Method for Stochastic Optimization," arXiv:1412.6980, dated Dec. 22, 2014, 9 pages.
Kossaifi et al., "Tensor Contraction Layers for Parsimonious Deep Nets," Jun. 1, 2017, 7 pages.
Krizhevsky et al., "The CIFAR-10 dataset," Retrieved from, "https://www.cs.toronto.edu/~kriz/cifar.html," 2009, 4 pages.
Larsson et al., "Fractalnet: Ultra-Deep Neural Networks Without Residuals," May 26, 2017, 11 pages.
Li et al., "A System for Massively Parallel Hyperparameter Tuning," Mar. 16, 2020, 17 pages.
Li et al., "EagleEye: Fast Sub-net Evaluation for Efficient Neural Network Pruning," Aug. 5, 2020, 16 pages.
Li et al., "Improving One-shot NAS by Suppressing the Posterior Fading," IEEE, Oct. 6, 2019, 10 pages.
Li et al., "Searching for Fast Model Families on Datacenter Accelerators," IEEE, Feb. 10, 2021, 13 pages.
Lin et al., "Microsoft COCO: Common Objects in Context," European Conference on Computer Vision, Jul. 5, 2014, 14 pages.
Lin et al., "Neural Architecture Design for GPU-Efficient Networks," Aug. 11, 2020, 15 pages.
Liu et al., "Darts: Differentiable Architecture Search," Jun. 24, 2018, 13 pages.
Liu et al., "Progressive Neural Architecture Search," Proceedings of the European Conference on Computer Vision, Sep. 8, 2018, 16 pages.
Luo et al., "Neural Architecture Optimization," Dec. 3, 2018, 12 pages.
Luo et al., "Thinet: A Filter Level Pruning Method for Deep Neural Network Compression," In The IEEE International Conference on Computer Vision (ICCV), Oct. 2017, 9 pages.
Mei et al., "Atomnas: Fine-Grained End-To-End Neuralarchitecture Search," Feb. 23, 2020, 14 pages.
Molchanov et al., "HANT: Hardware-Aware Network Transformation," Jul. 12, 2021, 20 pages.
Molchanov et al., "Importance Estimation for Neural Network Pruning," Jun. 25, 2019, 11 pages.
Molchanov et al., Pruning Convolutional Neural Networks For Resource Efficient Inference, ICLR, 2017, 12 pages.
Mozer et al., "Skeletonization: A Technique for Trimming the Fat From a Network via Relevance Assessment," 1988, 9 pages.
Pham et al., "Efficient Neural Architecture Search via Parameter Sharing," International Conference on Machine earning, Feb. 9, 2018, 11 pages.
Radosavovic et al., "Designing Network Design Spaces," IEEE, Mar. 30, 2020, 12 pages.
Ramachandran et al., "Searching for Activation Functions," Oct. 27, 2017, 13 pages.
Sandler et al., "Mobilenetv2: Inverted Residuals and Linear Bottlenecks," CVPR, 2018, 11 pages.
Shen et al., "HALP: Hardware-Aware Latency Pruning," Oct. 20, 2021, 18 pages.
Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Tan et al., "EfficientDet: Scalable and Efficient Object Detection," CVPR, 2020, 10 pages.
Tan et al., "EfficientNet: Rethinking Model Scaling for Convolutional Neural Networks," Nov. 23, 2019, 10 pages.
Tan et al., "EfficientNetV2: Smaller Models and Faster Training," Jun. 23, 2021, 11 pages.
Tan et al., "Mnasnet: Platform-Aware Neural Architecture Search for Mobile," Jul. 31, 2018, 9 pages.
Vahdat et al., "UNAS: Differentiable Architecture Search Meets Reinforcement Learning," Proceedings of the IEEE/CVF Conference on Computer Vision and Pattern Recognition, 2020, 10 pages.
Wan et al., "FBNetV2: Differentiable Neural Architecture Search for Spatial and Channel Dimensions," Apr. 12, 2020, 13 pages.
Wang et al., "Searching the Deployable Convolution Neural Networks for GPUs, " Apr. 26, 2022, 11 pages.
Wu et al., "Constraint-Aware Importance Estimation for Global Filter Pruning under Multiple Resource Constraints," CVPR, 2020, 9 pages.
Wu et al., "FBNet: Hardware-Aware Efficient Convnet Design via Differentiable Neural Architecture Search," Dec. 14, 2018, 10 pages.
Xiang et al., "Zero-Cost Proxies Meet Differentiable Architecture Search," Jun. 12, 2021, 18 pages.
Xie et al., "SNAS: Stochastic Neural Architecture Search," ICLR, 2019, 17 pages.
Yang et al., "NetAdapt: Platform-Aware Neural Network Adaptation for Mobile Applications," IEEE, Apr. 9, 2018, 16 pages.
Yu et al., "An Analysis of Super-Net Heuristics in Weight-Sharing NAS," IEEE, Oct. 4, 2021, 14 pages.
Zhao et al., "Few-shot Neural Architecture Search," Jun. 11, 2020, 13 pages.

* cited by examiner

| PRUNET Without Distillation Comparison | | | | | | |
|---|---|---|---|---|---|---|
| Models | Top1 ImageNet | TensorRT Latency FP16 V100 (ms) | #Params (10e6) | #FLOPS (10e9) | PRUNET Speedup † | PRUNET Accuracy † |
| EfficientNet-B0 | 77.1 | 0.94 | 5.28 | 0.38 | 1.96x | 1.3 |
| EfficientNetX-B0-GPU | 77.3 | 0.96 | 7.6 | 0.91 | 2x | 1.1 |
| REGNETY-1.6GF | 78 | 2.55 | 11.2 | 1.6 | 5.31x | 0.4 |
| **PRUNET -0** | 78.4 | 0.48 | 11.3 | 2.10 | | |
| OFA 389 | 79.1 | 0.94 | 8.4 | 0.78 | 1.68x | 0.5 |
| EfficientNetX-B1-GPU | 79.4 | 1.37 | 9.6 | 1.58 | 2.45x | 0.2 |
| OFA 482 | 79.6 | 1.06 | 9.1 | 0.96 | 1.89x | 0.0 |
| **PRUNET -1** | 79.6 | 0.56 | 14.8 | 2.57 | | |
| FBNetV3-B | 79.8 | 1.5 | 8.6. | 0.46 | 2.27x | 0.9 |
| EfficientNetX-B2-GPU | 80.0 | 1.46 | 10 | 2.3 | 2.21x | 0.7 |
| EfficientNet-B2 | 80.3 | 1.65 | 9.2 | 1 | 2.5x | 0.4 |
| ResNet-50 | 80.3 | 1.1 | 28.09 | 4. | 1.67x | 0.4 |
| GPUNet-1 | 80.5 | 0.69 | 12.7 | 3.3 | 1.04x | 0.2 |
| **PRUNET -2** | 80.7 | 0.66 | 18.6 | 3.31 | | |
| REGNETY-32GF | 81 | 4.97 | 145 | 32.3 | 6.45x | 0.2 |
| **PRUNET -3** | 81.2 | 0.77 | 20.8 | 4.05 | | |
| EfficientNetX-B3-GPU | 81.4 | 1.9 | 13.3 | 4.3 | 2.09x | 0.1 |
| **PRUNET -4** | 81.5 | 0.91 | 24.0 | 4.25 | | |
| EfficientNet-B3 | 81.6 | 2.04 | 12 | 1.8 | 1.91x | 0.3 |
| **PRUNET -5** | 81.9 | 1.07 | 27.5 | 5.29 | | |
| ResNet-101 | 82.0 | 1.7 | 45 | 7.6 | 1.33x | 0.3 |
| FBNetV3-F | 82.1 | 1.97 | 13.9 | 1.18 | 1.54x | 0.2 |
| GPUNet-2 | 82.2 | 1.57 | 25.8 | 8.38 | 1.23x | 0.1 |
| **PRUNET -6** | 82.3 | 1.28 | 31.1 | 7.36 | | |
| PRUNET With Distillation Comparison | | | | | | |
| **PRUNET -0 (distilled)** | 80.0 | 0.48 | 11.3 | 2.10 | | |
| GPUNet-0 (distilled) | 80.7 | 0.61 | 11.9 | 3.25 | 1.09x | 0.3 |
| **PRUNET -1 (distilled)** | 81.0 | 0.56 | 14.8 | 2.57 | | |
| GPUNet-1 (distilled) | 81.9 | 0.69 | 12.7 | 3.3 | 1.04x | 0.3 |
| **PRUNET -2 (distilled)** | 82.2 | 0.66 | 18.5 | 3.31 | | |
| **PRUNET -3 (distilled)** | 82.6 | 0.77 | 20.8 | 4.05 | | |
| **PRUNET -4 (distilled)** | 83.1 | 0.91 | 24.0 | 4.25 | | |
| **PRUNET -5 (distilled)** | 83.4 | 1.07 | 27.5 | 5.29 | | |
| GPUNet-2 (distilled) | 83.5 | 1.57 | 25.8 | 8.38 | 1.23x | 0.5 |
| EfficientNetV2-S | 83.9 | 2.67 | 22 | 8.8 | 2.09x | 0.1 |
| **PRUNET -6 (distilled)** | 84.0 | 1.28 | 31.1 | 7.36 | | |

FIG. 5

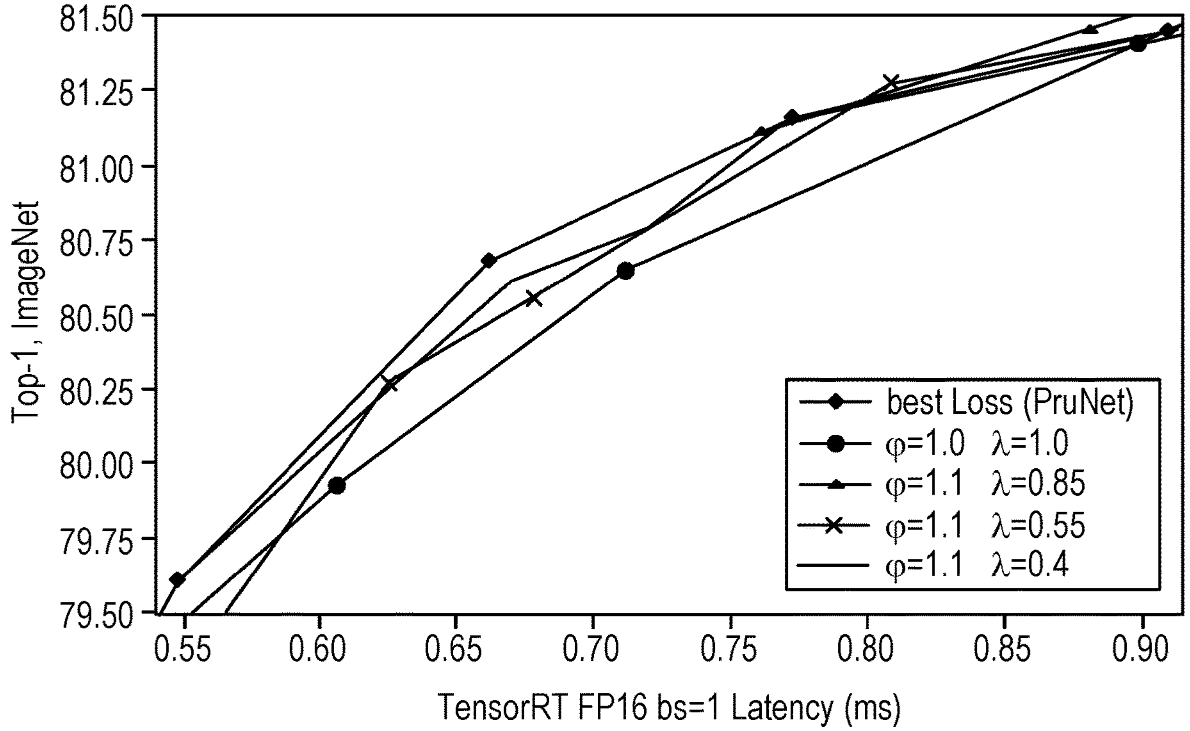
Graph 1102
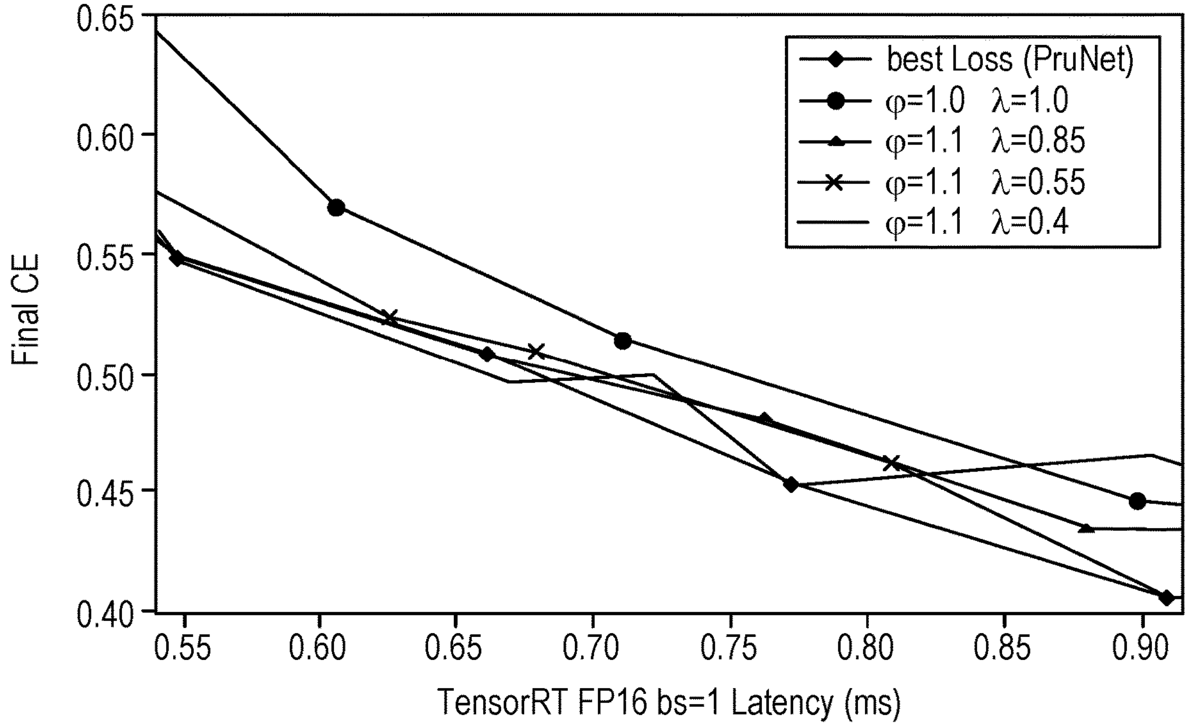
Graph 1104
FIG. 11

GENERATING NEURAL NETWORK HYPERPARAMETERS

CROSS-REFERENCE TO RELATED APPLICATIONS

This application is related to and incorporates by reference for all purposes the full disclosure of co-pending U.S. patent application Ser. No. 17/950,009, filed concurrently herewith, entitled "GENERATING NEURAL NETWORKS," and the full disclosure of co-pending U.S. patent application Ser. No. 17/950,018, filed concurrently herewith, entitled "REMOVING NEURAL NETWORK LAYERS" (now issued as U.S. Pat. No. 12,664,432).

TECHNICAL FIELD

At least one embodiment pertains to processing resources used to generate one or more neural networks. For example, at least one embodiment pertains to processors or computing systems used to generate one or more neural networks according to various novel techniques described herein.

BACKGROUND

Generating neural networks is an important task in various contexts. However, certain circumstances can cause less than optimal performance of the neural networks as well as the generation of the neural networks. Less than optimal performance of neural networks as well as generation of the neural networks can degrade performance of various tasks that use neural networks. The amount of memory, time, or computing resources used to generate and use neural networks can be improved.

BRIEF DESCRIPTION OF DRAWINGS

FIG. 5 illustrates an example of results, according to at least one embodiment;

FIG. 11 illustrates another example of results, according to at least one embodiment;

DETAILED DESCRIPTION

Figure 1:
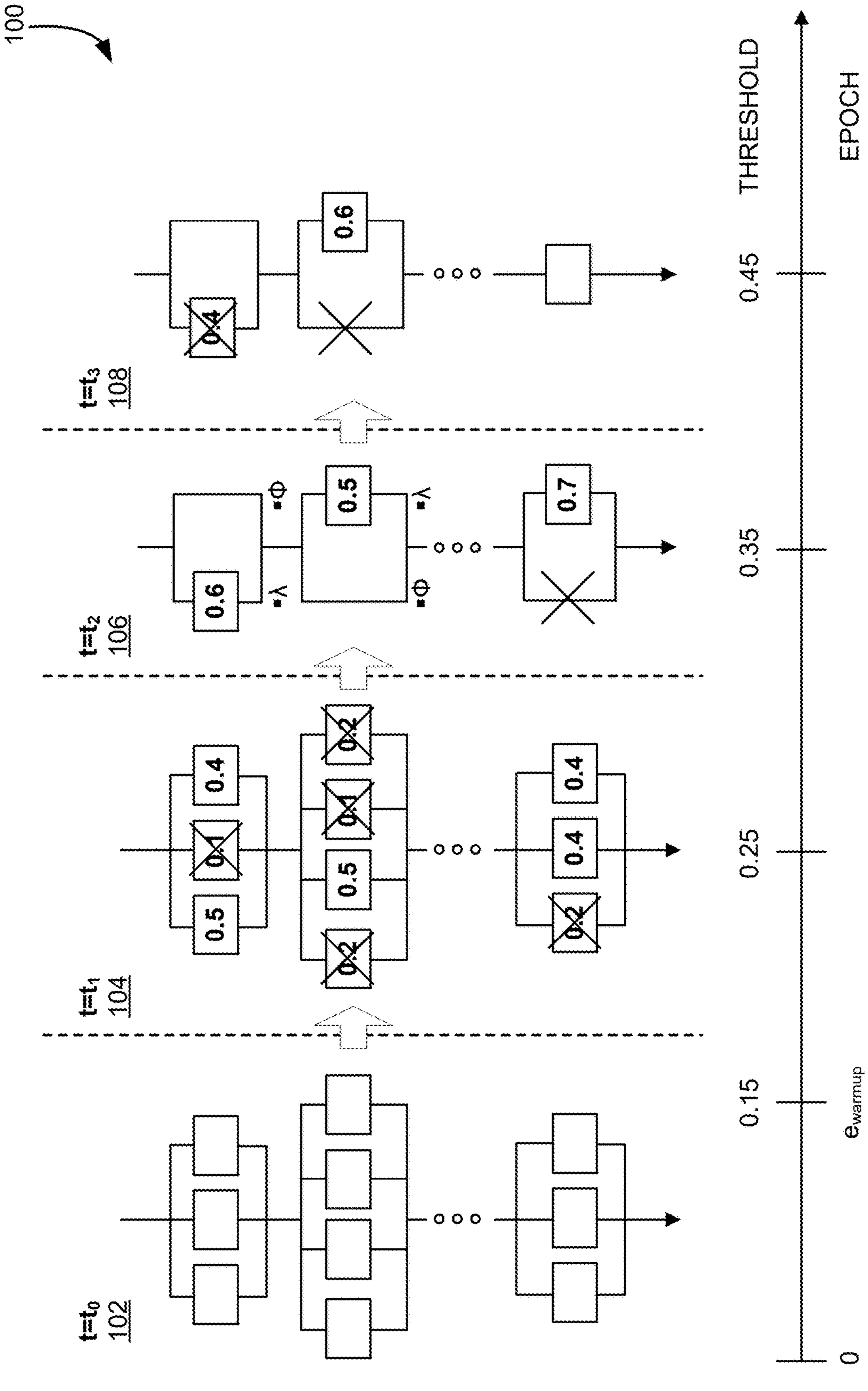
FIG. 1 illustrates an example of a differentiable neural architecture search (DNAS) process, according to at least one embodiment.

In at least one embodiment, neural architecture search (NAS) refers to one or more processes of calculating or otherwise defining a neural network. In at least one embodiment, NAS is associated with a search space of permissible neural architectures, a search strategy to sample architectures from said space, and an evaluation method to assess performance of selected architectures. In at least one embodiment, said search space indicates potential operations, configurations, and/or variations thereof for an architecture of said neural network. In at least one embodiment, said architecture of said neural network refers to a structure and/or design of said neural network (e.g., operations of said neural network, connections between said operations), in which said neural network can be trained and utilized for various tasks.

In at least one embodiment, one or more systems perform a differentiable NAS (DNAS) process, which refers to one or more processes of optimizing model weight and architecture parameters in a weight-sharing supernet using gradient-based algorithms to form a final neural network architecture. In at least one embodiment, a supernet such as those described herein, also referred to as a supernetwork, SuperNet, and/or variations thereof, refers to a composition or other suitable representation of various potential neural network architectures, operations, configurations, and/or variations thereof. In at least one embodiment, said supernet is a directed acyclic graph (DAG) whose subgraphs indicate different candidate neural network architectures. In at least one embodiment, said supernet indicates all potential architectures within a search space, in which said supernet is processed through one or more DNAS processes to calculate a neural network architecture. In at least one embodiment, one or more systems perform various pruning processes as part of said DNAS process.

In at least one embodiment, one or more systems utilize various pruning processes to improve cost and results of hardware-aware DNAS. In at least one embodiment, one or more systems utilize a stochastic bi-path building block for DNAS, also referred to as prunode, which can search over inner hidden dimensions with O(1) memory and compute complexity. In at least one embodiment, one or more systems utilize an algorithm for pruning blocks within a stochastic layer of a supernet during said DNAS process. In at least one embodiment, one or more systems perform various pruning processes for pruning unnecessary stochastic layers during said DNAS process. In at least one embodiment, neural network models resulting from one or more processes such as those described herein are referred to as PruNet.

In at least one embodiment, one or more systems optimize weight sharing processes based on supernets with architecture weights, in which said processes are efficient because with $O(\Sigma_i N_i)$ computation cost, one or more systems can search over $\Pi_i N_i$ candidates, where $N_i$ is number of candidates on layer i. In at least one embodiment, GPU memory consumption is of $O(\Sigma_i N_i)$ complexity.

In at least one embodiment, one or more systems perform pruning processes in connection with an internal structure of a block. In at least one embodiment, one or more systems utilize a multi-block referred to as Prunode, which learns optimal values of parameters, such as an expansion parameter in an inverted residual block (IRB). In at least one embodiment, computation and memory cost of Prunode is equal to cost of calculating two candidates. In at least one embodiment, Prunode in each iteration emulates two candidates, each with a different number of channels in internal structure. In at least one embodiment, said candidates are modified based on current architecture weights. In at least one embodiment, candidates are processed to cause convergence towards an optimal number of channels.

In at least one embodiment, one or more systems perform pruning processes in connection with blocks within a stochastic layer. In at least one embodiment, one or more systems perform progressive pruning based on trained architecture weights. In at least one embodiment, one or more systems remove blocks from said search space when a likelihood of a block being sampled is low enough. In at least one embodiment, reduction of size of said search space reduces computation cost and reduces co-adoption among operations. In at least one embodiment, one or more systems perform pruning processes on stochastic layers. In at least one embodiment, one or more systems perform pruning processes for skipping whole layers in a supernet.

In at least one embodiment, one or more processes such as those described herein are performed by any suitable system and/or collection of systems, such as those associated with one or more programming models such as a Compute Unified Device Architecture (CUDA) model, Heterogeneous compute Interface for Portability (HIP) model, oneAPI model, various hardware accelerator programming models, and/or variations thereof. In at least one embodiment, one or more processes such as those described herein are performed in connection with any suitable machine learning and/or neural network framework, such as TensorFlow, Boost, Caffe, Microsoft Cognitive Toolkit/CNTK, MXNet, Chainer, Keras, Deeplearning4j, and/or variations thereof.

FIG. 1 illustrates an example 100 of a differentiable neural architecture search (DNAS) process, according to at least one embodiment. In at least one embodiment, one or more processes of example 100 are performed a system to generate a neural network, also referred to as a model, neural network model, machine learning model, and/or variations thereof, for any suitable task or process, such as image processing, image classification, image segmentation, computer vision tasks, natural language processing, and/or variations thereof. In at least one embodiment, said system performs one or more processes depicted in and/or described in connection with example 100 as part of a DNAS process, also referred to as a NAS, NAS algorithm, NAS process, and/or variations thereof, to output or otherwise generate said neural network.

In at least one embodiment, said system is any suitable system and/or collection of systems, such as those associated with or otherwise part of various machine learning and/or neural network frameworks (e.g., TensorFlow, Boost, Caffe, Microsoft Cognitive Toolkit/CNTK, MXNet, Chainer, Keras, Deeplearning4j). In at least one embodiment, said system comprises a collection of hardware and/or software computing resources with instructions that, when executed, performs various operations such as those described herein. In at least one embodiment, said system includes any suitable processing unit and/or combination of processing units, such as one or more central processing units (CPUs), graphics processing units (GPUs), general purpose GPUs (GPGPUs), parallel processing units (PPUs), and/or variations thereof.

In at least one embodiment, said system defines or otherwise obtains a supernet. In at least one embodiment, said system processes said supernet to output said neural network. In at least one embodiment, said system processes said supernet to calculate an architecture of output said neural network. In at least one embodiment, a supernet such as those described herein is implemented using one or more data structures, objects, and/or variations thereof that encode or otherwise indicate data of a composition or other suitable representation of various potential neural network architectures, operations, configurations, and/or variations thereof. In at least one embodiment, said supernet is a data structure that encodes or otherwise indicates one or more blocks.

In at least one embodiment, said system performs a layer-wise search, in which each layer can use a different building block. In at least one embodiment, said supernet has a layered structure, in which each layer is built from blocks corresponding to neural network operations (e.g., Inverted Residual Blocks in computer vision, self-attention blocks in natural language processing, and/or any suitable operations associated with any suitable tasks). In at least one embodiment, said blocks perform or otherwise implement said neural network operations. In at least one embodiment, said system selects one block in each layer to form said neural network.

In at least one embodiment, said system outputs said neural network by at least selecting one block in each layer of said supernet. In at least one embodiment, a block is also referred to as a candidate layer, potential layer, layer, operation, neural network layer, and/or variations thereof. In at least one embodiment, each layer of said supernet corresponds to a respective layer of said neural network. In at least one embodiment, a layer of said supernet is associated with a set of blocks, in which each block of said set of blocks indicates a potential or candidate layer to be used as part of said neural network (e.g., as a layer of said neural network corresponding to said layer of said supernet).

In at least one embodiment, layers, which have an input and output of equal shape, can be replaced by skip connections during search, which can make said network shallower. In at least one embodiment, a skip connection operation in a particular layer (e.g., indicated by a skip connection block in said particular layer) refers to an operation that provides data from a previous layer to a subsequent layer. In at least one embodiment, supernets must have a predetermined number of output channels for each layer. In at least one embodiment, said system utilizes a network such as GPUNet-1, or any suitable model, as a baseline network. In at least one embodiment, said system processes search space of said supernet defined by following table, although any variations thereof can be utilized:

| Stage | Type | Stride | Kernel | # Layers | Activation | Expansion | Filters | SE |
|---|---|---|---|---|---|---|---|---|
| 0 | Conv | 2 | {3, 5} | 1 | Swish | | 24 | |
| 1 | Conv | 1 | {3, 5} | 2 | RELU | | 24 | |
| 2 | Fused-IRB | 2 | {3, 5} | 3 | Swish | (0, 8] | 64 | {0, 1} |
| 3 | Fused-IRB | 2 | {3, 5} | 3 | Swish | (0, 8] | 96 | {0, 1} |
| 4 | IRB | 2 | {3, 5} | 2 | Swish | (0, 8] | 160 | {0, 1} |
| 5 | IRB | 1 | {3, 5} | 5 | RELU | (0, 8] | 288 | {0, 1} |
| 6 | IRB | 2 | {3, 5} | 6 | RELU | (0, 8] | 448 | {0, 1} |
| 7 | Conv + Pool + FC | 1 | 1 | 1 | RELU | | 1280 | |

In at least one embodiment, one or more systems sample all possible expansions with channel granularity set to 32 (e.g., number of channels is forced to be a multiple of 32), or any suitable value, and consider skip connections for all residual layers, in which said search space covers $3^2*24*65*64*97^2*96*161*160*289^4*288*449^4\approx1.7e39$ candidates.

In at least one embodiment, as part of said DNAS process, said system performs multi-objective optimization denoted through following formula, although any variations thereof can be utilized:

$$\min_{\psi}\min_{\theta} L(\psi, \theta)$$

in which $\psi$ are weights of said network (e.g., supernet) and $\theta$ are architecture weights. In at least one embodiment, as part of said DNAS process, said system minimizes following latency-aware loss function denoted as following, although any variations thereof can be utilized:

$$L(\psi, \theta) = CE(\psi, \theta) + \alpha \log(LAT(\theta))^{\beta}$$

in which CE(ψ, θ) is cross entropy loss, although any suitable loss function and/or combination of loss functions can be utilized, and LAT(θ) is latency of said network. In at least one embodiment, coefficient α defines trade-off between accuracy and latency. In at least one embodiment, higher α results in finding networks with lower latency and lower α results in finding networks with higher accuracy. In at least one embodiment, coefficient β scales a magnitude of latency. In at least one embodiment, said loss function is hardware-aware, in which said system optimizes latency of networks for particular hardware. In at least one embodiment, coefficient α and/or coefficient β are referred to as latency constraints, latency coefficients, and/or variations thereof.

In at least one embodiment, said system trains said supernet using one or more continuous relaxation processes. In at least one embodiment, output of l-th layer is calculated through following formula, although any variations thereof can be utilized:

$$x_{l+1} = \sum_i a_{l,i} \cdot B_{l,i}(x_l)$$

in which $x_l$ is output of layer (l−1), $B_{l,i}(x_l)$ represents output of i-th block of l-th layer. In at least one embodiment, every block in a layer is assumed to have same input and output tensor shapes. In at least one embodiment, each block is associated with one or more network weights (e.g., ψ) and/or architecture weights (e.g., θ) which can be updated by said system using various processes, formulas, and/or functions such as those described herein. In at least one embodiment, coefficients $a_{l,i}$ are based on a Gumbel-Softmax distribution, or any suitable distribution, and defined through following formula, although any variations thereof can be utilized:

$$a_{l,i} = \text{Gumbel-Softmax}(\theta_{l,i} \mid \theta_l) = \frac{\exp[(\theta_{l,i} + g_{l,i})/\tau]}{\sum_j \exp[(\theta_{l,i} + g_{l,i})/\tau]}$$

in which $\theta_{l,i}$ is architecture weight of a particular block, $g_{l,i}$ is sampled from Gumbel(0, 1), and parameter τ controls temperature of Gumbel-Softmax function. In at least one embodiment, said system sets t to have a constant value throughout training. In at least one embodiment, architecture weights θ are differentiable and updated or otherwise calculated by said system using gradient descent alongside ψ weights.

In at least one embodiment, total latency, denoted by LAT(θ), is a sum of latencies of all layers in said supernet. In at least one embodiment, latency of a layer is a sum of latencies of its blocks weighted by Gumbel-Softmax coefficients, indicated through following formula, although any variations thereof can be utilized:

$$LAT(\theta) = \sum_l \sum_i a_{l,i} \cdot LAT(B_{l,i}).$$

In at least one embodiment, said system selects a target device for inference, which can be any suitable device, such as those associated with one or more GPUs, CPUs, GPGPUs, PPUs, and/or variations thereof. In at least one embodiment, for selected hardware, said system pre-computes and stores in a lookup table, or any suitable data structure, latency LAT ($B_{l,i}$) for every permissible block. In at least one embodiment, said system, for search, does not need to compute any further latencies and can run on arbitrary hardware (e.g., for embedded target hardware used in autonomous vehicles, said system can train network on a super computer). In at least one embodiment, said system performs training using a smaller proxy dataset to make supernet training faster. In at least one embodiment, once final architecture is obtained from said supernet, it is evaluated and re-trained from scratch on a full dataset.

In at least one embodiment, said system obtains training data, also referred to as a training dataset, neural network training data, and/or variations thereof, to train said supernet. In at least one embodiment, said training data is any suitable data for training one or more neural networks. In at least one embodiment, said training data comprises data and associated labels, which may be based on a particular task of a neural network. In at least one embodiment, said particular task is any suitable neural network task, such as computer vision tasks, NLP tasks, speech processing tasks, recommendation system tasks, and/or variations thereof. In at least one embodiment, said associated labels indicate one or more results of said particular task based on said data of said training dataset. In at least one embodiment, said training data comprises images and associated labels. In at least one embodiment, said training data is in accordance with those described elsewhere herein, such as in connection with FIG. 7.

In at least one embodiment, said system performs a training process using said training data in connection with said supernet as part of said DNAS process. In at least one embodiment, said training process comprises one or more training epochs. In at least one embodiment, a particular epoch is denoted as e, or any suitable notation. In at least one embodiment, a training epoch refers to a portion of said training process. In at least one embodiment, said training epoch refers to an interval of said training process in which said training data is processed through said supernet. In at least one embodiment, during said training process, a number of epochs that have elapsed indicates progress of said training process. In at least one embodiment, said training epoch comprises one or more training iterations. In at least one embodiment, a training iteration refers to an interval of a particular training epoch in which a set of said training data is processed through said supernet.

In at least one embodiment, as part of each training iteration, said system causes said supernet to process a set of said training data, and updates weights (e.g., network weights and/or architecture weights) of said supernet based, at least in part, on results of said processing. In at least one embodiment, said system updates said weights using various processes, formulas, and/or functions such as those described herein. In at least one embodiment, as an illustrative example, as part of a particular training iteration, said system causes said supernet to process a set of said training data to calculate a set of outputs, computes loss using one or more loss functions such as those described herein based, at least in part, on said set of outputs and ground truth data (e.g., labels) of said set of said training data, and updates said weights (e.g., network weights and/or architecture weights) of said supernet to minimize loss computed using said one or more loss functions. In at least one embodiment, said training process is complete when said system, at end of a particular training epoch, computes loss that is less than a defined threshold, accuracy that is greater than a defined threshold, and/or any suitable metric. In at least one embodiment, said training process is complete after a defined number of training epochs. In at least one embodiment, said system performs said training process using one or more processes such as those described in connection with FIG. 13.

In at least one embodiment, said supernet comprises one or more layers, each comprising one or more blocks, in which said system, as part of said DNAS process, selects a set of blocks from said one or more layers to form said neural network. In at least one embodiment, a first time 102 depicts a state of said supernet. In at least one embodiment, first time 102 depicts said supernet at a start of said training process. In at least one embodiment, said system, for each block in layer l, initializes a block's architecture weight as $1/N_l$ where $N_l$ is a number of blocks in layer l. In at least one embodiment, as an illustrative example, a particular layer comprises 4 blocks, in which an architecture weight of each block is initialized as 0.25 (e.g., 1/4, where 4 is a number of blocks in said particular layer).

In at least one embodiment, said system does not modify architecture weights for first $e_{warmup}$ epochs, which can be any suitable number. In at least one embodiment, after warmup phase is finished, said supernet can be pruned, which refers to one or more processes in which, when a block in a layer has a probability of being chosen below a threshold, it is removed from said layer. In at least one embodiment, an architecture weight of a block indicates a probability of said block being chosen (e.g., by said system) to be part of said output neural network. In at least one embodiment, said threshold changes linearly during training and depends only on value of current epoch of training. In at least one embodiment, said threshold increases linearly based, at least in part, on training progress. In at least one embodiment, during epoch $e>e_{warmup}$, said system computes said threshold t through following equation, although any variations thereof can be utilized:

$$t(e) = t_{initial} + (t_{final} - t_{initial})\frac{e - e_{warmup}}{e_{total} - e_{warmup}}.$$

In at least one embodiment, initial threshold is not greater than $1/\max(N_l)'$ in which $\max(N_l)$ is highest number of blocks in a layer, so no blocks are immediately removed after warmup phase. In at least one embodiment, final threshold is not less than 0.5, thus, during training, all blocks but one are removed from each layer of said supernet.

In at least one embodiment, a second time 104 depicts a state of said supernet at a particular training epoch after one or more training epochs. In at least one embodiment, second time 104 depicts state of said supernet after first time 102. In at least one embodiment, at second time 104, said system calculates architecture weights for blocks (e.g., depicted in FIG. 1 as a number inside a block). In at least one embodiment, at second time 104, said system calculates said threshold to be a value of 0.25. In at least one embodiment, at second time 104, said system removes blocks from said supernet with architecture weights less than said threshold at second time 104. In at least one embodiment, referring to FIG. 1, removed blocks are depicted as through crossed lines.

In at least one embodiment, a third time 106 depicts a state of said supernet at a particular training epoch after one or more training epochs. In at least one embodiment, third time 106 depicts state of said supernet after second time 104. In at least one embodiment, at third time 106, said system calculates architecture weights for blocks. In at least one embodiment, at third time 106, said system calculates said threshold to be a value of 0.35. In at least one embodiment, at third time 106, said system removes blocks from said supernet with architecture weights less than said threshold at third time 106 (e.g., said system removes a skip connection block, depicted by a straight line, with an architecture weight not depicted that is below said threshold at third time 106). In at least one embodiment, a fourth time 108 depicts a state of said supernet at a particular training epoch after one or more training epochs. In at least one embodiment, fourth time 108 depicts state of said supernet after third time 106. In at least one embodiment, at fourth time 108, said system calculates architecture weights for blocks. In at least one embodiment, at fourth time 108, said system calculates said threshold to be a value of 0.45. In at least one embodiment, at fourth time 108, said system removes blocks from said supernet with architecture weights less than said threshold at fourth time 108.

In at least one embodiment, said system continuously calculates architecture weights for blocks of said supernet (e.g., through one or more training iterations), calculates said threshold based at least in part on a current epoch, and removes blocks of said supernet with architecture weights less than said calculated threshold of said current epoch, for any suitable number of training epochs. In at least one embodiment, said system performs removal of any suitable blocks (e.g., blocks with architecture weights less than a calculated threshold for a current epoch) of said supernet once per epoch, or at any suitable interval. In at least one embodiment, said system forms said neural network comprising remaining blocks of said supernet after said training process, which can comprise any suitable number of training epochs. In at least one embodiment, said training process is complete when, at end of a particular training epoch, a single block remains in each layer of said supernet. In at least one embodiment, said neural network can be trained and/or utilized as part of various tasks.

In at least one embodiment, various layers of said supernet may have same input and output tensor sizes, in which such layers can be removed to obtain a shorter network. In at least one embodiment, removing a layer is equivalent to choosing a skip connection block. In at least one embodiment, instead of adding a skip connection block to a set of possible blocks of a layer, said system utilizes a GPU memory optimization. In at least one embodiment, when a penultimate block is to be removed from a layer by said system, said system replaces said block with a skip connection block, in which an output of said skip connection block is multiplied by said system using a value denoted as $\phi$, and an output of other remaining block is multiplied by said system using parameter $\lambda$, where $\phi$ and $\lambda$ are coefficients fixed for whole training and each layer uses same values of these parameters. In at least one embodiment, once said skip connection block or said other block is removed from said layer, output is no longer multiplied by any parameter. In at least one embodiment, said system, by selecting different λ and ϕ values, can reduce bias towards shallower networks and can calculate more optimal architectures.

In at least one embodiment, referring to FIG. 1, between second time 104 and third time 106 and/or at third time 106, said system, for a particular layer, after a penultimate block is to be removed by said system (e.g., an architecture weight for said penultimate block is below a calculated threshold for a particular epoch), said system replaces said penultimate block with a skip connection block (e.g., depicted in FIG. 1 as a straight path) and multiplies output of said skip connection block by ϕ and multiples output of remaining other block in said particular layer by λ. In at least one embodiment, referring to FIG. 1, at third time 106, a particular layer comprises a remaining block and a skip connection block, in which output of said skip connection block is multiplied by said system by ϕ and output of said remaining block is multiplied by said system by λ. In at least one embodiment, said system determines whether to remove said particular neural network layer by at least calculating architecture weights for said remaining block and said skip connection block, in which said system determines to remove said particular neural network layer when said system removes said remaining block from said supernet based at least in part on said architecture weights.

In at least one embodiment, FIG. 1 depicts one or more processes of said system to process said supernet. In at least one embodiment, FIG. 1 depicts a trimming procedure for said supernet. In at least one embodiment, for first $e_{warmup}$ epochs, said system trains only network weights, and does not modify architecture weights. In at least one embodiment, after warmup phase (e.g., $e_{warmup}$ epochs), said system increases threshold linearly. In at least one embodiment, if an architecture weight of a block is below current threshold, said system removes said block. In at least one embodiment, if a penultimate block is to be removed from a layer, said block is replaced by a skip connection block, in which said system multiplies output of said skip connection block by p, and multiplies output of other block by λ. In at least one embodiment, a penultimate block in a particular layer refers to a second to last remaining block in said particular layer.

In at least one embodiment, for a particular layer with a skip connection block and a remaining block, in a particular training epoch, said system determines whether to remove said particular layer by at least calculating a first architecture weight for said skip connection block and a second architecture weight for said remaining block, and comparing said architecture weights with a calculated threshold for said particular training epoch, in which said system determines to remove said particular layer only if said second architecture weight is less than said calculated threshold (e.g., resulting in said system removing said remaining block from said particular layer such that only said skip connection block remains in said particular layer, effectively removing said particular layer). In at least one embodiment, for each layer with a skip connection block and a remaining block, said system continuously, for any number of training epochs, determines whether to remove said layer by at least calculating architecture weights for said blocks and comparing said architecture weights with a calculated threshold for a current training epoch. In at least one embodiment, at end of said one or more processes of said system to process said supernet, every layer of said supernet contains exactly one block, in which remaining blocks of said supernet form said neural network (e.g., a non-stochastic network).

In at least one embodiment, remaining blocks of said supernet form said neural network. In at least one embodiment, said system generates or otherwise calculates said neural network such that said neural network indicates or otherwise comprises remaining blocks of said supernet. In at least one embodiment, said system outputs remaining blocks of said supernet as said neural network. In at least one embodiment, said system outputs said neural network in any suitable manner, such as through one or more data structures and/or objects that encode or otherwise indicate said architecture (e.g., remaining blocks of said supernet, connections between said remaining blocks, and/or variations thereof) and/or other data of said neural network. In at least one embodiment, said neural network can be trained by one or more systems and/or utilized as part of one or more processes and/or tasks, such as image processing, image classification, image segmentation, computer vision tasks, natural language processing, and/or variations thereof.

In at least one embodiment, said system obtains said supernet, performs one or more processes such as those described herein, and calculates said neural network comprising or otherwise indicating remaining blocks of said supernet after any suitable number of training epochs of said training process. In at least one embodiment, after said training process, said system outputs said neural network, which can be additionally trained by one or more systems and utilized for various tasks such as those described herein.

Figure 2:
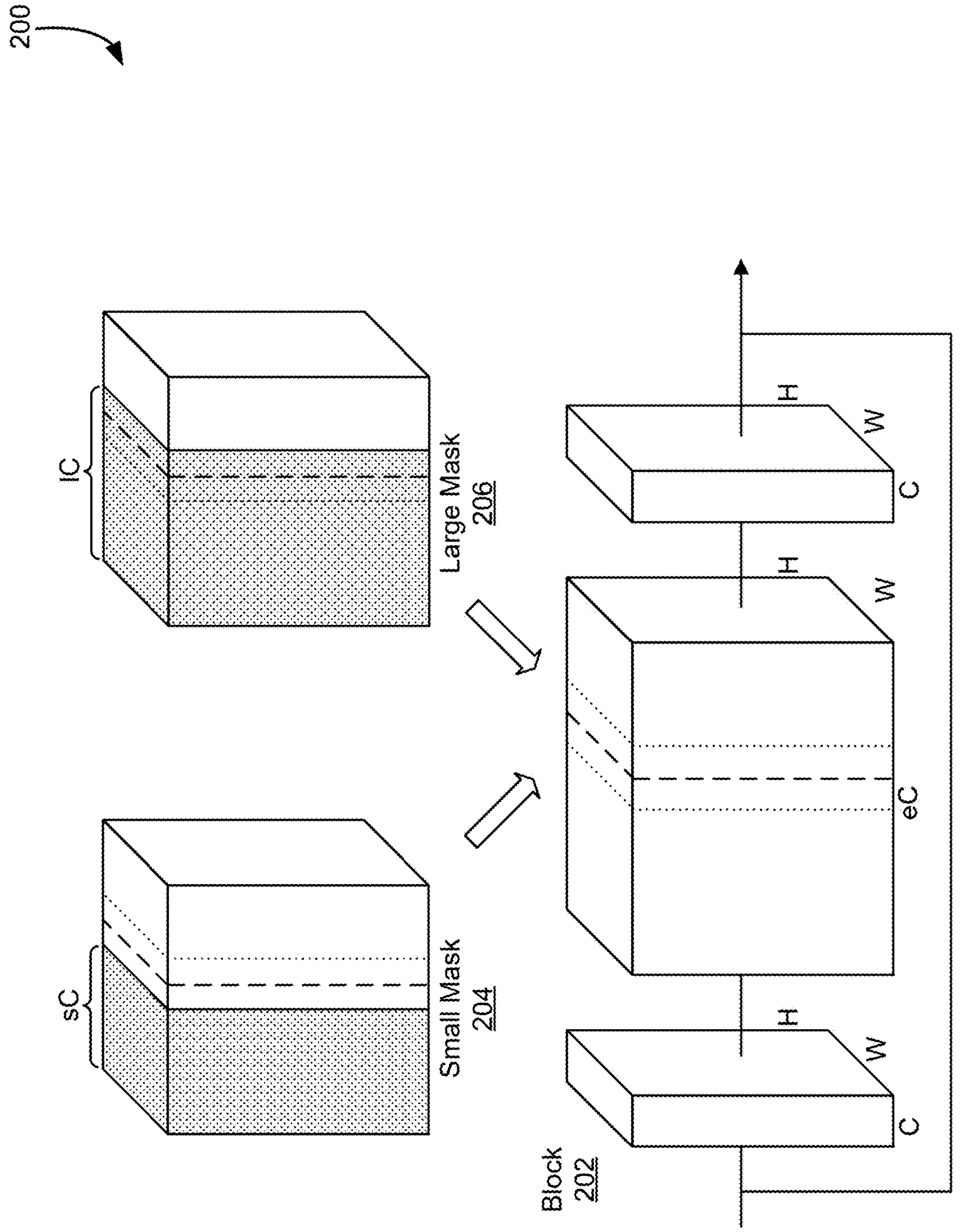
FIG. 2 illustrates an example of a block and masks, according to at least one embodiment.

FIG. 2 illustrates an example 200 of a block and masks, according to at least one embodiment. In at least one embodiment, example 200 includes a block 202, a small mask 204, and a large mask 206. In at least one embodiment, block 202 is in accordance with those described in connection with FIG. 1. In at least one embodiment, block 202 is one of blocks depicted in FIG. 1. In at least one embodiment, a block such as those described herein refers to an indication of a particular neural network operation and/or combination of operations, and is implemented using any suitable data structure and/or object that encodes data (e.g., instructions and/or other configuration data) of said particular neural network operation and/or combination of operations. In at least one embodiment, said block is also referred to as a candidate, neural network layer, operation, and/or variations thereof. In at least one embodiment, block 202 is part of a particular layer of said supernet as described in connection with FIG. 1.

In at least one embodiment, said block includes instructions that, when executed, cause performance of one or more processes of said block. In at least one embodiment, said system uses said block to perform one or more processes of said block. In at least one embodiment, said system causes said block to perform one or more processes of said block. In at least one embodiment, said block obtains or otherwise receives input data, and performs one or more processes to produce output data, in which a type of said block indicates said one or more processes (e.g., a convolution block performs one or more convolution processes). In at least one embodiment, types of blocks include IRB, fused IRB, convolution blocks, skip connection blocks, self-attention blocks, and/or any suitable block corresponding to any suitable neural network operation and/or combination of operations.

In at least one embodiment, said system utilizes one or more processes to calculate optimal values of discrete inner hidden dimensions, also referred to as hyperparameters, of a block. In at least one embodiment, said system requires that an impact of discrete parameters on an objective function (e.g., function of latency and accuracy) is predictable (e.g., small parameter values mean a negative impact on accuracy but a positive impact on latency, and large parameter values mean a positive impact on accuracy but negative impact on latency), as well as it to be regular (e.g., impacts are monotonic with regard to parameter value). In at least one embodiment, said parameter, also referred to as a hyperparameter, can be any suitable parameter or dimension associated with any suitable block, such as an expansion ratio in an Inverted Residual Block (IRB), in which said system utilizes one or more masks (e.g., small mask 204 and/or large mask 206) to calculate an optimal value of said parameter to be used in one or more neural networks.

In at least one embodiment, a block referred to as prunode, Prunode, and/or variations thereof, comprises two copies of a same block. In at least one embodiment, both blocks share weights, in which a difference between blocks is masking. In at least one embodiment, masks are applied to a hidden dimension of a block. In at least one embodiment, a mask refers to a set of data that can be utilized to filter out or otherwise remove, also referred to as mask, portions of other data. In at least one embodiment, said mask is implemented using one or more data structures and/or objects that encode data of said mask. In at least one embodiment, said mask is one or more vectors and/or matrices. In at least one embodiment, said system applies said mask by multiplying or otherwise processing data using said mask. In at least one embodiment, said system applies said mask to a particular part (e.g., hidden dimension) of a block by at least using said mask to filter out or otherwise remove one or more portions of said particular part. In at least one embodiment, said system applies said mask to a block to cause a dimension of said block to be a particular value, also referred to as a hyperparameter or hyperparameter value.

In at least one embodiment, as an illustrative example, a mask comprising values of all 1 s, when applied to a particular part of a block, does not remove or otherwise filter out any portions of said particular part (e.g., a value of said particular part, when multiplied or otherwise processed by a value of 1, is not removed or otherwise filtered out). In at least one embodiment, as an illustrative example, a mask comprising values of all 0 s, when applied to a particular part of a block, removes or otherwise filters out all portions of said particular part (e.g., a value of said particular part, when multiplied or otherwise processed by a value of 0, is removed or otherwise filtered out, also referred to as masked). In at least one embodiment, as an illustrative example, a mask, in which a half of said mask comprises values of all 0 s and another half of said mask comprises values of all 1 s, when applied to a particular part of a block, removes or otherwise filters out half of said particular part (e.g., half of said particular part are multiplied or otherwise processed by a value of 1, thus not being removed or otherwise filtered out, and other half of said particular part are multiplied or otherwise processed by a value of 0, thus being removed or otherwise filtered out).

In at least one embodiment, block 202 is an IRB, or any suitable block. In at least one embodiment, a prunode block corresponds to block 202 and comprises a copy of block 202 with small mask 204, also referred to as a small candidate or variant, and a copy of block 202 with large mask 206, also referred to as a large candidate or variant. In at least one embodiment, block 202, small candidate, and large candidate are each associated with a respective architecture weight that, as part of a particular training iteration of said training process, is updated by said system, utilized by said system (e.g., to update said small candidate and said large candidate and/or remove block 202), and/or reset by said system. In at least one embodiment, said system initializes small mask 204 and large mask 206 to process channels of an inner tensor of block 202 (e.g., depicted in FIG. 2 as a tensor with dimensions eC×W×H), or any suitable dimension of block 202, also referred to as a hyperparameter.

In at least one embodiment, said system initializes large mask 206 with all 1 s, in which initialized large mask 206, when applied to said inner tensor, does not filter out or otherwise remove all of said channels. In at least one embodiment, large mask 206 is indicated by a value l, or any suitable notation, in which channels not filtered out or otherwise removed by large mask 206 are depicted in FIG. 2 as a shaded region of said inner tensor. In at least one embodiment, said system initializes small mask 204 such that small mask 204, when applied to said inner tensor, filters out or otherwise removes half of said channels. In at least one embodiment, small mask 204 is indicated by a value s, or any suitable notation, in which channels not filtered out or otherwise removed by small mask 204 are depicted in FIG. 2 as a shaded region of said inner tensor. In at least one embodiment, said system generates a hyperparameter value by at least applying a mask (e.g., small mask 204 or large mask 206) to a copy of block 202 to cause a dimension of said copy (e.g., a number of channels in said inner tensor) to be a particular value, in which said particular value is said hyperparameter value.

In at least one embodiment, said system calculates an optimal mask value, denoted as o, between said candidates. In at least one embodiment, if a candidate with a larger mask l (e.g., large candidate) has a larger likelihood of being chosen (e.g., has a larger architecture weight compared to a candidate with a smaller mask s, also referred to as small candidate), then said system expands both masks (e.g., replacing values of 0 with values of 1 in both masks). In at least one embodiment, said system expands a particular mask such that said mask filters out or otherwise removes less portions of particular data. In at least one embodiment, if a candidate with a larger mask l (e.g., large candidate) has a smaller likelihood of being chosen (e.g., has a smaller architecture weight compared to a candidate with a smaller mask s, also referred to as small candidate), then said system reduces both masks (e.g., replacing values of 1 with values of 0 in both masks). In at least one embodiment, said system reduces a particular mask such that said mask filters out or otherwise removes more portions of particular data. In at least one embodiment, said system generates a new hyperparameter value by at least updating a particular mask (e.g., small mask 204 or large mask 206) applied to a particular copy of block 202 to cause a dimension of said copy (e.g., a number of channels in said inner tensor) to be a new particular value, in which said new particular value is said new hyperparameter value.

In at least one embodiment, a distance between masks, denoted as d=l−s, decreases as training progresses, and at end of search, d should be close to zero. In at least one embodiment, by end of search, final values obtained are close to each other and may approximate an optimal solution. In at least one embodiment, after search, said system samples a single candidate from two modified candidates. In at least one embodiment, said system performs one or more processes of following algorithm, although any variations thereof can be utilized:

Algorithm: Prunode masking

```
Constants c, max_distance, and granularity were set to 0.8, 0.6, and 32, respectively, or any
suitable values
arch_weight ← zeros(arch_weight); // arch_weight used by Gumbel-Softmax are initialized with zeros
preserved ← 0.5; // smaller mask is initialized in a way to mask out half of channels
last_update ← 0.0; // variable to store last update
Procedure update_masks(progress, momentum) // called after each training iteration
| if l − s > granularity then // update masks until reach consecutive choices
| | update ← last_update × momentum + arch_weight(l); // use momentum to speedup
| | // convergence
| | preserved ← preserved + update; // expand masks if larger candidate is better, reduce otherwise
| | last_update ← update;
| | d ← max_distance × (1 − progress)^2; // progress increases linearly from 0 to 1
| | if preserved > 0 then
| | | arch_weight ← zeros(arch_weight); // reset arch_weight if not corner case
| | | preserved ← min(preserved, 1 − c × d); // prevent premature convergence
| | else
| | | preserved ← 0 // ensure preserved to be non-negative
| | end
| | s ← ⌊(preserved × max_channels) / granularity⌋ × granularity; // ensure s is a multiple of granularity
| | s ← min(s, max_channels − granularity); // smaller mask shouldn't reach larger mask
| | s ← max(s, granularity); // smaller mask shouldn't mask all out channels
| | l ← ⌈((preserved + d) × max_channels) / granularity⌉ × granularity; // ensure l is a multiple of granularity
| | l ← min(l, max_channels); // larger mask shouldn't exceed maximum number of channels
| | l ← max(l, s + granularity); // larger mask should be larger than smaller mask
| | create_masks(s, l); // create masks based on s and l numbers
| end
|
```

In at least one embodiment, said system searches through discrete inner hidden dimension parameter values while minimizing memory usage and computation costs. In at least one embodiment, said system has a computation cost and memory usage of O(1) with respect to a number of all possible values, as only two candidates are evaluated every time. In at least one embodiment, as said system prunes or otherwise removes most of suboptimal candidates (e.g., blocks with architecture weights below a particular threshold for a given epoch), said supernet architecture tends to a sampled one, in which, as a result, co-adaptation among operations is minimized.

In at least one embodiment, FIG. 2 depicts masks of two candidates for an Inverted Residual Block (IRB). In at least one embodiment, said system performs channel pruning for said IRB. In at least one embodiment, inner tensor in said IRB has dimensions of eC×W'H, where C is input number of channels of said block, e is maximal expansion ratio, W and H are width and height of feature map. In at least one embodiment, small candidate uses sC channels, and large candidate uses lC channels, where s, l∈(0; e] and s<l. In at least one embodiment, said optimal candidate that said system calculates or otherwise approximates uses oC channels in which s≤o≤l. In at least one embodiment, said system generates a mask from a particular value (e.g., s, l, and/or o) such that said mask does not filter out or otherwise remove a particular number of channels, in which a ratio of said particular number of channels to a maximum number of channels is in accordance with a ratio of said particular value to a maximum value for said particular value (e.g., e). In at least one embodiment, both candidates mask out unused channels. In at least one embodiment, weights are shared between said candidates. In at least one embodiment, number of channels used by both candidates (e.g., parameters s and l) dynamically changes throughout said training process.

In at least one embodiment, said system obtains block 202 and generates or otherwise obtains small mask 204 and large mask 206 to calculate one or more values for a particular hyperparameter of block 202 (e.g., any suitable dimension of block 202, such as a number of channels in an inner tensor). In at least one embodiment, said system obtains block 202 as part of said supernet. In at least one embodiment, said system generates or otherwise obtains said prunode block corresponding to block 202 that comprises a copy of block 202 with small mask 204 applied (e.g., small candidate), and another copy of block 202 with large mask 206 applied (e.g., large candidate). In at least one embodiment, said system generates a first value of said particular hyperparameter by generating said small candidate (e.g., by applying small mask 204 to said copy of block 202) and a second value of said particular hyperparameter by generating said large candidate (e.g., by applying large mask 206 to said other copy of block 202). In at least one embodiment, said system utilizes said prunode block in said layer of said supernet (e.g., in connection with block 202 in said layer), and performs said training process as described in connection with FIG. 1.

In at least one embodiment, as part of a training iteration of a training epoch, said system calculates a first architecture weight for block 202, a second architecture weight for said small candidate, and a third architecture weight for said large candidate. In at least one embodiment, if said first architecture weight is below said threshold for said training epoch, block 202 and/or said prunode block are removed from said supernet by said system. In at least one embodiment, said system updates said small candidate and said large candidate based on said second architecture weight and said third architecture weight. In at least one embodiment, said system updates said small candidate by updating small mask 204, and updates said large candidate by updating large mask 206. In at least one embodiment, if said second architecture weight is greater than said third architecture weight, said system reduces both small mask 204 and large mask 206. In at least one embodiment, if said third architecture weight is greater than said second architecture weight, said system expands both small mask 204 and large mask 206.

In at least one embodiment, said system generates an updated first value of said particular hyperparameter by updating said small candidate (e.g., by updating and applying small mask 204 to said copy of block 202) and an updated second value of said particular hyperparameter by updating said large candidate (e.g., by updating and applying large mask 206 to said other copy of block 202). In at least one embodiment, as part of said training iteration, said system resets said third architecture weight and said second architecture weight. In at least one embodiment, said system resets said third architecture weight and said second architecture weight such that said weights equal each other and sum to a value of 1, or any suitable value (e.g., said system resets both weights to a value of 0.5, or any suitable value).

In at least one embodiment, said system continuously calculates architecture weights for said prunode block and generates new values of said particular hyperparameter (e.g., by updating said small candidate and/or said large candidate) for any number of training iterations for any number of training epochs until said prunode block is removed or until end of said training process, in which at end of said training process, said system calculates an optimal candidate by sampling from said small candidate and said large candidate. In at least one embodiment, said optimal candidate is an average of said small candidate and said large candidate. In at least one embodiment, said system calculates said optimal candidate by calculating an optimal mask from small mask 204 and large mask 206 (e.g., as an average of both masks), and applying said optimal mask to block 202 to form said optimal candidate.

In at least one embodiment, said system calculates a final value of said particular hyperparameter by calculating said optimal candidate, in which said optimal candidate's value of said particular hyperparameter is said final value. In at least one embodiment, said system utilizes said optimal candidate in place of block 202 and/or said prunode block in said layer of said supernet. In at least one embodiment, said system utilizes said optimal candidate as part of said neural network output by said system. In at least one embodiment, said system utilizes said final value as a value of said particular hyperparameter in said neural network output by said system.

In at least one embodiment, said system performs one or more processes such as those described in connection with FIG. 2 for each prunode block of said supernet. In at least one embodiment, a prunode block can be utilized for any suitable block, such as IRB, fused IRB, convolution blocks, skip connection blocks, self-attention blocks, and/or variations thereof, in which masking can be applied to calculate a value of any suitable dimension, parameter, configuration, and/or variations thereof of said block. In at least one embodiment, a prunode block such as those described herein can be utilized for any suitable block of said supernet, such as those described in connection with FIG. 1.

Figure 3:
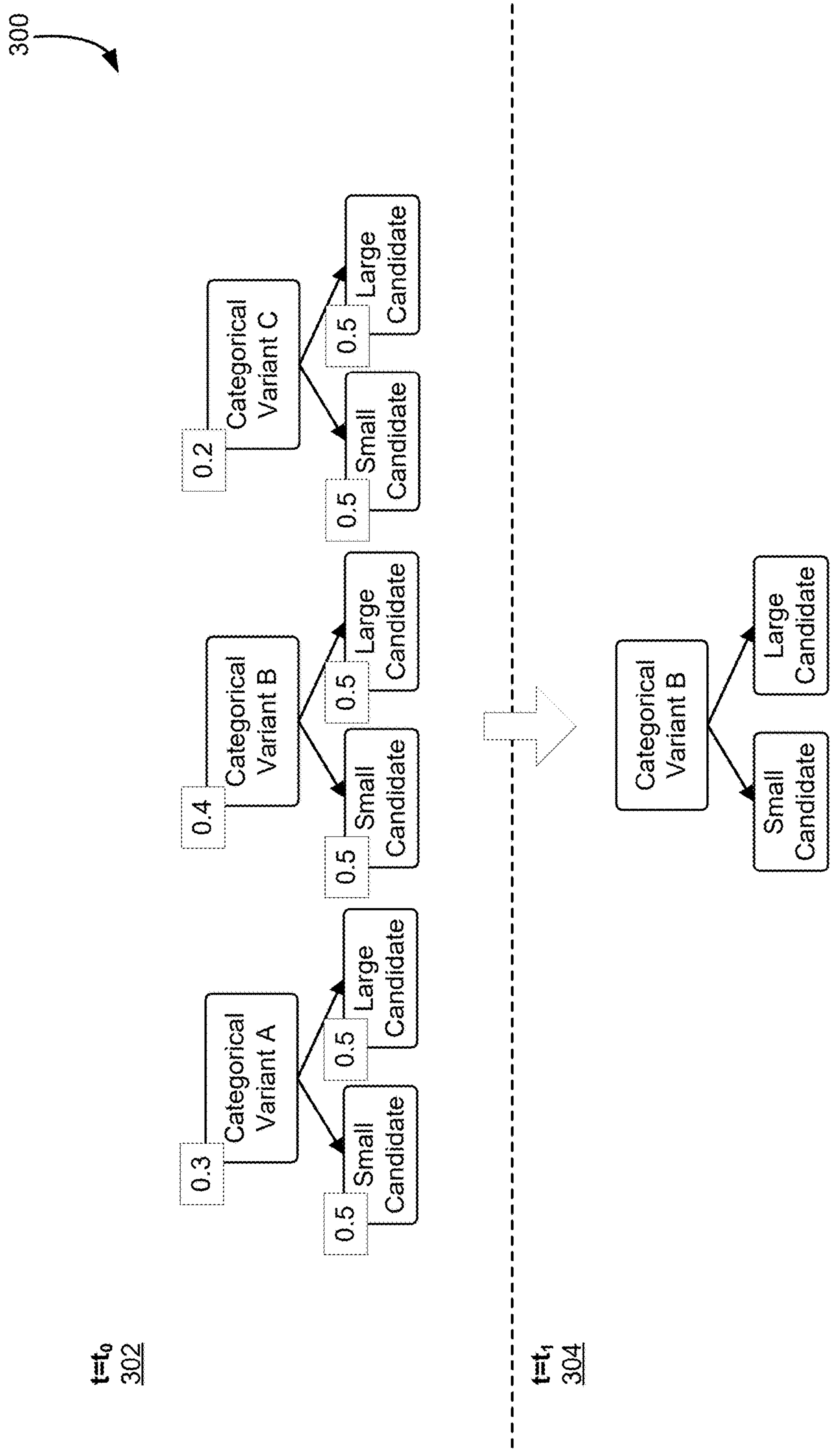
FIG. 3 illustrates an example of removing blocks from a layer, according to at least one embodiment.

FIG. 3 illustrates an example 300 of removing blocks from a layer, according to at least one embodiment. In at least one embodiment, example 300 depicts a state of a layer of said supernet at a first time 302 and a second time 304. In at least one embodiment, said layer is in accordance with those described elsewhere herein, such as in connection with FIG. 1 and FIG. 2. In at least one embodiment, said layer comprises at least a first prunode block, a second prunode block, a third prunode block, and can comprise other suitable blocks not depicted in FIG. 3. In at least one embodiment, said first prunode block, said second prunode block, and/or said third prunode block are one or more of blocks depicted in FIG. 1. In at least one embodiment, one or more masks and/or blocks (e.g., prunode blocks) discussed in connection with FIG. 3 are in accordance with those described elsewhere herein, such as in connection with FIG. 2.

In at least one embodiment, referring to FIG. 3, a categorical variant is a block, also referred to as a candidate neural network layer, of a particular type, in which a prunode block corresponding to said categorical variant comprises at least a small candidate, which is a block that is a copy of said categorical variant with a small mask applied, and a large candidate, which is a block that is a copy of said categorical variant with a large mask applied. In at least one embodiment, referring to FIG. 3, said first prunode block corresponds to categorical variant A and comprises a small candidate and a large candidate generated from said categorical variant A, said second prunode block corresponds to categorical variant B and comprises a small candidate and a large candidate generated from said categorical variant B, and said third prunode block corresponds to categorical variant C and comprises a small candidate and a large candidate generated from said categorical variant C. In at least one embodiment, referring to FIG. 3, each block has an associated architecture weight which is depicted by an associated value in a rectangle.

In at least one embodiment, first time 302 depicts a state of said layer of said supernet at a particular training iteration of a particular training epoch of said training process. In at least one embodiment, at first time 302, for each categorical variant, said system calculates architecture weights for said categorical variant and small and large candidates corresponding to said categorical variant, updates said small and large candidates based on said architecture weights (e.g., if architecture weight of small candidate is larger, said system reduces masks of both candidates and updates candidates based on reduced masks, or if architecture weight of large candidate is larger, said system expands masks of both candidates and updates candidates based on expanded masks), and resets architecture weights of said small and large candidates (e.g., to a value of 0.5, or any suitable value).

In at least one embodiment, said system calculates architecture weights by at least causing blocks of said layer to process a set of training data, and calculating said architecture weights based at least in part on results of said processing and one or more loss functions such as those described herein. In at least one embodiment, said system removes a categorical variant and associated small and large candidates if an architecture weight of said categorical variant is below a threshold for said particular training epoch. In at least one embodiment, at first time 302, said system calculates an architecture weight of 0.3 for categorical variant A, an architecture weight of 0.4 for categorical variant B, and an architecture weight of 0.2 for categorical variant C, although weights can be any suitable values.

In at least one embodiment, second time 304 depicts a state of said layer of said supernet at a particular training iteration after first time 302. In at least one embodiment, at a particular time between first time 302 and second time 304, said system calculates an architecture weight of categorical variant A that is less than a threshold calculated for a current epoch of said particular time, in which said system removes categorical variant A and corresponding small and large candidates from said layer. In at least one embodiment, at a particular time between first time 302 and second time 304, said system calculates an architecture weight of categorical variant C that is less than a threshold calculated for a current epoch of said particular time, in which said system removes categorical variant C and corresponding small and large candidates from said layer. In at least one embodiment, said system performs said training process until, at end of a particular training epoch, a single block or a single block (e.g., categorical variant) and corresponding small and large candidates (e.g., corresponding prunode block) remain in each layer of said supernet.

In at least one embodiment, second time 304 depicts a state of said layer of said supernet after said system removed, based on calculated architecture weights, categorical variant A with corresponding small and large candidates and categorical variant C with corresponding small and large candidates. In at least one embodiment, at second time 304, said layer comprises categorical variant B and corresponding small and large candidates. In at least one embodiment, said system samples an optimal candidate from small and large candidates corresponding to categorical variant B. In at least one embodiment, said system utilizes said optimal candidate in in said layer (e.g., in place of categorical variant B, small candidate, and large candidate blocks). In at least one embodiment, at end of said training process, said layer comprises said optimal candidate, which is utilized as part of said neural network output by said system. In at least one embodiment, said system performs one or more processes described in connection with FIG. 3 for each layer of said supernet that comprises at least a block and a corresponding prunode block.

Figure 4:
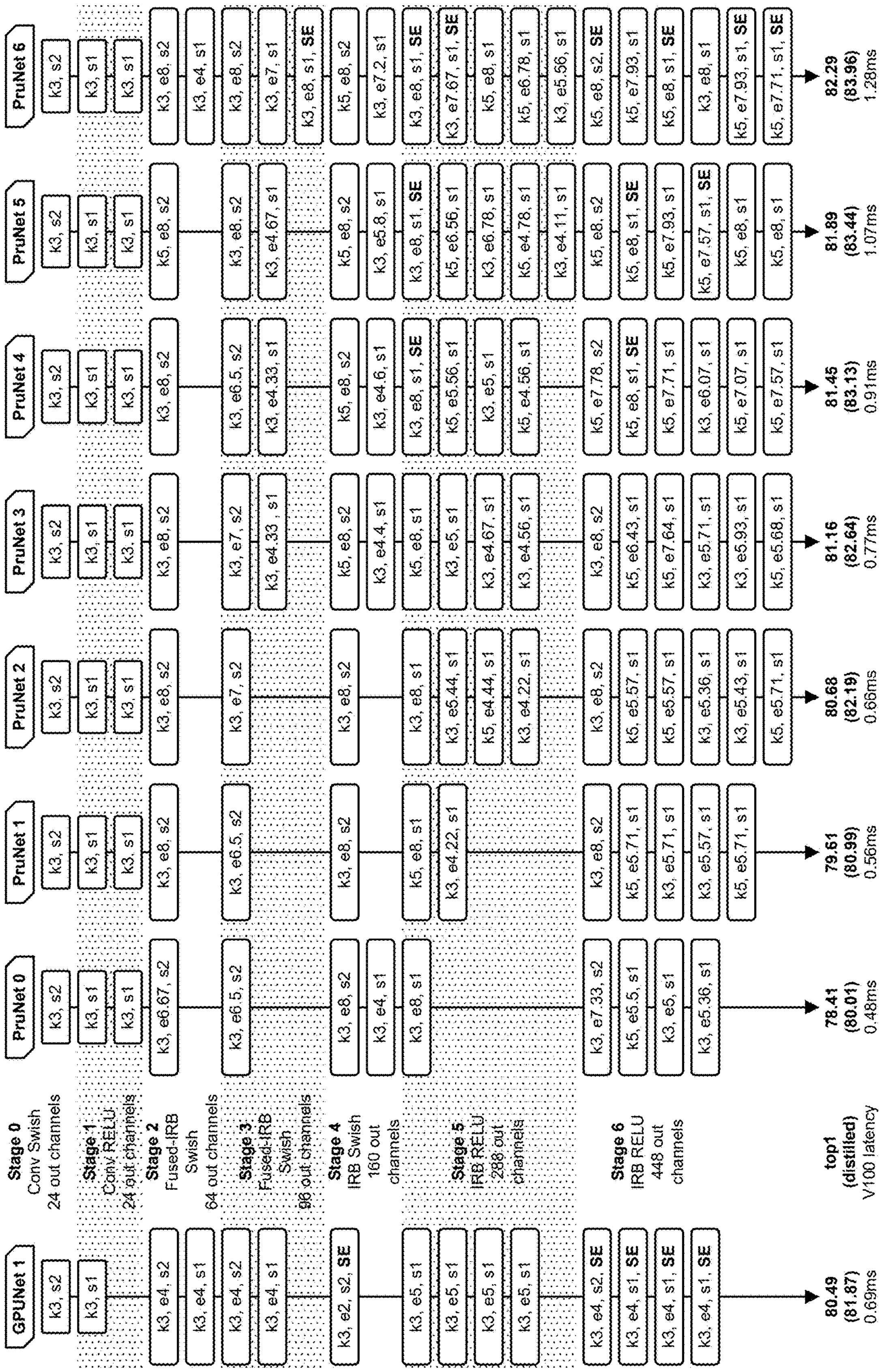
FIG. 4 illustrates an example of output neural networks, according to at least one embodiment.

FIG. 4 illustrates an example of output neural networks, according to at least one embodiment. In at least one embodiment, FIG. 4 depicts one or more neural networks output by said system through one or more processes such as those described in connection with FIGS. 1-3 and 5-11. In at least one embodiment, FIG. 4 depicts one or more neural networks, denoted by "PruNet 0" to "PruNet 6," which are output by said system in connection with processing said supernet. In at least one embodiment, said system processes said supernet through said training process to calculate at least a neural network of said one or more neural networks. In at least one embodiment, said system outputs said one or more neural networks, which can be trained by one or more systems and utilized for various tasks such as those described herein.

In at least one embodiment, said system utilizes a dataset such as Imagenet-1k, or any suitable dataset. In at least one embodiment, said system utilizes an architecture scheme such as those associated with any suitable network, such as GPUNET networks. In at least one embodiment, said system defines said supernet with an image resolution of 288×288, 2D convolution with kernel size of 3, stride of 2, and Swish activation function, or any suitable function, as a prologue, and with 6 stages followed by an epilogue, in which values can be any suitable values. In at least one embodiment, at each stage, said system utilizes building blocks, which can include convolution, Fused Inverted Residual Block, Inverted Residual Block, and/or any suitable blocks, activation function, and a particular number of channels, which may be in accordance with a suitable network such as GPUNet-1, and/or variations thereof. In at least one embodiment, within these constraints in stages from 2 to 6, said system defines stochastic layers that consist of four multi-blocks (e.g., kernel size∈{3,5}, SE∈{True, False}), all with maximum expansion of 8 and granularity of 32 channels, or any suitable values, in which SE refers to a Squeeze and Excitation block. In at least one embodiment, for stage 1, said system defines two choices (e.g., kernel size∈{3,5}). In at least one embodiment, each stage contains one additional layer that can be skipped during said training process.

In at least one embodiment, to generate a Pareto frontier, said system utilizes 7 different values of $\alpha\in\{0.2, 0.4, 0.6, 0.8, 1.0, 1.2, 2.0\}$, or any suitable values. In at least one embodiment, parameter a is defined through an equation such as described herein and controls a trade-off between latency and accuracy. In at least one embodiment, since proper layer skipping is crucial for finding an optimal network, and last 130 epochs are relatively less resource intensive due to progressive pruning of search space, said system tests 3 variants of layer skipping for each $\alpha$. In at least one embodiment, said system utilizes $\lambda\in\{0.4, 0.55, 0.85\}$ and $\phi=1.1$, although values can be any suitable values. In at least one embodiment, for each $\alpha$ value, said system calculates which $\lambda$ value is best based on final loss from said supernet search. In at least one embodiment, an architecture with lowest loss is then trained from scratch.

FIG. 5 illustrates an example of results, according to at least one embodiment. In at least one embodiment, FIG. 5 depicts results of said PruNet and/or said system such as described herein.

In at least one embodiment, referring to FIG. 5, PruNet has significantly lower latency than one or more neural networks. In at least one embodiment, it does not necessarily have lower number of parameters or FLOPs. In at least one embodiment, referring to FIG. 5, said system calculates networks that are uniformly better than one or more neural networks (e.g., higher accuracy with lower latency). In at least one embodiment, FIG. 5 depicts PruNet image classification results, in which all latency measurements are made using batch size 1, or any suitable value.

In at least one embodiment, said system, before training said supernet through said training process, creates a lookup table by benchmarking all blocks that can be sampled. In at least one embodiment, benchmarking can utilize a large amount of computing resources as a multi-block can generate many candidates, such as when low granularity is used. In at least one embodiment, as an illustrative example, with a granularity of 32, benchmarking all candidates takes approximately a few hours on a target architecture, which can be any suitable architecture such as an NVIDIA Tesla V100 GPU. In at least one embodiment, said system performs search on a single node with any suitable processing unit and/or combination of processing units, such as 8 NVIDIA A100 GPUs with 80 GB of memory. In at least one embodiment, said training can be performed on a different type of hardware than said target architecture. In at least one embodiment, said system only precomputes said lookup table on target hardware.

In at least one embodiment, said training process of said supernet comprises two parts, including a first part, which is 70 epochs of warmup, which can be computed only once by said system, and a second part. In at least one embodiment, as an illustrative example, said warmup takes approximately 10 hours with various hardware such as those described herein. In at least one embodiment, said system computes said second part, which is 130 epochs of actual search, in 21 variants (e.g., $\alpha\in\{0.2, 0.4, 0.6, 0.8, 1.0, 1.2, 2.0\}$, $\lambda\in\{0.4, 0.55, 0.85\}$, $\phi=1.1$, or any suitable values). In at least one embodiment, as an illustrative example, said second part takes approximately 156 hours using various hardware such as those described herein, in which without progressive pruning, said part would take approximately 21*130/70*10 h=390 hours. In at least one embodiment, as an illustrative example, said system, using various hardware such as those described herein, utilizes approximately 7 days on a single node to find said PruNet network family.

In at least one embodiment, said system utilizes a dataset such as COCO 2017 detection dataset, or any suitable dataset. In at least one embodiment, said system utilizes a model such as EfficientNet, or any suitable model, as a baseline model. In at least one embodiment, said system replaces said model backbone with one or more models such as GPUNet and PruNet, or any suitable models, in which all backbones were pretrained without distillation.

Figure 6:
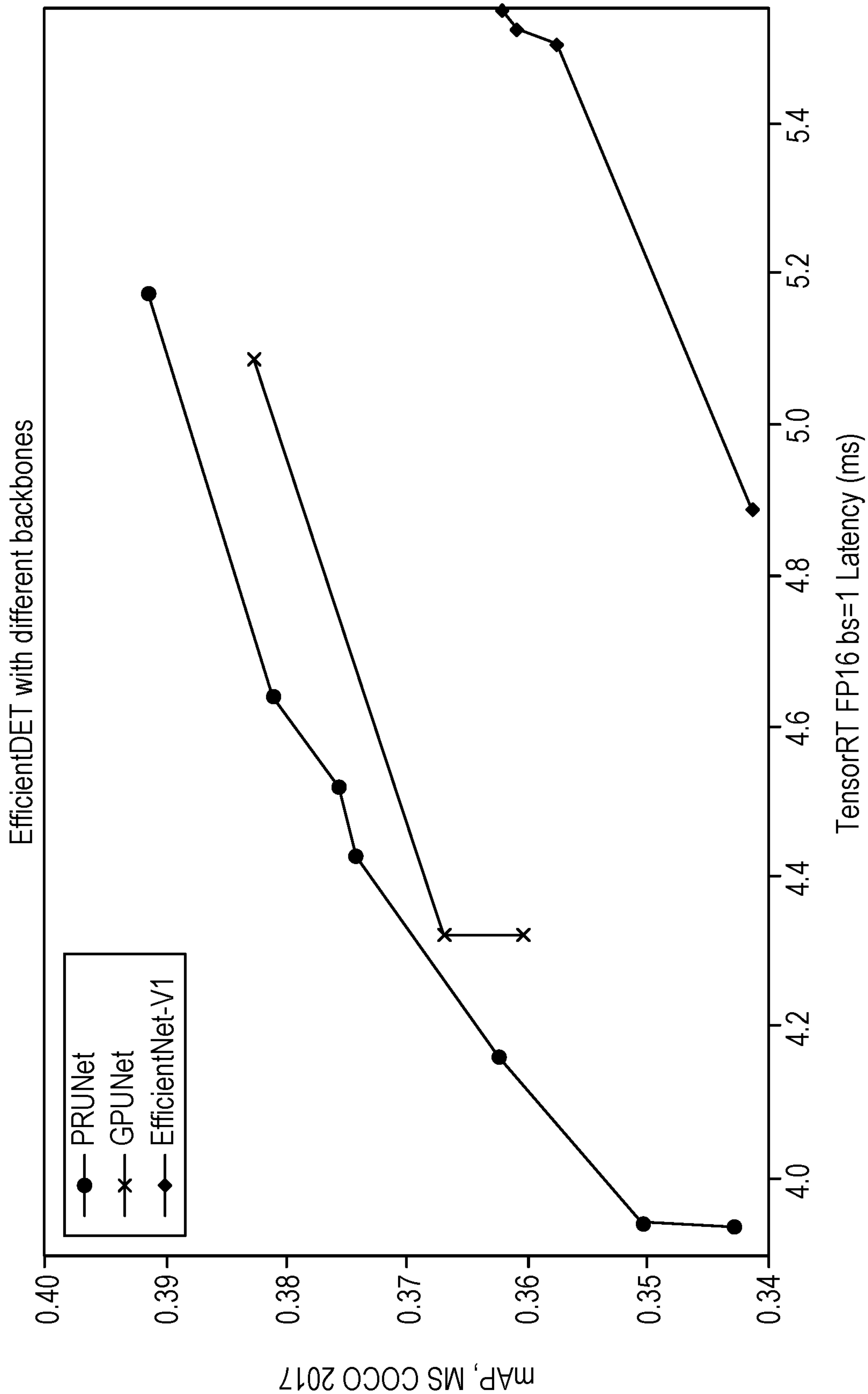
FIG. 6 illustrates another example of results, according to at least one embodiment.

FIG. 6 illustrates another example of results, according to at least one embodiment. In at least one embodiment, FIG. 6 depicts results of said system such as described herein. In at least one embodiment, referring to FIG. 6, as an illustrative example, PruNet as a backbone outperforms various neural networks such as GPUNet and EfficientNet on COCO object detection task on inference latency relative to mean Average Precision (mAP). In at least one embodiment, referring to FIG. 6, said system can generate architectures that can be successfully transferred to other Computer Vision tasks. In at least one embodiment, referring to FIG. 6, PruNet is faster and more accurate than one or more neural networks. In at least one embodiment, PruNet establishes an optimal frontier in terms of inference latency for ImageNet Top-1 image classification accuracy, in which, as an illustrative example, an aggregate compute cost of calculating said PruNet networks at said optimal frontier requires 7 days of training on a single machine with 8 NVIDIA A100 GPUs, although any suitable devices can be utilized.

In at least one embodiment, said system utilizes prunode, which is a stochastic bi-path building block which can be used to search any suitable inner hidden dimension of blocks in any differentiable NAS with O(1) cost. In at least one embodiment, said system, through various processes such as those described herein, establishes an optimal Pareto frontier (e.g., PruNet) in TensorRT inference latency and ImageNet-1K top-1 accuracy, although any suitable metric can be utilized, and enables fine granularity sampling of optimal frontier to better fit external deployment constraints. In at least one embodiment, FLOP and number of parameters are not a right proxy for latency, in which a correct metric for architectural evaluation is important. In at least one embodiment, said system generates neural networks that can be utilized in any suitable task, such as computer vision tasks, natural language processing (NLP), speech, and recommendation system tasks.

Figure 7:
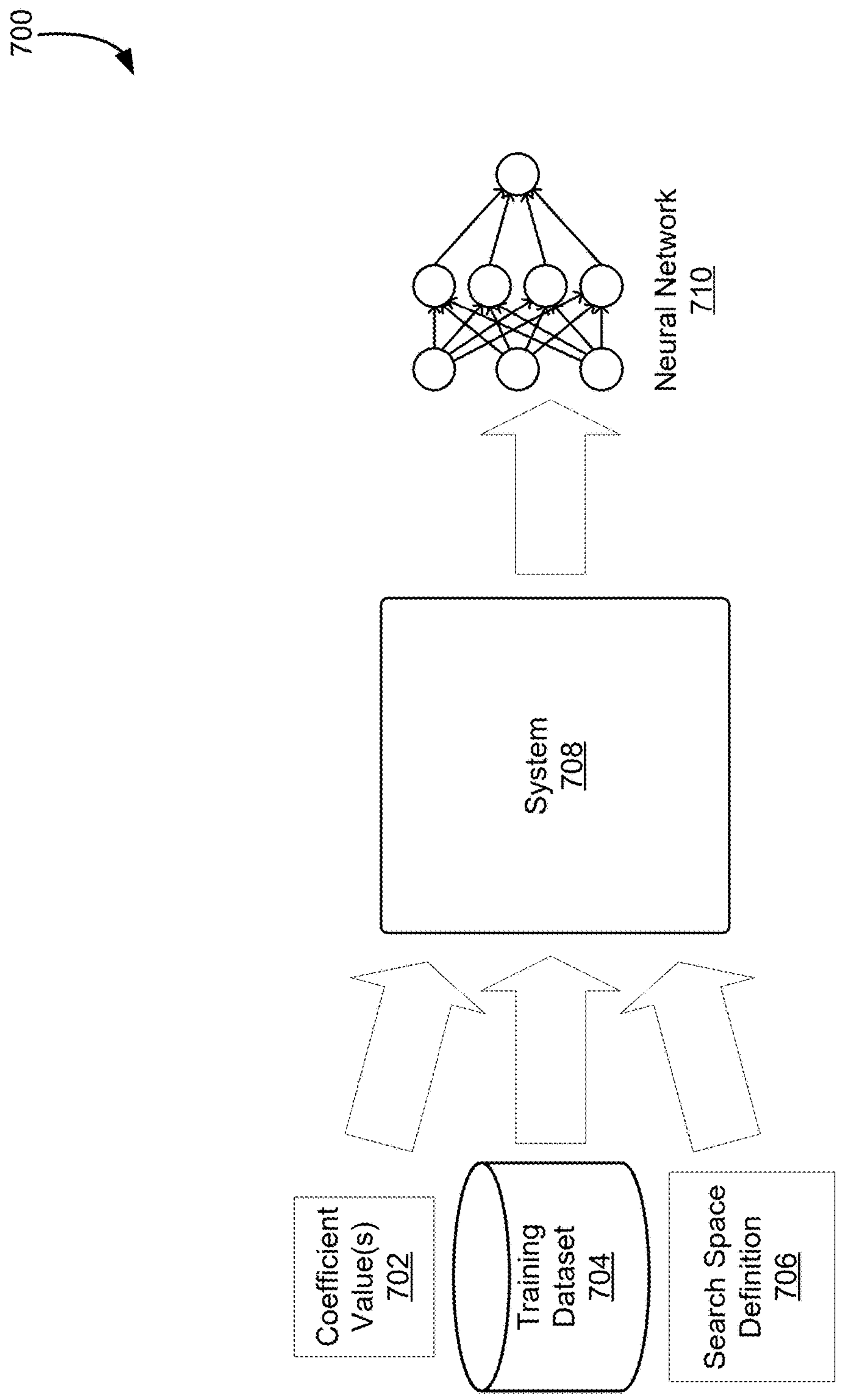
FIG. 7 illustrates an example of a system generating a neural network, according to at least one embodiment.

FIG. 7 illustrates an example 700 of a system generating a neural network, according to at least one embodiment. In at least one embodiment, a system 708 generates a neural network 710 based, at least in part, on a coefficient value(s) 702, training dataset 704, and/or a search space definition 706. In at least one embodiment, system 708 is or otherwise is in accordance with said system described herein, such as described in connection with FIGS. 1-4. In at least one embodiment, system 708 obtains or otherwise receives coefficient value(s) 702, training dataset 704, and/or search space definition 706 from one or more systems and generates neural network 710. In at least one embodiment, system 708 processes said supernet in connection with coefficient value(s) 702, training dataset 704, and/or search space definition 706 to generate neural network 710. In at least one embodiment, coefficient value(s) 702, training dataset 704, and/or search space definition 706 are in accordance with those described elsewhere herein, such as in connection with FIGS. 1-6.

In at least one embodiment, coefficient value(s) 702 is data indicating one or more values of one or more coefficients. In at least one embodiment, coefficient value(s) 702 indicates values of said coefficient $\alpha$ and coefficient $\beta$, also referred to as latency constraints, as described elsewhere herein. In at least one embodiment, coefficient $\alpha$ defines trade-off between accuracy and latency, and coefficient $\beta$ scales a magnitude of latency. In at least one embodiment, coefficient value(s) 702 indicates one or more coefficient values for any suitable coefficients which can control or otherwise modify various aspects of system 708, processes of system 708 to generate neural network 710, neural network 710, and/or variations thereof. In at least one embodiment, one or more systems generate and/or provide coefficient value(s) 702 to system 708, in which coefficient value(s) 702 can indicate any suitable coefficient values calculated in any suitable manner, such as through one or more functions, training processes, heuristics, and/or variations thereof.

In at least one embodiment, training dataset 704 is a set of data for training one or more neural networks. In at least one embodiment, data of training dataset 704 are categorized as either validation data or training data, in which each category may comprise any suitable percentage or amount of total data of training dataset 704. In at least one embodiment, training dataset 704 comprises data and associated labels, also referred to as ground truth data. In at least one embodiment, said associated labels are based on a particular task of a neural network (e.g., neural network 710). In at least one embodiment, said particular task is any suitable neural network task, such as computer vision tasks, NLP tasks, speech processing tasks, recommendation system tasks, and/or variations thereof.

In at least one embodiment, said associated labels indicate one or more results of said particular task of said neural network based on said data of training dataset 704. In at least one embodiment, as an illustrative example, training dataset 704 comprises a first set of data that is an image, and a first label associated with said first set of data that indicates a classification of said image, a location and/or classification of a particular object in said image, and/or variations thereof. In at least one embodiment, as an illustrative example, training dataset 704 comprises a first set of data that is a phrase, and a first label associated with said first set of data that indicates a translation of said phrase, an analysis of said phrase, a location and/or classification of a particular component of said phrase, and/or variations thereof.

In at least one embodiment, search space definition 706 is data indicating said search space for system 708 to generate neural network 710. In at least one embodiment, search space definition 706 is data indicating or otherwise defining one or more candidate operations, blocks, processes, and/or any suitable aspect of one or more processes (e.g., said DNAS process) of system 708 to generate neural network 710. In at least one embodiment, search space definition 706 indicates or otherwise comprises said supernet. In at least one embodiment, search space definition 706 comprises data that indicates or otherwise defines each block in each layer of said supernet. In at least one embodiment, search space definition 706 comprises data that indicates a number of layers of said supernet, one or more blocks in each layer of said supernet, one or more processes to be performed in connection with said supernet, and/or any suitable data associated with said supernet and/or processing of said supernet to generate a neural network (e.g., neural network 710).

In at least one embodiment, search space definition 706 is any suitable data that indicates, defines, or otherwise specifies aspects of said search space and/or said supernet. In at least one embodiment, one or more systems generate and/or provide search space definition 706 to system 708. In at least one embodiment, system 708 is initialized with search space definition 706. In at least one embodiment, search space definition 706 is generated in any suitable manner, such as through one or more functions, training processes, heuristics, and/or variations thereof.

In at least one embodiment, system 708 is a collection of hardware and/or software resources with instructions that, when executed, cause performance of one or more processes such as those described herein (e.g., to generate neural network 710). In at least one embodiment, system 708 is part of any suitable computing device and/or collection of computing devices, such as those associated with medical devices, image processing devices, and/or variations thereof. In at least one embodiment, system 708 comprises or is otherwise associated with one or more processing units, such as one or more CPUs, GPUs, PPUs, GPGPUs, and/or variations thereof, that perform one or more processes such as those described in connection with FIGS. 1-4 and 8-10 to generate neural network 710 based at least in part on coefficient value(s) 702, training dataset 704, and/or search space definition 706. In at least one embodiment, system 708 is a software program executing on computer hardware, application executing on computer hardware, and/or variations thereof. In at least one embodiment, system 708 comprises one or more circuits to perform one or more processes such as those described in connection with FIGS. 1-4 and 8-10 to generate neural network 710 based at least in part on coefficient value(s) 702, training dataset 704, and/or search space definition 706.

In at least one embodiment, system 708 performs one or more processes such as those described in connection with FIGS. 1-4 and 8-10. In at least one embodiment, system 708 performs one or more processes of said DNAS process. In at least one embodiment, system 708 performs one or more processes such as those described herein to define or otherwise calculate an architecture of said neural network. In at least one embodiment, system 708 performs one or more processes such as those described herein to generate neural network 710. In at least one embodiment, system 708 performs one or more processes to process said supernet to generate neural network 710. In at least one embodiment, system 708 is said system such as described in connection with FIGS. 1-6 and 8-11.

In at least one embodiment, system 708 generates neural network 710 in connection with one or more systems, such as a neural network framework and/or variations thereof. In at least one embodiment, neural network 710 is implemented using one or more data structures and/or objects that encode or otherwise indicate a structure, components, and/or configuration of neural network 710. In at least one embodiment, neural network 710 is any suitable neural network that performs any suitable task, such as an image processing neural network, image segmentation neural network, classification neural network, NLP neural network, and/or variations thereof. In at least one embodiment, neural network 710 is trained by one or more systems using any suitable training process, such as those described in connection with FIG. 13.

Figure 8:
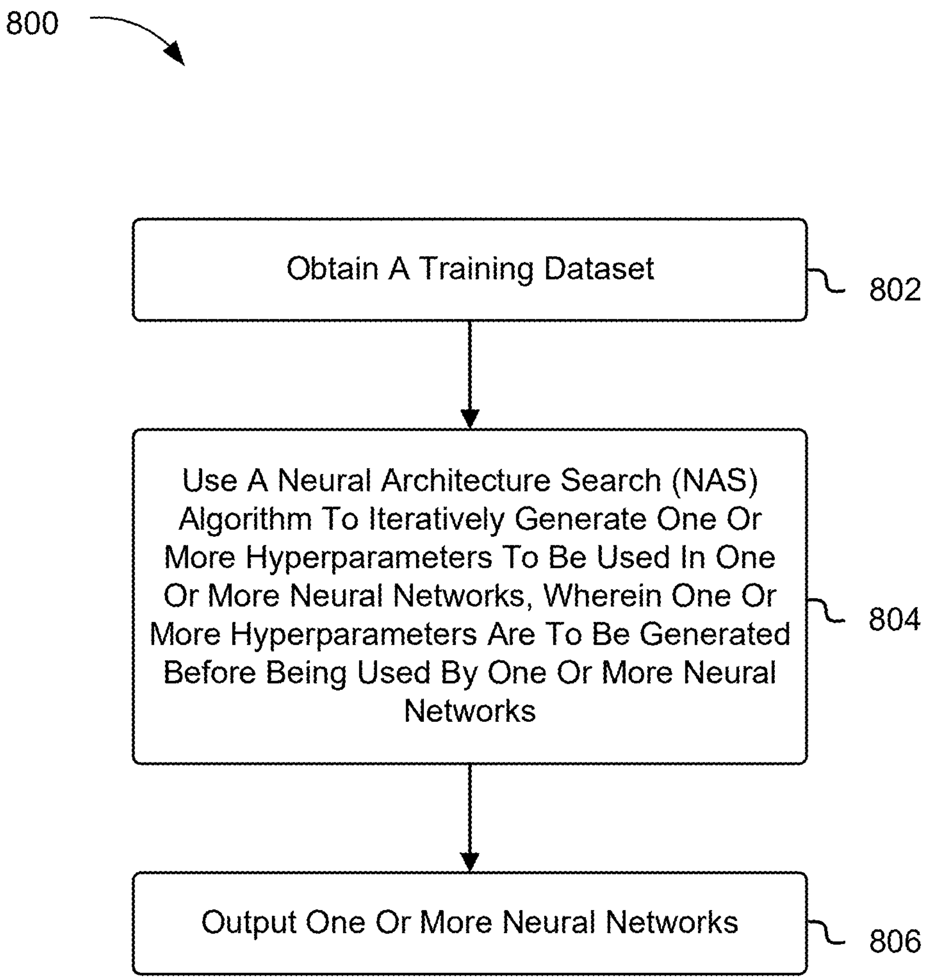
FIG. 8 illustrates an example of a process of iteratively generating one or more hyperparameters, according to at least one embodiment.

FIG. 8 illustrates an example of a process 800 of iteratively generating one or more hyperparameters, according to at least one embodiment. In at least one embodiment, some or all of process 800 (or any other processes described herein, or variations and/or combinations thereof) is performed under control of one or more computer systems configured with computer-executable instructions and is implemented as code (e.g., computer-executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 800 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals.

In at least one embodiment, process 800 is performed by one or more systems such as those described in this present disclosure. In at least one embodiment, process 800 is performed by a system of one or more programming models (e.g., CUDA, HIP, oneAPI, and/or variations thereof). In at least one embodiment, one or more processes of process 800 are performed in any suitable order, including sequential, parallel, and/or variations thereof, and using any suitable processing unit, such as a CPU, GPU, PPU, GPGPU, and/or variations thereof. In at least one embodiment, process 800 is performed by said system such as described in connection with FIGS. 1-7. In at least one embodiment, one or more processes of process 800 are performed by said system in connection with one or more processes of process 900 of FIG. 9 and/or process 1000 of FIG. 10 to generate said neural network.

In at least one embodiment, said system performing at least a part of process 800 includes executable code to at least obtain 802 a training dataset. In at least one embodiment, said system obtains said supernet such as described herein. In at least one embodiment, said system obtains said training dataset from one or more systems. In at least one embodiment, said training dataset comprises data (e.g., images) and associated labels. In at least one embodiment, said training dataset is in accordance with those described elsewhere herein, such as in connection with FIGS. 1-7.

In at least one embodiment, said system performing at least a part of process 800 includes executable code to at least use 804 a neural architecture search (NAS) algorithm to iteratively generate one or more hyperparameters to be used in one or more neural networks, wherein said one or more hyperparameters are to be generated before being used by said one or more neural networks. In at least one embodiment, said NAS algorithm is said DNAS process as described elsewhere herein. In at least one embodiment, said system performs said NAS algorithm by performing one or more processes such as those described in connection with FIGS. 1-7, and 9-10. In at least one embodiment, said system utilizes one or more prunode blocks such as those described herein to generate said one or more hyperparameters.

In at least one embodiment, a hyperparameter refers to any suitable dimension, parameter, configuration, value, and/or variations thereof associated with a block, in which a value of said suitable dimension, parameter, configuration, value, and/or variations thereof is also referred to as a hyperparameter or hyperparameter value. In at least one embodiment, said hyperparameter indicates a manner in which one or more weights are to be applied in one or more neural networks, such as how many times a particular convolution (e.g., convolution with a filter comprising one or more weights) is to be applied, how a particular function (e.g., function associated with one or more weights) is to be applied, and/or variations thereof. In at least one embodiment, as an illustrative example, said hyperparameter corresponds to a number of channels in an inner tensor of a block (e.g., IRB), an expansion ratio of a block (e.g., IRB), and/or variations thereof. In at least one embodiment, each hyperparameter of said one or more hyperparameters corresponds to a respective block, also referred to as an operation, to be used in said one or more neural networks.

In at least one embodiment, for a particular operation in a layer of said supernet, said system generates a first variant of said operation, also referred to as a small candidate, and a second variant of said operation, also referred to as a large candidate. In at least one embodiment, said particular operation is any suitable operation, such as IRB, fused IRB, convolution block, skip connection block, self-attention block, and/or variations thereof. In at least one embodiment, said system generates a first hyperparameter by generating said first variant which uses said first hyperparameter and a second hyperparameter by generating said second variant which uses said second hyperparameter, in which said first hyperparameter and second hyperparameter are values of a particular hyperparameter of said operation (e.g., such as a number of channels in an inner tensor of said operation, an expansion ratio of said operation). In at least one embodiment, said system generates said first variant by at least generating a first mask, also referred to as a small mask, and generates said second variant by at least generating a second mask, also referred to as a large mask. Further information regarding masks can be found in description of FIG. 2.

In at least one embodiment, as part of a training iteration of a training epoch of said training process, said system performs one or more training processes based on said training dataset to calculate a first architecture weight for said first variant based on said first hyperparameter and a second architecture weight for said second variant based on said second hyperparameter. In at least one embodiment, said system calculates an architecture weight for said operation, in which if said architecture weight is below said threshold for said training epoch, said operation is removed from said supernet by said system.

In at least one embodiment, said system updates said first variant and said second variant based on said first architecture weight and said second architecture weight. In at least one embodiment, said system updates said first variant by updating said small mask, and updates said second variant by updating said large mask. In at least one embodiment, if said first architecture weight is greater than said second architecture weight, said system reduces both said small mask and said large mask. In at least one embodiment, if said second architecture weight is greater than said first architecture weight, said system expands both said small mask and said large mask. In at least one embodiment, said system generates an updated first hyperparameter by updating said first variant and an updated second hyperparameter by updating said second variant. In at least one embodiment, said system updates a particular variant by updating and applying a particular mask to a copy of a particular operation. In at least one embodiment, as part of said training iteration, said system resets said second architecture weight and said first architecture weight.

In at least one embodiment, said system continuously calculates architecture weights for said variants and generates updated hyperparameters (e.g., by updating said first variant and/or said second variant) for any number of training iterations for any number of training epochs until said operation is removed or until end of said training process, in which at end of said training process, if said operation has not been removed from said supernet, said system calculates an optimal variant by sampling from said first variant and said second variant. In at least one embodiment, said optimal variant is an average of said first variant and said second variant. In at least one embodiment, said system calculates said optimal variant by calculating an optimal mask from said small mask and said large mask (e.g., as an average of both masks), and applying said optimal mask to said operation to form said optimal variant. In at least one embodiment, said system generates a hyperparameter of said one or more hyperparameters for said operation by calculating said optimal variant, in which said optimal variant's value of said particular hyperparameter is said generated hyperparameter.

In at least one embodiment, said system performs one or more processes such as those described above for any suitable operations of said supernet, in which at end of said training process, said system generates said one or more hyperparameters based on remaining one or more operations of said suitable operations. In at least one embodiment, said one or more hyperparameters comprise hyperparameters corresponding to operations not removed from said supernet through said training process by said system. In at least one embodiment, said system utilizes said remaining one or more operations in connection with said generated one or more hyperparameters as part of said one or more neural networks.

In at least one embodiment, said system performing at least a part of process 800 includes executable code to at least output 806 said one or more neural networks. In at least one embodiment, said one or more neural networks comprise said remaining one or more operations that use said one or more hyperparameters generated by said system. In at least one embodiment, said system utilizes said generated one or more hyperparameters for said remaining one or more operations in said one or more neural networks. In at least one embodiment, said system generates said one or more hyperparameters before said one or more hyperparameters are used by said one or more neural networks. In at least one embodiment, said system generates said one or more hyperparameters in connection with said supernet through one or more processes such as those described herein, in which said one or more hyperparameters are subsequently used in output said one or more neural networks. In at least one embodiment, said system generates said one or more hyperparameters through one or more processes such as those described herein that do not require use of said one or more hyperparameters in output said one or more neural networks, in which after said one or more hyperparameters are generated, said system utilizes said one or more hyperparameters in output said one or more neural networks.

In at least one embodiment, said one or more neural networks are utilized by any suitable system, such as those associated with various image and/or video processing hardware and/or software, for one or more computer vision tasks, such as image processing, image classification, image segmentation, and/or variations thereof, in which said one or more neural networks are trained by one or more systems using suitable training data associated with said one or more computer vision tasks and said one or more neural networks can be utilized to perform said one or more computer vision tasks. In at least one embodiment, said one or more neural networks are utilized by any suitable system, such as those associated with various text and/or speech processing hardware and/or software, for one or more NLP tasks, such as text/speech analysis, recognition, translation, and/or variations thereof, in which said one or more neural networks are trained by one or more systems using suitable training data associated with said one or more NLP tasks and said one or more neural networks can be utilized to perform said one or more NLP tasks.

Figure 9:
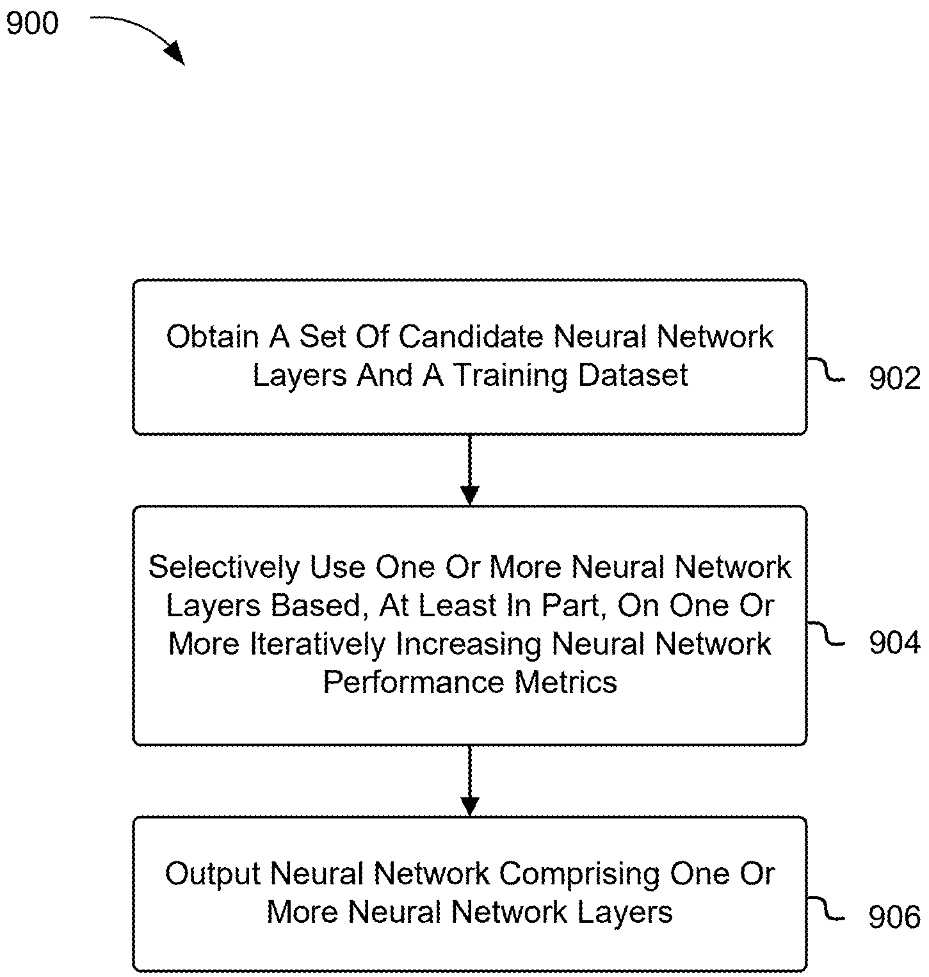
FIG. 9 illustrates an example of a process of selectively using one or more neural network layers, according to at least one embodiment.

FIG. 9 illustrates an example of a process 900 of selectively using one or more neural network layers, according to at least one embodiment. In at least one embodiment, some or all of process 900 (or any other processes described herein, or variations and/or combinations thereof) is performed under control of one or more computer systems configured with computer-executable instructions and is implemented as code (e.g., computer-executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 900 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals.

In at least one embodiment, process 900 is performed by one or more systems such as those described in this present disclosure. In at least one embodiment, process 900 is performed by a system of one or more programming models (e.g., CUDA, HIP, oneAPI, and/or variations thereof). In at least one embodiment, one or more processes of process 900 are performed in any suitable order, including sequential, parallel, and/or variations thereof, and using any suitable processing unit, such as a CPU, GPU, PPU, GPGPU, and/or variations thereof. In at least one embodiment, process 900 is performed by said system such as described in connection with FIGS. 1-8. In at least one embodiment, one or more processes of process 900 are performed by said system in connection with one or more processes of process 800 of FIG. 8 and/or process 1000 of FIG. 10 to generate said neural network.

In at least one embodiment, said system performing at least a part of process 900 includes executable code to at least obtain 902 a set of candidate neural network layers and a training dataset. In at least one embodiment, a candidate neural network layer is also referred to as a block or operation such as those described in connection with FIGS. 1-4 and elsewhere herein. In at least one embodiment, said system obtains said set of candidate neural network layers as part of said supernet. In at least one embodiment, said set of candidate neural network layers comprises one or more subsets of candidate neural network layers, in which each subset corresponds to a respective layer of said supernet. In at least one embodiment, said system generates or otherwise obtains said set of candidate neural network layers based, at least in part, on a search space definition, such as those described herein. In at least one embodiment, said system obtains said training dataset from one or more systems. In at least one embodiment, said training dataset comprises data (e.g., images) and associated labels. In at least one embodiment, said training dataset is in accordance with those described elsewhere herein, such as in connection with FIGS. 1-7.

In at least one embodiment, said system performing at least a part of process 900 includes executable code to at least selectively use 904 one or more neural network layers based, at least in part, on one or more iteratively increasing neural network performance metrics. In at least one embodiment, said system utilizes said training dataset to perform said training process in connection with said supernet. In at least one embodiment, said system performs said DNAS process in connection with said training dataset and said supernet. Further information regarding said training process and said DNAS process can be found in description of FIGS. 1-3 and elsewhere herein. In at least one embodiment, said system calculates a respective architecture weight for each candidate neural network layer of said set of candidate neural network layers. In at least one embodiment, said system calculates architecture weights each training iteration, or at any suitable times and/or time interval.

In at least one embodiment, said one or more iteratively increasing neural network performance metrics include said threshold (e.g., t(e)) as described in connection with FIGS. 1-3. In at least one embodiment, said system calculates a value of said one or more iteratively increasing neural network performance metrics at each training epoch or at any suitable times and/or time interval. In at least one embodiment, at each training epoch or at any suitable times and/or time interval, said system calculates said value of said one or more iteratively increasing neural network performance metrics based on current training epoch or training progress, and removes candidate neural network layers with architecture weights below said value from said set of candidate neural network layers. In at least one embodiment, said system calculates said value of said one or more iteratively increasing neural network performance metrics to increase linearly based on a current training epoch or any suitable indication of training progress.

In at least one embodiment, said system iteratively reduces said set of candidate neural network layers by at least continuously calculating architecture weights for candidate neural network layers of said set of candidate neural network layers (e.g., through one or more training iterations), calculating said value of said threshold based at least in part on a current epoch, and removing candidate neural network layers of said set of candidate neural network layers with architecture weights less than said calculated value of said current epoch, for any suitable number of training epochs. In at least one embodiment, said system selects said one or more neural network layers from said set of candidate neural network layers after said training process, which can comprise any suitable number of training epochs. In at least one embodiment, said one or more neural network layers comprise remaining candidate neural network layers of said set of candidate neural network layers after said training process, In at least one embodiment, said system performing at least a part of process 900 includes executable code to at least output 906 neural network comprising one or more neural network layers. In at least one embodiment, said system selectively uses said one or more neural network layers to form said neural network. In at least one embodiment, said system selects said one or more neural network layers to comprise remaining candidate neural network layers of said set of candidate neural network layers after one or more training epochs. In at least one embodiment, said system output said neural network comprising said one or more neural network layers, in which said neural network can be trained and utilized for any suitable task.

In at least one embodiment, said neural network is utilized by any suitable system, such as those associated with various image and/or video processing hardware and/or software, for one or more computer vision tasks, such as image processing, image classification, image segmentation, and/or variations thereof, in which said neural network is trained by one or more systems using suitable training data associated with said one or more computer vision tasks and said neural network can be utilized to perform said one or more computer vision tasks. In at least one embodiment, said neural network is utilized by any suitable system, such as those associated with various text and/or speech processing hardware and/or software, for one or more NLP tasks, such as text/speech analysis, recognition, translation, and/or variations thereof, in which said neural network is trained by one or more systems using suitable training data associated with said one or more NLP tasks and said neural network can be utilized to perform said one or more NLP tasks.

In at least one embodiment, a neural network such as those described herein is a system that performs one or more tasks such as those described herein to calculate one or more results based on data. In at least one embodiment, a neural network such as those described herein is a set of instructions that, when executed by one or more processors, cause said one or more processors to perform one or more tasks such as those described herein to calculate one or more results based on data. In at least one embodiment, a neural network such as those described herein is implemented in connection with one or more data structures, objects, instructions, data, and/or variations thereof, that encode or otherwise indicate a structure, components, configuration, processes, values, and/or variations thereof, of said neural network.

Figure 10:
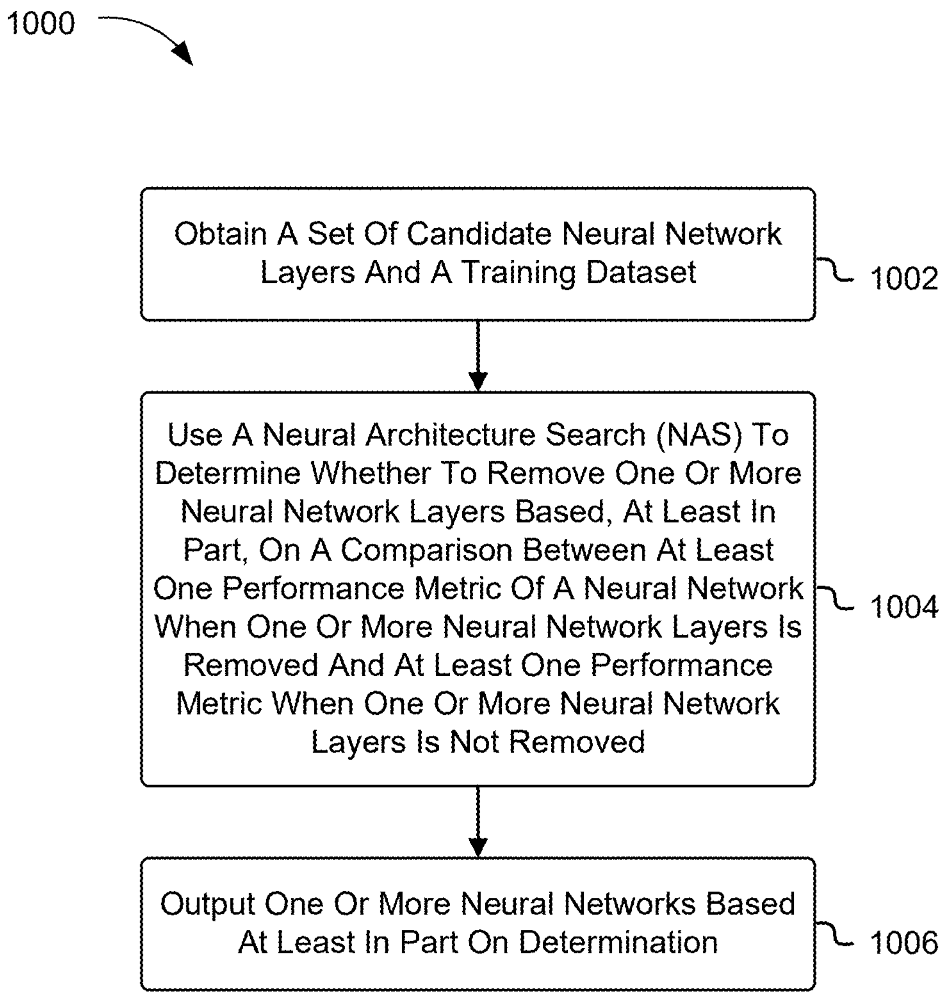
FIG. 10 illustrates an example of a process of determining whether to remove one or more neural network layers, according to at least one embodiment.

FIG. 10 illustrates an example of a process 1000 of determining whether to remove one or more neural network layers, according to at least one embodiment. In at least one embodiment, some or all of process 1000 (or any other processes described herein, or variations and/or combinations thereof) is performed under control of one or more computer systems configured with computer-executable instructions and is implemented as code (e.g., computer-executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 1000 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals.

In at least one embodiment, process 1000 is performed by one or more systems such as those described in this present disclosure. In at least one embodiment, process 1000 is performed by a system of one or more programming models (e.g., CUDA, HIP, oneAPI, and/or variations thereof). In at least one embodiment, one or more processes of process 1000 are performed in any suitable order, including sequential, parallel, and/or variations thereof, and using any suitable processing unit, such as a CPU, GPU, PPU, GPGPU, and/or variations thereof. In at least one embodiment, process 1000 is performed by said system such as described in connection with FIGS. 1-9. In at least one embodiment, one or more processes of process 1000 are performed by said system in connection with one or more processes of process 800 of FIG. 8 and/or process 900 of FIG. 9 to generate said neural network.

In at least one embodiment, said system performing at least a part of process 1000 includes executable code to at least obtain 1002 a set of candidate neural network layers and a training dataset. In at least one embodiment, a candidate neural network layer, also referred to as a layer, neural network layer, operation, candidate, and/or variations thereof, is a block such as those described in connection with FIGS. 1-4. In at least one embodiment, said system obtains said set of candidate neural network layers as part of said supernet. In at least one embodiment, said set of candidate neural network layers comprises one or more subsets of candidate neural network layers, in which each subset corresponds to a respective layer of said supernet. In at least one embodiment, said system obtains said training dataset from one or more systems. In at least one embodiment, said training dataset comprises data (e.g., images) and associated labels. In at least one embodiment, said training dataset is in accordance with those described elsewhere herein, such as in connection with FIGS. 1-7.

In at least one embodiment, said system performing at least a part of process 1000 includes executable code to at least use 1004 a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, said NAS refers to said DNAS process, also referred to as a NAS algorithm, NAS process, and/or variations thereof, as described herein, such as in connection with FIGS. 1-7. In at least one embodiment, said NAS comprises one or more processes such as those described in connection with FIGS. 1-9.

In at least one embodiment, said one or more neural network layers includes a first neural network layer part of a first layer of said supernet. In at least one embodiment, said first neural network layer is part of a subset of candidate neural network layers for said first layer of said supernet. In at least one embodiment, said system calculates said first neural network layer by at least reducing said subset of candidate neural network layers until only said first neural network layer remains. In at least one embodiment, said system adds a skip connection block to said first layer of said supernet after only said first neural network layer remains in said first layer. In at least one embodiment, said skip connection block, also referred to as skip connection operation, is associated with said first neural network layer such that said first layer of said supernet comprises said first neural network layer and said skip connection block. In at least one embodiment, said system scales an output of said skip connection block, also referred to as data that bypasses said first neural network layer, by at least multiplying said output by a particular value (e.g., ¢ as described in connection with FIG. 1). In at least one embodiment, said system scales an output of said first neural network layer by at least multiplying said output by another particular value (e.g., $\lambda$ as described in connection with FIG. 1).

In at least one embodiment, said at least one performance metric of said neural network refers to one or more architecture weights, or any suitable metric or values associated with performance or other suitable aspects of one or more neural networks. In at least one embodiment, said at least one performance metric when said first neural network layer is not removed refers to an architecture weight or architecture weight value of said first neural network layer. In at least one embodiment, said at least one performance metric when said one or more neural network layers is not removed refers to one or more architecture weights or architecture weight values of said one or more neural network layers. In at least one embodiment, said at least one performance metric when said first neural network layer is removed refers to an architecture weight or architecture weight value of said skip connection block in said first layer of said supernet (e.g., as utilizing said skip connection block results in removal of said first neural network layer). In at least one embodiment, said at least one performance metric when said one or more neural network layers is removed refers to one or more architecture weights or architecture weight values of one or more skip connection blocks associated with said one or more neural network layers.

In at least one embodiment, said system calculates an architecture weight of a neural network layer, also referred to as a block or operation, by at least causing said neural network layer to process data (e.g., of a training dataset), computing loss using one or more loss functions such as those described herein based at least in part on results of said processing, and calculating said architecture weight based at least in part on said loss. In at least one embodiment, said system calculates said architecture weight to minimize loss. In at least one embodiment, said system calculates one or more network weights for said neural network layer, and calculates said architecture weight such that computed loss is minimized at least with respect to said one or more network weights. In at least one embodiment, said system calculates said architecture weight through one or more multi-objective optimization processes. In at least one embodiment, said system calculates said architecture weights in connection with any suitable optimization processes, loss functions, training processes, latency constraints, and/or variations thereof, such as those described in connection with FIG. 1.

In at least one embodiment, at a particular training epoch, said system calculates a first value of said at least one performance metric when said first neural network layer is not removed and a second value of said at least one performance metric when said first neural network layer is removed, and compares said first value, said second value, and/or a threshold value calculated based on said particular training epoch (e.g., t(e) as described in connection with FIG. 1). In at least one embodiment, a comparison between said first value and said second value refers to a comparison of said first value, said second value, and/or said threshold value. In at least one embodiment, said system performs a comparison between said first value and said second value, in which if said first value is less than said second value, said system determines to remove said first neural network layer and removes said first neural network layer from said supernet (e.g., by selecting said skip connection block). In at least one embodiment, said system performs a comparison between said first value and said second value, and said threshold value, in which if said first value is less than said threshold value, said system determines to remove said first neural network layer and removes said first neural network layer from said supernet, and if said second value is less than said threshold value, said system determines to not remove said first neural network layer and does not remove said first neural network layer from said supernet.

In at least one embodiment, said system removes a particular layer of said supernet by selecting a skip connection block in said particular layer or otherwise causing only a skip connection block to remain in said particular layer. In at least one embodiment, said system does not remove a particular layer of said supernet by selecting a block other than a skip connection block in said particular layer or otherwise causing only said block to remain in said particular layer. In at least one embodiment, said one or more neural network layers are one or more neural network layers part of one or more layers of said supernet, in which said system performs one or more processes such as those described above to determine whether to remove each layer of said one or more neural network layers. In at least one embodiment, said system performs one or more processes such as those described herein for any number of training epochs until said system has determined whether to remove each layer of said one or more neural network layers and removed neural network layers determined to be removed from said supernet.

In at least one embodiment, said system performing at least a part of process 1000 includes executable code to at least output 1006 one or more neural networks based at least in part on determination. In at least one embodiment, said system determines a set of neural network layers to remove from said one or more neural network layers, and removes said set of neural network layers from said supernet. In at least one embodiment, said system determines another set of neural network layers not to remove from said one or more neural network layers, and does not remove said other set of neural network layers from said supernet. In at least one embodiment, said system outputs said one or more neural networks based on said supernet.

In at least one embodiment, said system outputs remaining neural network layers of said supernet as said one or more neural networks. In at least one embodiment, said system outputs said one or more neural networks that comprise or otherwise indicate said remaining neural network layers of said supernet. In at least one embodiment, said one or more neural networks can be trained and utilized by any suitable system for any suitable task, such as image processing, image classification, image segmentation, text/speech analysis, recognition, translation, and/or variations thereof.

In at least one embodiment, said system utilizes nodes equipped with 8 NVIDIA Tesla A100 GPUs (e.g., DGX-A100), although any suitable devices can be utilized. In at least one embodiment, said system utilizes any suitable programming language and/or models, such as those of Python, Pytorch, and/or variations thereof. In at least one embodiment, inference latency refers to Median GPU Compute Time, which can be measured through various commands of any suitable machine learning framework, such as TensorRT and/or variations thereof, with FP16 precision and batch size of 1, or any suitable values, using a GPU such as a NVIDIA V100 GPU or any suitable processing unit.

In at least one embodiment, said system utilizes any suitable dataset such as Imagenet-1k image classification dataset. In at least one embodiment, said system utilizes a weight decay of 1e-5 and one or more procedures such as those of AutoAugment with an augmentation magnitude of 9 and standard deviation 0.5 (e.g., corresponding to probability of applying an operation), or any suitable values, for both architecture search and training from scratch, although any suitable data augmentation policy search processes can be utilized. In at least one embodiment, said system utilizes automatic mixed precision (AMP).

In at least one embodiment, said system performs architecture search on 10%, or any suitable percentage, of randomly selected classes from an original dataset. In at least one embodiment, said system scales input images to a resolution of 288×288, or any suitable resolution. In at least one embodiment, said system performs search for 200 epochs with a total batch size of 256 and a cosine learning rate scheduler with an initial value of 0.1, although values can be any suitable values. In at least one embodiment, said system utilizes one or more optimizers, such as Adam optimizer for architecture parameters and RMSprop optimizer with an initial learning rate of 0.002 for weights, although any suitable optimizers can be utilized. In at least one embodiment, said system performs search in two phases, in which, in a first phase, said system trains only regular weights, also referred to as network weights, for first $e_{warmup}$=70 epochs, and may only do it once to save computational time. In at least one embodiment, second phase lasts remaining 130 epochs, in which, in each epoch, said system utilizes 80% of training dataset to train regular weights and remaining 20% to train architecture weights. In at least one embodiment, said second phase is computed in many variants but always starts from a common checkpoint after $e_{warmup}$ epochs, in which, during said phase, said system progressively prunes search space using a pruning threshold that increases linearly from 0.15 to 0.55, or any suitable values. In at least one embodiment, at end of each epoch, said system removes blocks below said threshold from search space. In at least one embodiment, said system utilizes momentum in pruning internal structure of a Prunode equal to 0.4, or any suitable value. In at least one embodiment, said system utilizes, as coefficient α in loss function, various values across different runs including values of {2.0, 1.2, 1.0, 0.8, 0.6, 0.4, 0.2}. In at least one embodiment, said system, for said runs, uses same coefficient β value of 0.6, or any suitable value. In at least one embodiment, latency term (LAT) of said loss function is measured in μs, or any suitable measurement.

In at least one embodiment, said system utilizes hyperparameters such as those associated with various networks, such as GPUNet and/or variations thereof. In at least one embodiment, said system trains various networks such as GPUNet-0, GPUNet-1, GPUNet-2, and/or variations thereof, using hyperparameters (e.g., including batch size) such as those utilized for PruNets such as those described herein.

In at least one embodiment, after architecture search, said system trains sampled network from scratch. In at least one embodiment, said system trains for 450 epochs with a total batch size of 1536 and an initial learning rate of 0.06, although any suitable values can be utilized. In at least one embodiment, said learning rate decays by 0.97 times for every 2.4 epochs, or at any suitable interval and/or value. In at least one embodiment, a parameter such as a crop_pct parameter is set to 1.0, or any suitable value. In at least one embodiment, said system utilizes exponential moving average (EMA) with a decay factor of 0.9999, or any suitable value. In at least one embodiment, said system utilizes a drop path with a base drop path rate of 0.2, or any suitable value. In at least one embodiment, said system performs training with and without distillation, in which knowledge distillation refers to a technique that transfers knowledge from a large pre-trained model to a smaller one which can be deployed under real-world limited constrains.

In at least one embodiment, for training with distillation, said system utilizes different teachers and different crop_pct as illustrated in following table, which can include any suitable values and/or variations thereof:

| | model resolution | teacher architecture | teacher resolution | crop_pct |
|---|---|---|---|---|
| GPUNet1 & PruNet | 288 × 288 | EfficientNet-B3 | 300 × 300 | 0.904 |
| GPUNet0 | 320 × 320 | EfficientNet-B4 | 380 × 380 | 0.922 |
| GPUNet2 | 384 × 384 | EfficientNet-B5 | 456 × 456 | 0.934 |

in which, for each image resolution, said system selects a different teacher. In at least one embodiment, said system changes crop_pct parameter to match a crop_pct parameter of said teacher.

In at least one embodiment, said system performs object detection processes utilizing any suitable dataset, such as MS COCO 2017 dataset. In at least one embodiment, said system utilizes a model such as EfficientDet as a baseline model, although any suitable model can be utilized, and replaces EfficientNet backbone with PruNet and GPUNet. In at least one embodiment, said system performs training for 300 epochs with batch size of 60, or any suitable values. In at least one embodiment, learning rate is warmed-up for first 20 epochs with value set to 1e-4, or any suitable value, in which, then, said system utilizes a cosine learning rate scheduler with an initial learning rate of 0.65, or any suitable value. In at least one embodiment, said system utilizes a stochastic gradient descent (SGD) optimizer, or any suitable optimizer, with a momentum of 0.9 and a weight decay of 4e-5, or any suitable values. In at least one embodiment, said system utilizes gradient clipping of value 10.0, or any suitable value. In at least one embodiment, said system performs training utilizing automatic mixed precision (AMP). In at least one embodiment, said system utilizes exponential moving average (EMA) with a decay factor of 0.999, or any suitable value.

In at least one embodiment, selection of parameters ϕ and λ (e.g., which multiply output of skip connection and output of a block) can influence final length of sampled network. In at least one embodiment, following table includes results for different ϕ and λ, in which said table can include any suitable values:

| | ϕ, λ = (1.0, 1.0) | | ϕ, λ = (1.1, 0.85) | | ϕ, λ = (1.1, 0.55) | | ϕ, λ = (1.1, 0.4) | |
|---|---|---|---|---|---|---|---|---|
| | Loss | # IRBs | Loss | # IRBs | Loss | # IRBs | Loss | # IRBs |
| α = 2.0 | 6.7149 | 6 | 6.6316 | 7 | 6.5968 | 9 | 6.6241 | 11 |
| α = 1.2 | 4.2938 | 9 | 4.1876 | 10 | 4.2139 | 12 | 4.2039 | 13 |
| α = 1.0 | 3.6352 | 11 | 3.6015 | 13 | 3.6074 | 13 | 3.6138 | 14 |
| α = 0.8 | 3.0027 | 13 | 2.9932 | 14 | 2.9762 | 14 | 2.9692 | 15 |
| α = 0.6 | 2.3528 | 15 | 2.3394 | 15 | 2.316 | 15 | 2.3723 | 15 |
| α = 0.4 | 1.7154 | 16 | 1.7201 | 17 | 1.7296 | 16 | 1.6946 | 16 |
| α = 0.2 | 1.0573 | 18 | 1.0573 | 18 | 1.0687 | 18 | 1.0531 | 18 |

in which said system, for each combination of α, ϕ, λ, runs a single search and for each search computes total loss. In at least one embodiment, total loss is a sum of cross entropy loss and latency loss (e.g., Loss=CE+$\alpha$*LAT?). In at least one embodiment, "#IRBs" indicates a number of fused inverted residual blocks and inverted residual blocks in a final architecture. In at least one embodiment, a number of other layers is a same for all architectures. In at least one embodiment, PruNet architectures are depicted by underlined numbers. In at least one embodiment, for $\alpha$ large enough, number of layers is inversely related to $\lambda$ for considered cases. In at least one embodiment, said system performs searches with ($\phi$, $\lambda$)=(1.0, 1.0), or any suitable values, in which these values correspond to a base approach without modification. In at least one embodiment, for $\alpha \geq 0.8$, said base approach samples networks with fewer layers than said performed searches.

In at least one embodiment, said system trains 28 of architectures found during searches such as those described herein and draws Pareto Frontiers defined by all four sets of @ and A. FIG. 11 illustrates another example of results, according to at least one embodiment. In at least one embodiment, referring to FIG. 11, graph 1102 illustrates how said system can perform one or more search processes to generate networks with up to 15%, or any suitable percentage, better latency with same accuracy compared to base approach. In at least one embodiment, graph 1102 illustrates architectures being searched using $0.6 \leq \alpha \leq 1.2$. In at least one embodiment, said system utilizes final loss of said search as a zero-cost filter to select architectures that are good candidates to be evaluated. In at least one embodiment, referring to FIG. 11, graph 1104 illustrates a Pareto Frontier of search loss with relation to final latency. In at least one embodiment, graph 1104 illustrates architectures being searched using $0.6 \leq \alpha \leq 1.2$, which illustrates a relationship between a final CE of said search and a final latency of said architecture. In at least one embodiment, referring to FIG. 11, if search loss is significantly better for similar searches (e.g., for similar $\alpha$ values), said system can expect better results in terms of final accuracy, which may or may not be correlated. In at least one embodiment, said system can generate any suitable neural network, such as those described herein, using various processes such as those described herein.

In at least one embodiment, one or more neural networks generated through various processes and/or in connection with said system such as those described herein are utilized as part of one or more systems, such as an image capturing/processing system, video capturing/processing system, audio capturing/processing system, word processing system, medical imaging system, autonomous vehicle system, NLP system, speech processing system, recommendation system, data processing system, and/or variations thereof. In at least one embodiment, one or more neural networks generated through various processes and/or in connection with said system such as those described herein can be utilized to perform any suitable task, such as classification, segmentation, detection, image processing, video processing, audio processing, NLP tasks, translation, information retrieval, sentiment analysis, information extraction, question answering, speech processing, recommendation tasks, and/or variations thereof.

Logic

Figure 12A:
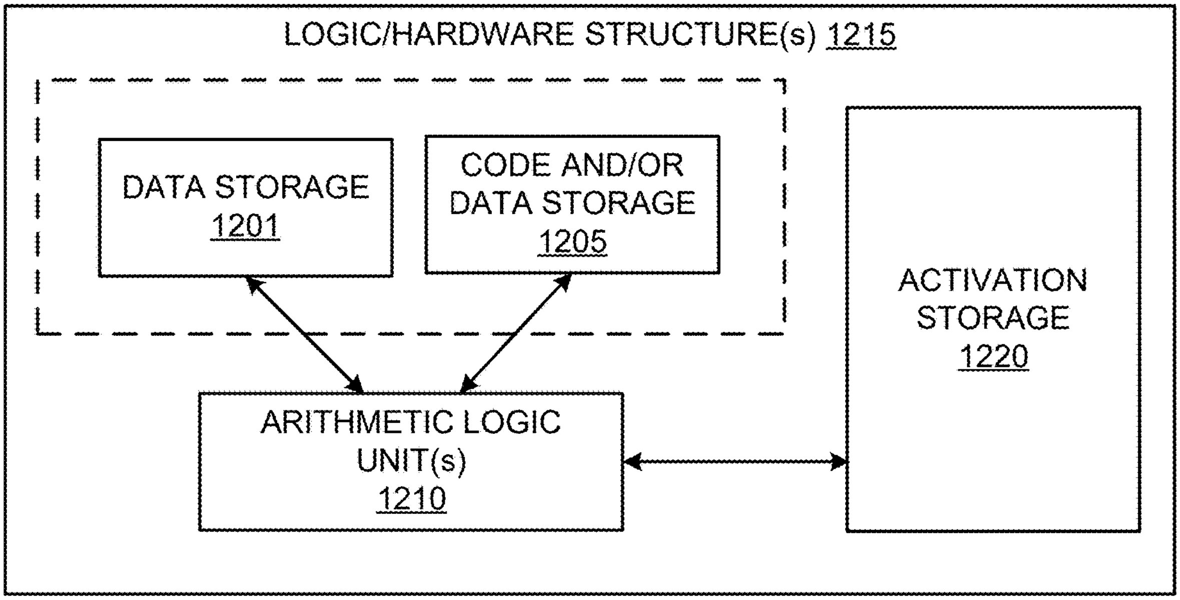
FIG. 12A illustrates logic, according to at least one embodiment.

FIG. 12A illustrates logic 1215 which, as described elsewhere herein, can be used in one or more devices to perform operations such as those discussed herein in accordance with at least one embodiment. In at least one embodiment, logic 1215 is used to perform inferencing and/or training operations associated with one or more embodiments. In at least one embodiment, logic 1215 is inference and/or training logic. Details regarding logic 1215 are provided below in conjunction with FIGS. 12A and/or 12B. In at least one embodiment, logic refers to any combination of software logic, hardware logic, and/or firmware logic to provide functionality or operations described herein, wherein logic may be, collectively or individually, embodied as circuitry that forms part of a larger system, for example, an integrated circuit (IC), system-on-chip (SoC), or one or processors (e.g., CPU, GPU).

In at least one embodiment, logic 1215 may include, without limitation, code and/or data storage 1201 to store forward and/or output weight and/or input/output data, and/or other parameters to configure neurons or layers of a neural network trained and/or used for inferencing in aspects of one or more embodiments. In at least one embodiment, logic 1215 may include, or be coupled to code and/or data storage 1201 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 1201 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1201 may be included with other on-chip or off-chip data storage, including a processor's L1, L2, or L3 cache or system memory.

In at least one embodiment, any portion of code and/or data storage 1201 may be internal or external to one or more processors or other hardware logic devices or circuits. In at least one embodiment, code and/or code and/or data storage 1201 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 1201 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, logic 1215 may include, without limitation, a code and/or data storage 1205 to store backward and/or output weight and/or input/output data corresponding to neurons or layers of a neural network trained and/or used for inferencing in aspects of one or more embodiments. In at least one embodiment, code and/or data storage 1205 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, logic 1215 may include, or be coupled to code and/or data storage 1205 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 1205 may be included with other on-chip or off-chip data storage, including a processor's L1, L2, or L3 cache or system memory. In at least one embodiment, any portion of code and/or data storage 1205 may be internal or external to one or more processors or other hardware logic devices or circuits. In at least one embodiment, code and/or data storage 1205 may be cache memory, DRAM, SRAM, non-volatile memory (e.g., flash memory), or other storage. In at least one embodiment, a choice of whether code and/or data storage 1205 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1201 and code and/or data storage 1205 may be separate storage structures. In at least one embodiment, code and/or data storage 1201 and code and/or data storage 1205 may be a combined storage structure. In at least one embodiment, code and/or data storage 1201 and code and/or data storage 1205 may be partially combined and partially separate. In at least one embodiment, any portion of code and/or data storage 1201 and code and/or data storage 1205 may be included with other on-chip or off-chip data storage, including a processor's L1, L2, or L3 cache or system memory.

In at least one embodiment, logic 1215 may include, without limitation, one or more arithmetic logic unit(s) ("ALU(s)") 1210, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1220 that are functions of input/output and/or weight parameter data stored in code and/or data storage 1201 and/or code and/or data storage 1205. In at least one embodiment, activations stored in activation storage 1220 are generated according to linear algebraic and or matrix-based mathematics performed by ALU(s) 1210 in response to performing instructions or other code, wherein weight values stored in code and/or data storage 1205 and/or data storage 1201 are used as operands along with other values, such as bias values, gradient information, momentum values, or other parameters or hyperparameters, any or all of which may be stored in code and/or data storage 1205 or code and/or data storage 1201 or another storage on or off-chip.

In at least one embodiment, ALU(s) 1210 are included within one or more processors or other hardware logic devices or circuits, whereas in another embodiment, ALU(s) 1210 may be external to a processor or other hardware logic device or circuit that uses them (e.g., a co-processor). In at least one embodiment, ALUs 1210 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1201, code and/or data storage 1205, and activation storage 1220 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 1220 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1220 may be cache memory, DRAM, SRAM, non-volatile memory (e.g., flash memory), or other storage. In at least one embodiment, activation storage 1220 may be completely or partially within or external to one or more processors or other logical circuits. In at least one embodiment, a choice of whether activation storage 1220 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, logic 1215 illustrated in FIG. 12A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, logic 1215 illustrated in FIG. 12A may be used in conjunction with central processing unit ("CPU") hardware, graphics processing unit ("GPU") hardware or other hardware, such as field programmable gate arrays ("FPGAs").

Figure 12B:
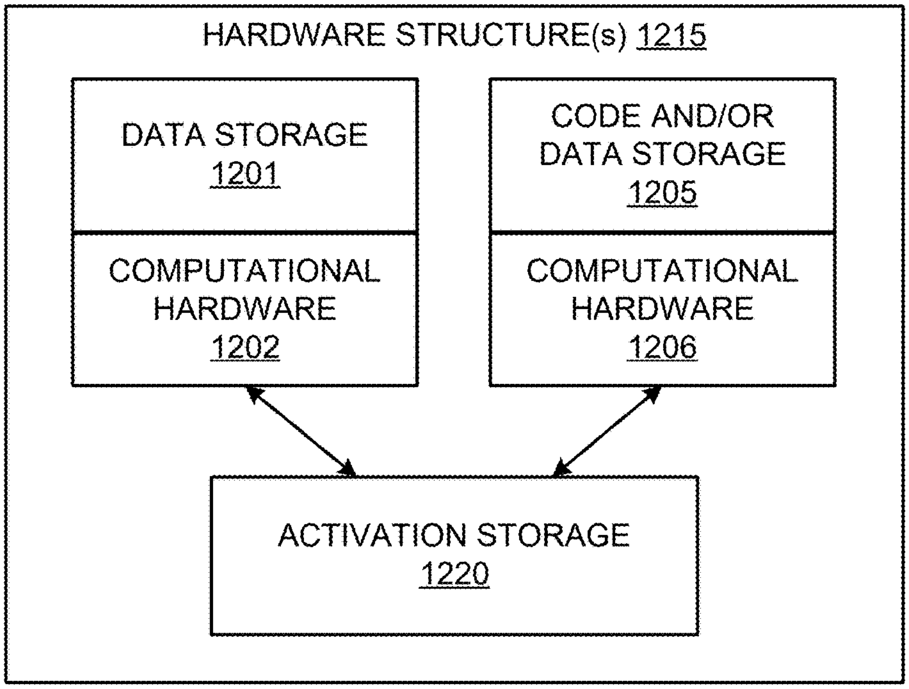
FIG. 12B illustrates logic, according to at least one embodiment.

FIG. 12B illustrates logic 1215, according to at least one embodiment. In at least one embodiment, logic 1215 is inference and/or training logic. In at least one embodiment, logic 1215 may include, without limitation, hardware logic in which computational resources are dedicated or otherwise exclusively used in conjunction with weight values or other information corresponding to one or more layers of neurons within a neural network. In at least one embodiment, logic 1215 illustrated in FIG. 12B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, logic 1215 illustrated in FIG. 12B may be used in conjunction with central processing unit (CPU) hardware, graphics processing unit (GPU) hardware or other hardware, such as field programmable gate arrays (FPGAs). In at least one embodiment, logic 1215 includes, without limitation, code and/or data storage 1201 and code and/or data storage 1205, which may be used to store code (e.g., graph code), weight values and/or other information, including bias values, gradient information, momentum values, and/or other parameter or hyperparameter information. In at least one embodiment illustrated in FIG. 12B, each of code and/or data storage 1201 and code and/or data storage 1205 is associated with a dedicated computational resource, such as computational hardware 1202 and computational hardware 1206, respectively. In at least one embodiment, each of computational hardware 1202 and computational hardware 1206 comprises one or more ALUs that perform mathematical functions, such as linear algebraic functions, only on information stored in code and/or data storage 1201 and code and/or data storage 1205, respectively, result of which is stored in activation storage 1220.

In at least one embodiment, each of code and/or data storage 1201 and 1205 and corresponding computational hardware 1202 and 1206, respectively, correspond to different layers of a neural network, such that resulting activation from one storage/computational pair 1201/1202 of code and/or data storage 1201 and computational hardware 1202 is provided as an input to a next storage/computational pair 1205/1206 of code and/or data storage 1205 and computational hardware 1206, in order to mirror a conceptual organization of a neural network. In at least one embodiment, each of storage/computational pairs 1201/1202 and 1205/1206 may correspond to more than one neural network layer. In at least one embodiment, additional storage/computation pairs (not shown) subsequent to or in parallel with storage/computation pairs 1201/1202 and 1205/1206 may be included in logic 1215.

In at least one embodiment, one or more systems depicted in FIGS. 12A-12B are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 12A-12B are utilized to perform operations discussed herein such as selectively using one or more neural network layers based, at least in part, on one or more iteratively increasing neural network performance metrics. In at least one embodiment, one or more systems depicted in FIGS. 12A-12B are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 12A-12B are utilized to implement one or more systems and/or processes such as those described in connection with FIGS. 1-11.

Neural Network Training and Deployment

Figure 13:
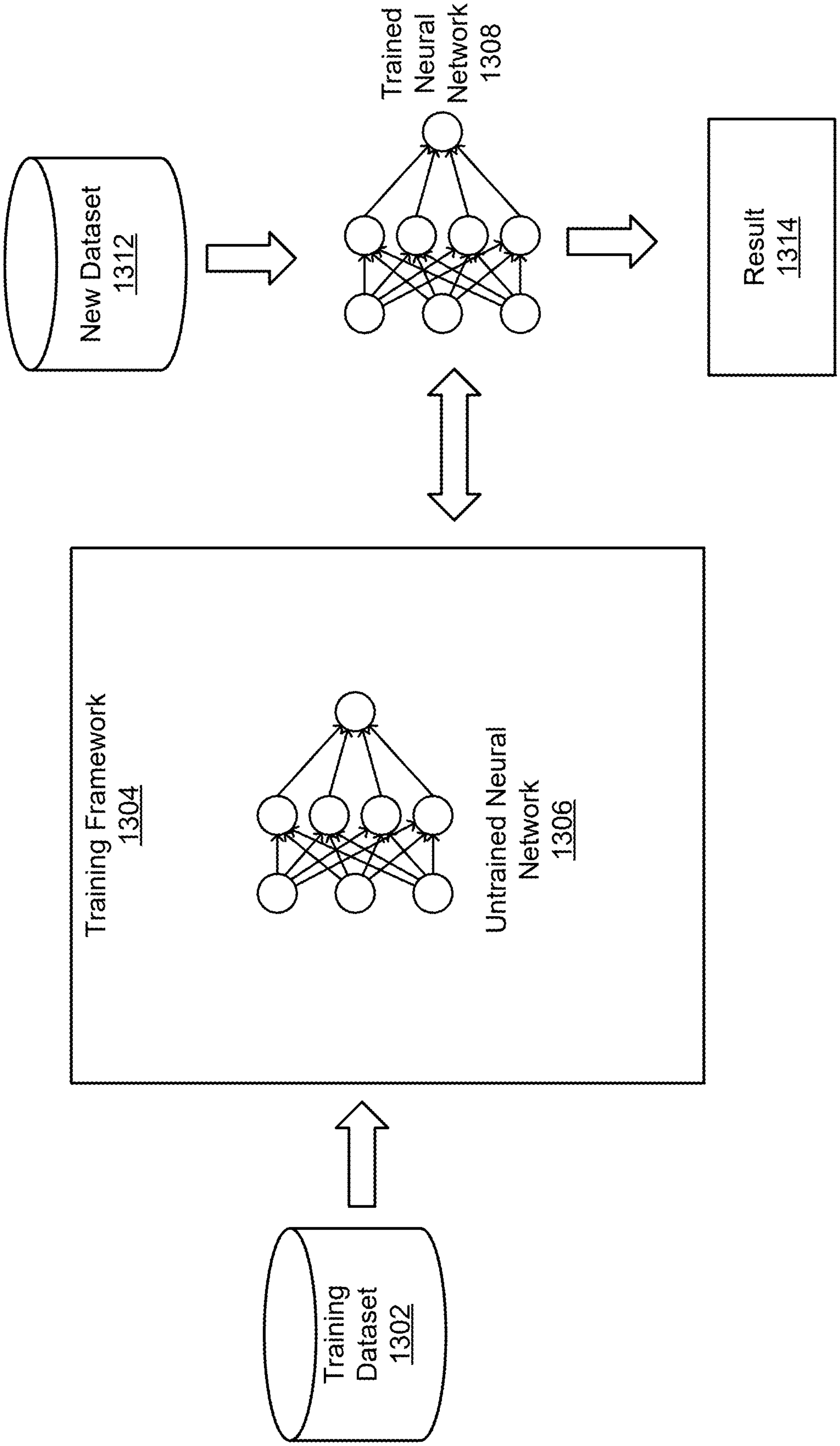
FIG. 13 illustrates training and deployment of a neural network, according to at least one embodiment.

FIG. 13 illustrates training and deployment of a deep neural network, according to at least one embodiment. In at least one embodiment, untrained neural network 1306 is trained using a training dataset 1302. In at least one embodiment, training framework 1304 is a PyTorch framework, whereas in other embodiments, training framework 1304 is a TensorFlow, Boost, Caffe, Microsoft Cognitive Toolkit/CNTK, MXNet, Chainer, Keras, Deeplearning4j, or other training framework. In at least one embodiment, training framework 1304 trains an untrained neural network 1306 and enables it to be trained using processing resources described herein to generate a trained neural network 1308. In at least one embodiment, weights may be chosen randomly or by pre-training using a deep belief network. In at least one embodiment, training may be performed in either a supervised, partially supervised, or unsupervised manner.

In at least one embodiment, untrained neural network 1306 is trained using supervised learning, wherein training dataset 1302 includes an input paired with a desired output for an input, or where training dataset 1302 includes input having a known output and an output of neural network 1306 is manually graded. In at least one embodiment, untrained neural network 1306 is trained in a supervised manner and processes inputs from training dataset 1302 and compares resulting outputs against a set of expected or desired outputs. In at least one embodiment, errors are then propagated back through untrained neural network 1306. In at least one embodiment, training framework 1304 adjusts weights that control untrained neural network 1306. In at least one embodiment, training framework 1304 includes tools to monitor how well untrained neural network 1306 is converging towards a model, such as trained neural network 1308, suitable to generating correct answers, such as in result 1314, based on input data such as a new dataset 1312. In at least one embodiment, training framework 1304 trains untrained neural network 1306 repeatedly while adjust weights to refine an output of untrained neural network 1306 using a loss function and adjustment algorithm, such as stochastic gradient descent. In at least one embodiment, training framework 1304 trains untrained neural network 1306 until untrained neural network 1306 achieves a desired accuracy. In at least one embodiment, trained neural network 1308 can then be deployed to implement any number of machine learning operations.

In at least one embodiment, untrained neural network 1306 is trained using unsupervised learning, wherein untrained neural network 1306 attempts to train itself using unlabeled data. In at least one embodiment, unsupervised learning training dataset 1302 will include input data without any associated output data or "ground truth" data. In at least one embodiment, untrained neural network 1306 can learn groupings within training dataset 1302 and can determine how individual inputs are related to untrained dataset 1302. In at least one embodiment, unsupervised training can be used to generate a self-organizing map in trained neural network 1308 capable of performing operations useful in reducing dimensionality of new dataset 1312. In at least one embodiment, unsupervised training can also be used to perform anomaly detection, which allows identification of data points in new dataset 1312 that deviate from normal patterns of new dataset 1312.

In at least one embodiment, semi-supervised learning may be used, which is a technique in which in training dataset 1302 includes a mix of labeled and unlabeled data. In at least one embodiment, training framework 1304 may be used to perform incremental learning, such as through transferred learning techniques. In at least one embodiment, incremental learning enables trained neural network 1308 to adapt to new dataset 1312 without forgetting knowledge instilled within trained neural network 1308 during initial training.

In at least one embodiment, training framework 1304 is a framework processed in connection with a software development toolkit such as an OpenVINO (Open Visual Inference and Neural network Optimization) toolkit. In at least one embodiment, an OpenVINO toolkit is a toolkit such as those developed by Intel Corporation of Santa Clara, CA. In at least one embodiment, OpenVINO comprises logic 1215 or uses logic 1215 to perform operations described herein. In at least one embodiment, an SoC, integrated circuit, or processor uses OpenVINO to perform operations described herein.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based neural networks, and/or various other neural network models. In at least one embodiment, OpenVINO supports various software libraries such as OpenCV, OpenCL, and/or variations thereof.

In at least one embodiment, Open VINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, OpenVINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, Open VINO provides various software functions to execute a program on one or more devices. In at least one embodiment, OpenVINO provides various software functions to execute a program and/or portions of a program on different devices. In at least one embodiment, OpenVINO provides various software functions to, for example, run a first portion of code on a CPU and a second portion of code on a GPU and/or FPGA. In at least one embodiment, Open VINO provides various software functions to execute one or more layers of a neural network on one or more devices (e.g., a first set of layers on a first device, such as a GPU, and a second set of layers on a second device, such as a CPU).

In at least one embodiment, OpenVINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using Open VINO.

In at least one embodiment, one or more systems depicted in FIG. 13 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 13 are utilized to perform operations discussed herein such as selectively using one or more neural network layers based, at least in part, on one or more iteratively increasing neural network performance metrics. In at least one embodiment, one or more systems depicted in FIG. 13 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 13 are utilized to implement one or more systems and/or processes such as those described in connection with FIGS. 1-11.

Data Center

Figure 14:
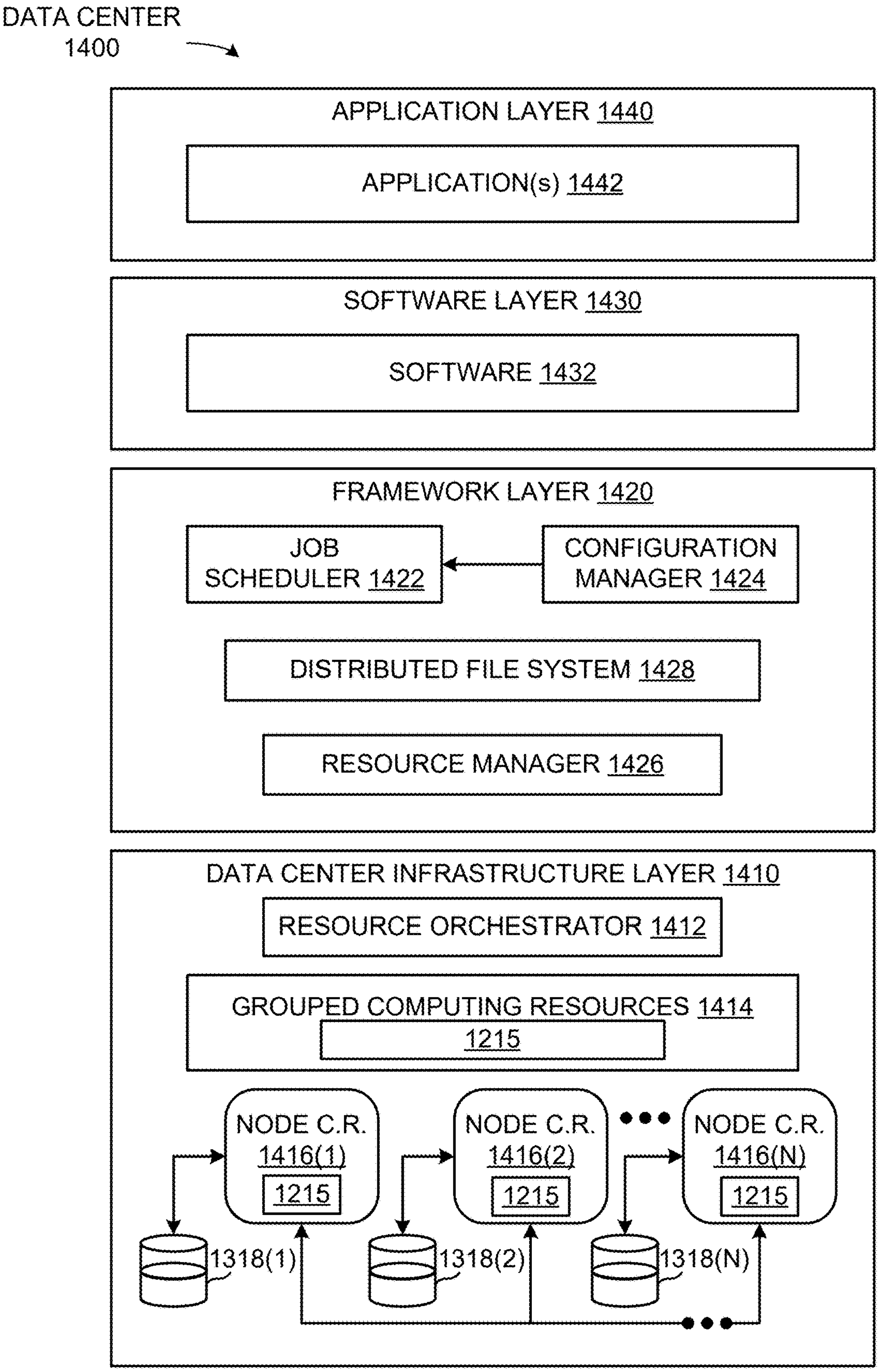
FIG. 14 illustrates an example data center system, according to at least one embodiment.

FIG. 14 illustrates an example data center 1400, in which at least one embodiment may be used. In at least one embodiment, data center 1400 includes a data center infrastructure layer 1410, a framework layer 1420, a software layer 1430 and an application layer 1440.

In at least one embodiment, as shown in FIG. 14, data center infrastructure layer 1410 may include a resource orchestrator 1412, grouped computing resources 1414, and node computing resources ("node C.R.s") 1416(1)-1416(N), where "N" represents a positive integer (which may be a different integer "N" than used in other figures). In at least one embodiment, node C.R.s 1416(1)-1416(N) may include, but are not limited to, any number of central processing units ("CPUs") or other processors (including accelerators, field programmable gate arrays (FPGAs), graphics processors, etc.), memory storage devices 1418(1)-1418(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1416(1)-1416(N) may be a server having one or more of above-mentioned computing resources.

In at least one embodiment, grouped computing resources 1414 may include separate groupings of node C.R.s housed within one or more racks (not shown), or many racks housed in data centers at various geographical locations (also not shown). In at least one embodiment, separate groupings of node C.R.s within grouped computing resources 1414 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1412 may configure or otherwise control one or more node C.R.s 1416(1)-1416(N) and/or grouped computing resources 1414. In at least one embodiment, resource orchestrator 1412 may include a software design infrastructure ("SDI") management entity for data center 1400. In at least one embodiment, resource orchestrator 1212 may include hardware, software or some combination thereof.

In at least one embodiment, as shown in FIG. 14, framework layer 1420 includes a job scheduler 1422, a configuration manager 1424, a resource manager 1426 and a distributed file system 1428. In at least one embodiment, framework layer 1420 may include a framework to support software 1432 of software layer 1430 and/or one or more application(s) 1442 of application layer 1440. In at least one embodiment, software 1432 or application(s) 1442 may respectively include web-based service software or applications, such as those provided by Amazon Web Services, Google Cloud and Microsoft Azure. In at least one embodiment, framework layer 1420 may be, but is not limited to, a type of free and open-source software web application framework such as Apache Spark™ (hereinafter "Spark") that may utilize distributed file system 1428 for large-scale data processing (e.g., "big data"). In at least one embodiment, job scheduler 1422 may include a Spark driver to facilitate scheduling of workloads supported by various layers of data center 1400. In at least one embodiment, configuration manager 1424 may be capable of configuring different layers such as software layer 1430 and framework layer 1420 including Spark and distributed file system 1428 for supporting large-scale data processing. In at least one embodiment, resource manager 1426 may be capable of managing clustered or grouped computing resources mapped to or allocated for support of distributed file system 1428 and job scheduler 1422. In at least one embodiment, clustered or grouped computing resources may include grouped computing resources 1414 at data center infrastructure layer 1410. In at least one embodiment, resource manager 1426 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1428 of framework layer 1420. In at least one embodiment, one or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1428 of framework layer 1420. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1424, resource manager 1426, and resource orchestrator 1412 may implement any number and type of self-modifying actions based on any amount and type of data acquired in any technically feasible fashion. In at least one embodiment, self-modifying actions may relieve a data center operator of data center 1400 from making possibly bad configuration decisions and possibly avoiding underutilized and/or poor performing portions of a data center.

In at least one embodiment, data center 1400 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1400. In at least one embodiment, trained machine learning models corresponding to one or more neural networks may be used to infer or predict information using resources described above with respect to data center 1400 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 14 for inferencing or predicting operations based, at least in part, on weight parameters calculated using neural network training operations, neural network functions and/or architectures, or neural network use cases described herein.

In at least one embodiment, one or more systems depicted in FIG. 14 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 14 are utilized to perform operations discussed herein such as selectively using one or more neural network layers based, at least in part, on one or more iteratively increasing neural network performance metrics. In at least one embodiment, one or more systems depicted in FIG. 14 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 14 are utilized to implement one or more systems and/or processes such as those described in connection with FIGS. 1-11.

Autonomous Vehicle

Figure 15A:
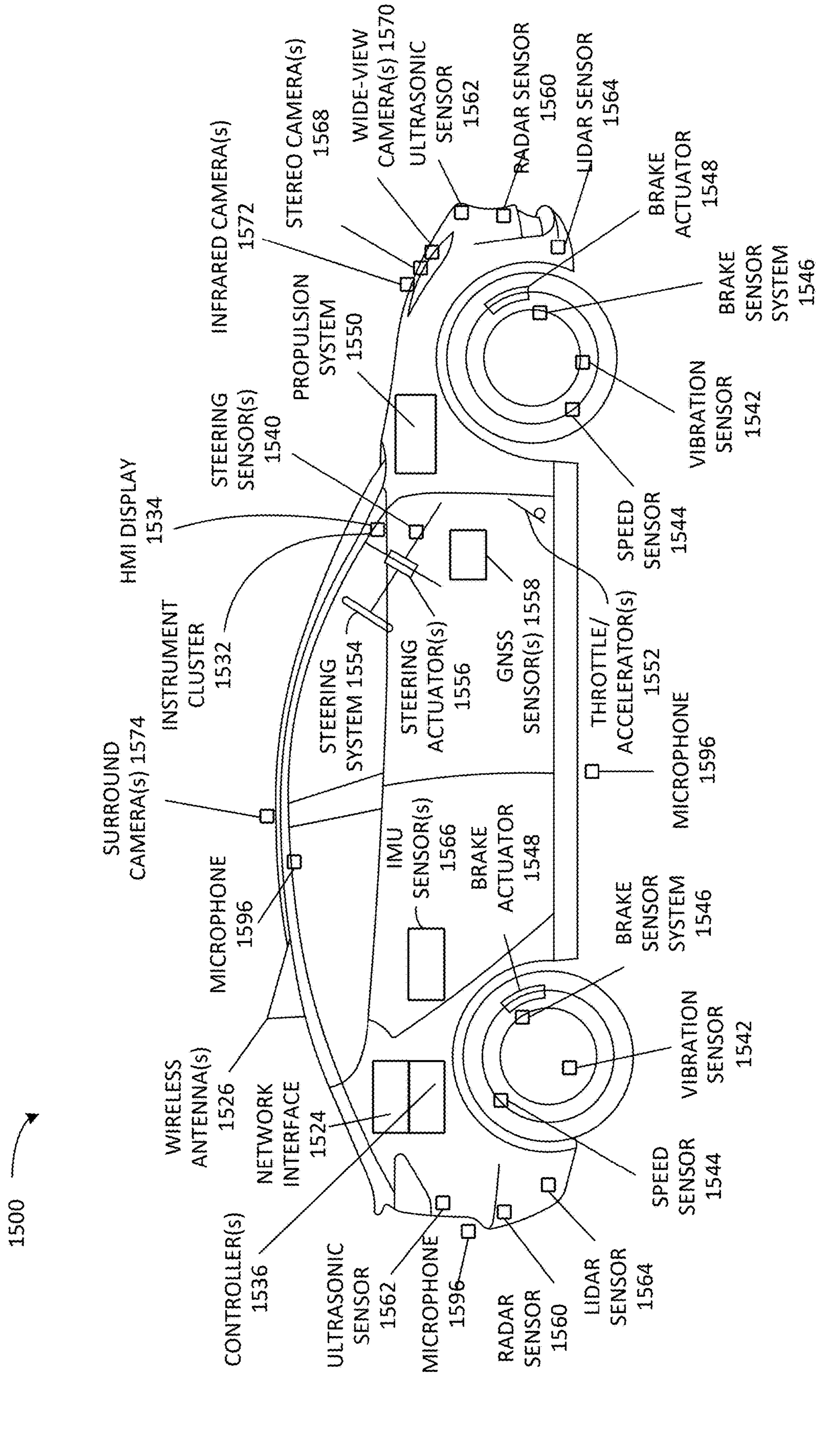
FIG. 15A illustrates an example of an autonomous vehicle, according to at least one embodiment.

FIG. 15A illustrates an example of an autonomous vehicle 1500, according to at least one embodiment. In at least one embodiment, autonomous vehicle 1500 (alternatively referred to herein as "vehicle 1500") may be, without limitation, a passenger vehicle, such as a car, a truck, a bus, and/or another type of vehicle that accommodates one or more passengers. In at least one embodiment, vehicle 1500 may be a semi-tractor-trailer truck used for hauling cargo. In at least one embodiment, vehicle 1500 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 1500 may be capable of functionality in accordance with one or more of Level 1 through Level 5 of autonomous driving levels. For example, in at least one embodiment, vehicle 1500 may be capable of conditional automation (Level 3), high automation (Level 4), and/or full automation (Level 5), depending on embodiment.

In at least one embodiment, vehicle 1500 may include, without limitation, components such as a chassis, a vehicle body, wheels (e.g., 2, 4, 6, 8, 18, etc.), tires, axles, and other components of a vehicle. In at least one embodiment, vehicle 1500 may include, without limitation, a propulsion system 1550, such as an internal combustion engine, hybrid electric power plant, an all-electric engine, and/or another propulsion system type. In at least one embodiment, propulsion system 1550 may be connected to a drive train of vehicle 1500, which may include, without limitation, a transmission, to enable propulsion of vehicle 1500. In at least one embodiment, propulsion system 1550 may be controlled in response to receiving signals from a throttle/accelerator(s) 1552.

In at least one embodiment, a steering system 1554, which may include, without limitation, a steering wheel, is used to steer vehicle 1500 (e.g., along a desired path or route) when propulsion system 1550 is operating (e.g., when vehicle 1500 is in motion). In at least one embodiment, steering system 1554 may receive signals from steering actuator(s) 1556. In at least one embodiment, a steering wheel may be optional for full automation (Level 5) functionality. In at least one embodiment, a brake sensor system 1546 may be used to operate vehicle brakes in response to receiving signals from brake actuator(s) 1548 and/or brake sensors.

In at least one embodiment, controller(s) 1536, which may include, without limitation, one or more system on chips ("SoCs") (not shown in FIG. 15A) and/or graphics processing unit(s) ("GPU(s)"), provide signals (e.g., representative of commands) to one or more components and/or systems of vehicle 1500. For instance, in at least one embodiment, controller(s) 1536 may send signals to operate vehicle brakes via brake actuator(s) 1548, to operate steering system 1554 via steering actuator(s) 1556, to operate propulsion system 1550 via throttle/accelerator(s) 1552. In at least one embodiment, controller(s) 1536 may include one or more onboard (e.g., integrated) computing devices that process sensor signals, and output operation commands (e.g., signals representing commands) to enable autonomous driving and/or to assist a human driver in driving vehicle 1500. In at least one embodiment, controller(s) 1536 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 1536 provide signals for controlling one or more components and/or systems of vehicle 1500 in response to sensor data received from one or more sensors (e.g., sensor inputs). In at least one embodiment, sensor data may be received from, for example and without limitation, global navigation satellite systems ("GNSS") sensor(s) 1558 (e.g., Global Positioning System sensor(s)), RADAR sensor(s) 1560, ultrasonic sensor(s) 1562, LIDAR sensor(s) 1564, inertial measurement unit ("IMU") sensor(s) 1566 (e.g., accelerometer(s), gyroscope(s), a magnetic compass or magnetic compasses, magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range cameras (not shown in FIG. 15A), mid-range camera(s) (not shown in FIG. 15A), speed sensor(s) 1544 (e.g., for measuring speed of vehicle 1500), vibration sensor(s) 1542, steering sensor(s) 1540, brake sensor(s) (e.g., as part of brake sensor system 1546), and/or other sensor types.

In at least one embodiment, one or more of controller(s) 1536 may receive inputs (e.g., represented by input data) from an instrument cluster 1532 of vehicle 1500 and provide outputs (e.g., represented by output data, display data, etc.) via a human-machine interface ("HMI") display 1534, an audible annunciator, a loudspeaker, and/or via other components of vehicle 1500. In at least one embodiment, outputs may include information such as vehicle velocity, speed, time, map data (e.g., a High Definition map (not shown in FIG. 15A)), location data (e.g., vehicle's 1500 location, such as on a map), direction, location of other vehicles (e.g., an occupancy grid), information about objects and status of objects as perceived by controller(s) 1536, etc. For example, in at least one embodiment, HMI display 1534 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1500 further includes a network interface 1524 which may use wireless antenna(s) 1526 and/or modem(s) to communicate over one or more networks. For example, in at least one embodiment, network interface 1524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 1526 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Logic 1215 are used to perform inferencing and/or training operations associated with one or more embodiments.

Details regarding logic 1215 are provided herein in conjunction with FIGS. 12A and/or 12B. In at least one embodiment, logic 1215 may be used in system FIG. 15A for inferencing or predicting operations based, at least in part, on weight parameters calculated using neural network training operations, neural network functions and/or architectures, or neural network use cases described herein.

Figure 15B:
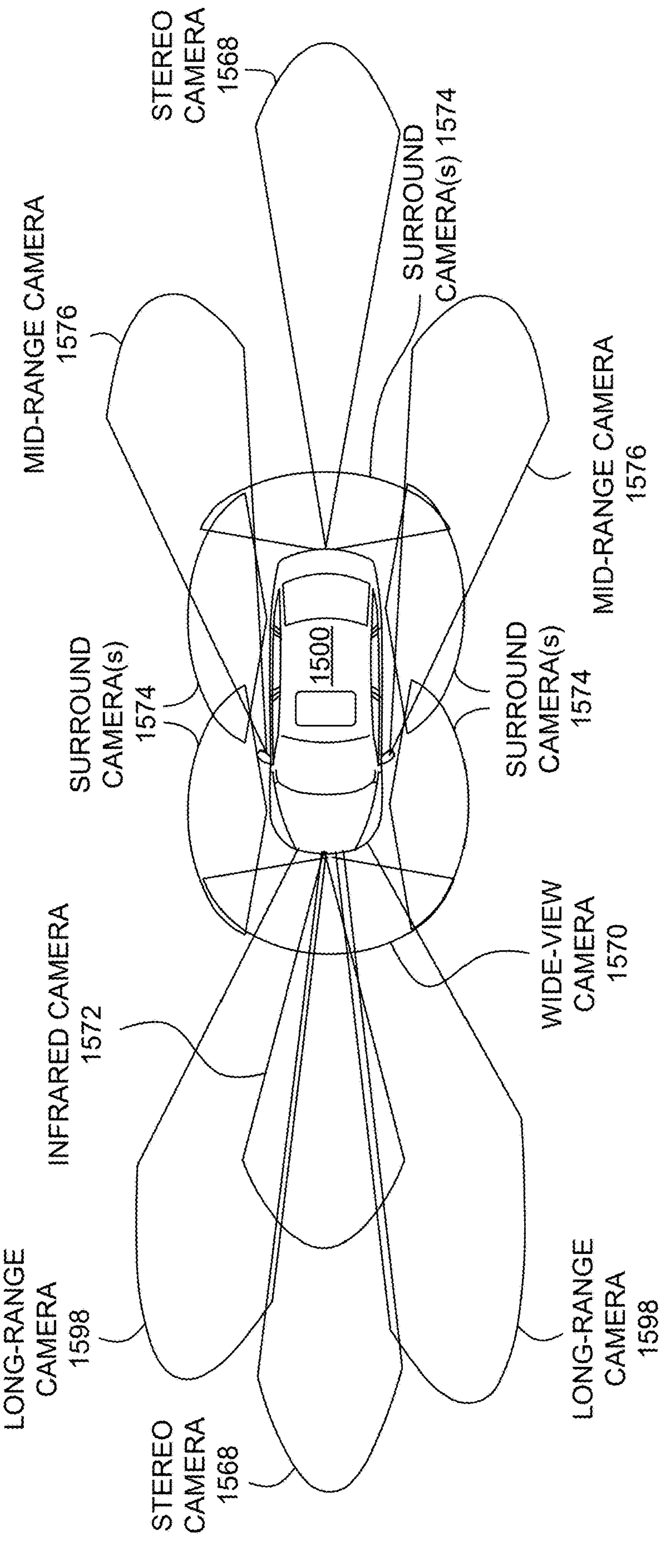
FIG. 15B illustrates an example of camera locations and fields of view for the autonomous vehicle of FIG. 15A, according to at least one embodiment.

FIG. 15B illustrates an example of camera locations and fields of view for autonomous vehicle 1500 of FIG. 15A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1500.

In at least one embodiment, camera types for cameras may include, but are not limited to, digital cameras that may be adapted for use with components and/or systems of vehicle 1500. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more camera may be mounted in a mounting assembly, such as a custom designed (three-dimensional ("3D") printed) assembly, in order to cut out stray light and reflections from within vehicle 1500 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 1500 (e.g., front-facing cameras) may be used for surround view, to help identify forward facing paths and obstacles, as well as aid in, with help of one or more of controller(s) 1536 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 1570 may be used to perceive objects coming into view from a periphery (e.g., pedestrians, crossing traffic or bicycles). Although only one wide-view camera 1570 is illustrated in FIG. 15B, in other embodiments, there may be any number (including zero) wide-view cameras on vehicle 1500. In at least one embodiment, any number of long-range camera(s) 1598 (e.g., a long-view stereo camera pair) may be used for depth-based object detection, especially for objects for which a neural network has not yet been trained. In at least one embodiment, long-range camera(s) 1598 may also be used for object detection and classification, as well as basic object tracking.

In at least one embodiment, any number of stereo camera(s) 1568 may also be included in a front-facing configuration. In at least one embodiment, one or more of stereo camera(s) 1568 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 1500, including a distance estimate for all points in an image. In at least one embodiment, one or more of stereo camera(s) 1568 may include, without limitation, compact stereo vision sensor(s) that may include, without limitation, two camera lenses (one each on left and right) and an image processing chip that may measure distance from vehicle 1500 to target object and use generated information (e.g., metadata) to activate autonomous emergency braking and lane departure warning functions. In at least one embodiment, other types of stereo camera(s) 1568 may be used in addition to, or alternatively from, those described herein.

In at least one embodiment, cameras with a field of view that include portions of environment to sides of vehicle 1500 (e.g., side-view cameras) may be used for surround view, providing information used to create and update an occupancy grid, as well as to generate side impact collision warnings. For example, in at least one embodiment, surround camera(s) 1574 (e.g., four surround cameras as illustrated in FIG. 15B) could be positioned on vehicle 1500. In at least one embodiment, surround camera(s) 1574 may include, without limitation, any number and combination of wide-view cameras, fisheye camera(s), 360 degree camera(s), and/or similar cameras. For instance, in at least one embodiment, four fisheye cameras may be positioned on a front, a rear, and sides of vehicle 1500. In at least one embodiment, vehicle 1500 may use three surround camera(s) 1574 (e.g., left, right, and rear), and may leverage one or more other camera(s) (e.g., a forward-facing camera) as a fourth surround-view camera.

In at least one embodiment, cameras with a field of view that include portions of an environment behind vehicle 1500 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 1598 and/or mid-range camera(s) 1576, stereo camera(s) 1568, infrared camera(s) 1572, etc.) as described herein.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 15B for inferencing or predicting operations based, at least in part, on weight parameters calculated using neural network training operations, neural network functions and/or architectures, or neural network use cases described herein.

Figure 15C:
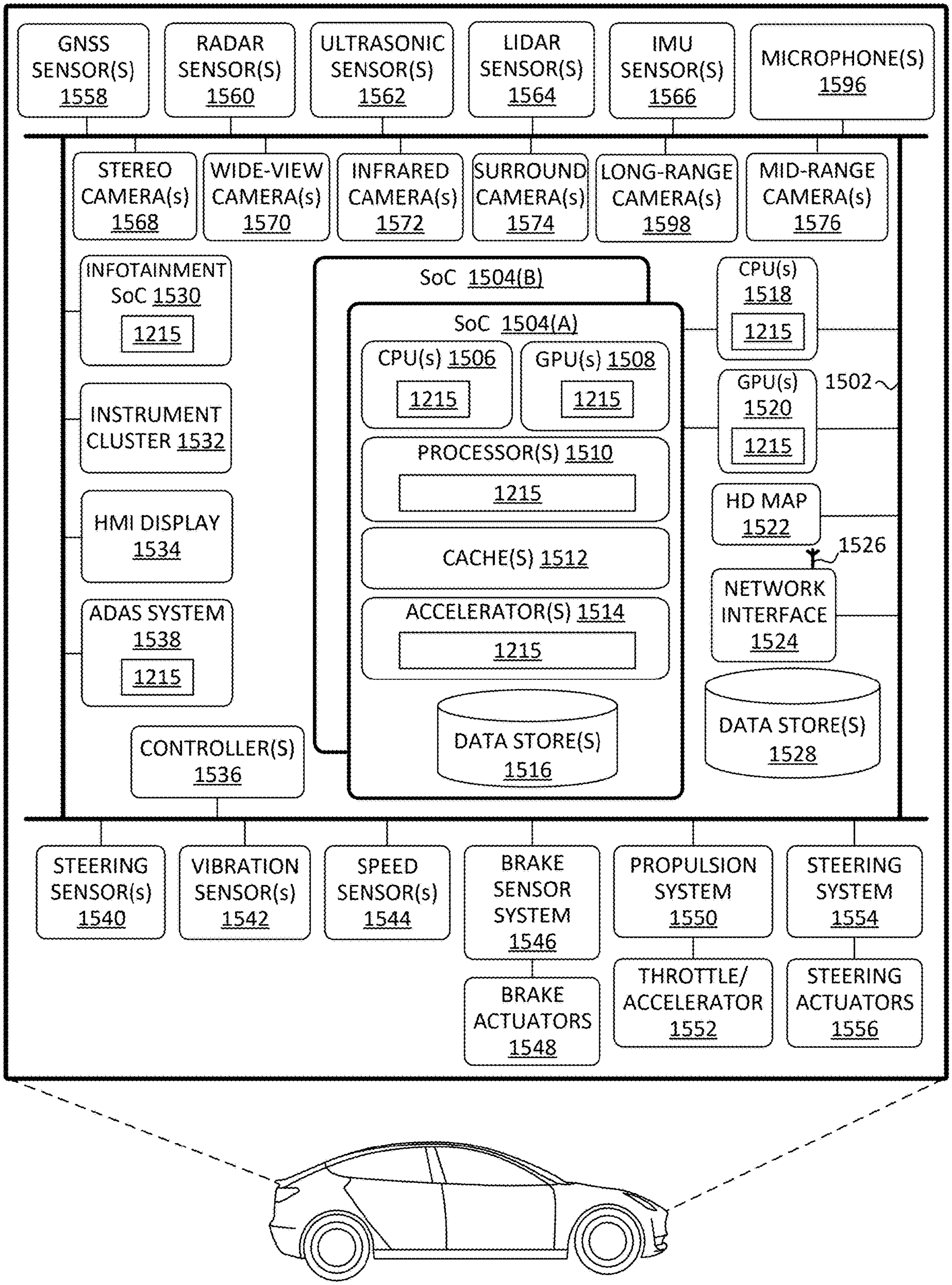
FIG. 15C is a block diagram illustrating an example system architecture for the autonomous vehicle of FIG. 15A, according to at least one embodiment.

FIG. 15C is a block diagram illustrating an example system architecture for autonomous vehicle 1500 of FIG. 15A, according to at least one embodiment. In at least one embodiment, each of components, features, and systems of vehicle 1500 in FIG. 15C is illustrated as being connected via a bus 1502. In at least one embodiment, bus 1502 may include, without limitation, a CAN data interface (alternatively referred to herein as a "CAN bus"). In at least one embodiment, a CAN may be a network inside vehicle 1500 used to aid in control of various features and functionality of vehicle 1500, such as actuation of brakes, acceleration, braking, steering, windshield wipers, etc. In at least one embodiment, bus 1502 may be configured to have dozens or even hundreds of nodes, each with its own unique identifier (e.g., a CAN ID). In at least one embodiment, bus 1502 may be read to find steering wheel angle, ground speed, engine revolutions per minute ("RPMs"), button positions, and/or other vehicle status indicators. In at least one embodiment, bus 1502 may be a CAN bus that is ASIL B compliant.

In at least one embodiment, in addition to, or alternatively from CAN, FlexRay and/or Ethernet protocols may be used. In at least one embodiment, there may be any number of busses forming bus 1502, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 1502 may communicate with any of components of vehicle 1500, and two or more busses of bus 1502 may communicate with corresponding components. In at least one embodiment, each of any number of system(s) on chip(s) ("SoC(s)") 1504 (such as SoC 1504(A) and SoC 1504(B)), each of controller(s) 1536, and/or each computer within vehicle may have access to same input data (e.g., inputs from sensors of vehicle 1500), and may be connected to a common bus, such CAN bus.

In at least one embodiment, vehicle 1500 may include one or more controller(s) 1536, such as those described herein with respect to FIG. 15A. In at least one embodiment, controller(s) 1536 may be used for a variety of functions. In at least one embodiment, controller(s) 1536 may be coupled to any of various other components and systems of vehicle 1500, and may be used for control of vehicle 1500, artificial intelligence of vehicle 1500, infotainment for vehicle 1500, and/or other functions.

In at least one embodiment, vehicle 1500 may include any number of SoCs 1504. In at least one embodiment, each of SoCs 1504 may include, without limitation, central processing units ("CPU(s)") 1506, graphics processing units ("GPU(s)") 1508, processor(s) 1510, cache(s) 1512, accelerator(s) 1514, data store(s) 1516, and/or other components and features not illustrated. In at least one embodiment, SoC(s) 1504 may be used to control vehicle 1500 in a variety of platforms and systems. For example, in at least one embodiment, SoC(s) 1504 may be combined in a system (e.g., system of vehicle 1500) with a High Definition ("HD") map 1522 which may obtain map refreshes and/or updates via network interface 1524 from one or more servers (not shown in FIG. 15C).

In at least one embodiment, CPU(s) 1506 may include a CPU cluster or CPU complex (alternatively referred to herein as a "CCPLEX"). In at least one embodiment, CPU(s) 1506 may include multiple cores and/or level two ("L2") caches. For instance, in at least one embodiment, CPU(s) 1506 may include eight cores in a coherent multi-processor configuration. In at least one embodiment, CPU(s) 1506 may include four dual-core clusters where each cluster has a dedicated L2 cache (e.g., a 2 megabyte (MB) L2 cache). In at least one embodiment, CPU(s) 1506 (e.g., CCPLEX) may be configured to support simultaneous cluster operations enabling any combination of clusters of CPU(s) 1506 to be active at any given time.

In at least one embodiment, one or more of CPU(s) 1506 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1506 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 1508 may include an integrated GPU (alternatively referred to herein as an "iGPU"). In at least one embodiment, GPU(s) 1508 may be programmable and may be efficient for parallel workloads. In at least one embodiment, GPU(s) 1508 may use an enhanced tensor instruction set. In at least one embodiment, GPU(s) 1508 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 1508 may include at least eight streaming microprocessors. In at least one embodiment, GPU(s) 1508 may use compute application programming interface(s)

(API(s)). In at least one embodiment, GPU(s) 1508 may use one or more parallel computing platforms and/or programming models (e.g., NVIDIA's CUDA model).

In at least one embodiment, one or more of GPU(s) 1508 may be power-optimized for best performance in automotive and embedded use cases. For example, in at least one embodiment, GPU(s) 1508 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a scheduler (e.g., warp scheduler) or sequencer, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1508 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1508 may include unified memory technology. In at least one embodiment, address translation services ("ATS") support may be used to allow GPU(s) 1508 to access CPU(s) 1506 page tables directly. In at least one embodiment, embodiment, when a GPU of GPU(s) 1508 memory management unit ("MMU") experiences a miss, an address translation request may be transmitted to CPU(s) 1506. In response, 2 CPU of CPU(s) 1506 may look in its page tables for a virtual-to-physical mapping for an address and transmit translation back to GPU(s) 1508, in at least one embodiment. In at least one embodiment, unified memory technology may allow a single unified virtual address space for memory of both CPU(s) 1506 and GPU(s) 1508, thereby simplifying GPU(s) 1508 programming and porting of applications to GPU(s) 1508.

In at least one embodiment, GPU(s) 1508 may include any number of access counters that may keep track of frequency of access of GPU(s) 1508 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 1504 may include any number of cache(s) 1512, including those described herein. For example, in at least one embodiment, cache(s) 1512 could include a level three ("L3") cache that is available to both CPU(s) 1506 and GPU(s) 1508 (e.g., that is connected to CPU(s) 1506 and GPU(s) 1508). In at least one embodiment, cache(s) 1512 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 1504 may include one or more accelerator(s) 1514 (e.g., hardware accelerators, software accelerators, or a combination thereof). In at least one embodiment, SoC(s) 1504 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 1508 and to off-load some of tasks of GPU(s) 1508 (e.g., to free up more cycles of GPU(s) 1508 for performing other tasks). In at least one embodiment, accelerator(s) 1514 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1514 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 1508, and by using an inference accelerator, for example, a designer may target either DLA(s) or GPU(s) 1508 for any function. For example, in at least one embodiment, a designer may focus processing of CNNs and floating point operations on DLA(s) and leave other functions to GPU(s) 1508 and/or accelerator(s) 1514.

In at least one embodiment, accelerator(s) 1514 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 1538, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 1506. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 1514 may include a computer vision network on-chip and static random-access memory ("SRAM"), for providing a high-bandwidth, low latency SRAM for accelerator(s) 1514. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1504 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1514 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 1500, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 1566 that correlates with vehicle 1500 orientation, distance, 3D location estimates of object obtained from neural network and/or other sensors (e.g., LIDAR sensor(s) 1564 or RADAR sensor(s) 1560), among others.

In at least one embodiment, one or more of SoC(s) 1504 may include data store(s) 1516 (e.g., memory). In at least one embodiment, data store(s) 1516 may be on-chip memory of SoC(s) 1504, which may store neural networks to be executed on GPU(s) 1508 and/or a DLA. In at least one embodiment, data store(s) 1516 may be large enough in capacity to store multiple instances of neural networks for redundancy and safety. In at least one embodiment, data store(s) 1516 may comprise L2 or L3 cache(s).

In at least one embodiment, one or more of SoC(s) 1504 may include any number of processor(s) 1510 (e.g., embedded processors). In at least one embodiment, processor(s) 1510 may include a boot and power management processor that may be a dedicated processor and subsystem to handle boot power and management functions and related security enforcement. In at least one embodiment, a boot and power management processor may be a part of a boot sequence of SoC(s) 1504 and may provide runtime power management services. In at least one embodiment, a boot power and management processor may provide clock and voltage programming, assistance in system low power state transitions, management of SoC(s) 1504 thermals and temperature sensors, and/or management of SoC(s) 1504 power states. In at least one embodiment, each temperature sensor may be implemented as a ring-oscillator whose output frequency is proportional to temperature, and SoC(s) 1504 may use ring-oscillators to detect temperatures of CPU(s) 1506, GPU(s) 1508, and/or accelerator(s) 1514. In at least one embodiment, if temperatures are determined to exceed a threshold, then a boot and power management processor may enter a temperature fault routine and put SoC(s) 1504 into a lower power state and/or put vehicle 1500 into a chauffeur to safe stop mode (e.g., bring vehicle 1500 to a safe stop).

In at least one embodiment, processor(s) 1510 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 1510 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 1510 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1510 may further include a real-time camera engine that may include, without limitation, a dedicated processor subsystem for handling real-time camera management. In at least one embodiment, processor(s) 1510 may further include a high-dynamic range signal processor that may include, without limitation, an image signal processor that is a hardware engine that is part of a camera processing pipeline.

In at least one embodiment, processor(s) 1510 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 1570, surround camera(s) 1574, and/or on in-cabin monitoring camera sensor(s). In at least one embodiment, in-cabin monitoring camera sensor(s) are preferably monitored by a neural network running on another instance of SoC 1504, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 1508 are not required to continuously render new surfaces. In at least one embodiment, when GPU(s) 1508 are powered on and active doing 3D rendering, a video image compositor may be used to offload GPU(s) 1508 to improve performance and responsiveness.

In at least one embodiment, one or more SoC of SoC(s) 1504 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 1504 may further include an input/output controller(s) that may be controlled by software and may be used for receiving I/O signals that are uncommitted to a specific role.

In at least one embodiment, one or more Soc of SoC(s) 1504 may further include a broad range of peripheral interfaces to enable communication with peripherals, audio encoders/decoders ("codecs"), power management, and/or other devices. In at least one embodiment, SoC(s) 1504 may be used to process data from cameras (e.g., connected over Gigabit Multimedia Serial Link and Ethernet channels), sensors (e.g., LIDAR sensor(s) 1564, RADAR sensor(s) 1560, etc. that may be connected over Ethernet channels), data from bus 1502 (e.g., speed of vehicle 1500, steering wheel position, etc.), data from GNSS sensor(s) 1558 (e.g., connected over a Ethernet bus or a CAN bus), etc. In at least one embodiment, one or more SoC of SoC(s) 1504 may further include dedicated high-performance mass storage controllers that may include their own DMA engines, and that may be used to free CPU(s) 1506 from routine data management tasks.

In at least one embodiment, SoC(s) 1504 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 1504 may be faster, more reliable, and even more energy-efficient and space-efficient than conventional systems. For example, in at least one embodiment, accelerator(s) 1514, when combined with CPU(s) 1506, GPU(s) 1508, and data store(s) 1516, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 1520) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 1508.

In at least one embodiment, a CNN for facial recognition and vehicle owner identification may use data from camera sensors to identify presence of an authorized driver and/or owner of vehicle 1500. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 1504 provide for security against theft and/or carjacking.

In at least one embodiment, a CNN for emergency vehicle detection and identification may use data from microphones 1596 to detect and identify emergency vehicle sirens. In at least one embodiment, SoC(s) 1504 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 1558. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 1562, until emergency vehicles pass.

In at least one embodiment, vehicle 1500 may include CPU(s) 1518 (e.g., discrete CPU(s), or dCPU(s)), that may be coupled to SoC(s) 1504 via a high-speed interconnect (e.g., PCIe). In at least one embodiment, CPU(s) 1518 may include an X86 processor, for example. CPU(s) 1518 may be used to perform any of a variety of functions, including arbitrating potentially inconsistent results between ADAS sensors and SoC(s) 1504, and/or monitoring status and health of controller(s) 1536 and/or an infotainment system on a chip ("infotainment SoC") 1530, for example. In at least one embodiment, SoC(s) 1504 includes one or more interconnects, and an interconnect can include a peripheral component interconnect express (PCIe).

In at least one embodiment, vehicle 1500 may include GPU(s) 1520 (e.g., discrete GPU(s), or dGPU(s)), that may be coupled to SoC(s) 1504 via a high-speed interconnect (e.g., NVIDIA's NVLINK channel). In at least one embodiment, GPU(s) 1520 may provide additional artificial intelligence functionality, such as by executing redundant and/or different neural networks, and may be used to train and/or update neural networks based at least in part on input (e.g., sensor data) from sensors of a vehicle 1500.

In at least one embodiment, vehicle 1500 may further include network interface 1524 which may include, without limitation, wireless antenna(s) 1526 (e.g., one or more wireless antennas for different communication protocols, such as a cellular antenna, a Bluetooth antenna, etc.). In at least one embodiment, network interface 1524 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 150 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 1500 information about vehicles in proximity to vehicle 1500 (e.g., vehicles in front of, on a side of, and/or behind vehicle 1500). In at least one embodiment, such aforementioned functionality may be part of a cooperative adaptive cruise control functionality of vehicle 1500.

In at least one embodiment, network interface 1524 may include an SoC that provides modulation and demodulation functionality and enables controller(s) 1536 to communicate over wireless networks. In at least one embodiment, network interface 1524 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1500 may further include data store(s) 1528 which may include, without limitation, off-chip (e.g., off SoC(s) 1504) storage. In at least one embodiment, data store(s) 1528 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 1500 may further include GNSS sensor(s) 1558 (e.g., GPS and/or assisted GPS sensors), to assist in mapping, perception, occupancy grid generation, and/or path planning functions. In at least one embodiment, any number of GNSS sensor(s) 1558 may be used, including, for example and without limitation, a GPS using a USB connector with an Ethernet-to-Serial (e.g., RS-232) bridge.

In at least one embodiment, vehicle 1500 may further include RADAR sensor(s) 1560. In at least one embodiment, RADAR sensor(s) 1560 may be used by vehicle 1500 for long-range vehicle detection, even in darkness and/or severe weather conditions. In at least one embodiment, RADAR functional safety levels may be ASIL B. In at least one embodiment, RADAR sensor(s) 1560 may use a CAN bus and/or bus 1502 (e.g., to transmit data generated by RADAR sensor(s) 1560) for control and to access object tracking data, with access to Ethernet channels to access raw data in some examples. In at least one embodiment, a wide variety of RADAR sensor types may be used. For example, and without limitation, RADAR sensor(s) 1560 may be suitable for front, rear, and side RADAR use. In at least one embodiment, one or more sensor of RADAR sensors(s) 1560 is a Pulse Doppler RADAR sensor.

In at least one embodiment, RADAR sensor(s) 1560 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 1560 may help in distinguishing between static and moving objects, and may be used by ADAS system 1538 for emergency brake assist and forward collision warning. In at least one embodiment, sensors 1560 (*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 1500 surroundings at higher speeds with minimal interference from traffic in adjacent lanes. In at least one embodiment, another two antennae may expand field of view, making it possible to quickly detect vehicles entering or leaving a lane of vehicle 1500.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1560 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 1538 for blind spot detection and/or lane change assist.

In at least one embodiment, vehicle 1500 may further include ultrasonic sensor(s) 1562. In at least one embodiment, ultrasonic sensor(s) 1562, which may be positioned at a front, a back, and/or side location of vehicle 1500, may be used for parking assist and/or to create and update an occupancy grid. In at least one embodiment, a wide variety of ultrasonic sensor(s) 1562 may be used, and different ultrasonic sensor(s) 1562 may be used for different ranges of detection (e.g., 2.5 m, 4 m). In at least one embodiment, ultrasonic sensor(s) 1562 may operate at functional safety levels of ASIL B.

In at least one embodiment, vehicle 1500 may include LIDAR sensor(s) 1564. In at least one embodiment, LIDAR sensor(s) 1564 may be used for object and pedestrian detection, emergency braking, collision avoidance, and/or other functions. In at least one embodiment, LIDAR sensor(s) 1564 may operate at functional safety level ASIL B. In at least one embodiment, vehicle 1500 may include multiple LIDAR sensors 1564 (e.g., two, four, six, etc.) that may use an Ethernet channel (e.g., to provide data to a Gigabit Ethernet switch).

In at least one embodiment, LIDAR sensor(s) 1564 may be capable of providing a list of objects and their distances for a 360-degree field of view. In at least one embodiment, commercially available LIDAR sensor(s) 1564 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 1564 may include a small device that may be embedded into a front, a rear, a side, and/or a corner location of vehicle 1500. In at least one embodiment, LIDAR sensor(s) 1564, in such an embodiment, may provide up to a 120-degree horizontal and 35-degree vertical field-of-view, with a 200 m range even for low-reflectivity objects. In at least one embodiment, front-mounted LIDAR sensor(s) 1564 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 1500 up to approximately 200 m. In at least one embodiment, a flash LIDAR unit includes, without limitation, a receptor, which records laser pulse transit time and reflected light on each pixel, which in turn corresponds to a range from vehicle 1500 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1500. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 1500 may further include IMU sensor(s) 1566. In at least one embodiment, IMU sensor(s) 1566 may be located at a center of a rear axle of vehicle 1500. In at least one embodiment, IMU sensor(s) 1566 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 1566 may include, without limitation, accelerometers and gyroscopes. In at least one embodiment, such as in nine-axis applications, IMU sensor(s) 1566 may include, without limitation, accelerometers, gyroscopes, and magnetometers.

In at least one embodiment, IMU sensor(s) 1566 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1566 may enable vehicle 1500 to estimate its heading without requiring input from a magnetic sensor by directly observing and correlating changes in velocity from a GPS to IMU sensor(s) 1566. In at least one embodiment, IMU sensor(s) 1566 and GNSS sensor(s) 1558 may be combined in a single integrated unit.

In at least one embodiment, vehicle 1500 may include microphone(s) 1596 placed in and/or around vehicle 1500. In at least one embodiment, microphone(s) 1596 may be used for emergency vehicle detection and identification, among other things.

In at least one embodiment, vehicle 1500 may further include any number of camera types, including stereo camera(s) 1568, wide-view camera(s) 1570, infrared camera(s) 1572, surround camera(s) 1574, long-range camera(s) 1598, mid-range camera(s) 1576, and/or other camera types. In at least one embodiment, cameras may be used to capture image data around an entire periphery of vehicle 1500. In at least one embodiment, which types of cameras used depends on vehicle 1500. In at least one embodiment, any combination of camera types may be used to provide necessary coverage around vehicle 1500. In at least one embodiment, a number of cameras deployed may differ depending on embodiment. For example, in at least one embodiment, vehicle 1500 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 15A and FIG. 15B.

In at least one embodiment, vehicle 1500 may further include vibration sensor(s) 1542. In at least one embodiment, vibration sensor(s) 1542 may measure vibrations of components of vehicle 1500, such as axle(s). For example, in at least one embodiment, changes in vibrations may indicate a change in road surfaces. In at least one embodiment, when two or more vibration sensors 1542 are used, differences between vibrations may be used to determine friction or slippage of road surface (e.g., when a difference in vibration is between a power-driven axle and a freely rotating axle).

In at least one embodiment, vehicle 1500 may include ADAS system 1538. In at least one embodiment, ADAS system 1538 may include, without limitation, an SoC, in some examples. In at least one embodiment, ADAS system 1538 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1560, LIDAR sensor(s) 1564, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 1500 and automatically adjusts speed of vehicle 1500 to maintain a safe distance from vehicles ahead. In at least one embodiment, a lateral ACC system performs distance keeping, and advises vehicle 1500 to change lanes when necessary. In at least one embodiment, a lateral ACC is related to other ADAS applications, such as LC and CW.

In at least one embodiment, a CACC system uses information from other vehicles that may be received via network interface 1524 and/or wireless antenna(s) 1526 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 1500), while I2V communication provides information about traffic further ahead. In at least one embodiment, a CACC system may include either or both I2V and V2V information sources. In at least one embodiment, given information of vehicles ahead of vehicle 1500, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 1560, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 1560, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 1500 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 1500 if vehicle 1500 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 1500 is backing up. In at least one embodiment, an RCTW system includes an AEB system to ensure that vehicle brakes are applied to avoid a crash. In at least one embodiment, an RCTW system may use one or more rear-facing RADAR sensor(s) 1560, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 1500 itself decides, in case of conflicting results, whether to heed result from a primary computer or a secondary computer (e.g., a first controller or a second controller of controllers 1536). For example, in at least one embodiment, ADAS system 1538 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 1538 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 1504.

In at least one embodiment, ADAS system 1538 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 1538 may be fed into a primary computer's perception block and/or a primary computer's dynamic driving task block. For example, in at least one embodiment, if ADAS system 1538 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 1500 may further include infotainment SoC 1530 (e.g., an in-vehicle infotainment system (IVI)). Although illustrated and described as an SoC, infotainment system SoC 1530, in at least one embodiment, may not be an SoC, and may include, without limitation, two or more discrete components. In at least one embodiment, infotainment SoC 1530 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1500. For example, infotainment SoC 1530 could include radios, disk players, navigation systems, video players, USB and Bluetooth connectivity, carputers, in-car entertainment, WiFi, steering wheel audio controls, hands free voice control, a heads-up display ("HUD"), HMI display 1534, a telematics device, a control panel (e.g., for controlling and/or interacting with various components, features, and/or systems), and/or other components. In at least one embodiment, infotainment SoC 1530 may further be used to provide information (e.g., visual and/or audible) to user(s) of vehicle 1500, such as information from ADAS system 1538, autonomous driving information such as planned vehicle maneuvers, trajectories, surrounding environment information (e.g., intersection information, vehicle information, road information, etc.), and/or other information.

In at least one embodiment, infotainment SoC 1530 may include any amount and type of GPU functionality. In at least one embodiment, infotainment SoC 1530 may communicate over bus 1502 with other devices, systems, and/or components of vehicle 1500. In at least one embodiment, infotainment SoC 1530 may be coupled to a supervisory MCU such that a GPU of an infotainment system may perform some self-driving functions in event that primary controller(s) 1536 (e.g., primary and/or backup computers of vehicle 1500) fail. In at least one embodiment, infotainment SoC 1530 may put vehicle 1500 into a chauffeur to safe stop mode, as described herein.

In at least one embodiment, vehicle 1500 may further include instrument cluster 1532 (e.g., a digital dash, an electronic instrument cluster, a digital instrument panel, etc.). In at least one embodiment, instrument cluster 1532 may include, without limitation, a controller and/or supercomputer (e.g., a discrete controller or supercomputer). In at least one embodiment, instrument cluster 1532 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1530 and instrument cluster 1532. In at least one embodiment, instrument cluster 1532 may be included as part of infotainment SoC 1530, or vice versa.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 15C for inferencing or predicting operations based, at least in part, on weight parameters calculated using neural network training operations, neural network functions and/or architectures, or neural network use cases described herein.

Figure 15D:
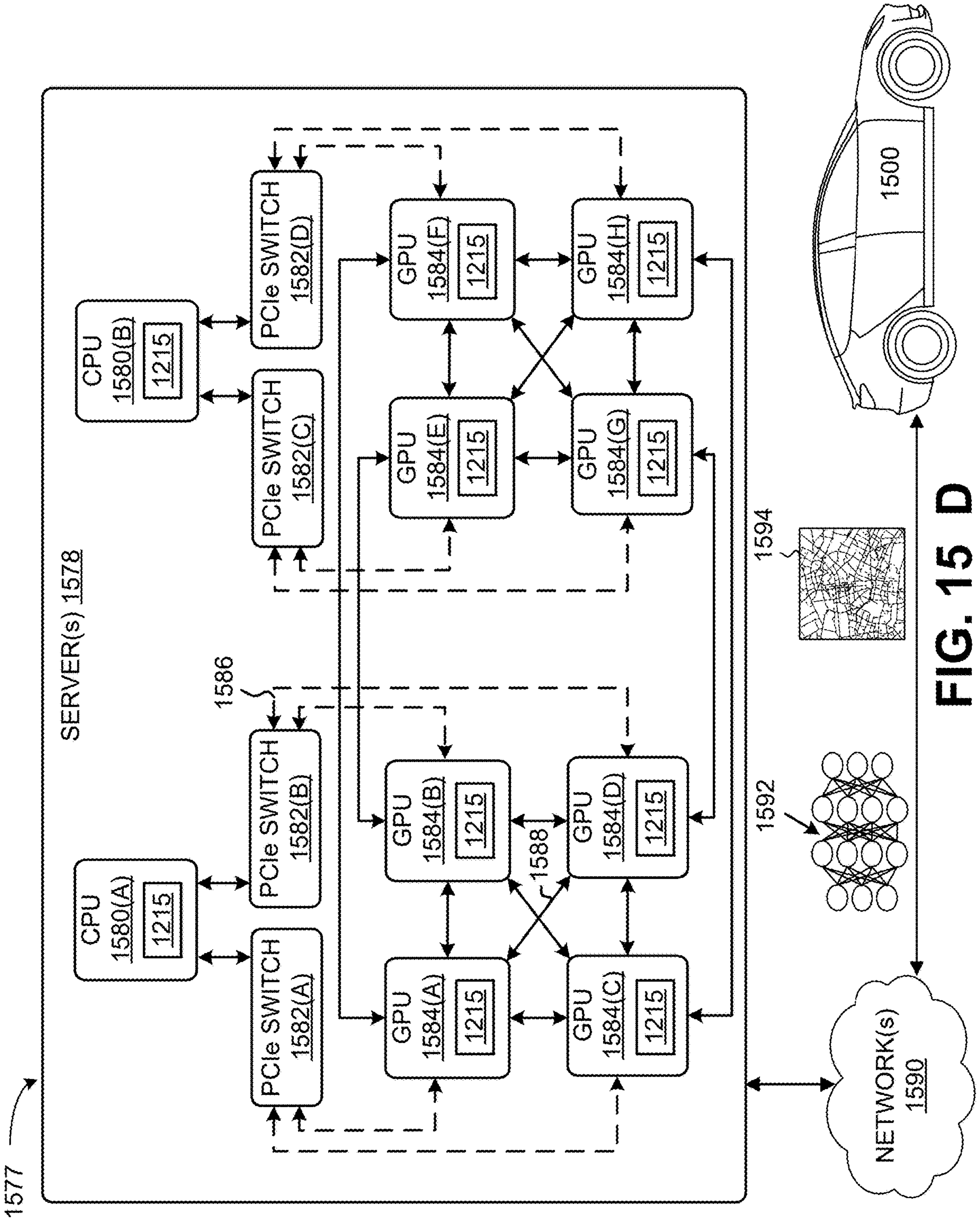
FIG. 15D is a diagram illustrating a system for communication between cloud-based server(s) and the autonomous vehicle of FIG. 15A, according to at least one embodiment.

FIG. 15D is a diagram of a system for communication between cloud-based server(s) and autonomous vehicle 1500 of FIG. 15A, according to at least one embodiment. In at least one embodiment, system may include, without limitation, server(s) 1578, network(s) 1590, and any number and type of vehicles, including vehicle 1500. In at least one embodiment, server(s) 1578 may include, without limitation, a plurality of GPUs 1584(A)-1584(H) (collectively referred to herein as GPUs 1584), PCIe switches 1582(A)-1582(D) (collectively referred to herein as PCIe switches 1582), and/or CPUs 1580(A)-1580(B) (collectively referred to herein as CPUs 1580). In at least one embodiment, GPUs 1584, CPUs 1580, and PCIe switches 1582 may be interconnected with high-speed interconnects such as, for example and without limitation, NVLink interfaces 1588 developed by NVIDIA and/or PCIe connections 1586. In at least one embodiment, GPUs 1584 are connected via an NVLink and/or NVSwitch SoC and GPUs 1584 and PCIe switches 1582 are connected via PCIe interconnects. Although eight GPUs 1584, two CPUs 1580, and four PCIe switches 1582 are illustrated, this is not intended to be limiting. In at least one embodiment, each of server(s) 1578 may include, without limitation, any number of GPUs 1584, CPUs 1580, and/or PCIe switches 1582, in any combination. For example, in at least one embodiment, server(s) 1578 could each include eight, sixteen, thirty-two, and/or more GPUs 1584.

In at least one embodiment, server(s) 1578 may receive, over network(s) 1590 and from vehicles, image data representative of images showing unexpected or changed road conditions, such as recently commenced road-work. In at least one embodiment, server(s) 1578 may transmit, over network(s) 1590 and to vehicles, neural networks 1592, updated or otherwise, and/or map information 1594, including, without limitation, information regarding traffic and road conditions. In at least one embodiment, updates to map information 1594 may include, without limitation, updates for HD map 1522, such as information regarding construction sites, potholes, detours, flooding, and/or other obstructions. In at least one embodiment, neural networks 1592, and/or map information 1594 may have resulted from new training and/or experiences represented in data received from any number of vehicles in an environment, and/or based at least in part on training performed at a data center (e.g., using server(s) 1578 and/or other servers).

In at least one embodiment, server(s) 1578 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1590), and/or machine learning models may be used by server(s) 1578 to remotely monitor vehicles.

In at least one embodiment, server(s) 1578 may receive data from vehicles and apply data to up-to-date real-time neural networks for real-time intelligent inferencing. In at least one embodiment, server(s) 1578 may include deep-learning supercomputers and/or dedicated AI computers powered by GPU(s) 1584, such as a DGX and DGX Station machines developed by NVIDIA. However, in at least one embodiment, server(s) 1578 may include deep learning infrastructure that uses CPU-powered data centers.

In at least one embodiment, deep-learning infrastructure of server(s) 1578 may be capable of fast, real-time inferencing, and may use that capability to evaluate and verify health of processors, software, and/or associated hardware in vehicle 1500. For example, in at least one embodiment, deep-learning infrastructure may receive periodic updates from vehicle 1500, such as a sequence of images and/or objects that vehicle 1500 has located in that sequence of images (e.g., via computer vision and/or other machine learning object classification techniques). In at least one embodiment, deep-learning infrastructure may run its own neural network to identify objects and compare them with objects identified by vehicle 1500 and, if results do not match and deep-learning infrastructure concludes that AI in vehicle 1500 is malfunctioning, then server(s) 1578 may transmit a signal to vehicle 1500 instructing a fail-safe computer of vehicle 1500 to assume control, notify passengers, and complete a safe parking maneuver.

In at least one embodiment, server(s) 1578 may include GPU(s) 1584 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1215 are used to perform one or more embodiments. Details regarding hardware structure(x) 1215 are provided herein in conjunction with FIGS. 12A and/or 12B.

In at least one embodiment, one or more systems depicted in FIGS. 15A-15D are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 15A-15D are utilized to perform operations discussed herein such as selectively using one or more neural network layers based, at least in part, on one or more iteratively increasing neural network performance metrics. In at least one embodiment, one or more systems depicted in FIGS. 15A-15D are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 15A-15D are utilized to implement one or more systems and/or processes such as those described in connection with FIGS. 1-11.

Computer Systems

Figure 16:
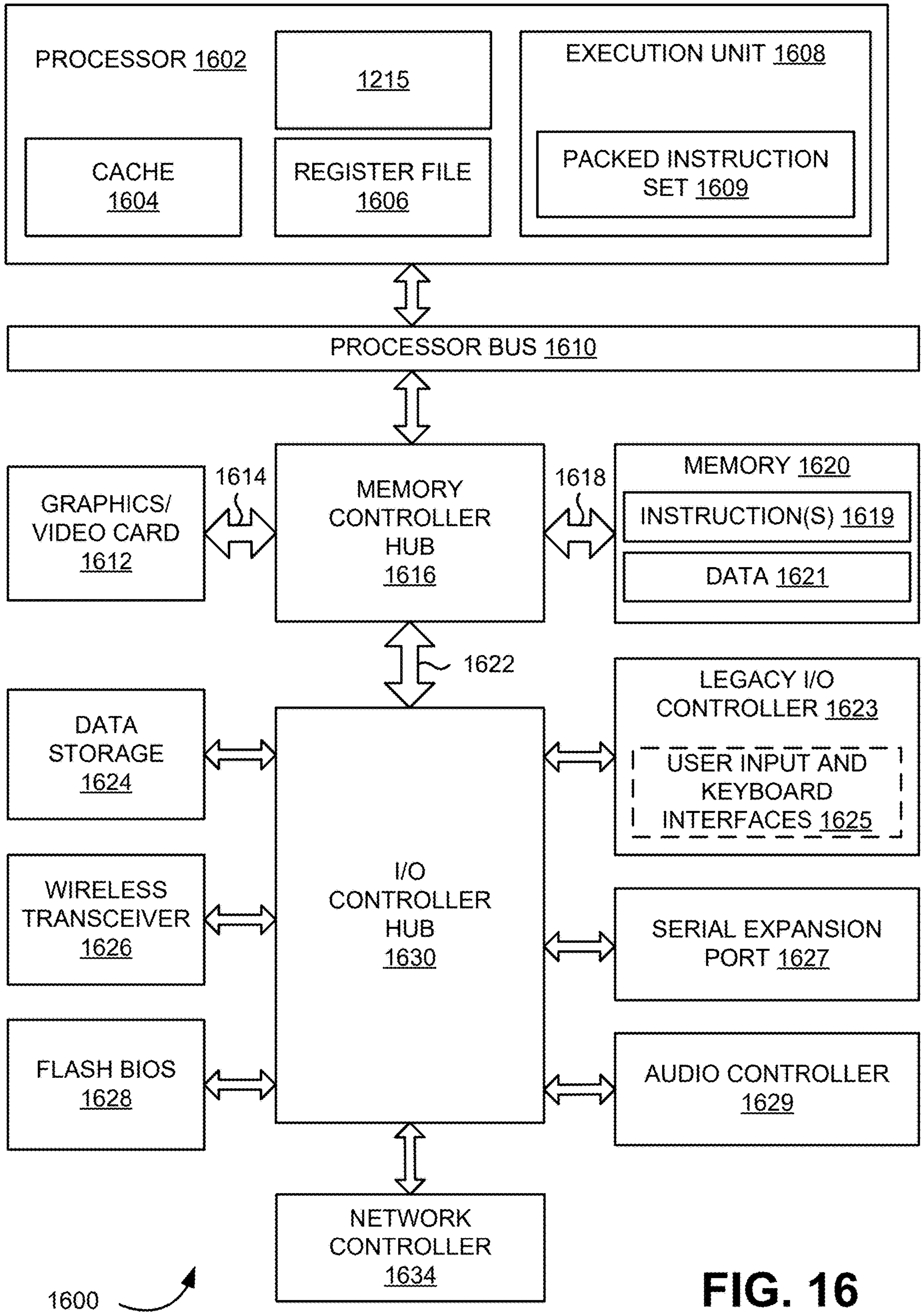
FIG. 16 is a block diagram illustrating a computer system, according to at least one embodiment.

FIG. 16 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1600 may include, without limitation, a component, such as a processor 1602 to employ execution units including logic to perform algorithms for process data, in accordance with present disclosure, such as in embodiment described herein. In at least one embodiment, computer system 1600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1600 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1600 may include, without limitation, processor 1602 that may include, without limitation, one or more execution units 1608 to perform machine learning model training and/or inferencing according to techniques described herein. In at least one embodiment, computer system 1600 is a single processor desktop or server system, but in another embodiment, computer system 1600 may be a multiprocessor system. In at least one embodiment, processor 1602 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1602 may be coupled to a processor bus 1610 that may transmit data signals between processor 1602 and other components in computer system 1600.

In at least one embodiment, processor 1602 may include, without limitation, a Level 1 ("L1") internal cache memory ("cache") 1604. In at least one embodiment, processor 1602 may have a single internal cache or multiple levels of internal cache. In at least one embodiment, cache memory may reside external to processor 1602. Other embodiments may also include a combination of both internal and external caches depending on particular implementation and needs. In at least one embodiment, a register file 1606 may store different types of data in various registers including, without limitation, integer registers, floating point registers, status registers, and an instruction pointer register.

In at least one embodiment, execution unit 1608, including, without limitation, logic to perform integer and floating point operations, also resides in processor 1602. In at least one embodiment, processor 1602 may also include a microcode ("ucode") read only memory ("ROM") that stores microcode for certain macro instructions. In at least one embodiment, execution unit 1608 may include logic to handle a packed instruction set 1609. In at least one embodiment, by including packed instruction set 1609 in an instruction set of a general-purpose processor, along with associated circuitry to execute instructions, operations used by many multimedia applications may be performed using packed data in processor 1602. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1608 may also be used in microcontrollers, embedded processors, graphics devices, DSPs, and other types of logic circuits. In at least one embodiment, computer system 1600 may include, without limitation, a memory 1620. In at least one embodiment, memory 1620 may be a Dynamic Random Access Memory ("DRAM") device, a Static Random Access Memory ("SRAM") device, a flash memory device, or another memory device. In at least one embodiment, memory 1620 may store instruction(s) 1619 and/or data 1621 represented by data signals that may be executed by processor 1602.

In at least one embodiment, a system logic chip may be coupled to processor bus 1610 and memory 1620. In at least one embodiment, a system logic chip may include, without limitation, a memory controller hub ("MCH") 1616, and processor 1602 may communicate with MCH 1616 via processor bus 1610. In at least one embodiment, MCH 1616 may provide a high bandwidth memory path 1618 to memory 1620 for instruction and data storage and for storage of graphics commands, data and textures. In at least one embodiment, MCH 1616 may direct data signals between processor 1602, memory 1620, and other components in computer system 1600 and to bridge data signals between processor bus 1610, memory 1620, and a system I/O interface 1622. In at least one embodiment, a system logic chip may provide a graphics port for coupling to a graphics controller. In at least one embodiment, MCH 1616 may be coupled to memory 1620 through high bandwidth memory path 1618 and a graphics/video card 1612 may be coupled to MCH 1616 through an Accelerated Graphics Port ("AGP") interconnect 1614.

In at least one embodiment, computer system 1600 may use system I/O interface 1622 as a proprietary hub interface bus to couple MCH 1616 to an I/O controller hub ("ICH") 1630. In at least one embodiment, ICH 1630 may provide direct connections to some I/O devices via a local I/O bus. In at least one embodiment, a local I/O bus may include, without limitation, a high-speed I/O bus for connecting peripherals to memory 1620, a chipset, and processor 1602. Examples may include, without limitation, an audio controller 1629, a firmware hub ("flash BIOS") 1628, a wireless transceiver 1626, a data storage 1624, a legacy I/O controller 1623 containing user input and keyboard interfaces 1625, a serial expansion port 1627, such as a Universal Serial Bus ("USB") port, and a network controller 1634. In at least one embodiment, data storage 1624 may comprise a hard disk drive, a floppy disk drive, a CD-ROM device, a flash memory device, or other mass storage device.

In at least one embodiment, FIG. 16 illustrates a system, which includes interconnected hardware devices or "chips", whereas in other embodiments, FIG. 16 may illustrate an exemplary SoC. In at least one embodiment, devices illustrated in FIG. 16 may be interconnected with proprietary interconnects, standardized interconnects (e.g., PCIe) or some combination thereof. In at least one embodiment, one or more components of computer system 1600 are interconnected using compute express link (CXL) interconnects.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 16 for inferencing or predicting operations based, at least in part, on weight parameters calculated using neural network training operations, neural network functions and/or architectures, or neural network use cases described herein.

In at least one embodiment, one or more systems depicted in FIG. 16 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 16 are utilized to perform operations discussed herein such as selectively using one or more neural network layers based, at least in part, on one or more iteratively increasing neural network performance metrics. In at least one embodiment, one or more systems depicted in FIG. 16 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 16 are utilized to implement one or more systems and/or processes such as those described in connection with FIGS. 1-11.

Figure 17:
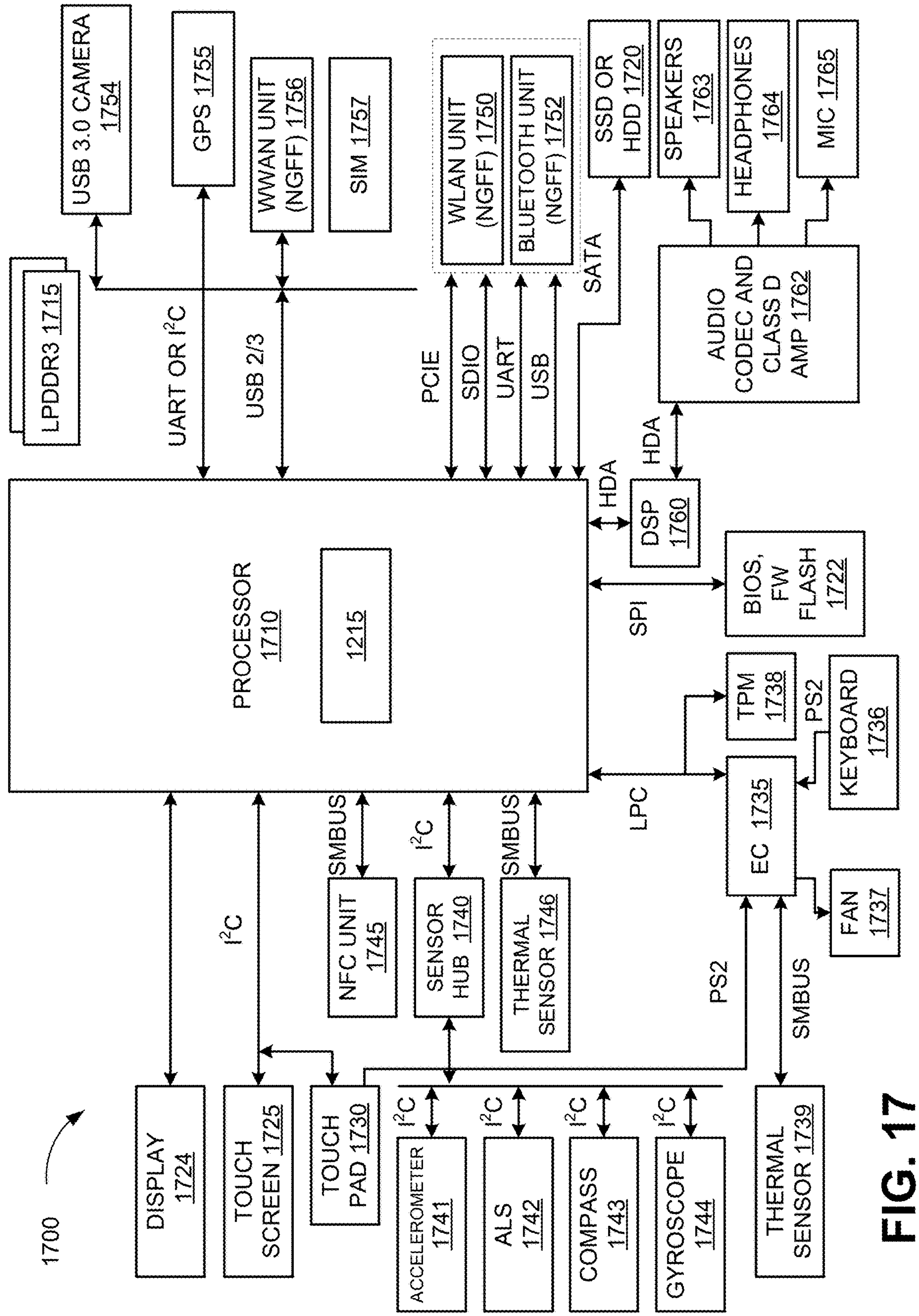
FIG. 17 is a block diagram illustrating a computer system, according to at least one embodiment.

FIG. 17 is a block diagram illustrating an electronic device 1700 for utilizing a processor 1710, according to at least one embodiment. In at least one embodiment, electronic device 1700 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1700 may include, without limitation, processor 1710 communicatively coupled to any suitable number or kind of components, peripherals, modules, or devices. In at least one embodiment, processor 1710 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 17 illustrates a system, which includes interconnected hardware devices or "chips", whereas in other embodiments, FIG. 17 may illustrate an exemplary SoC. In at least one embodiment, devices illustrated in FIG. 17 may be interconnected with proprietary interconnects, standardized interconnects (e.g., PCIe) or some combination thereof. In at least one embodiment, one or more components of FIG. 17 are interconnected using compute express link (CXL) interconnects.

In at least one embodiment, FIG. 17 may include a display 1724, a touch screen 1725, a touch pad 1730, a Near Field Communications unit ("NFC") 1745, a sensor hub 1740, a thermal sensor 1746, an Express Chipset ("EC") 1735, a Trusted Platform Module ("TPM") 1738, BIOS/firmware/flash memory ("BIOS, FW Flash") 1722, a DSP 1760, a drive 1720 such as a Solid State Disk ("SSD") or a Hard Disk Drive ("HDD"), a wireless local area network unit ("WLAN") 1750, a Bluetooth unit 1752, a Wireless Wide Area Network unit ("WWAN") 1756, a Global Positioning System (GPS) unit 1755, a camera ("USB 3.0 camera") 1754 such as a USB 3.0 camera, and/or a Low Power Double Data Rate ("LPDDR") memory unit ("LPDDR3") 1715 implemented in, for example, an LPDDR3 standard. These components may each be implemented in any suitable manner.

In at least one embodiment, other components may be communicatively coupled to processor 1710 through components described herein. In at least one embodiment, an accelerometer 1741, an ambient light sensor ("ALS") 1742, a compass 1743, and a gyroscope 1744 may be communicatively coupled to sensor hub 1740. In at least one embodiment, a thermal sensor 1739, a fan 1737, a keyboard 1736, and touch pad 1730 may be communicatively coupled to EC 1735. In at least one embodiment, speakers 1763, headphones 1764, and a microphone ("mic") 1765 may be communicatively coupled to an audio unit ("audio codec and class D amp") 1762, which may in turn be communicatively coupled to DSP 1760. In at least one embodiment, audio unit 1762 may include, for example and without limitation, an audio coder/decoder ("codec") and a class D amplifier. In at least one embodiment, a SIM card ("SIM") 1757 may be communicatively coupled to WWAN unit 1756. In at least one embodiment, components such as WLAN unit 1750 and Bluetooth unit 1752, as well as WWAN unit 1756 may be implemented in a Next Generation Form Factor ("NGFF").

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 17 for inferencing or predicting operations based, at least in part, on weight parameters calculated using neural network training operations, neural network functions and/or architectures, or neural network use cases described herein.

In at least one embodiment, one or more systems depicted in FIG. 17 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 17 are utilized to perform operations discussed herein such as selectively using one or more neural network layers based, at least in part, on one or more iteratively increasing neural network performance metrics. In at least one embodiment, one or more systems depicted in FIG. 17 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 17 are utilized to implement one or more systems and/or processes such as those described in connection with FIGS. 1-11.

Figure 18:
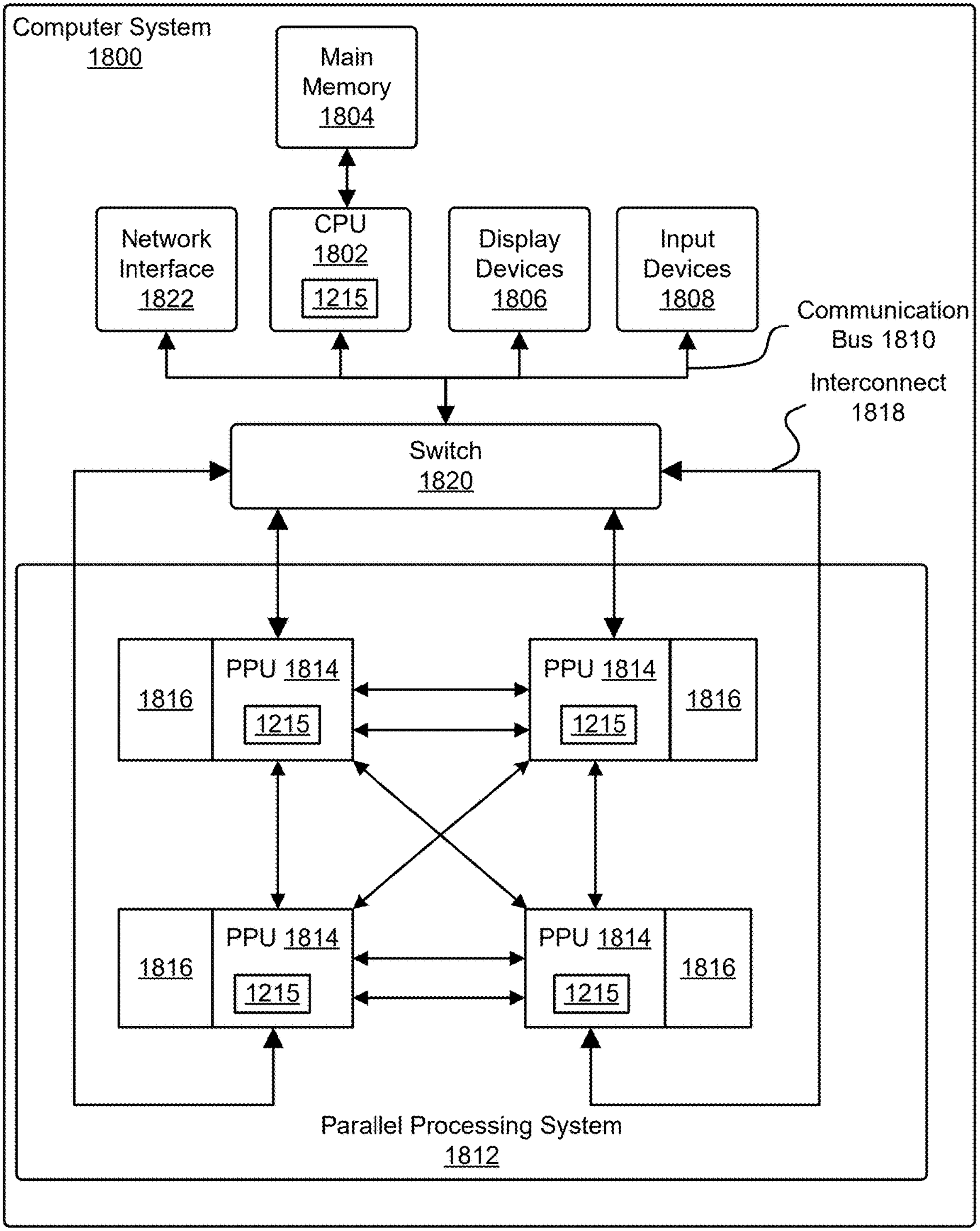
FIG. 18 illustrates a computer system, according to at least one embodiment.

FIG. 18 illustrates a computer system 1800, according to at least one embodiment. In at least one embodiment, computer system 1800 is configured to implement various processes and methods described throughout this disclosure.

In at least one embodiment, computer system 1800 comprises, without limitation, at least one central processing unit ("CPU") 1802 that is connected to a communication bus 1810 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1800 includes, without limitation, a main memory 1804 and control logic (e.g., implemented as hardware, software, or a combination thereof) and data are stored in main memory 1804, which may take form of random access memory ("RAM"). In at least one embodiment, a network interface subsystem ("network interface") 1822 provides an interface to other computing devices and networks for receiving data from and transmitting data to other systems with computer system 1800.

In at least one embodiment, computer system 1800, in at least one embodiment, includes, without limitation, input devices 1808, a parallel processing system 1812, and display devices 1806 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1808 such as keyboard, mouse, touchpad, microphone, etc. In at least one embodiment, each module described herein can be situated on a single semiconductor platform to form a processing system.

Logic 1215 are used to perform inferencing and/or training operations associated with one or more embodiments. Details regarding inference and/or training logic 1215 are provided herein in conjunction with FIGS. 12A and/or 12B. In at least one embodiment, logic 1215 may be used in system FIG. 18 for inferencing or predicting operations based, at least in part, on weight parameters calculated using neural network training operations, neural network functions and/or architectures, or neural network use cases described herein.

In at least one embodiment, one or more systems depicted in FIG. 18 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 18 are utilized to perform operations discussed herein such as selectively using one or more neural network layers based, at least in part, on one or more iteratively increasing neural network performance metrics. In at least one embodiment, one or more systems depicted in FIG. 18 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 18 are utilized to implement one or more systems and/or processes such as those described in connection with FIGS. 1-11.

Figure 19:
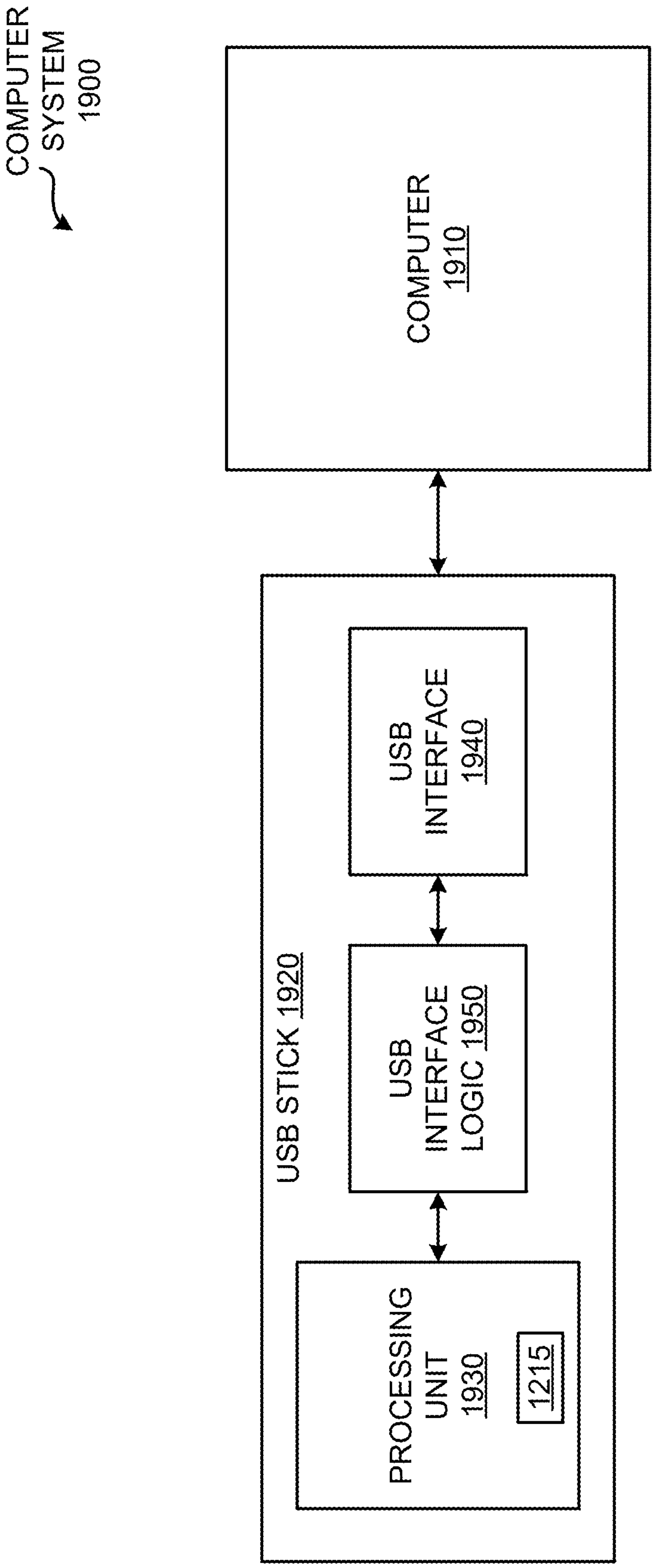
FIG. 19 illustrates a computer system, according to at least one embodiment.

FIG. 19 illustrates a computer system 1900, according to at least one embodiment. In at least one embodiment, computer system 1900 includes, without limitation, a computer 1910 and a USB stick 1920. In at least one embodiment, computer 1910 may include, without limitation, any number and type of processor(s) (not shown) and a memory (not shown). In at least one embodiment, computer 1910 includes, without limitation, a server, a cloud instance, a laptop, and a desktop computer.

In at least one embodiment, USB stick 1920 includes, without limitation, a processing unit 1930, a USB interface 1940, and USB interface logic 1950. In at least one embodiment, processing unit 1930 may be any instruction execution system, apparatus, or device capable of executing instructions. In at least one embodiment, processing unit 1930 may include, without limitation, any number and type of processing cores (not shown). In at least one embodiment, processing unit 1930 comprises an application specific integrated circuit ("ASIC") that is optimized to perform any amount and type of operations associated with machine learning. For instance, in at least one embodiment, processing unit 1930 is a tensor processing unit ("TPC") that is optimized to perform machine learning inference operations. In at least one embodiment, processing unit 1930 is a vision processing unit ("VPU") that is optimized to perform machine vision and machine learning inference operations.

In at least one embodiment, USB interface 1940 may be any type of USB connector or USB socket. For instance, in at least one embodiment, USB interface 1940 is a USB 3.0 Type-C socket for data and power. In at least one embodiment, USB interface 1940 is a USB 3.0 Type-A connector. In at least one embodiment, USB interface logic 1950 may include any amount and type of logic that enables processing unit 1930 to interface with devices (e.g., computer 1910) via USB connector 1940.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 19 for inferencing or predicting operations based, at least in part, on weight parameters calculated using neural network training operations, neural network functions and/or architectures, or neural network use cases described herein.

In at least one embodiment, one or more systems depicted in FIG. 19 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 19 are utilized to perform operations discussed herein such as selectively using one or more neural network layers based, at least in part, on one or more iteratively increasing neural network performance metrics. In at least one embodiment, one or more systems depicted in FIG. 19 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 19 are utilized to implement one or more systems and/or processes such as those described in connection with FIGS. 1-11.

Figure 20A:
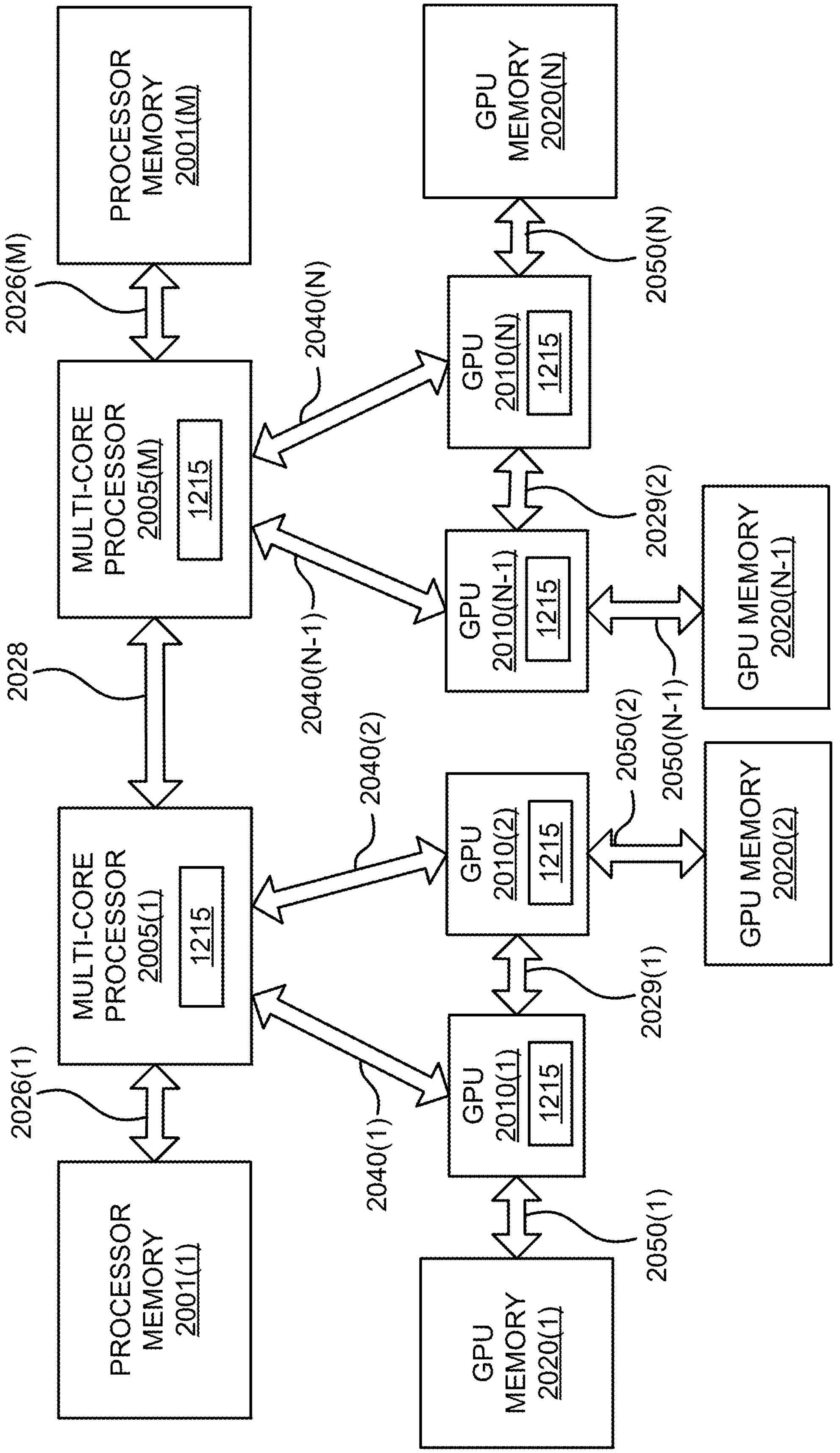
FIG. 20A illustrates a computer system, according to at least one embodiment.

FIG. 20A illustrates an exemplary architecture in which a plurality of GPUs 2010(1)-2010(N) is communicatively coupled to a plurality of multi-core processors 2005(1)-2005(M) over high-speed links 2040(1)-2040(N) (e.g., buses, point-to-point interconnects, etc.). In at least one embodiment, high-speed links 2040(1)-2040(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, one or more GPUs in a plurality of GPUs 2010(1)-2010(N) includes one or more graphics cores (also referred to simply as "cores") 2300 as disclosed in FIGS. 23A and 23B. In at least one embodiment, one or more graphics cores 2300 may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

In addition, and in at least one embodiment, two or more of GPUs 2010 are interconnected over high-speed links 2029(1)-2029(2), which may be implemented using similar or different protocols/links than those used for high-speed links 2040(1)-2040(N). Similarly, two or more of multi-core processors 2005 may be connected over a high-speed link

2028 which may be symmetric multi-processor (SMP) buses operating at 20 GB/s, 30 GB/s, 120 GB/s or higher. Alternatively, all communication between various system components shown in FIG. 20A may be accomplished using similar protocols/links (e.g., over a common interconnection fabric).

In at least one embodiment, each multi-core processor 2005 is communicatively coupled to a processor memory 2001(1)-2001(M), via memory interconnects 2026(1)-2026 (M), respectively, and each GPU 2010(1)-2010(N) is communicatively coupled to GPU memory 2020(1)-2020(N) over GPU memory interconnects 2050(1)-2050(N), respectively. In at least one embodiment, memory interconnects 2026 and 2050 may utilize similar or different memory access technologies. By way of example, and not limitation, processor memories 2001(1)-2001(M) and GPU memories 2020 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 2001 may be volatile memory and another portion may be non-volatile memory (e.g., using a two-level memory (2 LM) hierarchy).

As described herein, although various multi-core processors 2005 and GPUs 2010 may be physically coupled to a particular memory 2001, 2020, respectively, and/or a unified memory architecture may be implemented in which a virtual system address space (also referred to as "effective address" space) is distributed among various physical memories. For example, processor memories 2001(1)-2001(M) may each comprise 64 GB of system memory address space and GPU memories 2020(1)-2020(N) may each comprise 32 GB of system memory address space resulting in a total of 256 GB addressable memory when M=2 and N=4. Other values for N and M are possible.

Figure 20B:
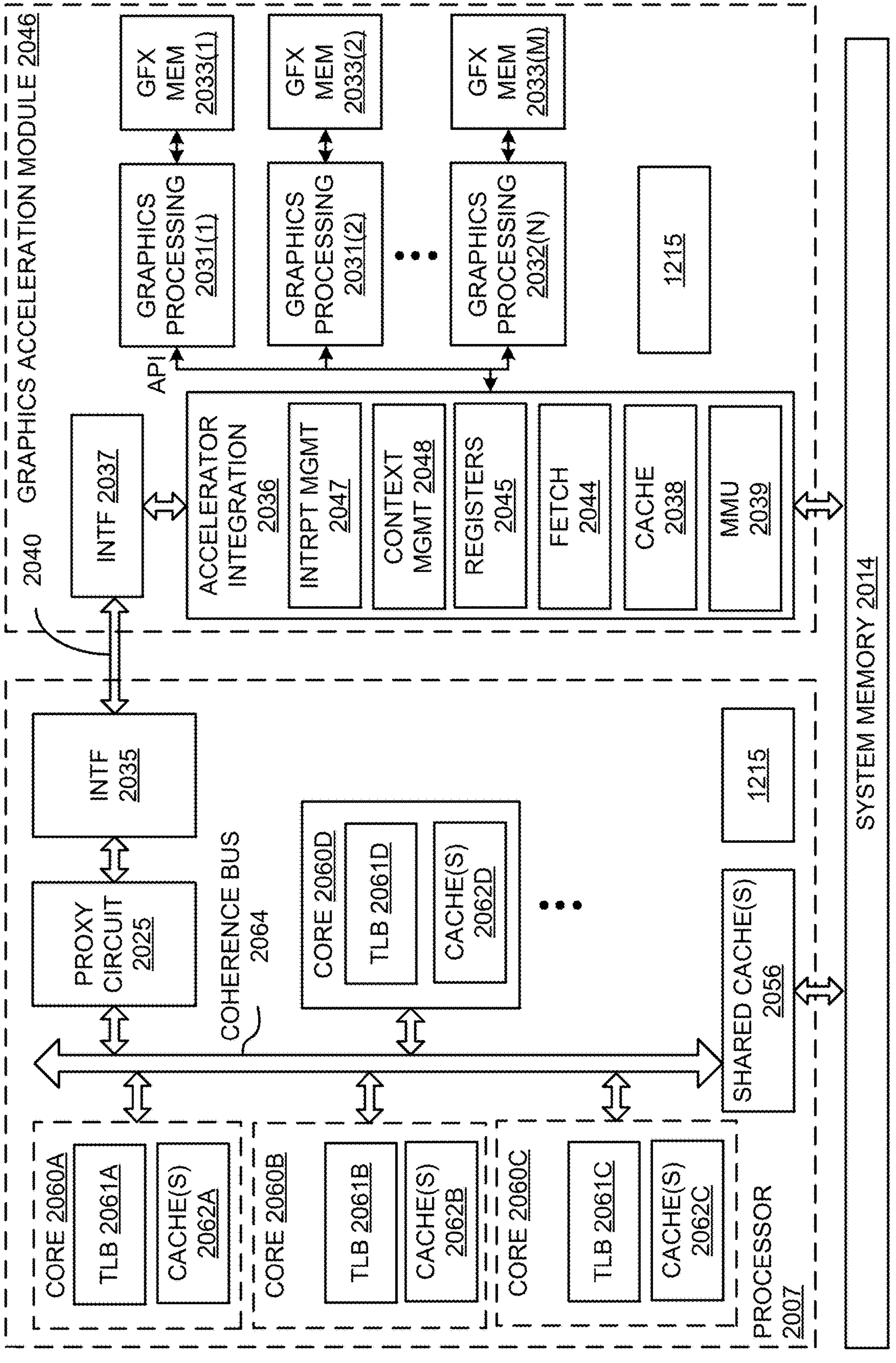
FIG. 20B illustrates a computer system, according to at least one embodiment.

FIG. 20B illustrates additional details for an interconnection between a multi-core processor 2007 and a graphics acceleration module 2046 in accordance with one exemplary embodiment. In at least one embodiment, graphics acceleration module 2046 may include one or more GPU chips integrated on a line card which is coupled to processor 2007 via high-speed link 2040 (e.g., a PCIe bus, NVLink, etc.). In at least one embodiment, graphics acceleration module 2046 may alternatively be integrated on a package or chip with processor 2007.

In at least one embodiment, processor 2007 includes a plurality of cores 2060A-2060D (which may be referred to as "execution units"), each with a translation lookaside buffer ("TLB") 2061A-2061D and one or more caches 2062A-2062D. In at least one embodiment, cores 2060A-2060D may include various other components for executing instructions and processing data that are not illustrated. In at least one embodiment, caches 2062A-2062D may comprise Level 1 (L1) and Level 2 (L2) caches. In addition, one or more shared caches 2056 may be included in caches 2062A-2062D and shared by sets of cores 2060A-2060D. For example, one embodiment of processor 2007 includes 24 cores, each with its own L1 cache, twelve shared L2 caches, and twelve shared L3 caches. In this embodiment, one or more L2 and L3 caches are shared by two adjacent cores. In at least one embodiment, processor 2007 and graphics acceleration module 2046 connect with system memory 2014, which may include processor memories 2001(1)-2001 (M) of FIG. 20A.

In at least one embodiment, coherency is maintained for data and instructions stored in various caches 2062A-2062D, 2056 and system memory 2014 via inter-core communication over a coherence bus 2064. In at least one embodiment, for example, each cache may have cache coherency logic/circuitry associated therewith to communicate to over coherence bus 2064 in response to detected reads or writes to particular cache lines. In at least one embodiment, a cache snooping protocol is implemented over coherence bus 2064 to snoop cache accesses.

In at least one embodiment, a proxy circuit 2025 communicatively couples graphics acceleration module 2046 to coherence bus 2064, allowing graphics acceleration module 2046 to participate in a cache coherence protocol as a peer of cores 2060A-2060D. In particular, in at least one embodiment, an interface 2035 provides connectivity to proxy circuit 2025 over high-speed link 2040 and an interface 2037 connects graphics acceleration module 2046 to high-speed link 2040.

In at least one embodiment, an accelerator integration circuit 2036 provides cache management, memory access, context management, and interrupt management services on behalf of a plurality of graphics processing engines 2031 (1)-2031(N) of graphics acceleration module 2046. In at least one embodiment, graphics processing engines 2031 (1)-2031(N) may each comprise a separate graphics processing unit (GPU). In at least one embodiment, plurality of graphics processing engines 2031(1)-2031(N) of graphics acceleration module 2046 include one or more graphics cores 2300 as discussed in connection with FIGS. 23A and 23B. In at least one embodiment, graphics processing engines 2031(1)-2031(N) alternatively may comprise different types of graphics processing engines within a GPU, such as graphics execution units, media processing engines (e.g., video encoders/decoders), samplers, and blit engines. In at least one embodiment, graphics acceleration module 2046 may be a GPU with a plurality of graphics processing engines 2031(1)-2031(N) or graphics processing engines 2031(1)-2031(N) may be individual GPUs integrated on a common package, line card, or chip.

In at least one embodiment, accelerator integration circuit 2036 includes a memory management unit (MMU) 2039 for performing various memory management functions such as virtual-to-physical memory translations (also referred to as effective-to-real memory translations) and memory access protocols for accessing system memory 2014. In at least one embodiment, MMU 2039 may also include a translation lookaside buffer (TLB) (not shown) for caching virtual/effective to physical/real address translations. In at least one embodiment, a cache 2038 can store commands and data for efficient access by graphics processing engines 2031(1)-2031(N). In at least one embodiment, data stored in cache 2038 and graphics memories 2033(1)-2033(M) is kept coherent with core caches 2062A-2062D, 2056 and system memory 2014, possibly using a fetch unit 2044. As mentioned, this may be accomplished via proxy circuit 2025 on behalf of cache 2038 and memories 2033(1)-2033(M) (e.g., sending updates to cache 2038 related to modifications/accesses of cache lines on processor caches 2062A-2062D, 2056 and receiving updates from cache 2038).

In at least one embodiment, a set of registers 2045 store context data for threads executed by graphics processing engines 2031(1)-2031(N) and a context management circuit 2048 manages thread contexts. For example, context management circuit 2048 may perform save and restore operations to save and restore contexts of various threads during contexts switches (e.g., where a first thread is saved and a second thread is stored so that a second thread can be execute by a graphics processing engine). For example, on a context switch, context management circuit 2048 may store current register values to a designated region in memory (e.g., identified by a context pointer). It may then restore register values when returning to a context. In at least one embodiment, an interrupt management circuit 2047 receives and processes interrupts received from system devices.

In at least one embodiment, virtual/effective addresses from a graphics processing engine 2031 are translated to real/physical addresses in system memory 2014 by MMU 2039. In at least one embodiment, accelerator integration circuit 2036 supports multiple (e.g., 4, 8, 16) graphics accelerator modules 2046 and/or other accelerator devices. In at least one embodiment, graphics accelerator module 2046 may be dedicated to a single application executed on processor 2007 or may be shared between multiple applications. In at least one embodiment, a virtualized graphics execution environment is presented in which resources of graphics processing engines 2031(1)-2031(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2036 performs as a bridge to a system for graphics acceleration module 2046 and provides address translation and system memory cache services. In addition, in at least one embodiment, accelerator integration circuit 2036 may provide virtualization facilities for a host processor to manage virtualization of graphics processing engines 2031(1)-2031(N), interrupts, and memory management.

In at least one embodiment, because hardware resources of graphics processing engines 2031(1)-2031(N) are mapped explicitly to a real address space seen by host processor 2007, any host processor can address these resources directly using an effective address value. In at least one embodiment, one function of accelerator integration circuit 2036 is physical separation of graphics processing engines 2031(1)-2031(N) so that they appear to a system as independent units.

In at least one embodiment, one or more graphics memories 2033(1)-2033(M) are coupled to each of graphics processing engines 2031(1)-2031(N), respectively and N=M. In at least one embodiment, graphics memories 2033(1)-2033(M) store instructions and data being processed by each of graphics processing engines 2031(1)-2031(N). In at least one embodiment, graphics memories 2033(1)-2033(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 2040, biasing techniques can be used to ensure that data stored in graphics memories 2033(1)-2033(M) is data that will be used most frequently by graphics processing engines 2031(1)-2031(N) and preferably not used by cores 2060A-2060D (at least not frequently). Similarly, in at least one embodiment, a biasing mechanism attempts to keep data needed by cores (and preferably not graphics processing engines 2031(1)-2031(N)) within caches 2062A-2062D, 2056 and system memory 2014.

Figure 20C:
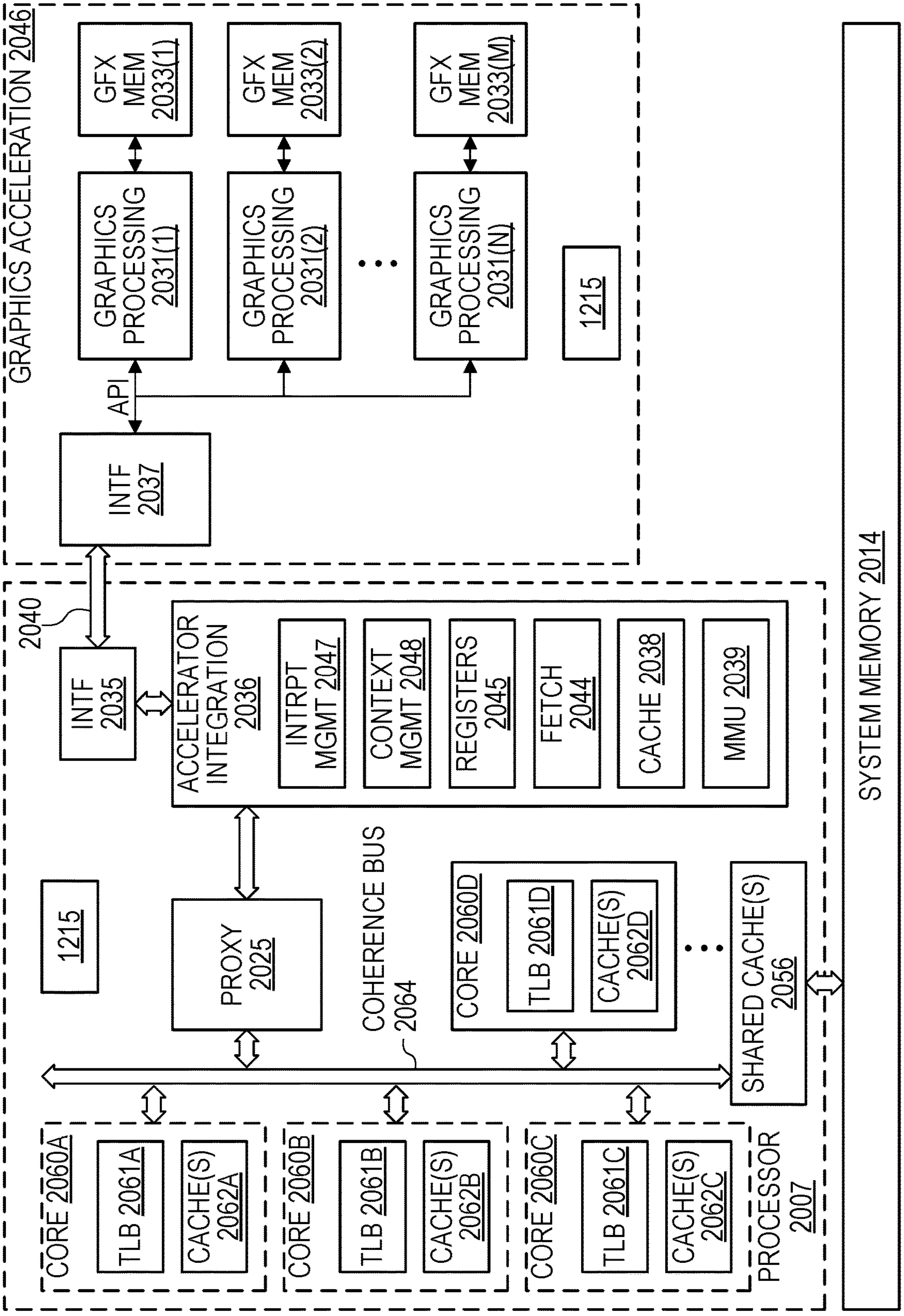
FIG. 20C illustrates a computer system, according to at least one embodiment.

FIG. 20C illustrates another exemplary embodiment in which accelerator integration circuit 2036 is integrated within processor 2007. In this embodiment, graphics processing engines 2031(1)-2031(N) communicate directly over high-speed link 2040 to accelerator integration circuit 2036 via interface 2037 and interface 2035 (which, again, may be any form of bus or interface protocol). In at least one embodiment, accelerator integration circuit 2036 may perform similar operations as those described with respect to FIG. 20B, but potentially at a higher throughput given its close proximity to coherence bus 2064 and caches 2062A-2062D, 2056. In at least one embodiment, an accelerator integration circuit supports different programming models including a dedicated-process programming model (no graphics acceleration module virtualization) and shared programming models (with virtualization), which may include programming models which are controlled by accelerator integration circuit 2036 and programming models which are controlled by graphics acceleration module 2046.

In at least one embodiment, graphics processing engines 2031(1)-2031(N) are dedicated to a single application or process under a single operating system. In at least one embodiment, a single application can funnel other application requests to graphics processing engines 2031(1)-2031(N), providing virtualization within a VM/partition.

In at least one embodiment, graphics processing engines 2031(1)-2031(N), may be shared by multiple VM/application partitions. In at least one embodiment, shared models may use a system hypervisor to virtualize graphics processing engines 2031(1)-2031(N) to allow access by each operating system. In at least one embodiment, for single-partition systems without a hypervisor, graphics processing engines 2031(1)-2031(N) are owned by an operating system. In at least one embodiment, an operating system can virtualize graphics processing engines 2031(1)-2031(N) to provide access to each process or application.

In at least one embodiment, graphics acceleration module 2046 or an individual graphics processing engine 2031(1)-2031(N) selects a process element using a process handle. In at least one embodiment, process elements are stored in system memory 2014 and are addressable using an effective address to real address translation technique described herein. In at least one embodiment, a process handle may be an implementation-specific value provided to a host process when registering its context with graphics processing engine 2031(1)-2031(N) (that is, calling system software to add a process element to a process element linked list). In at least one embodiment, a lower 16-bits of a process handle may be an offset of a process element within a process element linked list.

Figure 20D:
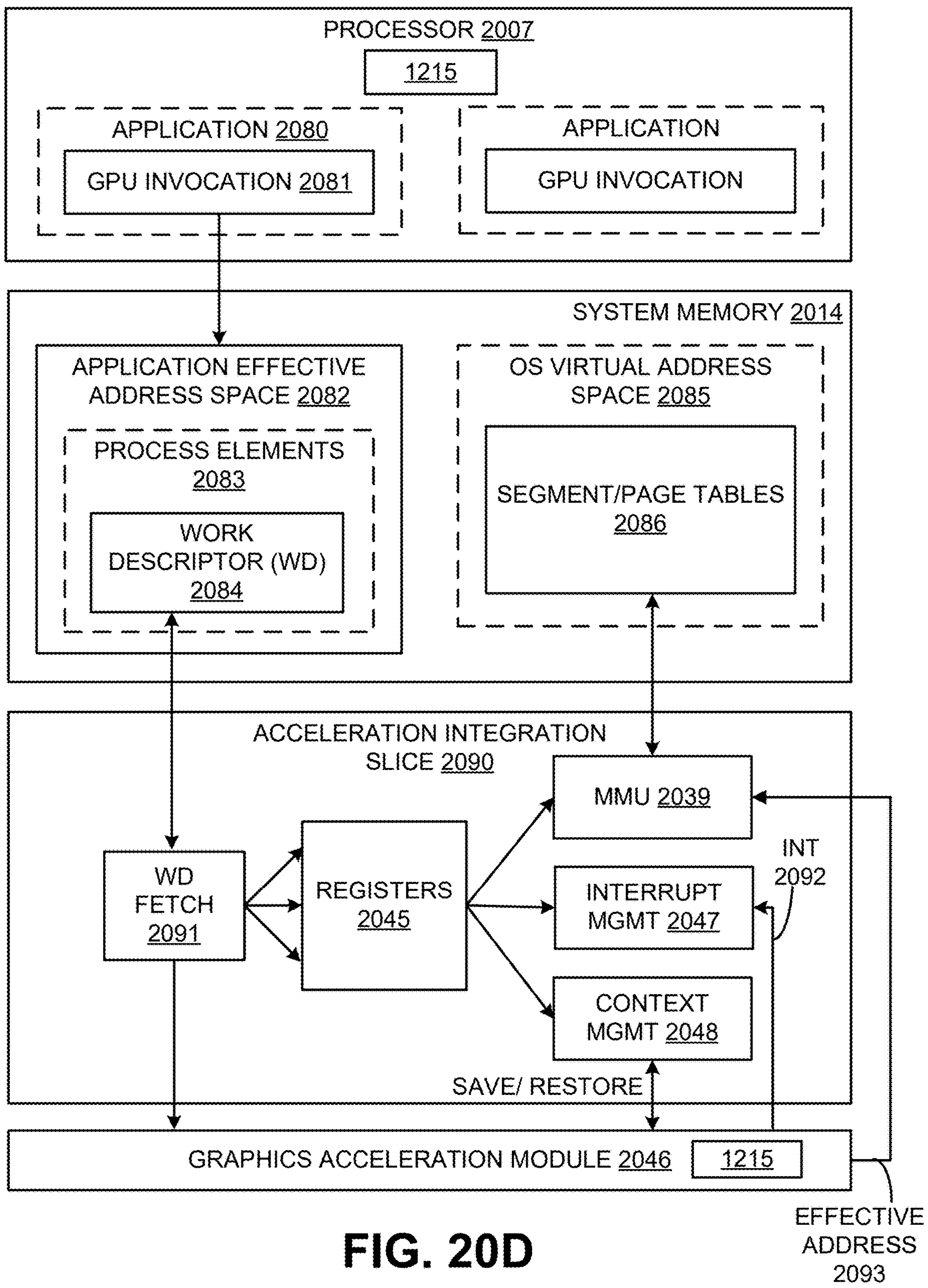
FIG. 20D illustrates a computer system, according to at least one embodiment.

FIG. 20D illustrates an exemplary accelerator integration slice 2090. In at least one embodiment, a "slice" comprises a specified portion of processing resources of accelerator integration circuit 2036. In at least one embodiment, an application is effective address space 2082 within system memory 2014 stores process elements 2083. In at least one embodiment, process elements 2083 are stored in response to GPU invocations 2081 from applications 2080 executed on processor 2007. In at least one embodiment, a process element 2083 contains process state for corresponding application 2080. In at least one embodiment, a work descriptor (WD) 2084 contained in process element 2083 can be a single job requested by an application or may contain a pointer to a queue of jobs. In at least one embodiment, WD 2084 is a pointer to a job request queue in an application's effective address space 2082.

In at least one embodiment, graphics acceleration module 2046 and/or individual graphics processing engines 2031(1)-2031(N) can be shared by all or a subset of processes in a system. In at least one embodiment, an infrastructure for setting up process states and sending a WD 2084 to a graphics acceleration module 2046 to start a job in a virtualized environment may be included.

In at least one embodiment, a dedicated-process programming model is implementation-specific. In at least one embodiment, in this model, a single process owns graphics acceleration module 2046 or an individual graphics processing engine 2031. In at least one embodiment, when graphics acceleration module 2046 is owned by a single process, a hypervisor initializes accelerator integration circuit 2036 for an owning partition and an operating system initializes accelerator integration circuit 2036 for an owning process when graphics acceleration module 2046 is assigned.

In at least one embodiment, in operation, a WD fetch unit 2091 in accelerator integration slice 2090 fetches next WD 2084, which includes an indication of work to be done by one or more graphics processing engines of graphics acceleration module 2046. In at least one embodiment, data from WD 2084 may be stored in registers 2045 and used by MMU 2039, interrupt management circuit 2047 and/or context management circuit 2048 as illustrated. For example, one embodiment of MMU 2039 includes segment/page walk circuitry for accessing segment/page tables 2086 within an OS virtual address space 2085. In at least one embodiment, interrupt management circuit 2047 may process interrupt events 2092 received from graphics acceleration module 2046. In at least one embodiment, when performing graphics operations, an effective address 2093 generated by a graphics processing engine 2031(1)-2031(N) is translated to a real address by MMU 2039.

In at least one embodiment, registers 2045 are duplicated for each graphics processing engine 2031(1)-2031(N) and/or graphics acceleration module 2046 and may be initialized by a hypervisor or an operating system. In at least one embodiment, each of these duplicated registers may be included in an accelerator integration slice 2090. Exemplary registers that may be initialized by a hypervisor are shown in Table 1.

Table 1—Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

Table 2—Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 2084 is specific to a particular graphics acceleration module 2046 and/or graphics processing engines 2031(1)-2031(N). In at least one embodiment, it contains all information required by a graphics processing engine 2031(1)-2031(N) to do work, or it can be a pointer to a memory location where an application has set up a command queue of work to be completed.

Figure 20E:
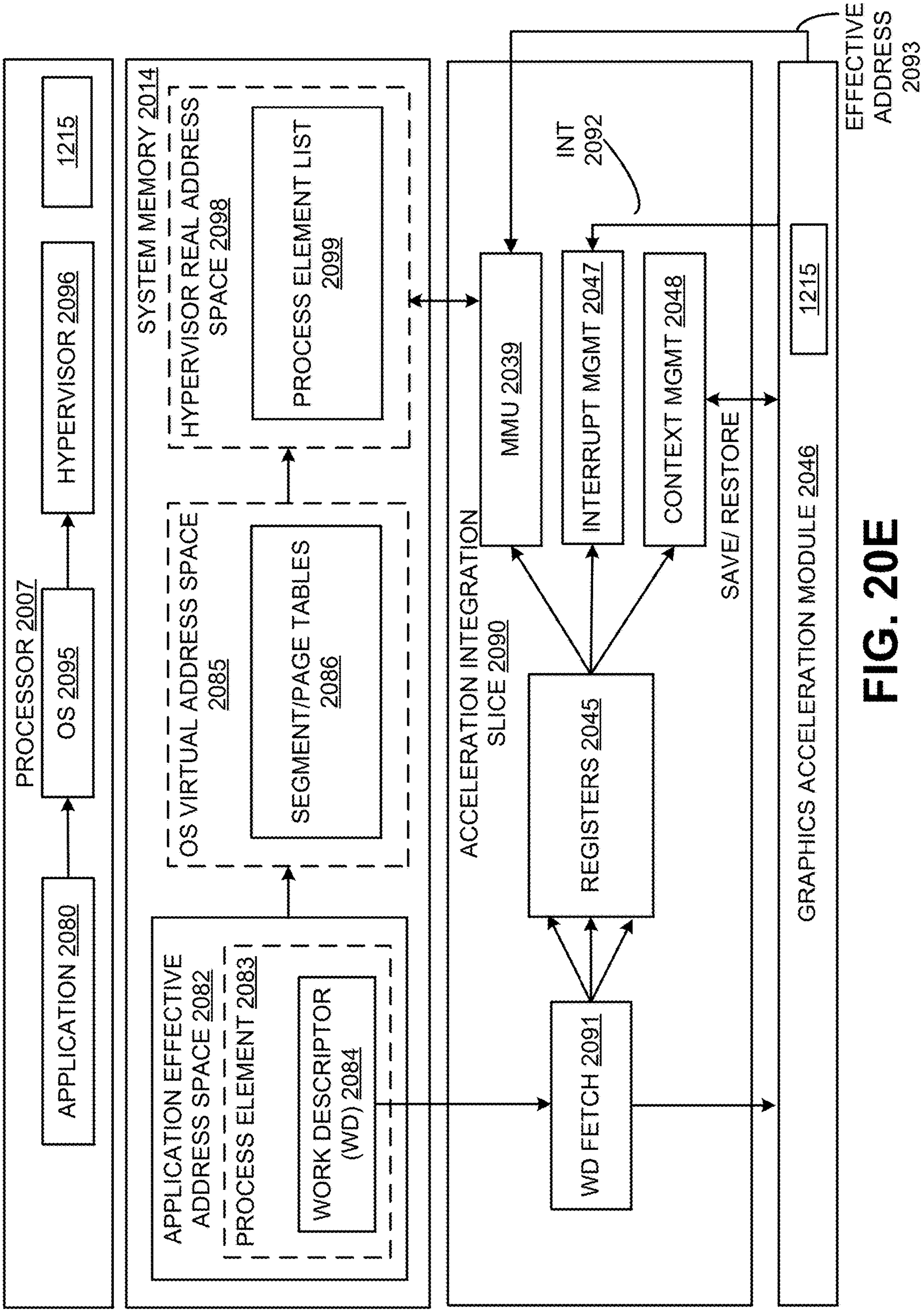
FIGS. 20E and 20F illustrate a shared programming model, according to at least one embodiment.

FIG. 20E illustrates additional details for one exemplary embodiment of a shared model. This embodiment includes a hypervisor real address space 2098 in which a process element list 2099 is stored. In at least one embodiment, hypervisor real address space 2098 is accessible via a hypervisor 2096 which virtualizes graphics acceleration module engines for operating system 2095.

In at least one embodiment, shared programming models allow for all or a subset of processes from all or a subset of partitions in a system to use a graphics acceleration module 2046. In at least one embodiment, there are two programming models where graphics acceleration module 2046 is shared by multiple processes and partitions, namely time-sliced shared and graphics directed shared.

In at least one embodiment, in this model, system hypervisor 2096 owns graphics acceleration module 2046 and makes its function available to all operating systems 2095. In at least one embodiment, for a graphics acceleration module 2046 to support virtualization by system hypervisor 2096, graphics acceleration module 2046 may adhere to certain requirements, such as (1) an application's job request must be autonomous (that is, state does not need to be maintained between jobs), or graphics acceleration module 2046 must provide a context save and restore mechanism, (2) an application's job request is guaranteed by graphics acceleration module 2046 to complete in a specified amount of time, including any translation faults, or graphics acceleration module 2046 provides an ability to preempt processing of a job, and (3) graphics acceleration module 2046 must be guaranteed fairness between processes when operating in a directed shared programming model.

In at least one embodiment, application 2080 is required to make an operating system 2095 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 2046 and can be in a form of a graphics acceleration module 2046 command, an effective address pointer to a user-defined structure, an effective address pointer to a queue of commands, or any other data structure to describe work to be done by graphics acceleration module 2046.

In at least one embodiment, an AMR value is an AMR state to use for a current process. In at least one embodiment, a value passed to an operating system is similar to an application setting an AMR. In at least one embodiment, if accelerator integration circuit 2036 (not shown) and graphics acceleration module 2046 implementations do not support a User Authority Mask Override Register (UAMOR), an operating system may apply a current UAMOR value to an AMR value before passing an AMR in a hypervisor call. In at least one embodiment, hypervisor 2096 may optionally apply a current Authority Mask Override Register (AMOR) value before placing an AMR into process element 2083. In at least one embodiment, CSRP is one of registers 2045 containing an effective address of an area in an application's effective address space 2082 for graphics acceleration module 2046 to save and restore context state. In at least one embodiment, this pointer is optional if no state is required to be saved between jobs or when a job is preempted. In at least one embodiment, context save/restore area may be pinned system memory.

Upon receiving a system call, operating system 2095 may verify that application 2080 has registered and been given authority to use graphics acceleration module 2046. In at least one embodiment, operating system 2095 then calls hypervisor 2096 with information shown in Table 3.

Table 3—OS to Hypervisor Call Parameters

| Parameter # | Description |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 2096 verifies that operating system 2095 has registered and been given authority to use graphics acceleration module 2046. In at least one embodiment, hypervisor 2096 then puts process element 2083 into a process element linked list for a corresponding graphics acceleration module 2046 type. In at least one embodiment, a process element may include information shown in Table 4.

Table 4—Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2090 registers 2045.

Figure 20F:
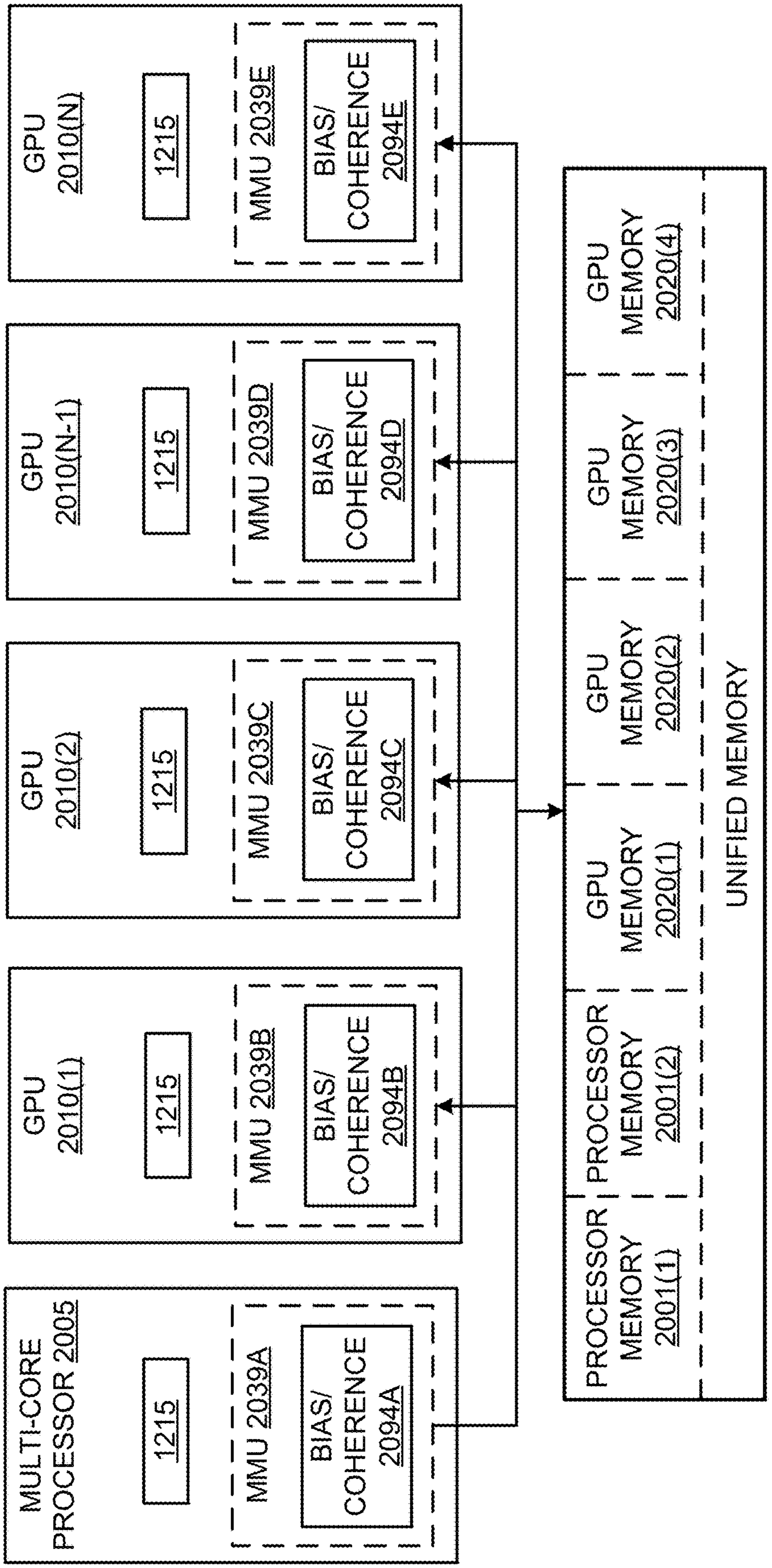

As illustrated in FIG. 20F, in at least one embodiment, a unified memory is used, addressable via a common virtual memory address space used to access physical processor memories 2001(1)-2001(N) and GPU memories 2020(1)-2020(N). In this implementation, operations executed on GPUs 2010(1)-2010(N) utilize a same virtual/effective memory address space to access processor memories 2001 (1)-2001(M) and vice versa, thereby simplifying programmability. In at least one embodiment, a first portion of a virtual/effective address space is allocated to processor memory 2001(1), a second portion to second processor memory 2001(N), a third portion to GPU memory 2020(1), and so on. In at least one embodiment, an entire virtual/effective memory space (sometimes referred to as an effective address space) is thereby distributed across each of processor memories 2001 and GPU memories 2020, allowing any processor or GPU to access any physical memory with a virtual address mapped to that memory.

In at least one embodiment, bias/coherence management circuitry 2094A-2094E within one or more of MMUs 2039A-2039E ensures cache coherence between caches of one or more host processors (e.g., 2005) and GPUs 2010 and implements biasing techniques indicating physical memories in which certain types of data should be stored. In at least one embodiment, while multiple instances of bias/coherence management circuitry 2094A-2094E are illustrated in FIG. 20F, bias/coherence circuitry may be implemented within an MMU of one or more host processors 2005 and/or within accelerator integration circuit 2036.

One embodiment allows GPU memories 2020 to be mapped as part of system memory, and accessed using shared virtual memory (SVM) technology, but without suffering performance drawbacks associated with full system cache coherence. In at least one embodiment, an ability for GPU memories 2020 to be accessed as system memory without onerous cache coherence overhead provides a beneficial operating environment for GPU offload. In at least one embodiment, this arrangement allows software of host processor 2005 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 2020 without cache coherence overheads can be critical to execution time of an offloaded computation. In at least one embodiment, in cases with substantial streaming write memory traffic, for example, cache coherence overhead can significantly reduce an effective write bandwidth seen by a GPU 2010. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 2020, with or without a bias cache in a GPU 2010 (e.g., to cache frequently/recently used entries of a bias table). Alternatively, in at least one embodiment, an entire bias table may be maintained within a GPU.

In at least one embodiment, a bias table entry associated with each access to a GPU attached memory 2020 is accessed prior to actual access to a GPU memory, causing following operations. In at least one embodiment, local requests from a GPU 2010 that find their page in GPU bias are forwarded directly to a corresponding GPU memory 2020. In at least one embodiment, local requests from a GPU that find their page in host bias are forwarded to processor 2005 (e.g., over a high-speed link as described herein). In at least one embodiment, requests from processor 2005 that find a requested page in host processor bias complete a request like a normal memory read. Alternatively, requests directed to a GPU-biased page may be forwarded to a GPU 2010. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 2005 bias to GPU bias, but is not for an opposite transition.

In at least one embodiment, cache coherency is maintained by temporarily rendering GPU-biased pages uncacheable by host processor 2005. In at least one embodiment, to access these pages, processor 2005 may request access from GPU 2010, which may or may not grant access right away. In at least one embodiment, thus, to reduce communication between processor 2005 and GPU 2010 it is beneficial to ensure that GPU-biased pages are those which are required by a GPU but not host processor 2005 and vice versa.

Hardware structure(s) 1215 are used to perform one or more embodiments. Details regarding a hardware structure(s) 1215 may be provided herein in conjunction with FIGS. 12A and/or 12B.

In at least one embodiment, one or more systems depicted in FIGS. 20A-20F are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 20A-20F are utilized to perform operations discussed herein such as selectively using one or more neural network layers based, at least in part, on one or more iteratively increasing neural network performance metrics. In at least one embodiment, one or more systems depicted in FIGS. 20A-20F are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 20A-20F are utilized to implement one or more systems and/or processes such as those described in connection with FIGS. 1-11.

Figure 21:
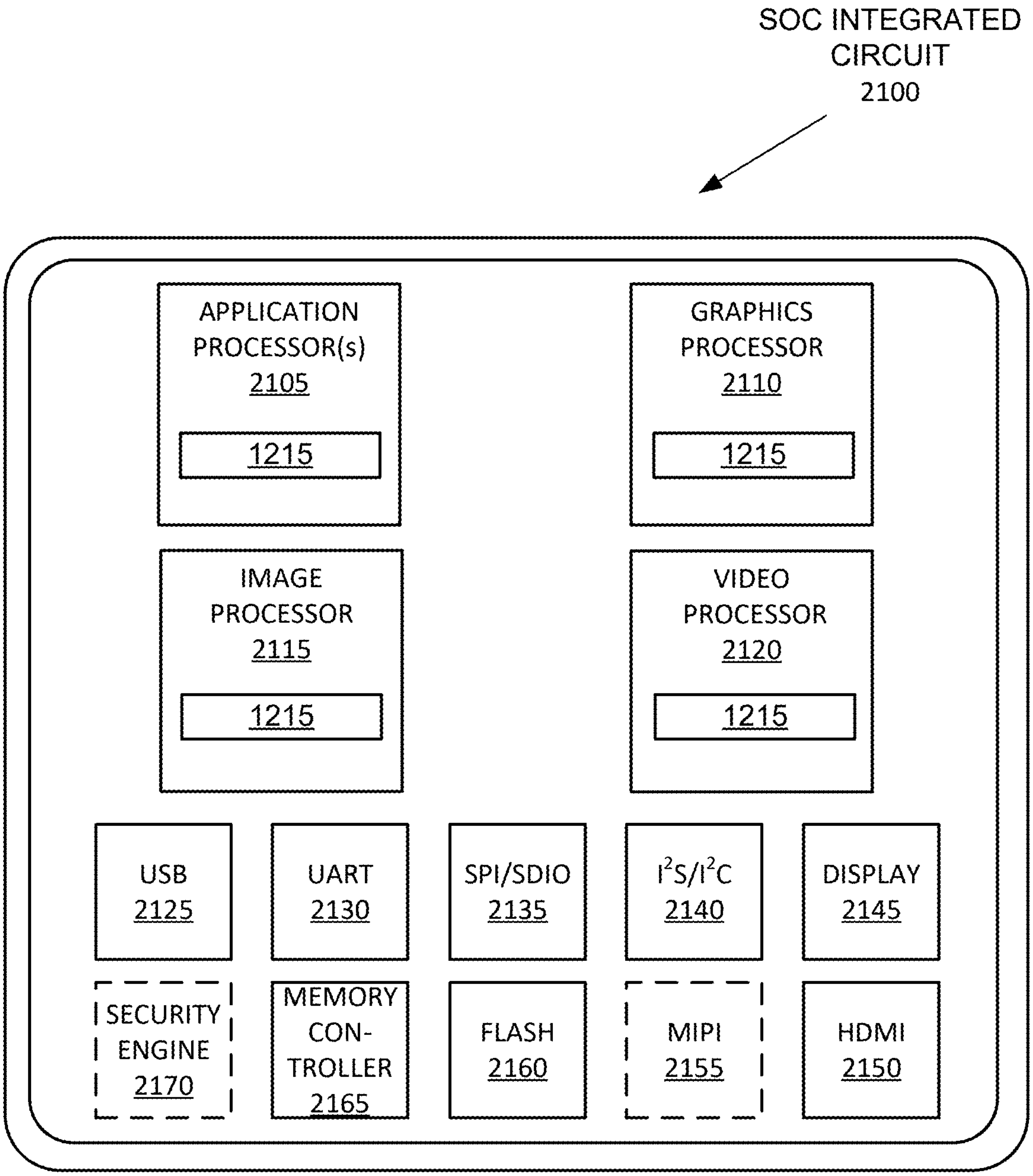
FIG. 21 illustrates exemplary integrated circuits and associated graphics processors, according to at least one embodiment.

FIG. 21 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 21 is a block diagram illustrating an exemplary system on a chip integrated circuit 2100 that may be fabricated using one or more IP cores, according to at least one embodiment. In at least one embodiment, integrated circuit 2100 includes one or more application processor(s) 2105 (e.g., CPUs), at least one graphics processor 2110, and may additionally include an image processor 2115 and/or a video processor 2120, any of which may be a modular IP core. In at least one embodiment, integrated circuit 2100 includes peripheral or bus logic including a USB controller 2125, a UART controller 2130, an SPI/SDIO controller 2135, and an $I^2S/I^2C$ controller 2140. In at least one embodiment, integrated circuit 2100 can include a display device 2145 coupled to one or more of a high-definition multimedia interface (HDMI) controller 2150 and a mobile industry processor interface (MIPI) display interface 2155. In at least one embodiment, storage may be provided by a flash memory subsystem 2160 including flash memory and a flash memory controller. In at least one embodiment, a memory interface may be provided via a memory controller 2165 for access to SDRAM or SRAM memory devices. In at least one embodiment, some integrated circuits additionally include an embedded security engine 2170.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in integrated circuit 2100 for inferencing or predicting operations based, at least in part, on weight parameters calculated using neural network training operations, neural network functions and/or architectures, or neural network use cases described herein.

In at least one embodiment, one or more systems depicted in FIG. 21 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 21 are utilized to perform operations discussed herein such as selectively using one or more neural network layers based, at least in part, on one or more iteratively increasing neural network performance metrics. In at least one embodiment, one or more systems depicted in FIG. 21 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 21 are utilized to implement one or more systems and/or processes such as those described in connection with FIGS. 1-11.

Figure 22A:
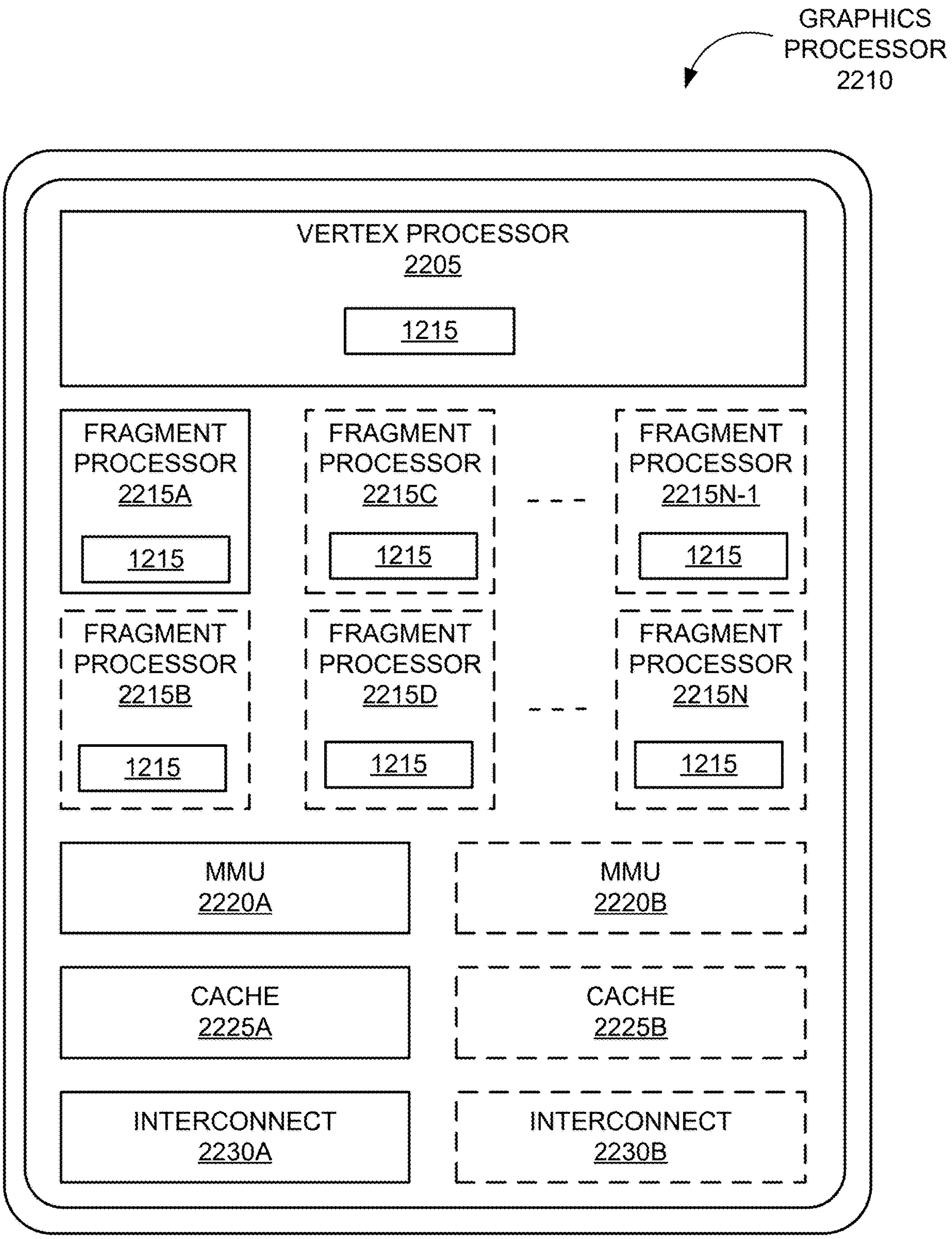
FIGS. 22A-22B illustrate exemplary integrated circuits and associated graphics processors, according to at least one embodiment.
Figure 22B:
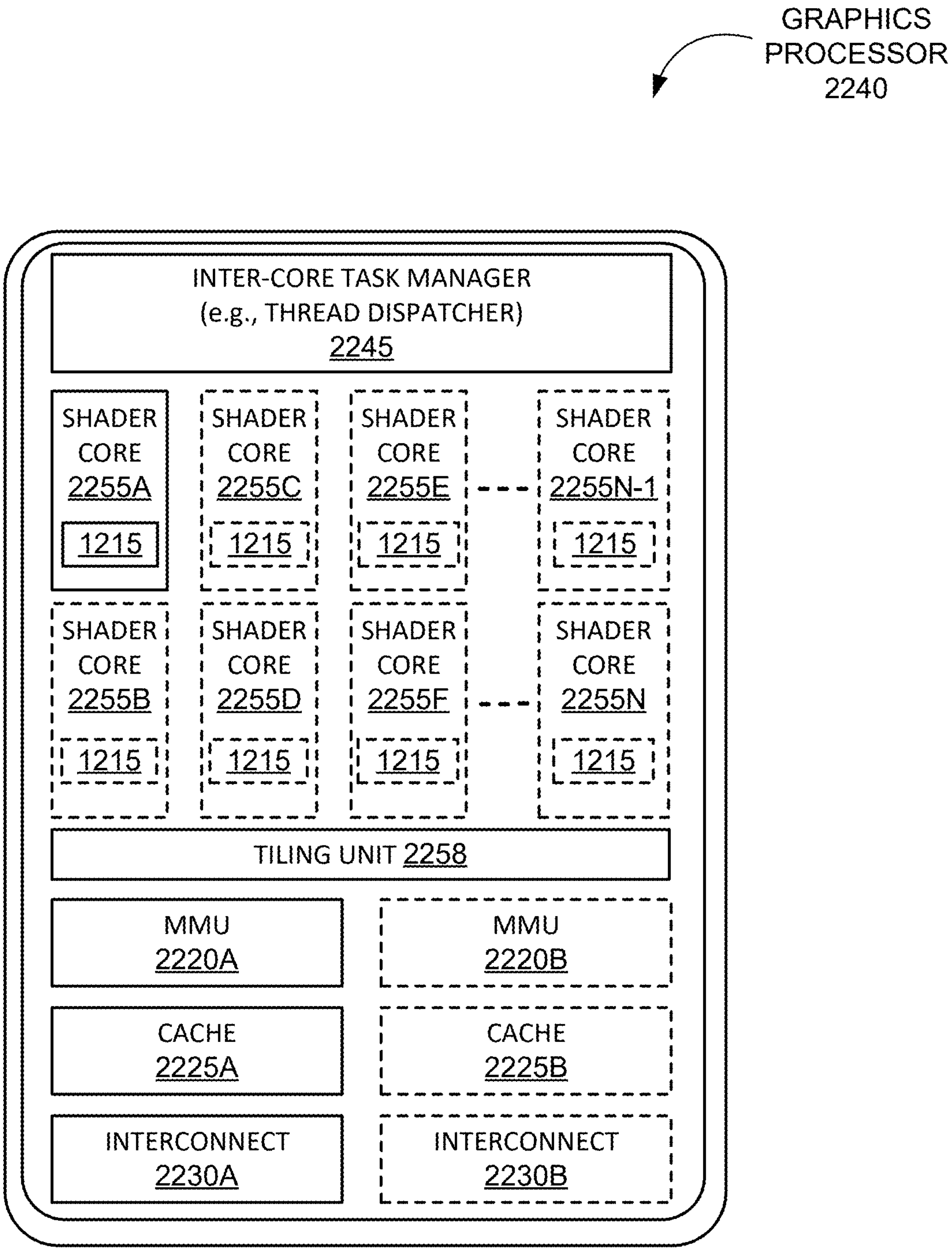

FIGS. 22A-22B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 22A-22B are block diagrams illustrating exemplary graphics processors for use within an SoC, according to embodiments described herein. FIG. 22A illustrates an exemplary graphics processor 2210 of a system on a chip integrated circuit that may be fabricated using one or more IP cores, according to at least one embodiment. FIG. 22B illustrates an additional exemplary graphics processor 2240 of a system on a chip integrated circuit that may be fabricated using one or more IP cores, according to at least one embodiment. In at least one embodiment, graphics processor 2210 of FIG. 22A is a low power graphics processor core. In at least one embodiment, graphics processor 2240 of FIG. 22B is a higher performance graphics processor core. In at least one embodiment, each of graphics processors 2210, 2240 can be variants of graphics processor 2110 of FIG. 21.

In at least one embodiment, graphics processor 2210 includes a vertex processor 2205 and one or more fragment processor(s) 2215A-2215N (e.g., 2215A, 2215B, 2215C, 2215D, through 2215N-1, and 2215N). In at least one embodiment, graphics processor 2210 can execute different shader programs via separate logic, such that vertex processor 2205 is optimized to execute operations for vertex shader programs, while one or more fragment processor(s) 2215A-2215N execute fragment (e.g., pixel) shading operations for fragment or pixel shader programs. In at least one embodiment, vertex processor 2205 performs a vertex processing stage of a 3D graphics pipeline and generates primitives and vertex data. In at least one embodiment, fragment processor(s) 2215A-2215N use primitive and vertex data generated by vertex processor 2205 to produce a framebuffer that is displayed on a display device. In at least one embodiment, fragment processor(s) 2215A-2215N are optimized to execute fragment shader programs as provided for in an OpenGL API, which may be used to perform similar operations as a pixel shader program as provided for in a Direct 3D API.

In at least one embodiment, graphics processor 2210 additionally includes one or more memory management units (MMUs) 2220A-2220B, cache(s) 2225A-2225B, and circuit interconnect(s) 2230A-2230B. In at least one embodiment, one or more MMU(s) 2220A-2220B provide for virtual to physical address mapping for graphics processor 2210, including for vertex processor 2205 and/or fragment processor(s) 2215A-2215N, which may reference vertex or image/texture data stored in memory, in addition to vertex or image/texture data stored in one or more cache(s) 2225A-2225B. In at least one embodiment, one or more MMU(s) 2220A-2220B may be synchronized with other MMUs within a system, including one or more MMUs associated with one or more application processor(s) 2105, image processors 2115, and/or video processors 2120 of FIG. 21, such that each processor 2105-2120 can participate in a shared or unified virtual memory system. In at least one embodiment, one or more circuit interconnect(s) 2230A-2230B enable graphics processor 2210 to interface with other IP cores within SoC, either via an internal bus of SoC or via a direct connection.

In at least one embodiment, graphics processor 2240 includes one or more shader core(s) 2255A-2255N (e.g., 2255A, 2255B, 2255C, 2255D, 2255E, 2255F, through 2255N−1, and 2255N) as shown in FIG. 22B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2240 includes an inter-core task manager 2245, which acts as a thread dispatcher to dispatch execution threads to one or more shader cores 2255A-2255N and a tiling unit 2258 to accelerate tiling operations for tile-based rendering, in which rendering operations for a scene are subdivided in image space, for example to exploit local spatial coherence within a scene or to optimize use of internal caches.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in integrated circuit 22A and/or 22B for inferencing or predicting operations based, at least in part, on weight parameters calculated using neural network training operations, neural network functions and/or architectures, or neural network use cases described herein.

In at least one embodiment, one or more systems depicted in FIGS. 22A-22B are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 22A-22B are utilized to perform operations discussed herein such as selectively using one or more neural network layers based, at least in part, on one or more iteratively increasing neural network performance metrics. In at least one embodiment, one or more systems depicted in FIGS. 22A-22B are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 22A-22B are utilized to implement one or more systems and/or processes such as those described in connection with FIGS. 1-11.

Figure 23A:
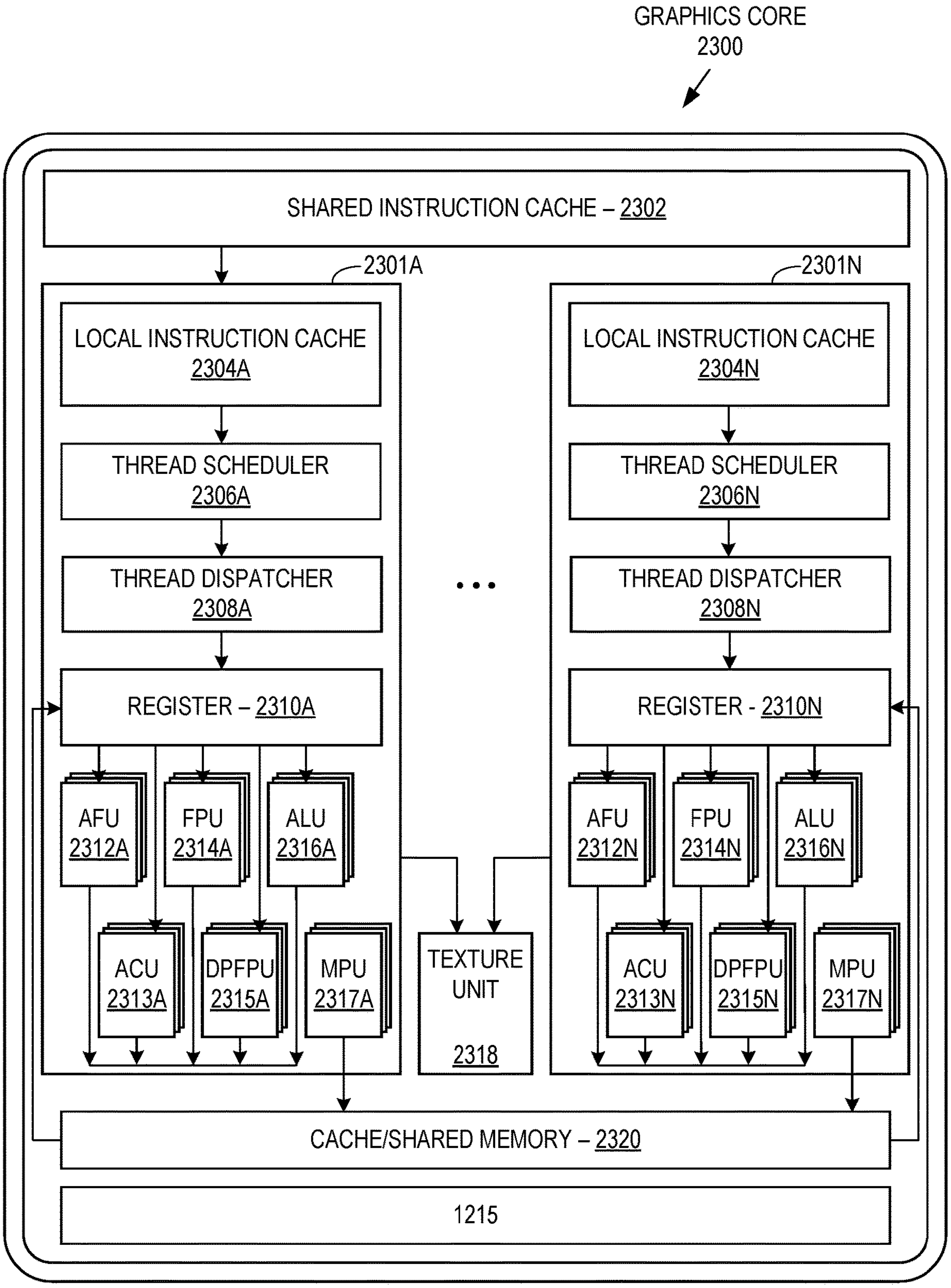
FIGS. 23A-23B illustrate additional exemplary graphics processor logic according to at least one embodiment.
Figure 23B:
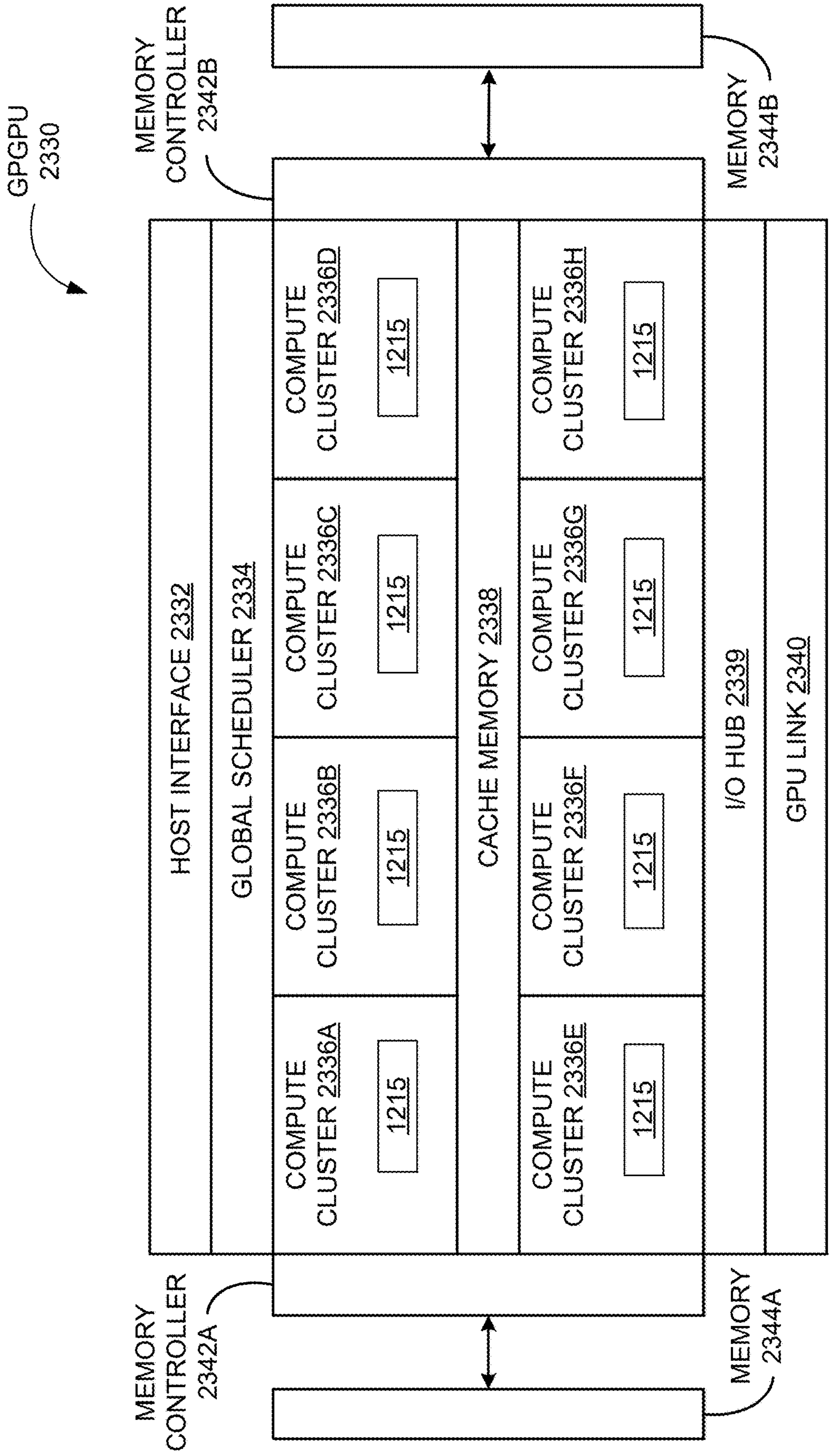

FIGS. 23A-23B illustrate additional exemplary graphics processor logic according to embodiments described herein. In at least one embodiment, components illustrated in and described in connection with FIGS. 23A-23B are integrated into a single system, such as a graphics processing unit (GPU), SoC, or another type of processor. FIG. 23A illustrates a graphics core 2300 that may be included within graphics processor 2110 of FIG. 21, in at least one embodiment, and may be a unified shader core 2255A-2255N as in FIG. 22B in at least one embodiment. FIG. 23B illustrates a highly-parallel general-purpose graphics processing unit ("GPGPU", which can also be referred to as a "graphics processing unit") 2330 suitable for deployment on a multichip module in at least one embodiment. In at least one embodiment, graphics processing unit 2330 is a GPGPU that comprises a graphics processor. In at least one embodiment, integrated circuit 2100 comprises graphics core 2300, e.g., to form an integrated circuit and/or to form an SoC, where such an integrated circuit and/or such an SoC perform operations described herein.

In at least one embodiment, graphics core 2300 includes a shared instruction cache 2302, a texture unit 2318, and a cache/shared memory 2320 (e.g., including L1, L2, L3, last level cache, or other caches) that are common to execution resources within graphics core 2300. In at least one embodiment, graphics core 2300 can include multiple slices 2301A-2301N or a partition for each core, and a graphics processor can include multiple instances of graphics core 2300. In at least one embodiment, each slice 2301A-2301N refers to graphics core 2300. In at least one embodiment, slices 2301A-2301N have sub-slices, which are part of a slice 2301A-2301N. In at least one embodiment, slices 2301A-2301N are independent of other slices or dependent on other slices. In at least one embodiment, slices 2301A-2301N can include support logic including a local instruction cache 2304A-2304N, a thread scheduler (sequencer) 2306A-2306N, a thread dispatcher 2308A-2308N, and a set of registers 2310A-2310N. In at least one embodiment, slices 2301A-2301N can include a set of additional function units (AFUs 2312A-2312N), floating-point units (FPUs 2314A-2314N), integer arithmetic logic units (ALUs 2316A-2316N), address computational units (ACUs 2313A-2313N), double-precision floating-point units (DPFPUs 2315A-2315N), and matrix processing units (MPUs 2317A-2317N). In at least one embodiment, MPUs 2317A-2317N are referred to as matrix engines.

In at least one embodiment, each slice 2301A-2301N includes one or more engines for floating point and integer vector operations and one or more engines to accelerate convolution and matrix operations in AI, machine learning, or large dataset workloads. In at least one embodiment, one or more slices 2301A-2301N include one or more vector engines to compute a vector (e.g., compute mathematical operations for vectors). In at least one embodiment, a vector engine can compute a vector operation in 16-bit floating point (also referred to as "FP16"), 32-bit floating point (also referred to as "FP32"), or 64-bit floating point (also referred to as "FP64"). In at least one embodiment, one or more slices 2301A-2301N includes 16 vector engines that are paired with 16 matrix math units to compute matrix/tensor operations, where vector engines and math units are exposed via matrix extensions. In at least one embodiment, a slice a specified portion of processing resources of a processing unit, e.g., 16 cores and a ray tracing unit or 8 cores, a thread scheduler, a thread dispatcher, and additional functional units for a processor. In at least one embodiment, graphics core 2300 includes one or more matrix engines to compute matrix operations, e.g., when computing tensor operations.

In at least one embodiment, one or more slices 2301A-2301N includes one or more ray tracing units to compute ray tracing operations (e.g., 16 ray tracing units per slice slices 2301A-2301N). In at least one embodiment, a ray tracing unit computes ray traversal, triangle intersection, bounding box intersect, or other ray tracing operations.

In at least one embodiment, one or more slices 2301A-2301N includes a media slice that encodes, decodes, and/or transcodes data; scales and/or format converts data; and/or performs video quality operations on video data.

In at least one embodiment, one or more slices 2301A-2301N are linked to L2 cache and memory fabric, link connectors, high-bandwidth memory (HBM) (e.g., HBM2e, HDM3) stacks, and a media engine. In at least one embodiment, one or more slices 2301A-2301N include multiple cores (e.g., 16 cores) and multiple ray tracing units (e.g., 16) paired to each core. In at least one embodiment, one or more slices 2301A-2301N has one or more L1 caches. In at least one embodiment, one or more slices 2301A-2301N include one or more vector engines; one or more instruction caches to store instructions; one or more L1 caches to cache data; one or more shared local memories (SLMs) to store data, e.g., corresponding to instructions; one or more samplers to sample data; one or more ray tracing units to perform ray tracing operations; one or more geometries to perform operations in geometry pipelines and/or apply geometric transformations to vertices or polygons; one or more rasterizers to describe an image in vector graphics format (e.g., shape) and convert it into a raster image (e.g., a series of pixels, dots, or lines, which when displayed together, create an image that is represented by shapes); one or more a Hierarchical Depth Buffer (Hiz) to buffer data; and/or one or more pixel backends. In at least one embodiment, a slice 2301A-2301N includes a memory fabric, e.g., an L2 cache.

In at least one embodiment, FPUs 2314A-2314N can perform single-precision (32-bit) and half-precision (16-bit) floating point operations, while DPFPUs 2315A-2315N perform double precision (64-bit) floating point operations. In at least one embodiment, ALUs 2316A-2316N can perform variable precision integer operations at 8-bit, 16-bit, and 32-bit precision, and can be configured for mixed precision operations. In at least one embodiment, MPUs 2317A-2317N can also be configured for mixed precision matrix operations, including half-precision floating point and 8-bit integer operations. In at least one embodiment, MPUs 2317-2317N can perform a variety of matrix operations to accelerate machine learning application frameworks, including enabling support for accelerated general matrix to matrix multiplication (GEMM). In at least one embodiment, AFUs 2312A-2312N can perform additional logic operations not supported by floating-point or integer units, including trigonometric operations (e.g., sine, logic 1215 are used to perform inferencing and/or training operations associated with one or more embodiments. Details regarding logic 1215 are provided herein in conjunction with FIGS. 12A and/or 12B. In at least one embodiment, logic 1215 may be used in graphics core 2300 for inferencing or predicting operations based, at least in part, on weight parameters calculated using neural network training operations, neural network functions and/or architectures, or neural network use cases described herein.

In at least one embodiment, graphics core 2300 includes an interconnect and a link fabric sublayer that is attached to a switch and a GPU-GPU bridge that enables multiple graphics processors 2300 (e.g., 8) to be interlinked without glue to each other with load/store units (LSUs), data transfer units, and sync semantics across multiple graphics processors 2300. In at least one embodiment, interconnects include standardized interconnects (e.g., PCIe) or some combination thereof.

In at least one embodiment, graphics core 2300 includes multiple tiles. In at least one embodiment, a tile is an individual die or one or more dies, where individual dies can be connected with an interconnect (e.g., embedded multi-die interconnect bridge (EMIB)). In at least one embodiment, graphics core 2300 includes a compute tile, a memory tile (e.g., where a memory tile can be exclusively accessed by different tiles or different chipsets such as a Rambo tile), substrate tile, a base tile, a HMB tile, a link tile, and EMIB tile, where all tiles are packaged together in graphics core 2300 as part of a GPU. In at least one embodiment, graphics core 2300 can include multiple tiles in a single package (also referred to as a "multi tile package"). In at least one embodiment, a compute tile can have 8 graphics cores 2300, an L1 cache; and a base tile can have a host interface with PCIe 5.0, HBM2e, MDFI, and EMIB, a link tile with 8 links, 8 ports with an embedded switch. In at least one embodiment, tiles are connected with face-to-face (F2F) chip-on-chip bonding through fine-pitched, 36-micron, microbumps (e.g., copper pillars). In at least one embodiment, graphics core 2300 includes memory fabric, which includes memory, and is tile that is accessible by multiple tiles. In at least one embodiment, graphics core 2300 stores, accesses, or loads its own hardware contexts in memory, where a hardware context is a set of data loaded from registers before a process resumes, and where a hardware context can indicate a state of hardware (e.g., state of a GPU).

In at least one embodiment, graphics core 2300 includes serializer/deserializer (SERDES) circuitry that converts a serial data stream to a parallel data stream, or converts a parallel data stream to a serial data stream.

In at least one embodiment, graphics core 2300 includes a high speed coherent unified fabric (GPU to GPU), load/ store units, bulk data transfer and sync semantics, and connected GPUs through an embedded switch, where a GPU-GPU bridge is controlled by a controller.

In at least one embodiment, graphics core 2300 performs an API, where said API abstracts hardware of graphics core 2300 and access libraries with instructions to perform math operations (e.g., math kernel library), deep neural network operations (e.g., deep neural network library), vector operations, collective communications, thread building blocks, video processing, data analytics library, and/or ray tracing operations.

FIG. 23B illustrates a general-purpose processing unit (GPGPU) 2330 that can be configured to enable highly-parallel compute operations to be performed by an array of graphics processing units, in at least one embodiment. In at least one embodiment, GPGPU 2330 can be linked directly to other instances of GPGPU 2330 to create a multi-GPU cluster to improve training speed for deep neural networks. In at least one embodiment, GPGPU 2330 includes a host interface 2332 to enable a connection with a host processor. In at least one embodiment, host interface 2332 is a PCI Express interface. In at least one embodiment, host interface 2332 can be a vendor-specific communications interface or communications fabric. In at least one embodiment, GPGPU 2330 receives commands from a host processor and uses a global scheduler 2334 (which may be referred to as a thread sequencer and/or asynchronous compute engine) to distribute execution threads associated with those commands to a set of compute clusters 2336A-2336H. In at least one embodiment, compute clusters 2336A-2336H share a cache memory 2338. In at least one embodiment, cache memory 2338 can serve as a higher-level cache for cache memories within compute clusters 2336A-2336H. In at least one embodiment, compute clusters 2336A-2336H comprise a slice or are referred to as "slices." In at least one embodiment, GPGPU 2330 is part of an SoC such as part of integrated circuit 2100 (FIG. 21).

In at least one embodiment, GPGPU 2330 includes memory 2344A-2344B coupled with compute clusters 2336A-2336H via a set of memory controllers 2342A-2342B (e.g., one or more controllers for HBM2e). In at least one embodiment, memory 2344A-2344B can include various types of memory devices including dynamic random access memory (DRAM) or graphics random access memory, such as synchronous graphics random access memory (SGRAM), including graphics double data rate (GDDR) memory.

In at least one embodiment, compute clusters 2336A-2336H each include a set of graphics cores, such as graphics core 2300 of FIG. 23A, which can include multiple types of integer and floating point logic units that can perform computational operations at a range of precisions including suited for machine learning computations. For example, in at least one embodiment, at least a subset of floating point units in each of compute clusters 2336A-2336H can be configured to perform 16-bit or 32-bit floating point operations, while a different subset of floating point units can be configured to perform 64-bit floating point operations.

In at least one embodiment, multiple instances of GPGPU 2330 can be configured to operate as a compute cluster. In at least one embodiment, communication used by compute clusters 2336A-2336H for synchronization and data exchange varies across embodiments. In at least one embodiment, multiple instances of GPGPU 2330 communicate over host interface 2332. In at least one embodiment, GPGPU 2330 includes an I/O hub 2339 that couples GPGPU 2330 with a GPU link 2340 that enables a direct connection to other instances of GPGPU 2330. In at least one embodiment, GPU link 2340 is coupled to a dedicated GPU-to-GPU bridge that enables communication and synchronization between multiple instances of GPGPU 2330. In at least one embodiment, GPU link 2340 couples with a high-speed interconnect to transmit and receive data to other GPGPUs or parallel processors. In at least one embodiment, multiple instances of GPGPU 2330 are located in separate data processing systems and communicate via a network device that is accessible via host interface 2332. In at least one embodiment GPU link 2340 can be configured to enable a connection to a host processor in addition to or as an alternative to host interface 2332.

In at least one embodiment, GPGPU 2330 can be configured to train neural networks. In at least one embodiment, GPGPU 2330 can be used within an inferencing platform. In at least one embodiment, in which GPGPU 2330 is used for inferencing, GPGPU 2330 may include fewer compute clusters 2336A-2336H relative to when GPGPU 2330 is used for training a neural network. In at least one embodiment, memory technology associated with memory 2344A-2344B may differ between inferencing and training configurations, with higher bandwidth memory technologies devoted to training configurations. In at least one embodiment, an inferencing configuration of GPGPU 2330 can support inferencing specific instructions. For example, in at least one embodiment, an inferencing configuration can provide support for one or more 8-bit integer dot product instructions, which may be used during inferencing operations for deployed neural networks.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in GPGPU 2330 for inferencing or predicting operations based, at least in part, on weight parameters calculated using neural network training operations, neural network functions and/or architectures, or neural network use cases described herein.

In at least one embodiment, one or more systems depicted in FIGS. 23A-23B are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 23A-23B are utilized to perform operations discussed herein such as selectively using one or more neural network layers based, at least in part, on one or more iteratively increasing neural network performance metrics. In at least one embodiment, one or more systems depicted in FIGS. 23A-23B are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 23A-23B are utilized to implement one or more systems and/or processes such as those described in connection with FIGS. 1-11.

Figure 24:
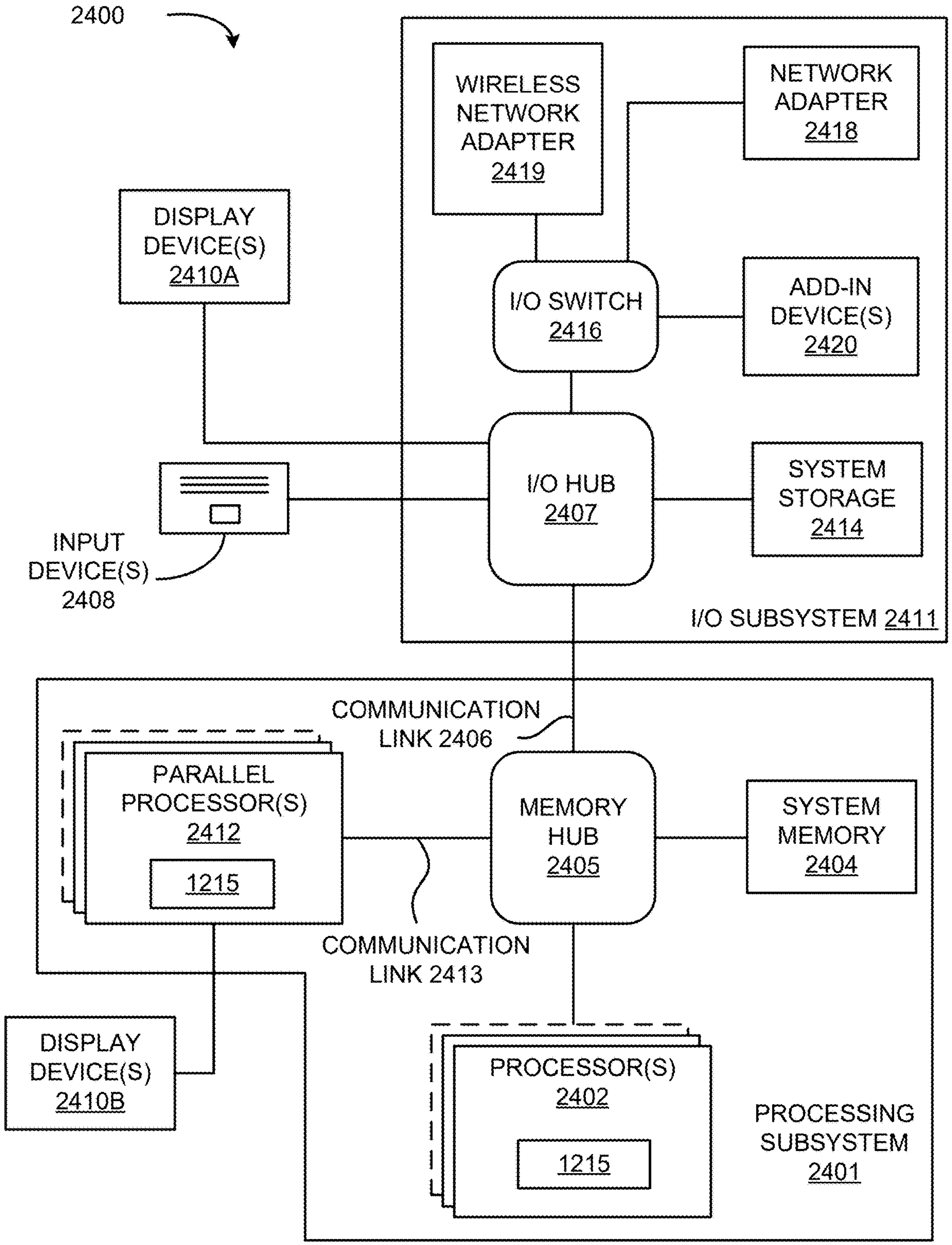
FIG. 24 illustrates a computer system, according to at least one embodiment.

FIG. 24 is a block diagram illustrating a computing system 2400 according to at least one embodiment. In at least one embodiment, computing system 2400 includes a processing subsystem 2401 having one or more processor(s)

2402 and a system memory 2404 communicating via an interconnection path that may include a memory hub 2405. In at least one embodiment, memory hub 2405 may be a separate component within a chipset component or may be integrated within one or more processor(s) 2402. In at least one embodiment, memory hub 2405 couples with an I/O subsystem 2411 via a communication link 2406. In at least one embodiment, I/O subsystem 2411 includes an I/O hub 2407 that can enable computing system 2400 to receive input from one or more input device(s) 2408. In at least one embodiment, I/O hub 2407 can enable a display controller, which may be included in one or more processor(s) 2402, to provide outputs to one or more display device(s) 2410A. In at least one embodiment, one or more display device(s) 2410A coupled with I/O hub 2407 can include a local, internal, or embedded display device.

In at least one embodiment, processing subsystem 2401 includes one or more parallel processor(s) 2412 coupled to memory hub 2405 via a bus or other communication link 2413. In at least one embodiment, communication link 2413 may use one of any number of standards based communication link technologies or protocols, such as, but not limited to PCI Express, or may be a vendor-specific communications interface or communications fabric. In at least one embodiment, one or more parallel processor(s) 2412 form a computationally focused parallel or vector processing system that can include a large number of processing cores and/or processing clusters, such as a many-integrated core (MIC) processor. In at least one embodiment, some or all of parallel processor(s) 2412 form a graphics processing subsystem that can output pixels to one of one or more display device(s) 2410A coupled via I/O Hub 2407. In at least one embodiment, parallel processor(s) 2412 can also include a display controller and display interface (not shown) to enable a direct connection to one or more display device(s) 2410B. In at least one embodiment, parallel processor(s) 2412 include one or more cores, such as graphics cores 2300 discussed herein.

In at least one embodiment, a system storage unit 2414 can connect to I/O hub 2407 to provide a storage mechanism for computing system 2400. In at least one embodiment, an I/O switch 2416 can be used to provide an interface mechanism to enable connections between I/O hub 2407 and other components, such as a network adapter 2418 and/or a wireless network adapter 2419 that may be integrated into platform, and various other devices that can be added via one or more add-in device(s) 2420. In at least one embodiment, network adapter 2418 can be an Ethernet adapter or another wired network adapter. In at least one embodiment, wireless network adapter 2419 can include one or more of a Wi-Fi, Bluetooth, near field communication (NFC), or other network device that includes one or more wireless radios.

In at least one embodiment, computing system 2400 can include other components not explicitly shown, including USB or other port connections, optical storage drives, video capture devices, and like, may also be connected to I/O hub 2407. In at least one embodiment, communication paths interconnecting various components in FIG. 24 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 2412 incorporate circuitry optimized for graphics and video processing, including, for example, video output circuitry, and constitutes a graphics processing unit (GPU), e.g., parallel processor(s) 2412 includes graphics core 2300. In at least one embodiment, parallel processor(s) 2412 incorporate circuitry optimized for general purpose processing. In at least embodiment, components of computing system 2400 may be integrated with one or more other system elements on a single integrated circuit. For example, in at least one embodiment, parallel processor(s) 2412, memory hub 2405, processor(s) 2402, and I/O hub 2407 can be integrated into a system on chip (SoC) integrated circuit. In at least one embodiment, components of computing system 2400 can be integrated into a single package to form a system in package (SIP) configuration. In at least one embodiment, at least a portion of components of computing system 2400 can be integrated into a multi-chip module (MCM), which can be interconnected with other multi-chip modules into a modular computing system.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in system FIG. 2400 for inferencing or predicting operations based, at least in part, on weight parameters calculated using neural network training operations, neural network functions and/or architectures, or neural network use cases described herein.

In at least one embodiment, one or more systems depicted in FIG. 24 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 24 are utilized to perform operations discussed herein such as selectively using one or more neural network layers based, at least in part, on one or more iteratively increasing neural network performance metrics. In at least one embodiment, one or more systems depicted in FIG. 24 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 24 are utilized to implement one or more systems and/or processes such as those described in connection with FIGS. 1-11.

Processors

Figure 25A:
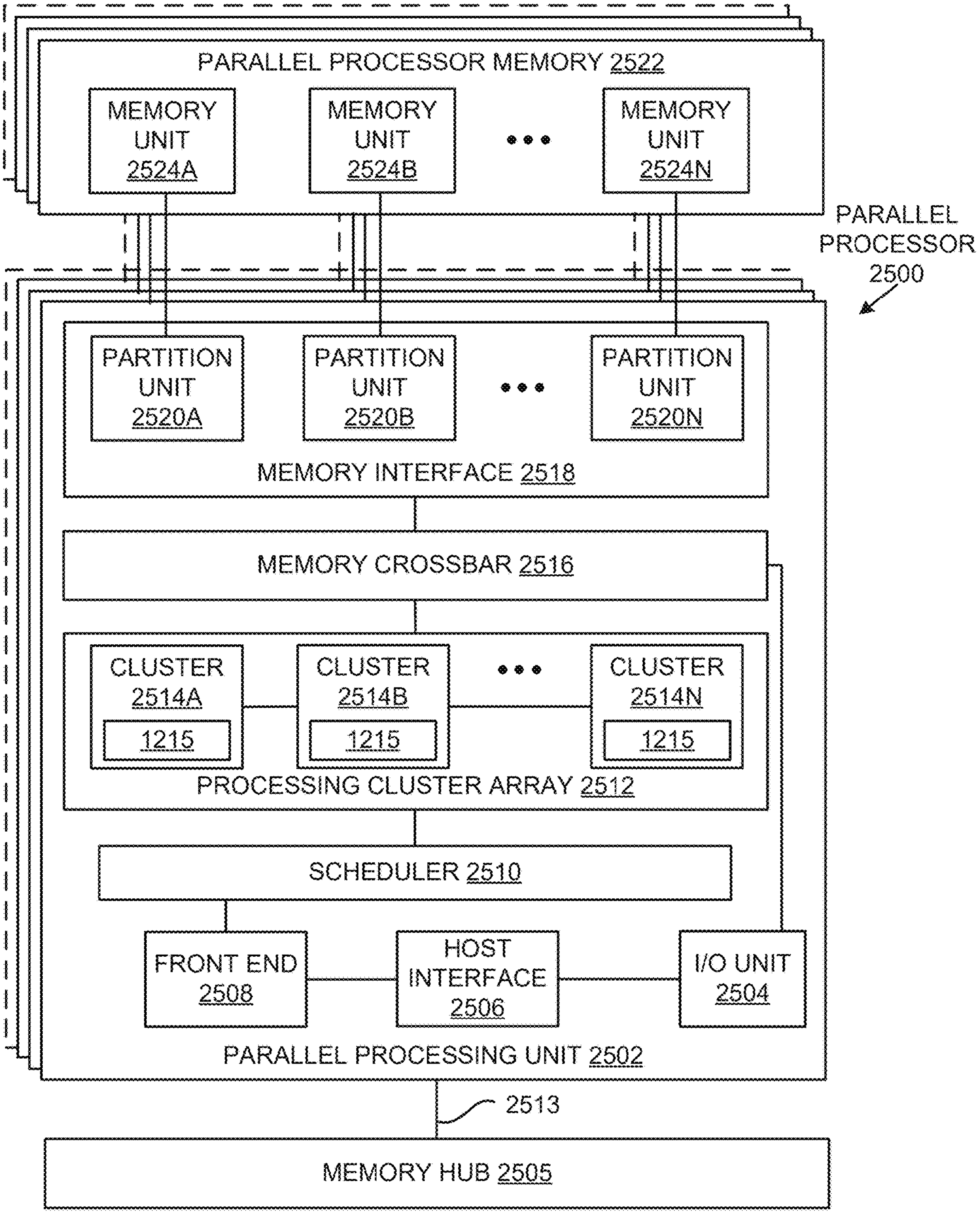
FIG. 25A illustrates a parallel processor, according to at least one embodiment.

FIG. 25A illustrates a parallel processor 2500 according to at least one embodiment. In at least one embodiment, various components of parallel processor 2500 may be implemented using one or more integrated circuit devices, such as programmable processors, application specific integrated circuits (ASICs), or field programmable gate arrays (FPGA). In at least one embodiment, illustrated parallel processor 2500 is a variant of one or more parallel processor(s) 2412 shown in FIG. 24 according to an exemplary embodiment. In at least one embodiment, a parallel processor 2500 includes one or more graphics cores 2300.

In at least one embodiment, parallel processor 2500 includes a parallel processing unit 2502. In at least one embodiment, parallel processing unit 2502 includes an I/O unit 2504 that enables communication with other devices, including other instances of parallel processing unit 2502. In at least one embodiment, I/O unit 2504 may be directly connected to other devices. In at least one embodiment, I/O unit 2504 connects with other devices via use of a hub or switch interface, such as a memory hub 2505. In at least one embodiment, connections between memory hub 2505 and I/O unit 2504 form a communication link 2513. In at least one embodiment, I/O unit 2504 connects with a host interface 2506 and a memory crossbar 2516, where host interface 2506 receives commands directed to performing processing operations and memory crossbar 2516 receives commands directed to performing memory operations.

In at least one embodiment, when host interface 2506 receives a command buffer via I/O unit 2504, host interface 2506 can direct work operations to perform those commands to a front end 2508. In at least one embodiment, front end 2508 couples with a scheduler 2510 (which may be referred to as a sequencer), which is configured to distribute commands or other work items to a processing cluster array 2512. In at least one embodiment, scheduler 2510 ensures that processing cluster array 2512 is properly configured and in a valid state before tasks are distributed to a cluster of processing cluster array 2512. In at least one embodiment, scheduler 2510 is implemented via firmware logic executing on a microcontroller. In at least one embodiment, microcontroller implemented scheduler 2510 is configurable to perform complex scheduling and work distribution operations at coarse and fine granularity, enabling rapid preemption and context switching of threads executing on processing array 2512. In at least one embodiment, host software can prove workloads for scheduling on processing cluster array 2512 via one of multiple graphics processing paths. In at least one embodiment, workloads can then be automatically distributed across processing array cluster 2512 by scheduler 2510 logic within a microcontroller including scheduler 2510.

In at least one embodiment, processing cluster array 2512 can include up to "N" processing clusters (e.g., cluster 2514A, cluster 2514B, through cluster 2514N), where "N" represents a positive integer (which may be a different integer "N" than used in other figures). In at least one embodiment, each cluster 2514A-2514N of processing cluster array 2512 can execute a large number of concurrent threads. In at least one embodiment, scheduler 2510 can allocate work to clusters 2514A-2514N of processing cluster array 2512 using various scheduling and/or work distribution algorithms, which may vary depending on workload arising for each type of program or computation. In at least one embodiment, scheduling can be handled dynamically by scheduler 2510, or can be assisted in part by compiler logic during compilation of program logic configured for execution by processing cluster array 2512. In at least one embodiment, different clusters 2514A-2514N of processing cluster array 2512 can be allocated for processing different types of programs or for performing different types of computations.

In at least one embodiment, processing cluster array 2512 can be configured to perform various types of parallel processing operations. In at least one embodiment, processing cluster array 2512 is configured to perform general-purpose parallel compute operations. For example, in at least one embodiment, processing cluster array 2512 can include logic to execute processing tasks including filtering of video and/or audio data, performing modeling operations, including physics operations, and performing data transformations.

In at least one embodiment, processing cluster array 2512 is configured to perform parallel graphics processing operations. In at least one embodiment, processing cluster array 2512 can include additional logic to support execution of such graphics processing operations, including but not limited to, texture sampling logic to perform texture operations, as well as tessellation logic and other vertex processing logic. In at least one embodiment, processing cluster array 2512 can be configured to execute graphics processing related shader programs such as, but not limited to, vertex shaders, tessellation shaders, geometry shaders, and pixel shaders. In at least one embodiment, parallel processing unit 2502 can transfer data from system memory via I/O unit 2504 for processing. In at least one embodiment, during processing, transferred data can be stored to on-chip memory (e.g., parallel processor memory 2522) during processing, then written back to system memory.

In at least one embodiment, when parallel processing unit 2502 is used to perform graphics processing, scheduler 2510 can be configured to divide a processing workload into approximately equal sized tasks, to better enable distribution of graphics processing operations to multiple clusters 2514A-2514N of processing cluster array 2512. In at least one embodiment, portions of processing cluster array 2512 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2514A-2514N may be stored in buffers to allow intermediate data to be transmitted between clusters 2514A-2514N for further processing.

In at least one embodiment, processing cluster array 2512 can receive processing tasks to be executed via scheduler 2510, which receives commands defining processing tasks from front end 2508. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2510 may be configured to fetch indices corresponding to tasks or may receive indices from front end 2508. In at least one embodiment, front end 2508 can be configured to ensure processing cluster array 2512 is configured to a valid state before a workload specified by incoming command buffers (e.g., batch-buffers, push buffers, etc.) is initiated.

In at least one embodiment, each of one or more instances of parallel processing unit 2502 can couple with a parallel processor memory 2522. In at least one embodiment, parallel processor memory 2522 can be accessed via memory crossbar 2516, which can receive memory requests from processing cluster array 2512 as well as I/O unit 2504. In at least one embodiment, memory crossbar 2516 can access parallel processor memory 2522 via a memory interface 2518. In at least one embodiment, memory interface 2518 can include multiple partition units (e.g., partition unit 2520A, partition unit 2520B, through partition unit 2520N) that can each couple to a portion (e.g., memory unit) of parallel processor memory 2522. In at least one embodiment, a number of partition units 2520A-2520N is configured to be equal to a number of memory units, such that a first partition unit 2520A has a corresponding first memory unit 2524A, a second partition unit 2520B has a corresponding memory unit 2524B, and an N-th partition unit 2520N has a corresponding N-th memory unit 2524N. In at least one embodiment, a number of partition units 2520A-2520N may not be equal to a number of memory units.

In at least one embodiment, memory units 2524A-2524N can include various types of memory devices, including dynamic random access memory (DRAM) or graphics random access memory, such as synchronous graphics random access memory (SGRAM), including graphics double data rate (GDDR) memory. In at least one embodiment, memory units 2524A-2524N may also include 3D stacked memory, including but not limited to high bandwidth memory (HBM), HBM2e, or HDM3. In at least one embodiment, render targets, such as frame buffers or texture maps may be stored across memory units 2524A-2524N, allowing partition units 2520A-2520N to write portions of each render target in parallel to efficiently use available bandwidth of parallel processor memory 2522. In at least one embodiment, a local instance of parallel processor memory 2522 may be excluded in favor of a unified memory design that utilizes system memory in conjunction with local cache memory.

In at least one embodiment, any one of clusters 2514A-2514N of processing cluster array 2512 can process data that will be written to any of memory units 2524A-2524N within parallel processor memory 2522. In at least one embodiment, memory crossbar 2516 can be configured to transfer an output of each cluster 2514A-2514N to any partition unit 2520A-2520N or to another cluster 2514A-2514N, which can perform additional processing operations on an output. In at least one embodiment, each cluster 2514A-2514N can communicate with memory interface 2518 through memory crossbar 2516 to read from or write to various external memory devices. In at least one embodiment, memory crossbar 2516 has a connection to memory interface 2518 to communicate with I/O unit 2504, as well as a connection to a local instance of parallel processor memory 2522, enabling processing units within different processing clusters 2514A-2514N to communicate with system memory or other memory that is not local to parallel processing unit 2502. In at least one embodiment, memory crossbar 2516 can use virtual channels to separate traffic streams between clusters 2514A-2514N and partition units 2520A-2520N.

In at least one embodiment, multiple instances of parallel processing unit 2502 can be provided on a single add-in card, or multiple add-in cards can be interconnected. In at least one embodiment, different instances of parallel processing unit 2502 can be configured to interoperate even if different instances have different numbers of processing cores, different amounts of local parallel processor memory, and/or other configuration differences. For example, in at least one embodiment, some instances of parallel processing unit 2502 can include higher precision floating point units relative to other instances. In at least one embodiment, systems incorporating one or more instances of parallel processing unit 2502 or parallel processor 2500 can be implemented in a variety of configurations and form factors, including but not limited to desktop, laptop, or handheld personal computers, servers, workstations, game consoles, and/or embedded systems.

Figure 25B:
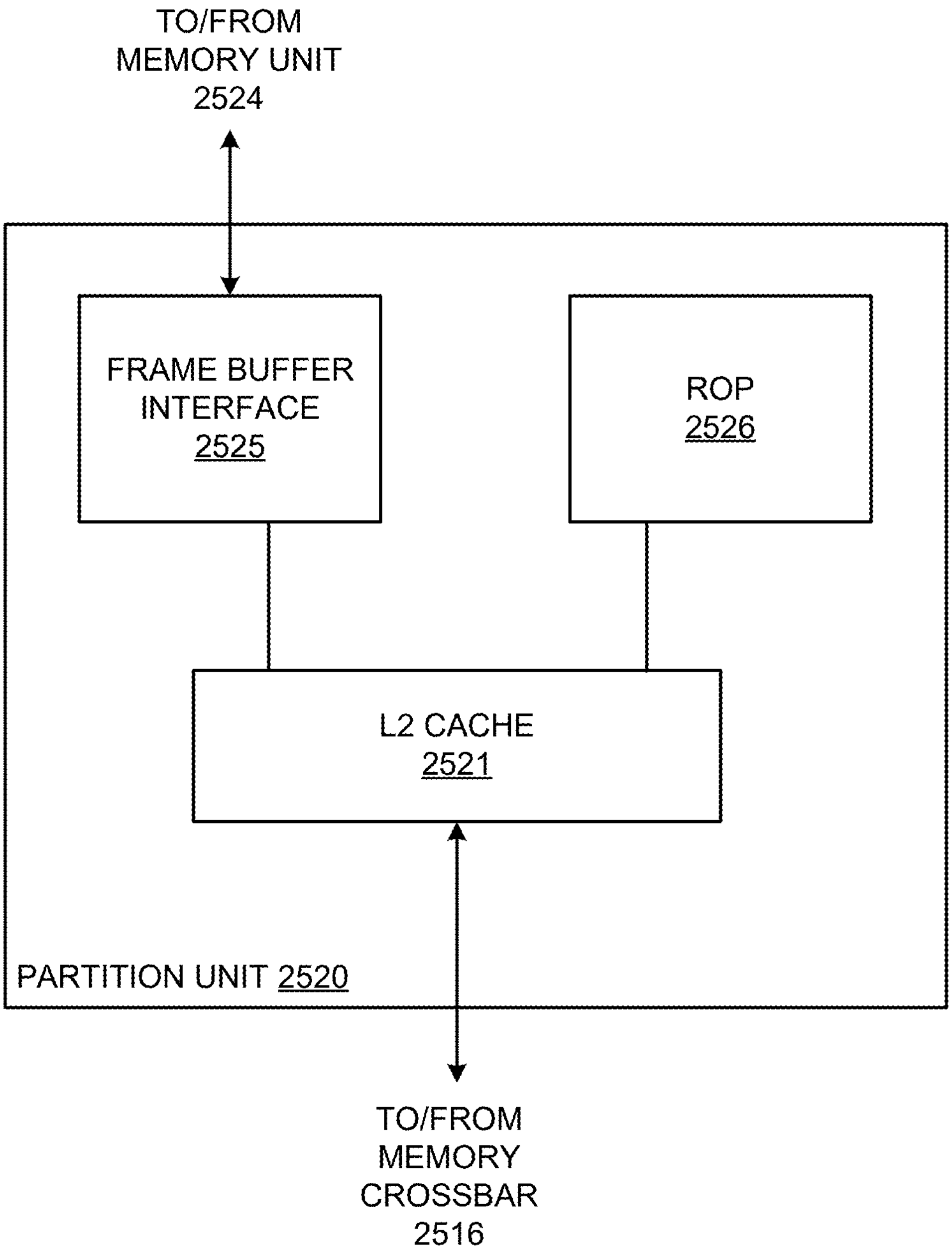
FIG. 25B illustrates a partition unit, according to at least one embodiment.

FIG. 25B is a block diagram of a partition unit 2520 according to at least one embodiment. In at least one embodiment, partition unit 2520 is an instance of one of partition units 2520A-2520N of FIG. 25A. In at least one embodiment, partition unit 2520 includes an L2 cache 2521, a frame buffer interface 2525, and a ROP 2526 (raster operations unit). In at least one embodiment, L2 cache 2521 is a read/write cache that is configured to perform load and store operations received from memory crossbar 2516 and ROP 2526. In at least one embodiment, read misses and urgent write-back requests are output by L2 cache 2521 to frame buffer interface 2525 for processing. In at least one embodiment, updates can also be sent to a frame buffer via frame buffer interface 2525 for processing. In at least one embodiment, frame buffer interface 2525 interfaces with one of memory units in parallel processor memory, such as memory units 2524A-2524N of FIG. 25 (e.g., within parallel processor memory 2522).

In at least one embodiment, ROP 2526 is a processing unit that performs raster operations such as stencil, z test, blending, etc. In at least one embodiment, ROP 2526 then outputs processed graphics data that is stored in graphics memory. In at least one embodiment, ROP 2526 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 2526 can vary based on statistical characteristics of data to be compressed. For example, in at least one embodiment, delta color compression is performed on depth and color data on a per-tile basis.

In at least one embodiment, ROP 2526 is included within each processing cluster (e.g., cluster 2514A-2514N of FIG. 25A) instead of within partition unit 2520. In at least one embodiment, read and write requests for pixel data are transmitted over memory crossbar 2516 instead of pixel fragment data. In at least one embodiment, processed graphics data may be displayed on a display device, such as one of one or more display device(s) 2410 of FIG. 24, routed for further processing by processor(s) 2402, or routed for further processing by one of processing entities within parallel processor 2500 of FIG. 25A.

Figure 25C:
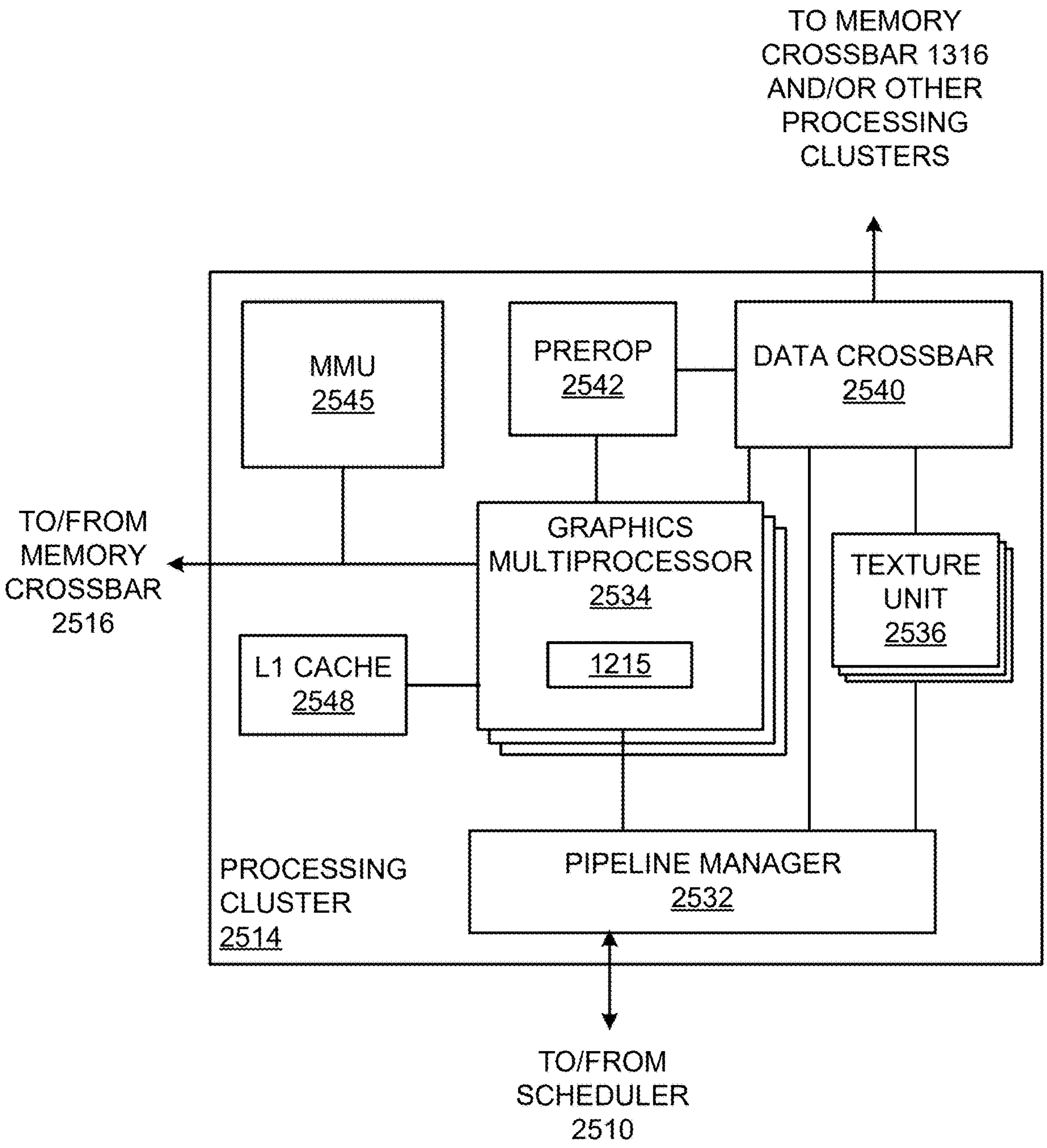
FIG. 25C illustrates a processing cluster, according to at least one embodiment.

FIG. 25C is a block diagram of a processing cluster 2514 within a parallel processing unit according to at least one embodiment. In at least one embodiment, a processing cluster is an instance of one of processing clusters 2514A-2514N of FIG. 25A. In at least one embodiment, processing cluster 2514 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2514 can be controlled via a pipeline manager 2532 that distributes processing tasks to SIMT parallel processors. In at least one embodiment, pipeline manager 2532 receives instructions from scheduler 2510 of FIG. 25A and manages execution of those instructions via a graphics multiprocessor 2534 and/or a texture unit 2536. In at least one embodiment, graphics multiprocessor 2534 is an exemplary instance of a SIMT parallel processor. However, in at least one embodiment, various types of SIMT parallel processors of differing architectures may be included within processing cluster 2514. In at least one embodiment, one or more instances of graphics multiprocessor 2534 can be included within a processing cluster 2514. In at least one embodiment, graphics multiprocessor 2534 can process data and a data crossbar 2540 can be used to distribute processed data to one of multiple possible destinations, including other shader units.

In at least one embodiment, pipeline manager 2532 can facilitate distribution of processed data by specifying destinations for processed data to be distributed via data crossbar 2540.

In at least one embodiment, each graphics multiprocessor 2534 within processing cluster 2514 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2514 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 2534. In at least one embodiment, a thread group may include fewer threads than a number of processing engines within graphics multiprocessor 2534. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2534. In at least one embodiment, when a thread group includes more threads than number of processing engines within graphics multiprocessor 2534, processing can be performed over consecutive clock cycles. In at least one embodiment, multiple thread groups can be executed concurrently on a graphics multiprocessor 2534.

In at least one embodiment, graphics multiprocessor 2534 includes an internal cache memory to perform load and store operations. In at least one embodiment, graphics multiprocessor 2534 can forego an internal cache and use a cache memory (e.g., L1 cache 2548) within processing cluster 2514. In at least one embodiment, each graphics multiprocessor 2534 also has access to L2 caches within partition units (e.g., partition units 2520A-2520N of FIG. 25A) that are shared among all processing clusters 2514 and may be used to transfer data between threads. In at least one embodiment, graphics multiprocessor 2534 may also access off-chip global memory, which can include one or more of local parallel processor memory and/or system memory. In at least one embodiment, any memory external to parallel processing unit 2502 may be used as global memory. In at least one embodiment, processing cluster 2514 includes multiple instances of graphics multiprocessor 2534 and can share common instructions and data, which may be stored in L1 cache 2548.

In at least one embodiment, each processing cluster 2514 may include an MMU 2545 (memory management unit) that is configured to map virtual addresses into physical addresses. In at least one embodiment, one or more instances of MMU 2545 may reside within memory interface 2518 of FIG. 25A. In at least one embodiment, MMU 2545 includes a set of page table entries (PTEs) used to map a virtual address to a physical address of a tile and optionally a cache line index. In at least one embodiment, MMU 2545 may include address translation lookaside buffers (TLB) or caches that may reside within graphics multiprocessor 2534 or L1 2548 cache or processing cluster 2514. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 2514 may be configured such that each graphics multiprocessor 2534 is coupled to a texture unit 2536 for performing texture mapping operations, e.g., determining texture sample positions, reading texture data, and filtering texture data. In at least one embodiment, texture data is read from an internal texture L1 cache (not shown) or from an L1 cache within graphics multiprocessor 2534 and is fetched from an L2 cache, local parallel processor memory, or system memory, as needed. In at least one embodiment, each graphics multiprocessor 2534 outputs processed tasks to data crossbar 2540 to provide processed task to another processing cluster 2514 for further processing or to store processed task in an L2 cache, local parallel processor memory, or system memory via memory crossbar 2516. In at least one embodiment, a preROP 2542 (pre-raster operations unit) is configured to receive data from graphics multiprocessor 2534, and direct data to ROP units, which may be located with partition units as described herein (e.g., partition units 2520A-2520N of FIG. 25A). In at least one embodiment, preROP 2542 unit can perform optimizations for color blending, organizing pixel color data, and performing address translations.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in graphics processing cluster 2514 for inferencing or predicting operations based, at least in part, on weight parameters calculated using neural network training operations, neural network functions and/or architectures, or neural network use cases described herein.

Figure 25D:
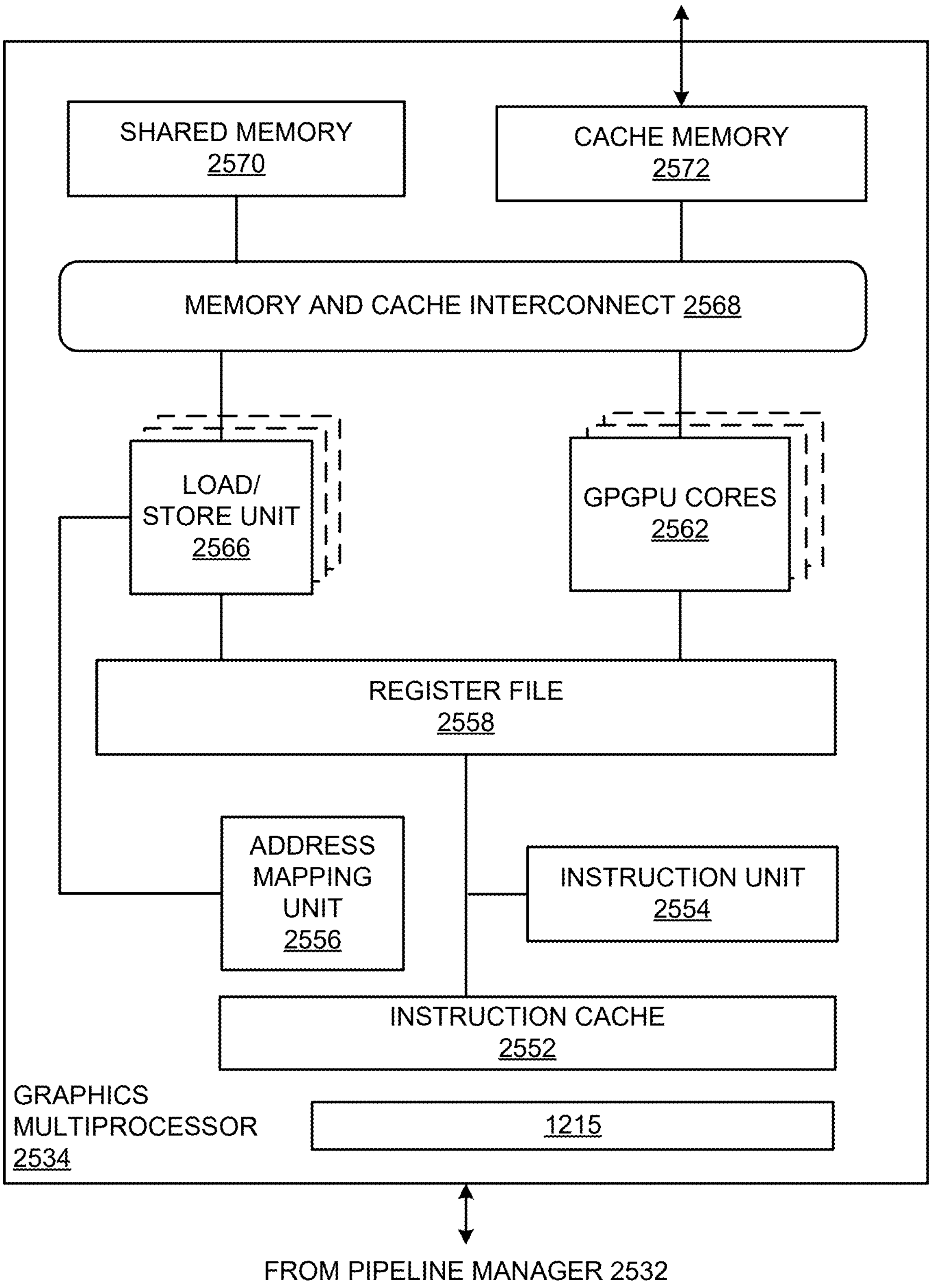
FIG. 25D illustrates a graphics multiprocessor, according to at least one embodiment.

FIG. 25D shows a graphics multiprocessor 2534 according to at least one embodiment. In at least one embodiment, graphics multiprocessor 2534 couples with pipeline manager 2532 of processing cluster 2514. In at least one embodiment, graphics multiprocessor 2534 has an execution pipeline including but not limited to an instruction cache 2552, an instruction unit 2554, an address mapping unit 2556, a register file 2558, one or more general purpose graphics processing unit (GPGPU) cores 2562, and one or more load/store units 2566, where one or more load/store units 2566 can perform load/store operations to load/store instructions corresponding to performing an operation. In at least one embodiment, GPGPU cores 2562 and load/store units 2566 are coupled with cache memory 2572 and shared memory 2570 via a memory and cache interconnect 2568. In at least one embodiment, GPGPU cores 2562 are part of an SoC such as part of integrated circuit 2100 in FIG. 21.

In at least one embodiment, instruction cache 2552 receives a stream of instructions to execute from pipeline manager 2532. In at least one embodiment, instructions are cached in instruction cache 2552 and dispatched for execution by an instruction unit 2554. In at least one embodiment, instruction unit 2554 can dispatch instructions as thread groups (e.g., warps, wavefronts, waves), with each thread of thread group assigned to a different execution unit within GPGPU cores 2562. In at least one embodiment, an instruction can access any of a local, shared, or global address space by specifying an address within a unified address space. In at least one embodiment, address mapping unit 2556 can be used to translate addresses in a unified address space into a distinct memory address that can be accessed by load/store units 2566.

In at least one embodiment, register file 2558 provides a set of registers for functional units of graphics multiprocessor 2534. In at least one embodiment, register file 2558 provides temporary storage for operands connected to data paths of functional units (e.g., GPGPU cores 2562, load/store units 2566) of graphics multiprocessor 2534. In at least one embodiment, register file 2558 is divided between each of functional units such that each functional unit is allocated a dedicated portion of register file 2558. In at least one embodiment, register file 2558 is divided between different warps (which may be referred to as wavefronts and/or waves) being executed by graphics multiprocessor 2534.

In at least one embodiment, GPGPU cores 2562 can each include floating point units (FPUs) and/or integer arithmetic logic units (ALUs) that are used to execute instructions of graphics multiprocessor 2534. In at least one embodiment, GPGPU cores 2562 can be similar in architecture or can differ in architecture. In at least one embodiment, a first portion of GPGPU cores 2562 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 2534 can additionally include one or more fixed function or special function units to perform specific functions such as copy rectangle or pixel blending operations. In at least one embodiment, one or more of GPGPU cores 2562 can also include fixed or special function logic.

In at least one embodiment, GPGPU cores 2562 include SIMD logic capable of performing a single instruction on multiple sets of data. In at least one embodiment, GPGPU cores 2562 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2568 is an interconnect network that connects each functional unit of graphics multiprocessor 2534 to register file 2558 and to shared memory 2570. In at least one embodiment, memory and cache interconnect 2568 is a crossbar interconnect that allows load/store unit 2566 to implement load and store operations between shared memory 2570 and register file 2558. In at least one embodiment, register file 2558 can operate at a same frequency as GPGPU cores 2562, thus data transfer between GPGPU cores 2562 and register file 2558 can have very low latency. In at least one embodiment, shared memory 2570 can be used to enable communication between threads that execute on functional units within graphics multiprocessor 2534. In at least one embodiment, cache memory 2572 can be used as a data cache for example, to cache texture data communicated between functional units and texture unit 2536. In at least one embodiment, shared memory 2570 can also be used as a program managed cache. In at least one embodiment, threads executing on GPGPU cores 2562 can programmatically store data within shared memory in addition to automatically cached data that is stored within cache memory 2572.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, an SoC comprises a parallel processor or GPGPU as described herein, where said parallel processor or said SoC is perform o In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in graphics multiprocessor 2534 for inferencing or predicting operations based, at least in part, on weight parameters calculated using neural network training operations, neural network functions and/or architectures, or neural network use cases described herein.

In at least one embodiment, one or more systems depicted in FIGS. 25A-25D are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 25A-25D are utilized to perform operations discussed herein such as selectively using one or more neural network layers based, at least in part, on one or more iteratively increasing neural network performance metrics. In at least one embodiment, one or more systems depicted in FIGS. 25A-25D are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 25A-25D are utilized to implement one or more systems and/or processes such as those described in connection with FIGS. 1-11.

Figure 26:
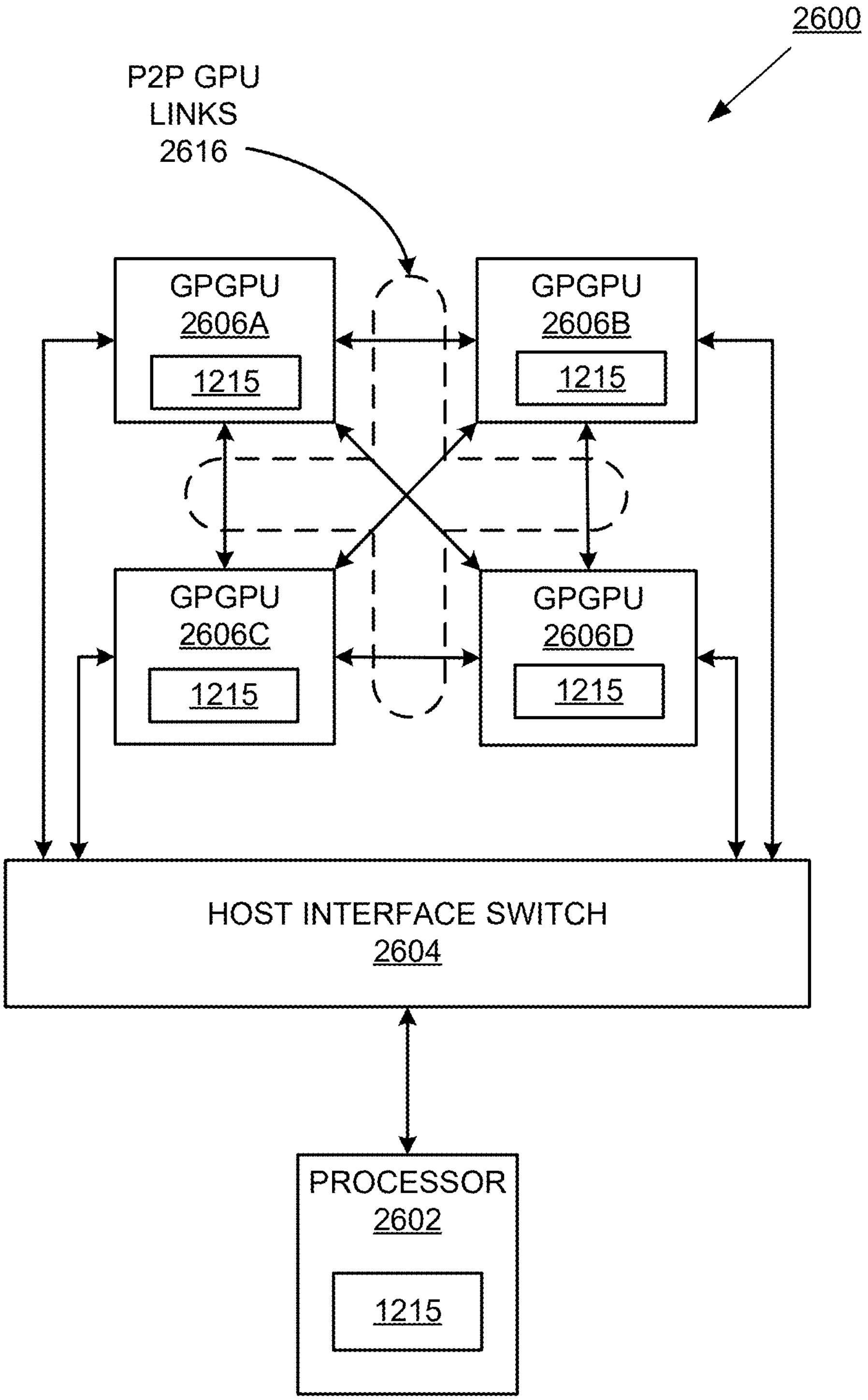
FIG. 26 illustrates a multi-graphics processing unit (GPU) system, according to at least one embodiment.

FIG. 26 illustrates a multi-GPU computing system 2600, according to at least one embodiment. In at least one embodiment, multi-GPU computing system 2600 can include a processor 2602 coupled to multiple general purpose graphics processing units (GPGPUs) 2606A-D via a host interface switch 2604. In at least one embodiment, host interface switch 2604 is a PCI express switch device that couples processor 2602 to a PCI express bus over which processor 2602 can communicate with GPGPUs 2606A-D. In at least one embodiment, GPGPUs 2606A-D can interconnect via a set of high-speed point-to-point GPU-to-GPU links 2616. In at least one embodiment, GPU-to-GPU links 2616 connect to each of GPGPUs 2606A-D via a dedicated GPU link. In at least one embodiment, P2P GPU links 2616 enable direct communication between each of GPGPUs 2606A-D without requiring communication over host interface bus 2604 to which processor 2602 is connected. In at least one embodiment, with GPU-to-GPU traffic directed to P2P GPU links 2616, host interface bus 2604 remains available for system memory access or to communicate with other instances of multi-GPU computing system 2600, for example, via one or more network devices. While in at least one embodiment GPGPUs 2606A-D connect to processor 2602 via host interface switch 2604, in at least one embodiment processor 2602 includes direct support for P2P GPU links 2616 and can connect directly to GPGPUs 2606A-D. In at least one embodiment, GPGPUs 2606A-D is part of an SoC such as part of integrated circuit 2100 in FIG. 21, wherein GPGPUs 2606A-D performs operations described herein.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in multi-GPU computing system 2600 for inferencing or predicting operations based, at least in part, on weight parameters calculated using neural network training operations, neural network functions and/or architectures, or neural network use cases described herein.

In at least one embodiment, multi-GPU computing system 2600 includes one or more graphics cores 2300.

In at least one embodiment, one or more systems depicted in FIG. 26 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 26 are utilized to perform operations discussed herein such as selectively using one or more neural network layers based, at least in part, on one or more iteratively increasing neural network performance metrics. In at least one embodiment, one or more systems depicted in FIG. 26 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 26 are utilized to implement one or more systems and/or processes such as those described in connection with FIGS. 1-11.

Figure 27:
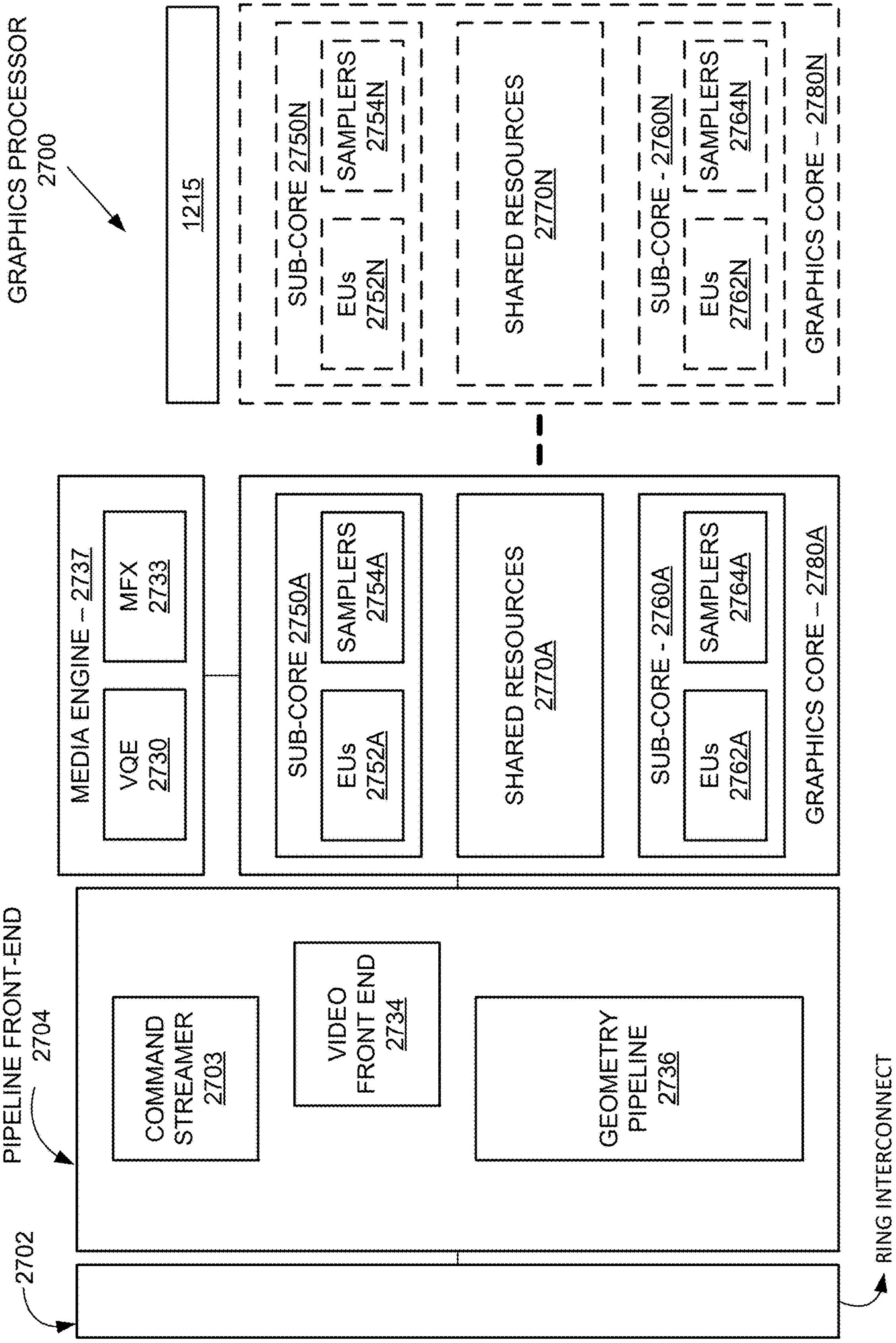
FIG. 27 illustrates a graphics processor, according to at least one embodiment.

FIG. 27 is a block diagram of a graphics processor 2700, according to at least one embodiment. In at least one embodiment, graphics processor 2700 includes a ring interconnect 2702, a pipeline front-end 2704, a media engine 2737, and graphics cores 2780A-2780N. In at least one embodiment, ring interconnect 2702 couples graphics processor 2700 to other processing units, including other graphics processors or one or more general-purpose processor cores. In at least one embodiment, graphics processor 2700 is one of many processors integrated within a multi-core processing system. In at least one embodiment, graphics processor 2700 includes graphics core 2300.

In at least one embodiment, graphics processor 2700 receives batches of commands via ring interconnect 2702. In at least one embodiment, incoming commands are interpreted by a command streamer 2703 in pipeline front-end 2704. In at least one embodiment, graphics processor 2700 includes scalable execution logic to perform 3D geometry processing and media processing via graphics core(s) 2780A-2780N. In at least one embodiment, for 3D geometry processing commands, command streamer 2703 supplies commands to geometry pipeline 2736. In at least one embodiment, for at least some media processing commands, command streamer 2703 supplies commands to a video front end 2734, which couples with media engine 2737. In at least one embodiment, media engine 2737 includes a Video Quality Engine (VQE) 2730 for video and image post-processing and a multi-format encode/decode (MFX) 2733 engine to provide hardware-accelerated media data encoding and decoding. In at least one embodiment, geometry pipeline 2736 and media engine 2737 each generate execution threads for thread execution resources provided by at least one graphics core 2780.

In at least one embodiment, graphics processor 2700 includes scalable thread execution resources featuring graphics cores 2780A-2780N (which can be modular and are sometimes referred to as core slices), each having multiple sub-cores 2750A-50N, 2760A-2760N (sometimes referred to as core sub-slices). In at least one embodiment, graphics processor 2700 can have any number of graphics cores 2780A. In at least one embodiment, graphics processor 2700 includes a graphics core 2780A having at least a first sub-core 2750A and a second sub-core 2760A. In at least one embodiment, graphics processor 2700 is a low power processor with a single sub-core (e.g., 2750A). In at least one embodiment, graphics processor 2700 includes multiple graphics cores 2780A-2780N, each including a set of first sub-cores 2750A-2750N and a set of second sub-cores 2760A-2760N. In at least one embodiment, each sub-core in first sub-cores 2750A-2750N includes at least a first set of execution units 2752A-2752N and media/texture samplers 2754A-2754N. In at least one embodiment, each sub-core in second sub-cores 2760A-2760N includes at least a second set of execution units 2762A-2762N and samplers 2764A-2764N. In at least one embodiment, each sub-core 2750A-2750N, 2760A-2760N shares a set of shared resources 2770A-2770N. In at least one embodiment, shared resources include shared cache memory and pixel operation logic. In at least one embodiment, graphics processor 2700 includes load/store units in pipeline front-end 2704.

Logic 1215 are used to perform inferencing and/or training operations associated with one or more embodiments. Details regarding logic 1215 are provided herein in conjunction with FIGS. 12A and/or 12B. In at least one embodiment, logic 1215 may be used in graphics processor 2700 for inferencing or predicting operations based, at least in part, on weight parameters calculated using neural network training operations, neural network functions and/or architectures, or neural network use cases described herein.

In at least one embodiment, one or more systems depicted in FIG. 27 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 27 are utilized to perform operations discussed herein such as selectively using one or more neural network layers based, at least in part, on one or more iteratively increasing neural network performance metrics. In at least one embodiment, one or more systems depicted in FIG. 27 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 27 are utilized to implement one or more systems and/or processes such as those described in connection with FIGS. 1-11.

Figure 28:
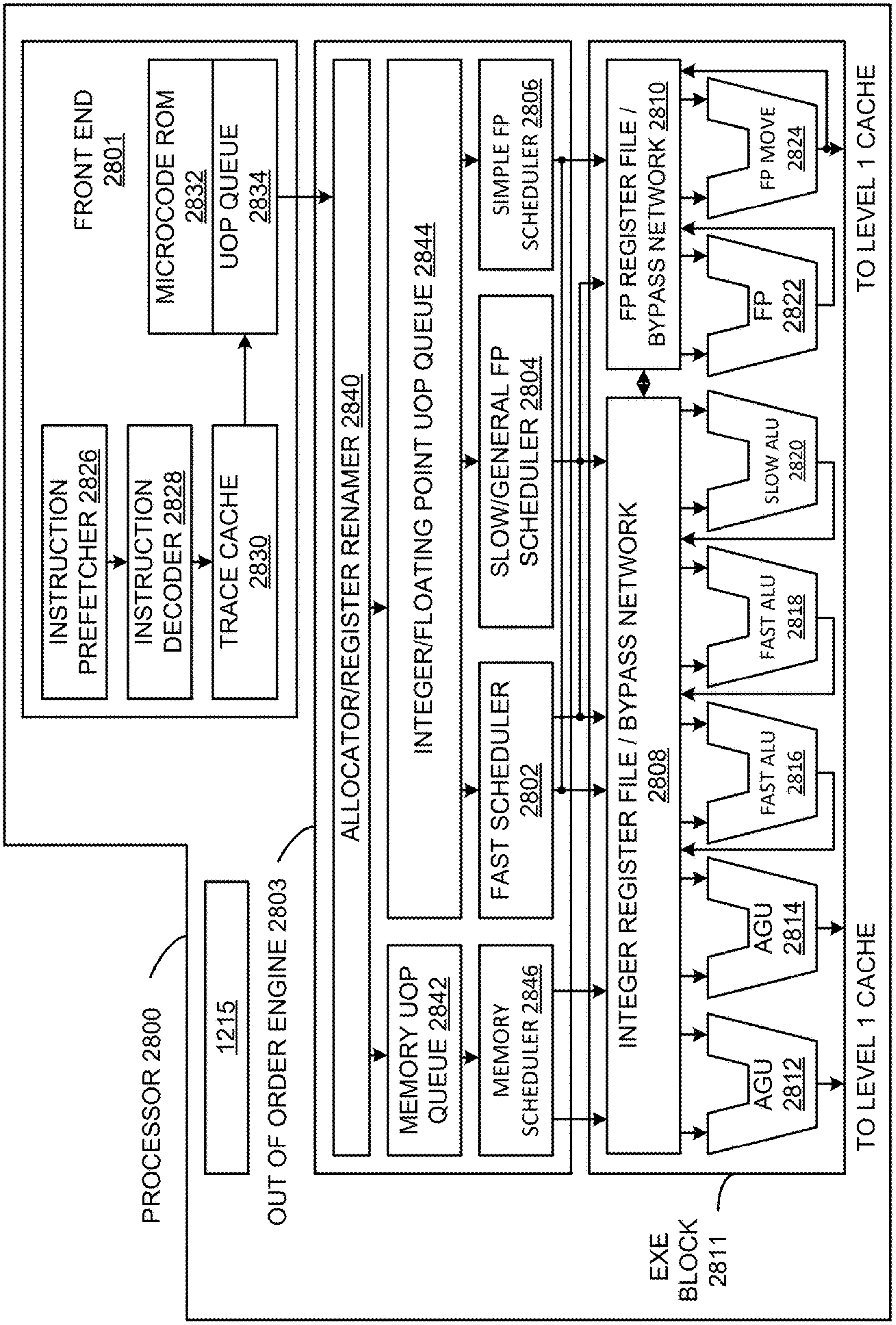
FIG. 28 is a block diagram illustrating a processor micro-architecture for a processor, according to at least one embodiment.

FIG. 28 is a block diagram illustrating micro-architecture for a processor 2800 that may include logic circuits to perform instructions, according to at least one embodiment. In at least one embodiment, processor 2800 may perform instructions, including x86 instructions, ARM instructions, specialized instructions for application-specific integrated circuits (ASICs), etc. In at least one embodiment, processor 2800 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 2800 may perform instructions to accelerate machine learning or deep learning algorithms, training, or inferencing.

In at least one embodiment, processor 2800 includes an in-order front end ("front end") 2801 to fetch instructions to be executed and prepare instructions to be used later in a processor pipeline. In at least one embodiment, front end 2801 may include several units. In at least one embodiment, an instruction prefetcher 2826 fetches instructions from memory and feeds instructions to an instruction decoder 2828 which in turn decodes or interprets instructions. For example, in at least one embodiment, instruction decoder 2828 decodes a received instruction into one or more operations called "micro-instructions" or "micro-operations" (also called "micro ops" or "uops" or "μ-ops") that a machine may execute. In at least one embodiment, instruction decoder 2828 parses an instruction into an opcode and corresponding data and control fields that may be used by micro-architecture to perform operations in accordance with at least one embodiment. In at least one embodiment, a trace cache 2830 may assemble decoded uops into program ordered sequences or traces in a uop queue 2834 for execution. In at least one embodiment, when trace cache 2830 encounters a complex instruction, a microcode ROM 2832 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2828 may access microcode ROM 2832 to perform that instruction. In at least one embodiment, an instruction may be decoded into a small number of micro-ops for processing at instruction decoder 2828. In at least one embodiment, an instruction may be stored within microcode ROM 2832 should a number of micro-ops be needed to accomplish such operation. In at least one embodiment, trace cache 2830 refers to an entry point programmable logic array ("PLA") to determine a correct micro-instruction pointer for reading microcode sequences to complete one or more instructions from microcode ROM 2832 in accordance with at least one embodiment. In at least one embodiment, after microcode ROM 2832 finishes sequencing micro-ops for an instruction, front end 2801 of a machine may resume fetching micro-ops from trace cache 2830.

In at least one embodiment, out-of-order execution engine ("out of order engine") 2803 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 2803 includes, without limitation, an allocator/register renamer 2840, a memory uop queue 2842, an integer/floating point uop queue 2844, a memory scheduler 2846, a fast scheduler 2802, a slow/general floating point scheduler ("slow/general FP scheduler") 2804, and a simple floating point scheduler ("simple FP scheduler") 2806. In at least one embodiment, fast schedule 2802, slow/general floating point scheduler 2804, and simple floating point scheduler 2806 are also collectively referred to herein as "uop schedulers 2802, 2804, 2806." In at least one embodiment, allocator/register renamer 2840 allocates machine buffers and resources that each uop needs in order to execute. In at least one embodiment, allocator/register renamer 2840 renames logic registers onto entries in a register file. In at least one embodiment, allocator/register renamer 2840 also allocates an entry for each uop in one of two uop queues, memory uop queue 2842 for memory operations and integer/floating point uop queue 2844 for non-memory operations, in front of memory scheduler 2846 and uop schedulers 2802, 2804, 2806. In at least one embodiment, uop schedulers 2802, 2804, 2806, determine when a uop is ready to execute based on readiness of their dependent input register operand sources and availability of execution resources uops need to complete their operation. In at least one embodiment, fast scheduler 2802 may schedule on each half of a main clock cycle while slow/general floating point scheduler 2804 and simple floating point scheduler 2806 may schedule once per main processor clock cycle. In at least one embodiment, uop schedulers 2802, 2804, 2806 arbitrate for dispatch ports to schedule uops for execution.

In at least one embodiment, execution block 2811 includes, without limitation, an integer register file/bypass network 2808, a floating point register file/bypass network ("FP register file/bypass network") 2810, address generation units ("AGUs") 2812 and 2814, fast Arithmetic Logic Units (ALUs) ("fast ALUs") 2816 and 2818, a slow Arithmetic Logic Unit ("slow ALU") 2820, a floating point ALU ("FP") 2822, and a floating point move unit ("FP move") 2824. In at least one embodiment, integer register file/bypass network 2808 and floating point register file/bypass network 2810 are also referred to herein as "register files 2808, 2810." In at least one embodiment, AGUSs 2812 and 2814, fast ALUs 2816 and 2818, slow ALU 2820, floating point ALU 2822, and floating point move unit 2824 are also referred to herein as "execution units 2812, 2814, 2816, 2818, 2820, 2822, and 2824." In at least one embodiment, execution block 2811 may include, without limitation, any number (including zero) and type of register files, bypass networks, address generation units, and execution units, in any combination.

In at least one embodiment, register networks 2808, 2810 may be arranged between uop schedulers 2802, 2804, 2806, and execution units 2812, 2814, 2816, 2818, 2820, 2822, and 2824. In at least one embodiment, integer register file/bypass network 2808 performs integer operations. In at least one embodiment, floating point register file/bypass network 2810 performs floating point operations. In at least one embodiment, each of register networks 2808, 2810 may include, without limitation, a bypass network that may bypass or forward just completed results that have not yet been written into a register file to new dependent uops. In at least one embodiment, register networks 2808, 2810 may communicate data with each other. In at least one embodiment, integer register file/bypass network 2808 may include, without limitation, two separate register files, one register file for a low-order thirty-two bits of data and a second register file for a high order thirty-two bits of data. In at least one embodiment, floating point register file/bypass network 2810 may include, without limitation, 128-bit wide entries because floating point instructions typically have operands from 64 to 128 bits in width.

In at least one embodiment, execution units 2812, 2814, 2816, 2818, 2820, 2822, 2824 may execute instructions. In at least one embodiment, register networks 2808, 2810 store integer and floating point data operand values that micro-instructions need to execute. In at least one embodiment, processor 2800 may include, without limitation, any number and combination of execution units 2812, 2814, 2816, 2818, 2820, 2822, 2824. In at least one embodiment, floating point ALU 2822 and floating point move unit 2824, may execute floating point, MMX, SIMD, AVX and SSE, or other operations, including specialized machine learning instructions. In at least one embodiment, floating point ALU 2822 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2816, 2818. In at least one embodiment, fast ALUS 2816, 2818 may execute fast operations with an effective latency of half a clock cycle. In at least one embodiment, most complex integer operations go to slow ALU 2820 as slow ALU 2820 may include, without limitation, integer execution hardware for long-latency type of operations, such as a multiplier, shifts, flag logic, and branch processing. In at least one embodiment, memory load/store operations may be executed by AGUs 2812, 2814. In at least one embodiment, fast ALU 2816, fast ALU 2818, and slow ALU 2820 may perform integer operations on 64-bit data operands. In at least one embodiment, fast ALU 2816, fast ALU 2818, and slow ALU 2820 may be implemented to support a variety of data bit sizes including sixteen, thirty-two, 128, 256, etc. In at least one embodiment, floating point ALU 2822 and floating point move unit 2824 may be implemented to support a range of operands having bits of various widths, such as 128-bit wide packed data operands in conjunction with SIMD and multimedia instructions.

In at least one embodiment, uop schedulers 2802, 2804, 2806 dispatch dependent operations before a parent load has finished executing. In at least one embodiment, as uops may be speculatively scheduled and executed in processor 2800, processor 2800 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, processor 2800 or each core of processor 2800 includes one or more prefetchers, one or more fetchers, one or more pre-decoders, one or more decoders to decode data (e.g., instructions), one or more instruction queues to process instructions (e.g., corresponding to operations or API calls), one or more micro-operation (μOP) cache to store μOPs, one or more micro-operation (μOP) queues, an in-order execution engine, one or more load buffers, one or more store buffers, one or more reorder buffers, one or more fill buffers, an out-of-order execution engine, one or more ports, one or more shift and/or shifter units, one or more fused multiply accumulate (FMA) units, one or more load and store units ("LSUs") to perform load of store operations corresponding to loading/storing data (e.g., instructions) to perform an operation (e.g., perform an API, an API call), one or more matrix multiply accumulate (MMA) units, and/or one or more shuffle units to perform any function further described herein with respect to said processor 2800. In at least one embodiment processor 2800 can access, use, perform, or execute instructions corresponding to calling an API.

In at least one embodiment, processor 2800 includes one or more ultra path interconnects (UPIs), e.g., that is a point-to-point processor interconnect; one or more PCIe's; one or more accelerators to accelerate computations or operations; and/or one or more memory controllers. In at least one embodiment, processor 2800 includes a shared last level cache (LLC) that is coupled to one or more memory controllers, which can enable shared memory access across processor cores.

In at least one embodiment, processor 2800 or a core of processor 2800 has a mesh architecture where processor cores, on-chip caches, memory controllers, and I/O controllers are organized in rows and columns, with wires and switches connecting them at each intersection to allow for turns. In at least one embodiment, processor 2800 has a one or more higher memory bandwidths (HMBs, e.g., HMBe) to store data or cache data, e.g., in Double Data Rate 5 Synchronous Dynamic Random-Access Memory (DDR5 SDRAM). In at least one embodiment, one or more components of processor 2800 are interconnected using compute express link (CXL) interconnects. In at least one embodiment, a memory controller uses a "least recently used" (LRU) approach to determine what gets stored in a cache. In at least one embodiment, processor 2800 includes one or more PCIe's (e.g., PCIe 5.0).

Logic 1215 are used to perform inferencing and/or training operations associated with one or more embodiments. Details regarding logic 1215 are provided herein in conjunction with FIGS. 12A and/or 12B. In at least one embodiment portions or all of logic 1215 may be incorporated into execution block 2811 and other memory or registers shown or not shown. For example, in at least one embodiment, training and/or inferencing techniques described herein may use one or more of ALUs illustrated in execution block 2811. Moreover, weight parameters may be stored in on-chip or off-chip memory and/or registers (shown or not shown) that configure ALUs of execution block 2811 to perform one or more machine learning algorithms, neural network architectures, use cases, or training techniques described herein.

In at least one embodiment, one or more systems depicted in FIG. 28 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 28 are utilized to perform operations discussed herein such as selectively using one or more neural network layers based, at least in part, on one or more iteratively increasing neural network performance metrics. In at least one embodiment, one or more systems depicted in FIG. 28 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 28 are utilized to implement one or more systems and/or processes such as those described in connection with FIGS. 1-11.

Figure 29:
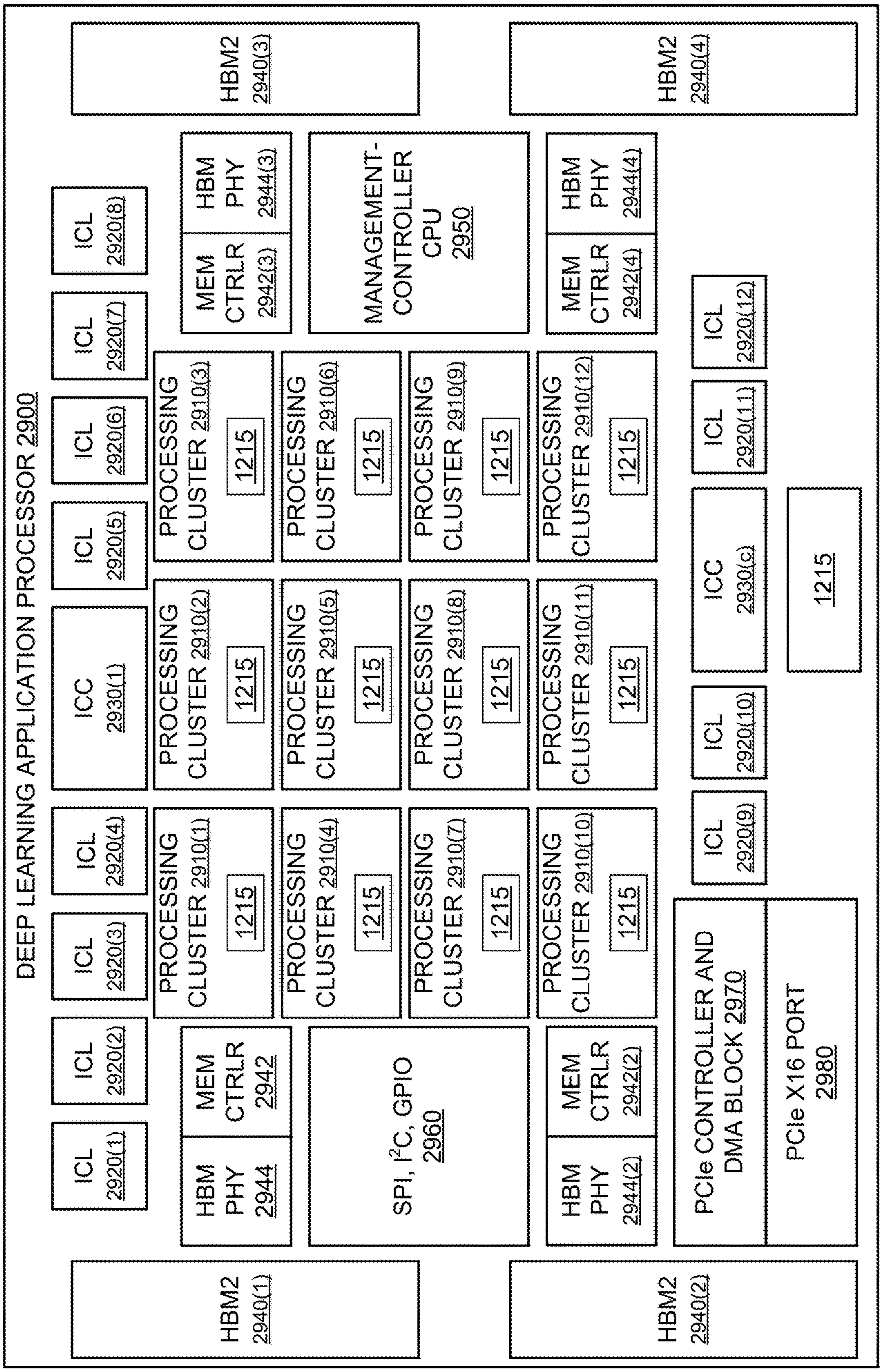
FIG. 29 illustrates a deep learning application processor, according to at least one embodiment.

FIG. 29 illustrates a deep learning application processor 2900, according to at least one embodiment. In at least one embodiment, deep learning application processor 2900 uses instructions that, if executed by deep learning application processor 2900, cause deep learning application processor 2900 to perform some or all of processes and techniques described throughout this disclosure. In at least one embodiment, deep learning application processor 2900 is an application-specific integrated circuit (ASIC). In at least one embodiment, application processor 2900 performs matrix multiply operations either "hard-wired" into hardware as a result of performing one or more instructions or both. In at least one embodiment, deep learning application processor 2900 includes, without limitation, processing clusters 2910(1)-2910(12), Inter-Chip Links ("ICLs") 2920(1)-2920(12), Inter-Chip Controllers ("ICCs") 2930(1)-2930(2), high-bandwidth memory second generation ("HBM2") 2940(1)-2940(4), memory controllers ("Mem Ctrlrs") 2942(1)-2942(4), high bandwidth memory physical layer ("HBM PHY") 2944(1)-2944(4), a management-controller central processing unit ("management-controller CPU") 2950, a Serial Peripheral Interface, Inter-Integrated Circuit, and General Purpose Input/Output block ("SPI, $I^2C$, GPIO") 2960, a peripheral component interconnect express controller and direct memory access block ("PCIe Controller and DMA") 2970, and a sixteen-lane peripheral component interconnect express port ("PCI Express x 16") 2980.

In at least one embodiment, processing clusters 2910 may perform deep learning operations, including inference or prediction operations based on weight parameters calculated one or more training techniques, including those described herein. In at least one embodiment, each processing cluster 2910 may include, without limitation, any number and type of processors. In at least one embodiment, deep learning application processor 2900 may include any number and type of processing clusters 2900. In at least one embodiment, Inter-Chip Links 2920 are bi-directional. In at least one embodiment, Inter-Chip Links 2920 and Inter-Chip Controllers 2930 enable multiple deep learning application processors 2900 to exchange information, including activation information resulting from performing one or more machine learning algorithms embodied in one or more neural networks. In at least one embodiment, deep learning application processor 2900 may include any number (including zero) and type of ICLs 2920 and ICCs 2930.

In at least one embodiment, HBM2 s 2940 provide a total of 32 Gigabytes (GB) of memory. In at least one embodiment, HBM2 2940(*i*) is associated with both memory controller 2942(*i*) and HBM PHY 2944(*i*) where "i" is an arbitrary integer. In at least one embodiment, any number of HBM2 s 2940 may provide any type and total amount of high bandwidth memory and may be associated with any number (including zero) and type of memory controllers 2942 and HBM PHYs 2944. In at least one embodiment, SPI, IC, GPIO 2960, PCIe Controller and DMA 2970, and/or PCIe 2980 may be replaced with any number and type of blocks that enable any number and type of communication standards in any technically feasible fashion.

Logic 1215 are used to perform inferencing and/or training operations associated with one or more embodiments. Details regarding logic 1215 are provided herein in conjunction with FIGS. 12A and/or 12B. In at least one embodiment, deep learning application processor is used to train a machine learning model, such as a neural network, to predict or infer information provided to deep learning application processor 2900. In at least one embodiment, deep learning application processor 2900 is used to infer or predict information based on a trained machine learning model (e.g., neural network) that has been trained by another processor or system or by deep learning application processor 2900. In at least one embodiment, processor 2900 may be used to perform one or more neural network use cases described herein.

In at least one embodiment, one or more systems depicted in FIG. 29 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 29 are utilized to perform operations discussed herein such as selectively using one or more neural network layers based, at least in part, on one or more iteratively increasing neural network performance metrics. In at least one embodiment, one or more systems depicted in FIG. 29 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 29 are utilized to implement one or more systems and/or processes such as those described in connection with FIGS. 1-11.

Figure 30:
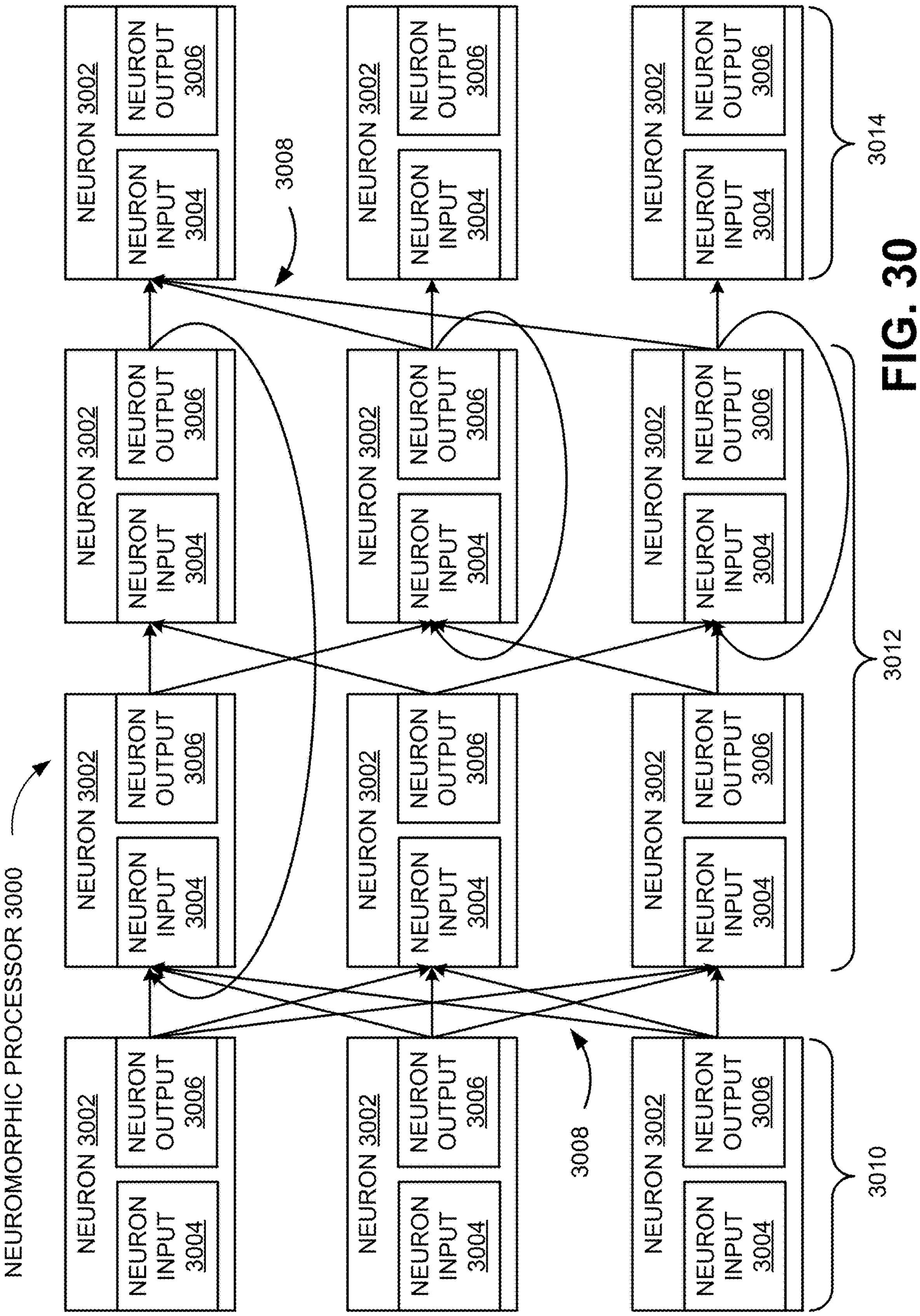
FIG. 30 is a block diagram illustrating an example neuromorphic processor, according to at least one embodiment.

FIG. 30 is a block diagram of a neuromorphic processor 3000, according to at least one embodiment. In at least one embodiment, neuromorphic processor 3000 may receive one or more inputs from sources external to neuromorphic processor 3000. In at least one embodiment, these inputs may be transmitted to one or more neurons 3002 within neuromorphic processor 3000. In at least one embodiment, neurons 3002 and components thereof may be implemented using circuitry or logic, including one or more arithmetic logic units (ALUs). In at least one embodiment, neuromorphic processor 3000 may include, without limitation, thousands or millions of instances of neurons 3002, but any suitable number of neurons 3002 may be used. In at least one embodiment, each instance of neuron 3002 may include a neuron input 3004 and a neuron output 3006. In at least one embodiment, neurons 3002 may generate outputs that may be transmitted to inputs of other instances of neurons 3002. For example, in at least one embodiment, neuron inputs 3004 and neuron outputs 3006 may be interconnected via synapses 3008.

In at least one embodiment, neurons 3002 and synapses 3008 may be interconnected such that neuromorphic processor 3000 operates to process or analyze information received by neuromorphic processor 3000. In at least one embodiment, neurons 3002 may transmit an output pulse (or "fire" or "spike") when inputs received through neuron input 3004 exceed a threshold. In at least one embodiment, neurons 3002 may sum or integrate signals received at neuron inputs 3004. For example, in at least one embodiment, neurons 3002 may be implemented as leaky integrate-and-fire neurons, wherein if a sum (referred to as a "membrane potential") exceeds a threshold value, neuron 3002 may generate an output (or "fire") using a transfer function such as a sigmoid or threshold function. In at least one embodiment, a leaky integrate-and-fire neuron may sum signals received at neuron inputs 3004 into a membrane potential and may also apply a decay factor (or leak) to reduce a membrane potential. In at least one embodiment, a leaky integrate-and-fire neuron may fire if multiple input signals are received at neuron inputs 3004 rapidly enough to exceed a threshold value (i.e., before a membrane potential decays too low to fire). In at least one embodiment, neurons 3002 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3002 may include, without limitation, comparator circuits or logic that generate an output spike at neuron output 3006 when result of applying a transfer function to neuron input 3004 exceeds a threshold. In at least one embodiment, once neuron 3002 fires, it may disregard previously received input information by, for example, resetting a membrane potential to 0 or another suitable default value. In at least one embodiment, once membrane potential is reset to 0, neuron 3002 may resume normal operation after a suitable period of time (or refractory period).

In at least one embodiment, neurons 3002 may be interconnected through synapses 3008. In at least one embodiment, synapses 3008 may operate to transmit signals from an output of a first neuron 3002 to an input of a second neuron 3002. In at least one embodiment, neurons 3002 may transmit information over more than one instance of synapse 3008. In at least one embodiment, one or more instances of neuron output 3006 may be connected, via an instance of synapse 3008, to an instance of neuron input 3004 in same neuron 3002. In at least one embodiment, an instance of neuron 3002 generating an output to be transmitted over an instance of synapse 3008 may be referred to as a "pre-synaptic neuron" with respect to that instance of synapse 3008. In at least one embodiment, an instance of neuron 3002 receiving an input transmitted over an instance of synapse 3008 may be referred to as a "post-synaptic neuron" with respect to that instance of synapse 3008. Because an instance of neuron 3002 may receive inputs from one or more instances of synapse 3008, and may also transmit outputs over one or more instances of synapse 3008, a single instance of neuron 3002 may therefore be both a "pre-synaptic neuron" and "post-synaptic neuron," with respect to various instances of synapses 3008, in at least one embodiment.

In at least one embodiment, neurons 3002 may be organized into one or more layers. In at least one embodiment, each instance of neuron 3002 may have one neuron output 3006 that may fan out through one or more synapses 3008 to one or more neuron inputs 3004. In at least one embodiment, neuron outputs 3006 of neurons 3002 in a first layer 3010 may be connected to neuron inputs 3004 of neurons 3002 in a second layer 3012. In at least one embodiment, layer 3010 may be referred to as a "feed-forward layer." In at least one embodiment, each instance of neuron 3002 in an instance of first layer 3010 may fan out to each instance of neuron 3002 in second layer 3012. In at least one embodiment, first layer 3010 may be referred to as a "fully connected feed-forward layer." In at least one embodiment, each instance of neuron 3002 in an instance of second layer 3012 may fan out to fewer than all instances of neuron 3002 in a third layer 3014. In at least one embodiment, second layer 3012 may be referred to as a "sparsely connected feed-forward layer." In at least one embodiment, neurons 3002 in second layer 3012 may fan out to neurons 3002 in multiple other layers, including to neurons 3002 also in second layer 3012. In at least one embodiment, second layer 3012 may be referred to as a "recurrent layer." In at least one embodiment, neuromorphic processor 3000 may include, without limitation, any suitable combination of recurrent layers and feed-forward layers, including, without limitation, both sparsely connected feed-forward layers and fully connected feed-forward layers.

In at least one embodiment, neuromorphic processor 3000 may include, without limitation, a reconfigurable interconnect architecture or dedicated hard-wired interconnects to connect synapse 3008 to neurons 3002. In at least one embodiment, neuromorphic processor 3000 may include, without limitation, circuitry or logic that allows synapses to be allocated to different neurons 3002 as needed based on neural network topology and neuron fan-in/out. For example, in at least one embodiment, synapses 3008 may be connected to neurons 3002 using an interconnect fabric, such as network-on-chip, or with dedicated connections. In at least one embodiment, synapse interconnections and components thereof may be implemented using circuitry or logic.

In at least one embodiment, one or more systems depicted in FIG. 30 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 30 are utilized to perform operations discussed herein such as selectively using one or more neural network layers based, at least in part, on one or more iteratively increasing neural network performance metrics. In at least one embodiment, one or more systems depicted in FIG. 30 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 30 are utilized to implement one or more systems and/or processes such as those described in connection with FIGS. 1-11.

Figure 31:
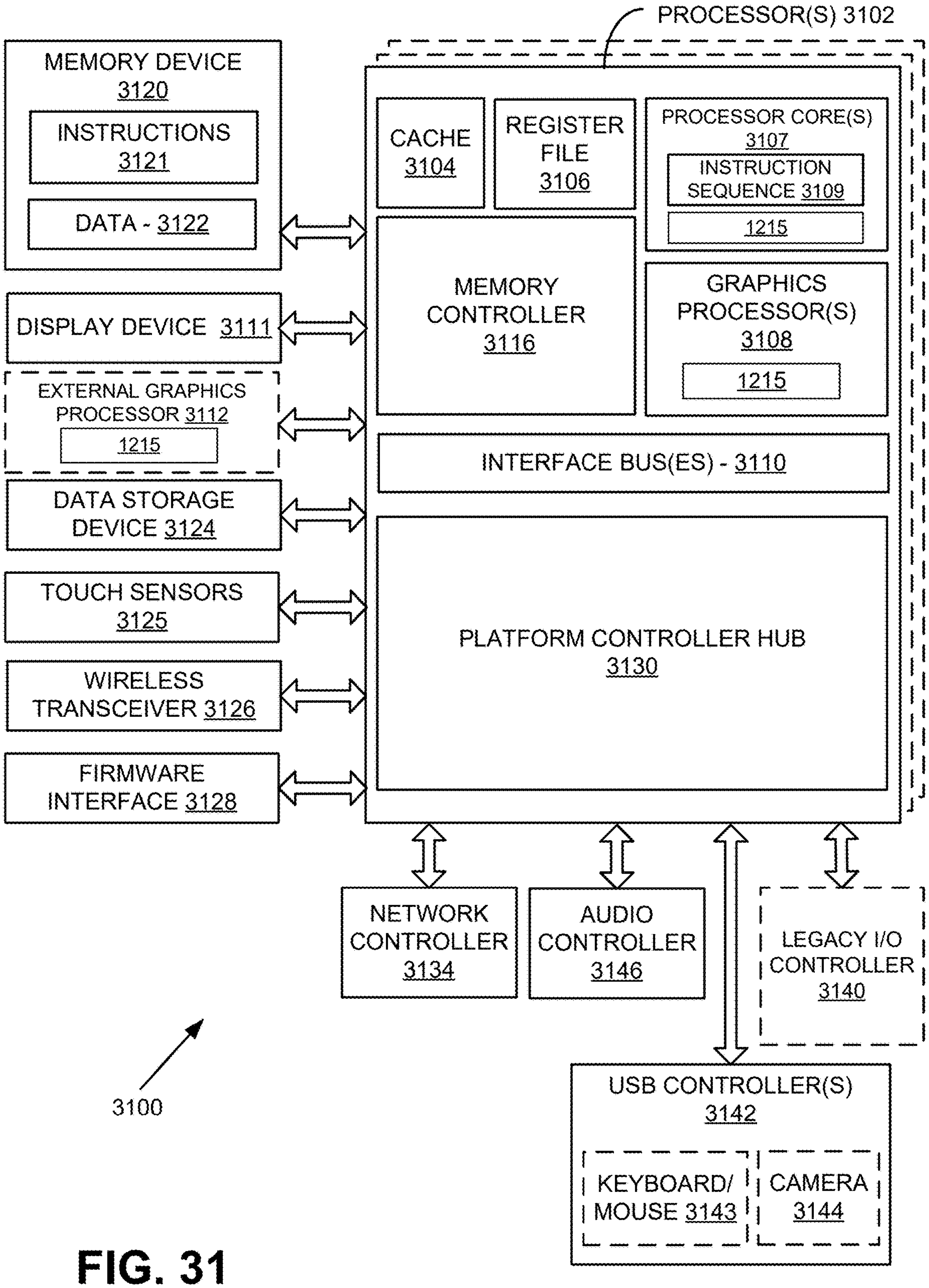
FIG. 31 illustrates at least portions of a graphics processor, according to one or more embodiments.

FIG. 31 is a block diagram of a processing system, according to at least one embodiment. In at least one embodiment, system 3100 includes one or more processors 3102 and one or more graphics processors 3108, and may be a single processor desktop system, a multiprocessor workstation system, or a server system having a large number of processors 3102 or processor cores 3107. In at least one embodiment, system 3100 is a processing platform incorporated within a system-on-a-chip (SoC) integrated circuit for use in mobile, handheld, or embedded devices. In at least one embodiment, one or more graphics processors 3108 include one or more graphics cores 2300.

In at least one embodiment, system 3100 can include, or be incorporated within a server-based gaming platform, a game console, including a game and media console, a mobile gaming console, a handheld game console, or an online game console. In at least one embodiment, system 3100 is a mobile phone, a smart phone, a tablet computing device or a mobile Internet device. In at least one embodiment, processing system 3100 can also include, couple with, or be integrated within a wearable device, such as a smart watch wearable device, a smart eyewear device, an augmented reality device, or a virtual reality device. In at least one embodiment, processing system 3100 is a television or set top box device having one or more processors 3102 and a graphical interface generated by one or more graphics processors 3108.

In at least one embodiment, one or more processors 3102 each include one or more processor cores 3107 to process instructions which, when executed, perform operations for system and user software. In at least one embodiment, each of one or more processor cores 3107 is configured to process a specific instruction sequence 3109. In at least one embodiment, instruction sequence 3109 may facilitate Complex Instruction Set Computing (CISC), Reduced Instruction Set Computing (RISC), or computing via a Very Long Instruction Word (VLIW). In at least one embodiment, processor cores 3107 may each process a different instruction sequence 3109, which may include instructions to facilitate emulation of other instruction sequences. In at least one embodiment, processor core 3107 may also include other processing devices, such a Digital Signal Processor (DSP).

In at least one embodiment, processor 3102 includes a cache memory 3104. In at least one embodiment, processor 3102 can have a single internal cache or multiple levels of internal cache. In at least one embodiment, cache memory is shared among various components of processor 3102. In at least one embodiment, processor 3102 also uses an external cache (e.g., a Level-3 (L3) cache or Last Level Cache (LLC)) (not shown), which may be shared among processor cores 3107 using known cache coherency techniques. In at least one embodiment, a register file 3106 is additionally included in processor 3102, which may include different types of registers for storing different types of data (e.g., integer registers, floating point registers, status registers, and an instruction pointer register). In at least one embodiment, register file 3106 may include general-purpose registers or other registers.

In at least one embodiment, one or more processor(s) 3102 are coupled with one or more interface bus(es) 3110 to transmit communication signals such as address, data, or control signals between processor 3102 and other components in system 3100. In at least one embodiment, interface bus 3110 can be a processor bus, such as a version of a Direct Media Interface (DMI) bus. In at least one embodiment, interface bus 3110 is not limited to a DMI bus, and may include one or more Peripheral Component Interconnect buses (e.g., PCI, PCI Express), memory busses, or other types of interface busses. In at least one embodiment processor(s) 3102 include an integrated memory controller 3116 and a platform controller hub 3130. In at least one embodiment, memory controller 3116 facilitates communication between a memory device and other components of system 3100, while platform controller hub (PCH) 3130 provides connections to I/O devices via a local I/O bus.

In at least one embodiment, a memory device 3120 can be a dynamic random access memory (DRAM) device, a static random access memory (SRAM) device, flash memory device, phase-change memory device, or some other memory device having suitable performance to serve as process memory. In at least one embodiment, memory device 3120 can operate as system memory for system 3100, to store data 3122 and instructions 3121 for use when one or more processors 3102 executes an application or process. In at least one embodiment, memory controller 3116 also couples with an optional external graphics processor 3112, which may communicate with one or more graphics processors 3108 in processors 3102 to perform graphics and media operations. In at least one embodiment, a display device 3111 can connect to processor(s) 3102. In at least one embodiment, display device 3111 can include one or more of an internal display device, as in a mobile electronic device or a laptop device, or an external display device attached via a display interface (e.g., DisplayPort, etc.). In at least one embodiment, display device 3111 can include a head mounted display (HMD) such as a stereoscopic display device for use in virtual reality (VR) applications or augmented reality (AR) applications.

In at least one embodiment, platform controller hub 3130 enables peripherals to connect to memory device 3120 and processor 3102 via a high-speed I/O bus. In at least one embodiment, I/O peripherals include, but are not limited to, an audio controller 3146, a network controller 3134, a firmware interface 3128, a wireless transceiver 3126, touch sensors 3125, a data storage device 3124 (e.g., hard disk drive, flash memory, etc.). In at least one embodiment, data storage device 3124 can connect via a storage interface (e.g., SATA) or via a peripheral bus, such as a Peripheral Component Interconnect bus (e.g., PCI, PCI Express). In at least one embodiment, touch sensors 3125 can include touch screen sensors, pressure sensors, or fingerprint sensors. In at least one embodiment, wireless transceiver 3126 can be a Wi-Fi transceiver, a Bluetooth transceiver, or a mobile network transceiver such as a 3G, 4G, or Long Term Evolution (LTE) transceiver. In at least one embodiment, firmware interface 3128 enables communication with system firmware, and can be, for example, a unified extensible firmware interface (UEFI). In at least one embodiment, network controller 3134 can enable a network connection to a wired network. In at least one embodiment, a high-performance network controller (not shown) couples with interface bus 3110.

In at least one embodiment, audio controller 3146 is a multi-channel high definition audio controller. In at least one embodiment, system 3100 includes an optional legacy I/O controller 3140 for coupling legacy (e.g., Personal System 2 (PS/2)) devices to system 3100. In at least one embodiment, platform controller hub 3130 can also connect to one or more Universal Serial Bus (USB) controllers 3142 connect input devices, such as keyboard and mouse 3143 combinations, a camera 3144, or other USB input devices.

In at least one embodiment, an instance of memory controller 3116 and platform controller hub 3130 may be integrated into a discreet external graphics processor, such as external graphics processor 3112. In at least one embodiment, platform controller hub 3130 and/or memory controller 3116 may be external to one or more processor(s) 3102. For example, in at least one embodiment, system 3100 can include an external memory controller 3116 and platform controller hub 3130, which may be configured as a memory controller hub and peripheral controller hub within a system chipset that is in communication with processor(s) 3102.

Logic 1215 are used to perform inferencing and/or training operations associated with one or more embodiments. Details regarding logic 1215 are provided herein in conjunction with FIGS. 12A and/or 12B. In at least one embodiment portions or all of logic 1215 may be incorporated into graphics processor 3108. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of graphics processor 3108 to perform one or more machine learning algorithms, neural network architectures, use cases, or training techniques described herein.

In at least one embodiment, one or more systems depicted in FIG. 31 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 31 are utilized to perform operations discussed herein such as selectively using one or more neural network layers based, at least in part, on one or more iteratively increasing neural network performance metrics. In at least one embodiment, one or more systems depicted in FIG. 31 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 31 are utilized to implement one or more systems and/or processes such as those described in connection with FIGS. 1-11.

Figure 32:
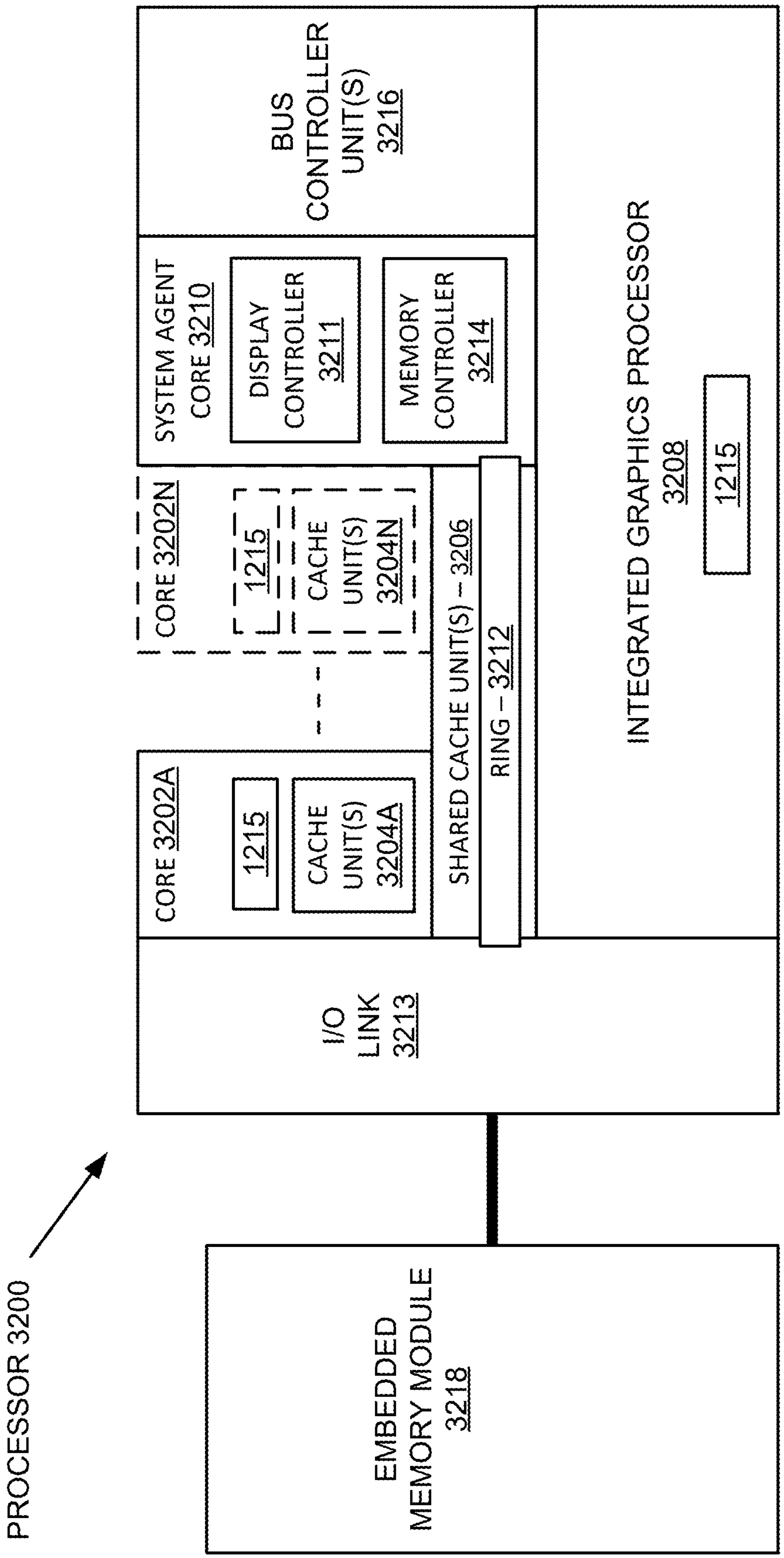
FIG. 32 illustrates at least portions of a graphics processor, according to one or more embodiments.

FIG. 32 is a block diagram of a processor 3200 having one or more processor cores 3202A-3202N, an integrated memory controller 3214, and an integrated graphics processor 3208, according to at least one embodiment. In at least one embodiment, processor 3200 can include additional cores up to and including additional core 3202N represented by dashed lined boxes. In at least one embodiment, each of processor cores 3202A-3202N includes one or more internal cache units 3204A-3204N. In at least one embodiment, each processor core also has access to one or more shared cached units 3206. In at least one embodiment, graphics processor 3208 includes one or more graphics cores 2300.

In at least one embodiment, internal cache units 3204A-3204N and shared cache units 3206 represent a cache memory hierarchy within processor 3200. In at least one embodiment, cache memory units 3204A-3204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3206 and 3204A-3204N.

In at least one embodiment, processor 3200 may also include a set of one or more bus controller units 3216 and a system agent core 3210. In at least one embodiment, bus controller units 3216 manage a set of peripheral buses, such as one or more PCI or PCI express busses. In at least one embodiment, system agent core 3210 provides management functionality for various processor components. In at least one embodiment, system agent core 3210 includes one or more integrated memory controllers 3214 to manage access to various external memory devices (not shown).

In at least one embodiment, one or more of processor cores 3202A-3202N include support for simultaneous multi-threading. In at least one embodiment, system agent core 3210 includes components for coordinating and operating cores 3202A-3202N during multi-threaded processing. In at least one embodiment, system agent core 3210 may additionally include a power control unit (PCU), which includes logic and components to regulate one or more power states of processor cores 3202A-3202N and graphics processor 3208.

In at least one embodiment, processor 3200 additionally includes graphics processor 3208 to execute graphics processing operations. In at least one embodiment, graphics processor 3208 couples with shared cache units 3206, and system agent core 3210, including one or more integrated memory controllers 3214. In at least one embodiment, system agent core 3210 also includes a display controller 3211 to drive graphics processor output to one or more coupled displays. In at least one embodiment, display controller 3211 may also be a separate module coupled with graphics processor 3208 via at least one interconnect, or may be integrated within graphics processor 3208.

In at least one embodiment, a ring-based interconnect unit 3212 is used to couple internal components of processor 3200. In at least one embodiment, an alternative interconnect unit may be used, such as a point-to-point interconnect, a switched interconnect, or other techniques. In at least one embodiment, graphics processor 3208 couples with ring interconnect 3212 via an I/O link 3213.

In at least one embodiment, I/O link 3213 represents at least one of multiple varieties of I/O interconnects, including an on package I/O interconnect which facilitates communication between various processor components and a high-performance embedded memory module 3218, such as an eDRAM module. In at least one embodiment, each of processor cores 3202A-3202N and graphics processor 3208 use embedded memory module 3218 as a shared Last Level Cache.

In at least one embodiment, processor cores 3202A-3202N are homogeneous cores executing a common instruction set architecture. In at least one embodiment, processor cores 3202A-3202N are heterogeneous in terms of instruction set architecture (ISA), where one or more of processor cores 3202A-3202N execute a common instruction set, while one or more other cores of processor cores 3202A-3202N executes a subset of a common instruction set or a different instruction set. In at least one embodiment, processor cores 3202A-3202N are heterogeneous in terms of microarchitecture, where one or more cores having a relatively higher power consumption couple with one or more power cores having a lower power consumption. In at least one embodiment, processor 3200 can be implemented on one or more chips or as an SoC integrated circuit.

Logic 1215 are used to perform inferencing and/or training operations associated with one or more embodiments. Details regarding logic 1215 are provided herein in conjunction with FIGS. 12A and/or 12B. In at least one embodiment portions or all of logic 1215 may be incorporated into graphics processor 3208. For example, in at least one embodiment, training and/or inferencing techniques described herein may use one or more of ALUs embodied in a 3D pipeline, graphics core(s) 3202, shared function logic, or other logic in FIG. 32. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of processor 3200 to perform one or more machine learning algorithms, neural network architectures, use cases, or training techniques described herein.

In at least one embodiment, one or more systems depicted in FIG. 32 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 32 are utilized to perform operations discussed herein such as selectively using one or more neural network layers based, at least in part, on one or more iteratively increasing neural network performance metrics. In at least one embodiment, one or more systems depicted in FIG. 32 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 32 are utilized to implement one or more systems and/or processes such as those described in connection with FIGS. 1-11.

Figure 33:
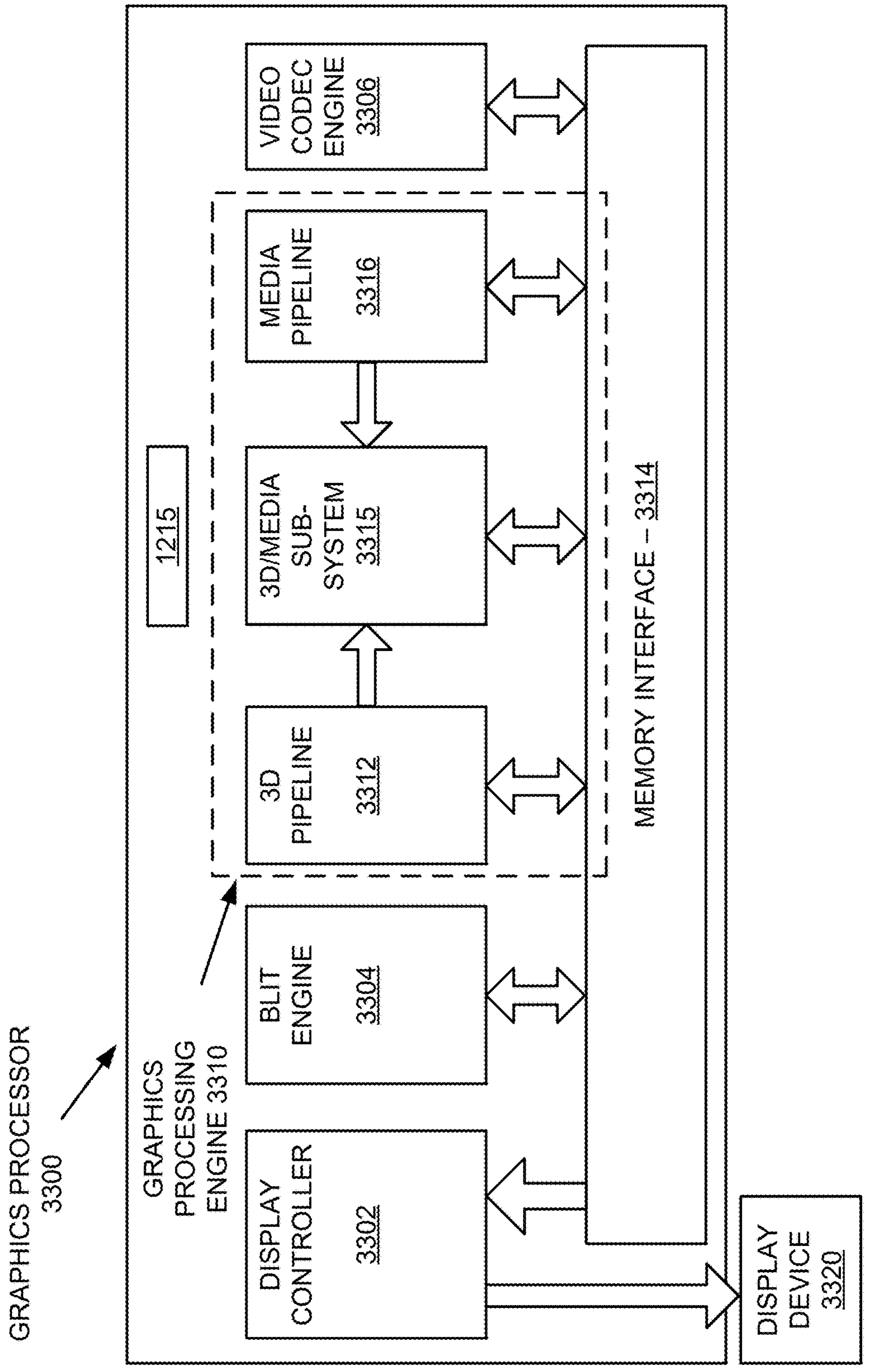
FIG. 33 illustrates at least portions of a graphics processor, according to one or more embodiments.

FIG. 33 is a block diagram of a graphics processor 3300, which may be a discrete graphics processing unit, or may be a graphics processor integrated with a plurality of processing cores. In at least one embodiment, graphics processor 3300 communicates via a memory mapped I/O interface to registers on graphics processor 3300 and with commands placed into memory. In at least one embodiment, graphics processor 3300 includes a memory interface 3314 to access memory. In at least one embodiment, memory interface 3314 is an interface to local memory, one or more internal caches, one or more shared external caches, and/or to system memory. In at least one embodiment, graphics processor 3300 includes graphics core 2300.

In at least one embodiment, graphics processor 3300 also includes a display controller 3302 to drive display output data to a display device 3320. In at least one embodiment, display controller 3302 includes hardware for one or more overlay planes for display device 3320 and composition of multiple layers of video or user interface elements. In at least one embodiment, display device 3320 can be an internal or external display device. In at least one embodiment, display device 3320 is a head mounted display device, such as a virtual reality (VR) display device or an augmented reality (AR) display device. In at least one embodiment, graphics processor 3300 includes a video codec engine 3306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3300 includes a block image transfer (BLIT) engine 3304 to perform two-dimensional (2D) rasterizer operations including, for example, bit-boundary block transfers. However, in at least one embodiment, 2D graphics operations are performed using one or more components of a graphics processing engine (GPE) 3310. In at least one embodiment, GPE 3310 is a compute engine for performing graphics operations, including three-dimensional (3D) graphics operations and media operations.

In at least one embodiment, GPE 3310 includes a 3D pipeline 3312 for performing 3D operations, such as rendering three-dimensional images and scenes using processing functions that act upon 3D primitive shapes (e.g., rectangle, triangle, etc.). In at least one embodiment, 3D pipeline 3312 includes programmable and fixed function elements that perform various tasks and/or spawn execution threads to a 3D/Media sub-system 3315. While 3D pipeline 3312 can be used to perform media operations, in at least one embodiment, GPE 3310 also includes a media pipeline 3316 that is used to perform media operations, such as video post-processing and image enhancement.

In at least one embodiment, media pipeline 3316 includes fixed function or programmable logic units to perform one or more specialized media operations, such as video decode acceleration, video de-interlacing, and video encode acceleration in place of, or on behalf of, video codec engine 3306. In at least one embodiment, media pipeline 3316 additionally includes a thread spawning unit to spawn threads for execution on 3D/Media sub-system 3315. In at least one embodiment, spawned threads perform computations for media operations on one or more graphics execution units included in 3D/Media sub-system 3315.

In at least one embodiment, 3D/Media subsystem 3315 includes logic for executing threads spawned by 3D pipeline 3312 and media pipeline 3316. In at least one embodiment, 3D pipeline 3312 and media pipeline 3316 send thread execution requests to 3D/Media subsystem 3315, which includes thread dispatch logic for arbitrating and dispatching various requests to available thread execution resources. In at least one embodiment, execution resources include an array of graphics execution units to process 3D and media threads. In at least one embodiment, 3D/Media subsystem 3315 includes one or more internal caches for thread instructions and data. In at least one embodiment, subsystem 3315 also includes shared memory, including registers and addressable memory, to share data between threads and to store output data.

Logic 1215 are used to perform inferencing and/or training operations associated with one or more embodiments. Details regarding logic 1215 are provided herein in conjunction with FIGS. 12A and/or 12B. In at least one embodiment portions or all of logic 1215 may be incorporated into graphics processor 3300. For example, in at least one embodiment, training and/or inferencing techniques described herein may use one or more of ALUs embodied in 3D pipeline 3312. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of graphics processor 3300 to perform one or more machine learning algorithms, neural network architectures, use cases, or training techniques described herein.

In at least one embodiment, one or more systems depicted in FIG. 33 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 33 are utilized to perform operations discussed herein such as selectively using one or more neural network layers based, at least in part, on one or more iteratively increasing neural network performance metrics. In at least one embodiment, one or more systems depicted in FIG. 33 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 33 are utilized to implement one or more systems and/or processes such as those described in connection with FIGS. 1-11.

Figure 34:
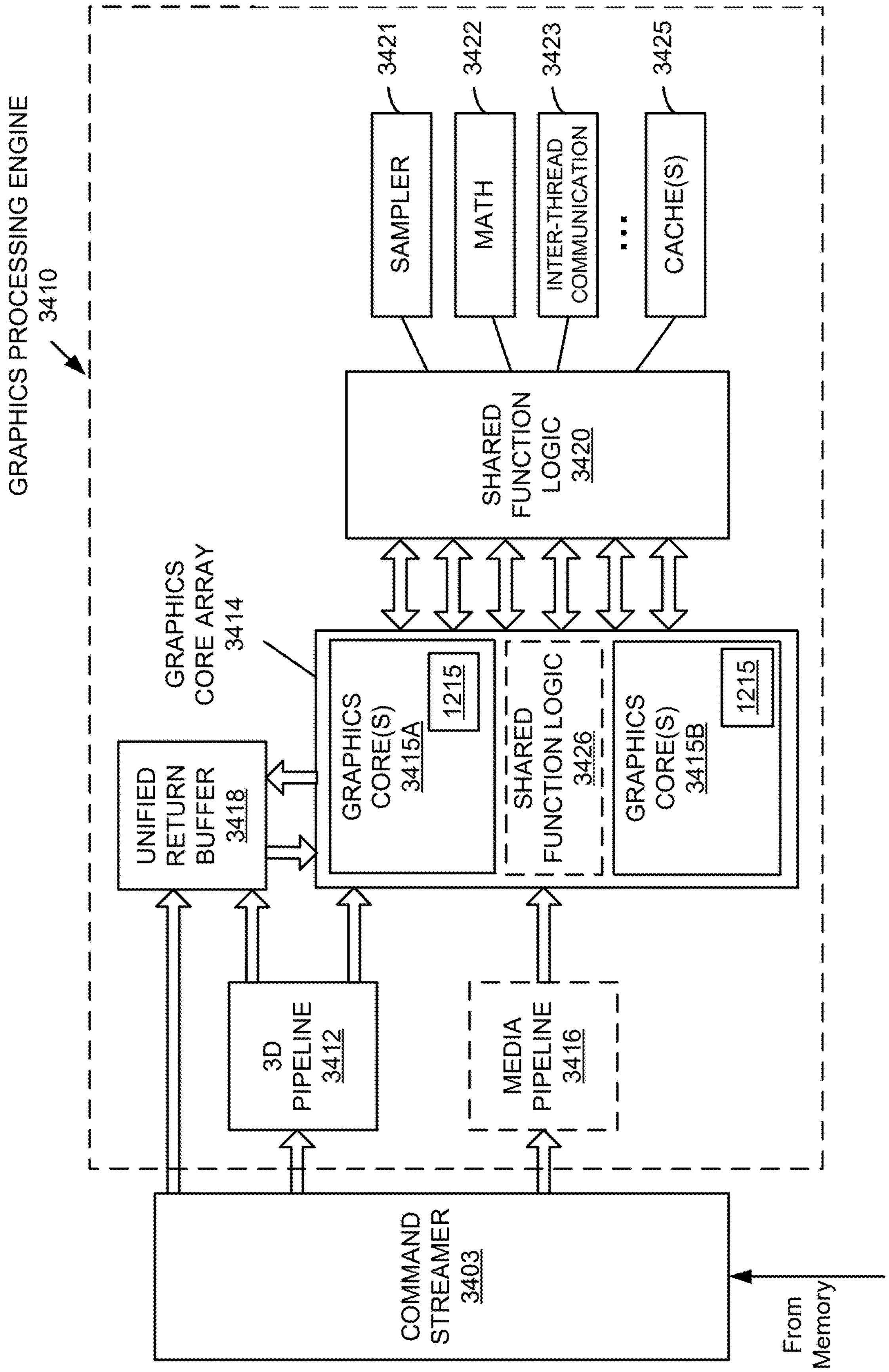
FIG. 34 is a block diagram of a graphics processing engine of a graphics processor in accordance with at least one embodiment.

FIG. 34 is a block diagram of a graphics processing engine 3410 of a graphics processor in accordance with at least one embodiment. In at least one embodiment, graphics processing engine (GPE) 3410 is a version of GPE 3310 shown in FIG. 33. In at least one embodiment, a media pipeline 3416 is optional and may not be explicitly included within GPE 3410. In at least one embodiment, a separate media and/or image processor is coupled to GPE 3410.

In at least one embodiment, GPE 3410 is coupled to or includes a command streamer 3403, which provides a command stream to a 3D pipeline 3412 and/or media pipeline 3416. In at least one embodiment, command streamer 3403 is coupled to memory, which can be system memory, or one or more of internal cache memory and shared cache memory. In at least one embodiment, command streamer 3403 receives commands from memory and sends commands to 3D pipeline 3412 and/or media pipeline 3416. In at least one embodiment, commands are instructions, primitives, or micro-operations fetched from a ring buffer, which stores commands for 3D pipeline 3412 and media pipeline 3416. In at least one embodiment, a ring buffer can additionally include batch command buffers storing batches of multiple commands. In at least one embodiment, commands for 3D pipeline 3412 can also include references to data stored in memory, such as, but not limited to, vertex and geometry data for 3D pipeline 3412 and/or image data and memory objects for media pipeline 3416. In at least one embodiment, 3D pipeline 3412 and media pipeline 3416 process commands and data by performing operations or by dispatching one or more execution threads to a graphics core array 3414. In at least one embodiment, graphics core array 3414 includes one or more blocks of graphics cores (e.g., graphics core(s) 3415A, graphics core(s) 3415B), each block including one or more graphics cores. In at least one embodiment, graphics core(s) 3415A, 3415B may be referred to as execution units ("EUs"). In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1215 in FIG. 12A and FIG. 12B.

In at least one embodiment, 3D pipeline 3412 includes fixed function and programmable logic to process one or more shader programs, such as vertex shaders, geometry shaders, pixel shaders, fragment shaders, compute shaders, or other shader programs, by processing instructions and dispatching execution threads to graphics core array 3414. In at least one embodiment, graphics core array 3414 provides a unified block of execution resources for use in processing shader programs. In at least one embodiment, a multi-purpose execution logic (e.g., execution units) within graphics core(s) 3415A-3415B of graphic core array 3414 includes support for various 3D API shader languages and can execute multiple simultaneous execution threads associated with multiple shaders.

In at least one embodiment, graphics core array 3414 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3414 can output data to memory in a unified return buffer (URB) 3418. In at least one embodiment, URB 3418 can store data for multiple threads. In at least one embodiment, URB 3418 may be used to send data between different threads executing on graphics core array 3414. In at least one embodiment, URB 3418 may additionally be used for synchronization between threads on graphics core array 3414 and fixed function logic within shared function logic 3420.

In at least one embodiment, graphics core array 3414 is scalable, such that graphics core array 3414 includes a variable number of graphics cores, each having a variable number of execution units based on a target power and performance level of GPE 3410. In at least one embodiment, execution resources are dynamically scalable, such that execution resources may be enabled or disabled as needed.

In at least one embodiment, graphics core array 3414 is coupled to shared function logic 3420 that includes multiple resources that are shared between graphics cores in graphics core array 3414. In at least one embodiment, shared functions performed by shared function logic 3420 are embodied in hardware logic units that provide specialized supplemental functionality to graphics core array 3414. In at least one embodiment, shared function logic 3420 includes but is not limited to a sampler unit 3421, a math unit 3422, and inter-thread communication (ITC) logic 3423. In at least one embodiment, one or more cache(s) 3425 are included in, or coupled to, shared function logic 3420.

In at least one embodiment, a shared function is used if demand for a specialized function is insufficient for inclusion within graphics core array 3414. In at least one embodiment, a single instantiation of a specialized function is used in shared function logic 3420 and shared among other execution resources within graphics core array 3414. In at least one embodiment, specific shared functions within shared function logic 3420 that are used extensively by graphics core array 3414 may be included within shared function logic 3426 within graphics core array 3414. In at least one embodiment, shared function logic 3426 within graphics core array 3414 can include some or all logic within shared function logic 3420. In at least one embodiment, all logic elements within shared function logic 3420 may be duplicated within shared function logic 3426 of graphics core array 3414. In at least one embodiment, shared function logic 3420 is excluded in favor of shared function logic 3426 within graphics core array 3414.

Logic 1215 are used to perform inferencing and/or training operations associated with one or more embodiments. Details regarding logic 1215 are provided herein in conjunction with FIGS. 12A and/or 12B. In at least one embodiment portions or all of logic 1215 may be incorporated into graphics processor 3410. For example, in at least one embodiment, training and/or inferencing techniques described herein may use one or more of ALUs embodied in 3D pipeline 3412, graphics core(s) 3415, shared function logic 3426, shared function logic 3420, or other logic in FIG. 34. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of graphics processor 3410 to perform one or more machine learning algorithms, neural network architectures, use cases, or training techniques described herein.

In at least one embodiment, one or more systems depicted in FIG. 34 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 34 are utilized to perform operations discussed herein such as selectively using one or more neural network layers based, at least in part, on one or more iteratively increasing neural network performance metrics. In at least one embodiment, one or more systems depicted in FIG. 34 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 34 are utilized to implement one or more systems and/or processes such as those described in connection with FIGS. 1-11.

Figure 35:
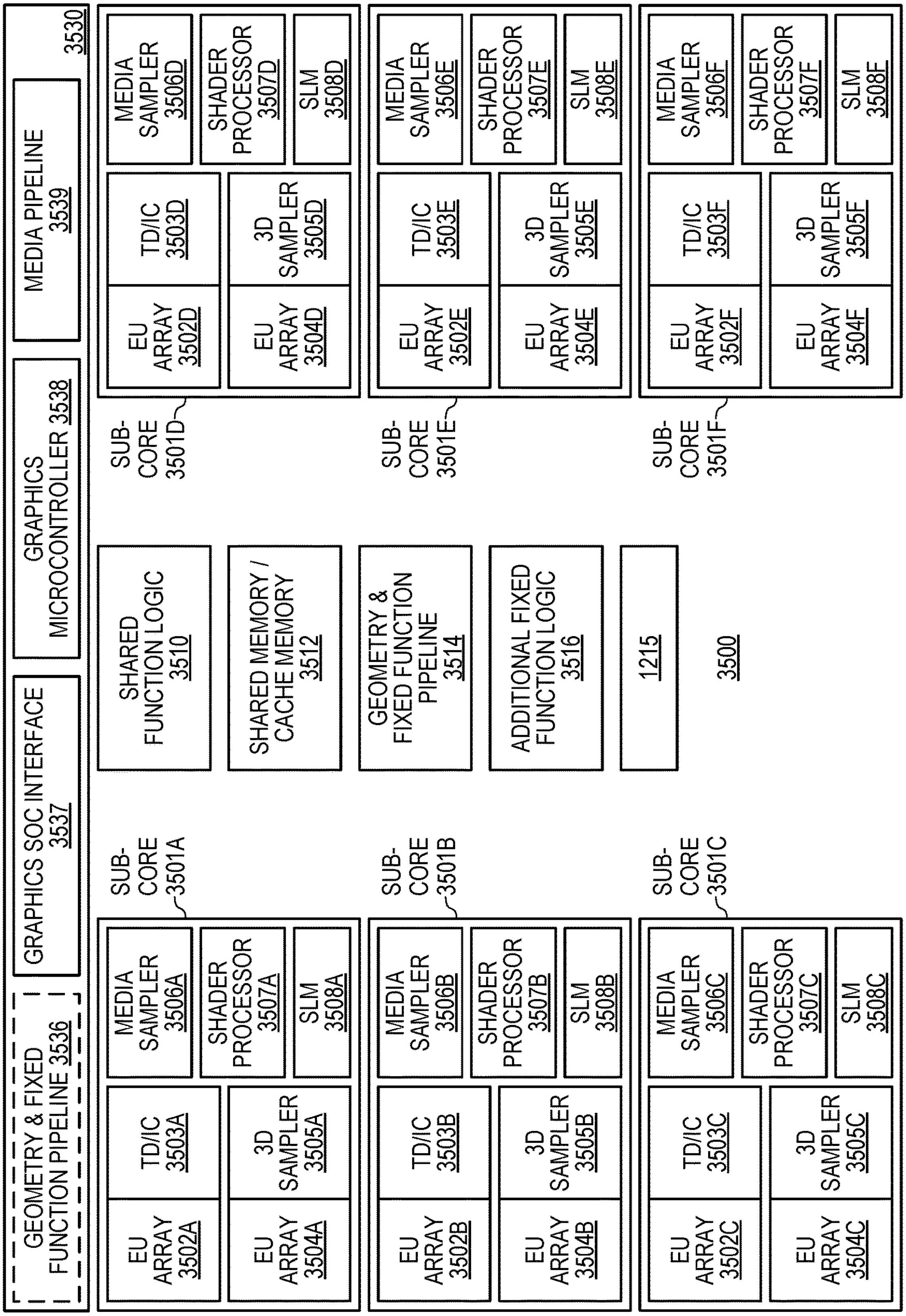
FIG. 35 is a block diagram of at least portions of a graphics processor core, according to at least one embodiment.

FIG. 35 is a block diagram of hardware logic of a graphics processor core 3500, according to at least one embodiment described herein. In at least one embodiment, graphics processor core 3500 includes graphics core 2300. In at least one embodiment, graphics processor core 3500 is included within a graphics core array. In at least one embodiment, graphics processor core 3500, sometimes referred to as a core slice, can be one or multiple graphics cores within a modular graphics processor. In at least one embodiment, graphics processor core 3500 is exemplary of one graphics core slice, and a graphics processor as described herein may include multiple graphics core slices based on target power and performance envelopes. In at least one embodiment, each graphics core 3500 can include a fixed function block 3530 coupled with multiple sub-cores 3501A-3501F, also referred to as sub-slices, that include modular blocks of general-purpose and fixed function logic.

In at least one embodiment, fixed function block 3530 includes a geometry and fixed function pipeline 3536 that can be shared by all sub-cores in graphics processor 3500, for example, in lower performance and/or lower power graphics processor implementations. In at least one embodiment, geometry and fixed function pipeline 3536 includes a 3D fixed function pipeline, a video front-end unit, a thread spawner and thread dispatcher, and a unified return buffer manager, which manages unified return buffers.

In at least one embodiment, fixed function block 3530 also includes a graphics SoC interface 3537, a graphics microcontroller 3538, and a media pipeline 3539. In at least one embodiment, graphics SoC interface 3537 provides an interface between graphics core 3500 and other processor cores within a system on a chip integrated circuit. In at least one embodiment, graphics microcontroller 3538 is a programmable sub-processor that is configurable to manage various functions of graphics processor 3500, including thread dispatch, scheduling, and pre-emption. In at least one embodiment, media pipeline 3539 includes logic to facilitate decoding, encoding, pre-processing, and/or post-processing of multimedia data, including image and video data. In at least one embodiment, media pipeline 3539 implements media operations via requests to compute or sampling logic within sub-cores 3501A-3501F.

In at least one embodiment, SoC interface 3537 enables graphics core 3500 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3537 can also enable communication with fixed function devices within an SoC, such as camera imaging pipelines, and enables use of and/or implements global memory atomics that may be shared between graphics core 3500 and CPUs within an SoC. In at least one embodiment, graphics SoC interface 3537 can also implement power management controls for graphics processor core 3500 and enable an interface between a clock domain of graphics processor core 3500 and other clock domains within an SoC. In at least one embodiment, SoC interface 3537 enables receipt of command buffers from a command streamer and global thread dispatcher that are configured to provide commands and instructions to each of one or more graphics cores within a graphics processor. In at least one embodiment, commands and instructions can be dispatched to media pipeline 3539, when media operations are to be performed, or a geometry and fixed function pipeline (e.g., geometry and fixed function pipeline 3536, and/or a geometry and fixed function pipeline 3514) when graphics processing operations are to be performed.

In at least one embodiment, graphics microcontroller 3538 can be configured to perform various scheduling and management tasks for graphics core 3500. In at least one embodiment, graphics microcontroller 3538 can perform graphics and/or compute workload scheduling on various graphics parallel engines within execution unit (EU) arrays 3502A-3502F, 3504A-3504F within sub-cores 3501A-3501F. In at least one embodiment, host software executing on a CPU core of an SoC including graphics core 3500 can submit workloads to one of multiple graphic processor paths, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3538 can also facilitate low-power or idle states for graphics core 3500, providing graphics core 3500 with an ability to save and restore registers within graphics core 3500 across low-power state transitions independently from an operating system and/or graphics driver software on a system.

In at least one embodiment, graphics core 3500 may have greater than or fewer than illustrated sub-cores 3501A-3501F, up to N modular sub-cores. For each set of N sub-cores, in at least one embodiment, graphics core 3500 can also include shared function logic 3510, shared and/or cache memory 3512, geometry/fixed function pipeline 3514, as well as additional fixed function logic 3516 to accelerate various graphics and compute processing operations. In at least one embodiment, shared function logic 3510 can include logic units (e.g., sampler, math, and/or inter-thread communication logic) that can be shared by each N sub-cores within graphics core 3500. In at least one embodiment, shared and/or cache memory 3512 can be a last-level cache for N sub-cores 3501A-3501F within graphics core 3500 and can also serve as shared memory that is accessible by multiple sub-cores. In at least one embodiment, geometry/fixed function pipeline 3514 can be included instead of geometry/fixed function pipeline 3536 within fixed function block 3530 and can include similar logic units.

In at least one embodiment, graphics core 3500 includes additional fixed function logic 3516 that can include various fixed function acceleration logic for use by graphics core 3500. In at least one embodiment, additional fixed function logic 3516 includes an additional geometry pipeline for use in position-only shading. In position-only shading, at least two geometry pipelines exist, whereas in a full geometry pipeline within geometry and fixed function pipelines 3514, 3536, and a cull pipeline, which is an additional geometry pipeline that may be included within additional fixed function logic 3516. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3516 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3516 can also include machine-learning acceleration logic, such as fixed function matrix multiplication logic, for implementations including optimizations for machine learning training or inferencing.

In at least one embodiment, within each graphics sub-core 3501A-3501F includes a set of execution resources that may be used to perform graphics, media, and compute operations in response to requests by graphics pipeline, media pipeline, or shader programs. In at least one embodiment, graphics sub-cores 3501A-3501F include multiple EU arrays 3502A-3502F, 3504A-3504F, thread dispatch and inter-thread communication (TD/IC) logic 3503A-3503F, a 3D (e.g., texture) sampler 3505A-3505F, a media sampler 3506A-3506F, a shader processor 3507A-3507F, and shared local memory (SLM) 3508A-3508F. In at least one embodiment, EU arrays 3502A-3502F, 3504A-3504F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3503A-3503F performs local thread dispatch and thread control operations for execution units within a sub-core and facilitates communication between threads executing on execution units of a sub-core. In at least one embodiment, 3D samplers 3505A-3505F can read texture or other 3D graphics related data into memory. In at least one embodiment, 3D samplers can read texture data differently based on a configured sample state and texture format associated with a given texture. In at least one embodiment, media samplers 3506A-3506F can perform similar read operations based on a type and format associated with media data. In at least one embodiment, each graphics sub-core 3501A-3501F can alternately include a unified 3D and media sampler. In at least one embodiment, threads executing on execution units within each of sub-cores 3501A-3501F can make use of shared local memory 3508A-3508F within each sub-core, to enable threads executing within a thread group to execute using a common pool of on-chip memory.

Logic 1215 are used to perform inferencing and/or training operations associated with one or more embodiments. Details regarding logic 1215 are provided herein in conjunction with FIGS. 12A and/or 12B. In at least one embodiment, portions or all of logic 1215 may be incorporated into graphics processor 3500. For example, in at least one embodiment, training and/or inferencing techniques described herein may use one or more of ALUs embodied in a 3D pipeline, graphics microcontroller 3538, geometry and fixed function pipeline 3514 and 3536, or other logic in FIG. 35. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs of graphics processor 3500 to perform one or more machine learning algorithms, neural network architectures, use cases, or training techniques described herein.

In at least one embodiment, one or more systems depicted in FIG. 35 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 35 are utilized to perform operations discussed herein such as selectively using one or more neural network layers based, at least in part, on one or more iteratively increasing neural network performance metrics. In at least one embodiment, one or more systems depicted in FIG. 35 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 35 are utilized to implement one or more systems and/or processes such as those described in connection with FIGS. 1-11.

Figure 36A:
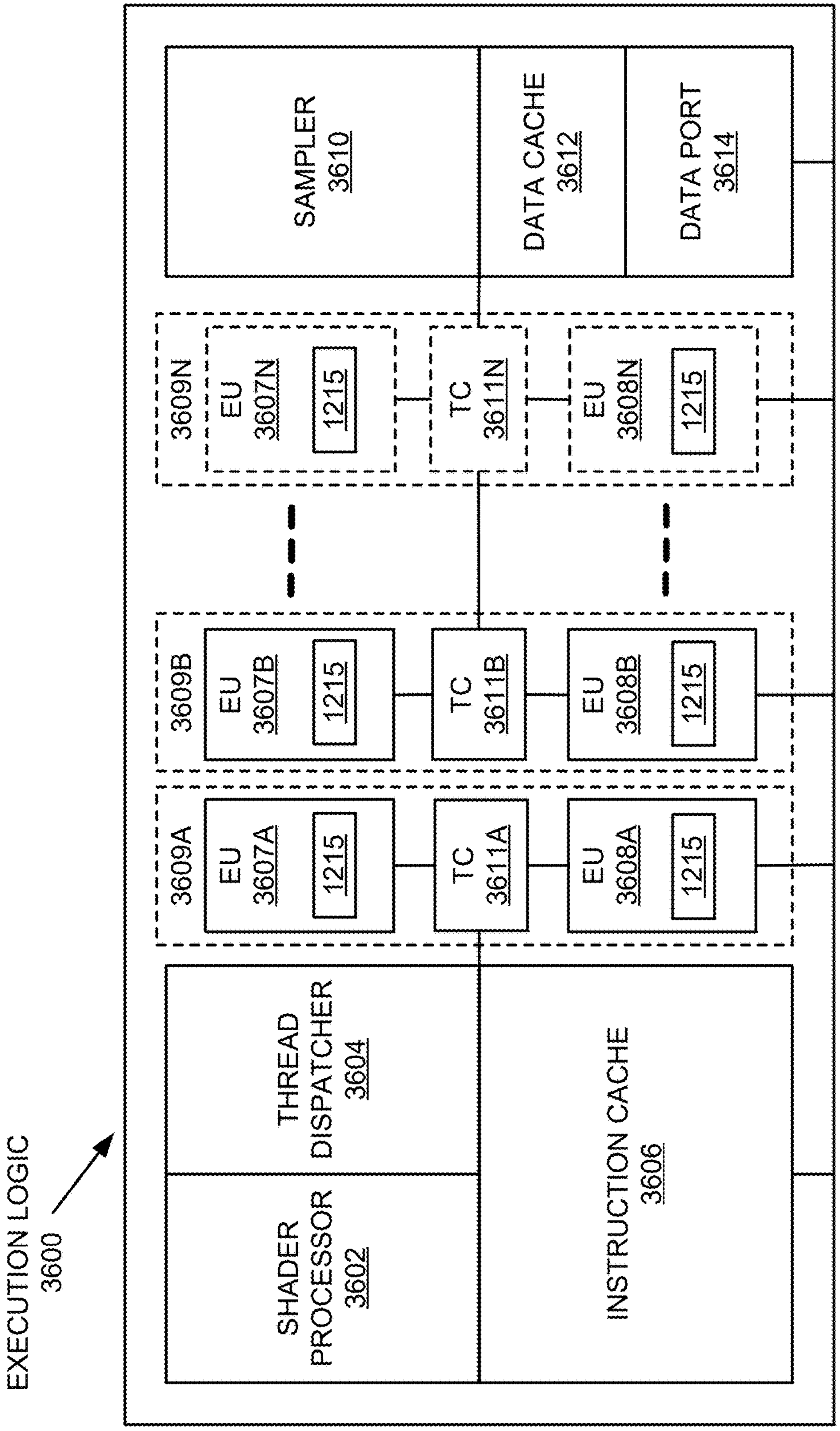
FIGS. 36A-36B illustrate thread execution logic including an array of processing elements of a graphics processor core according to at least one embodiment.
Figure 36B:
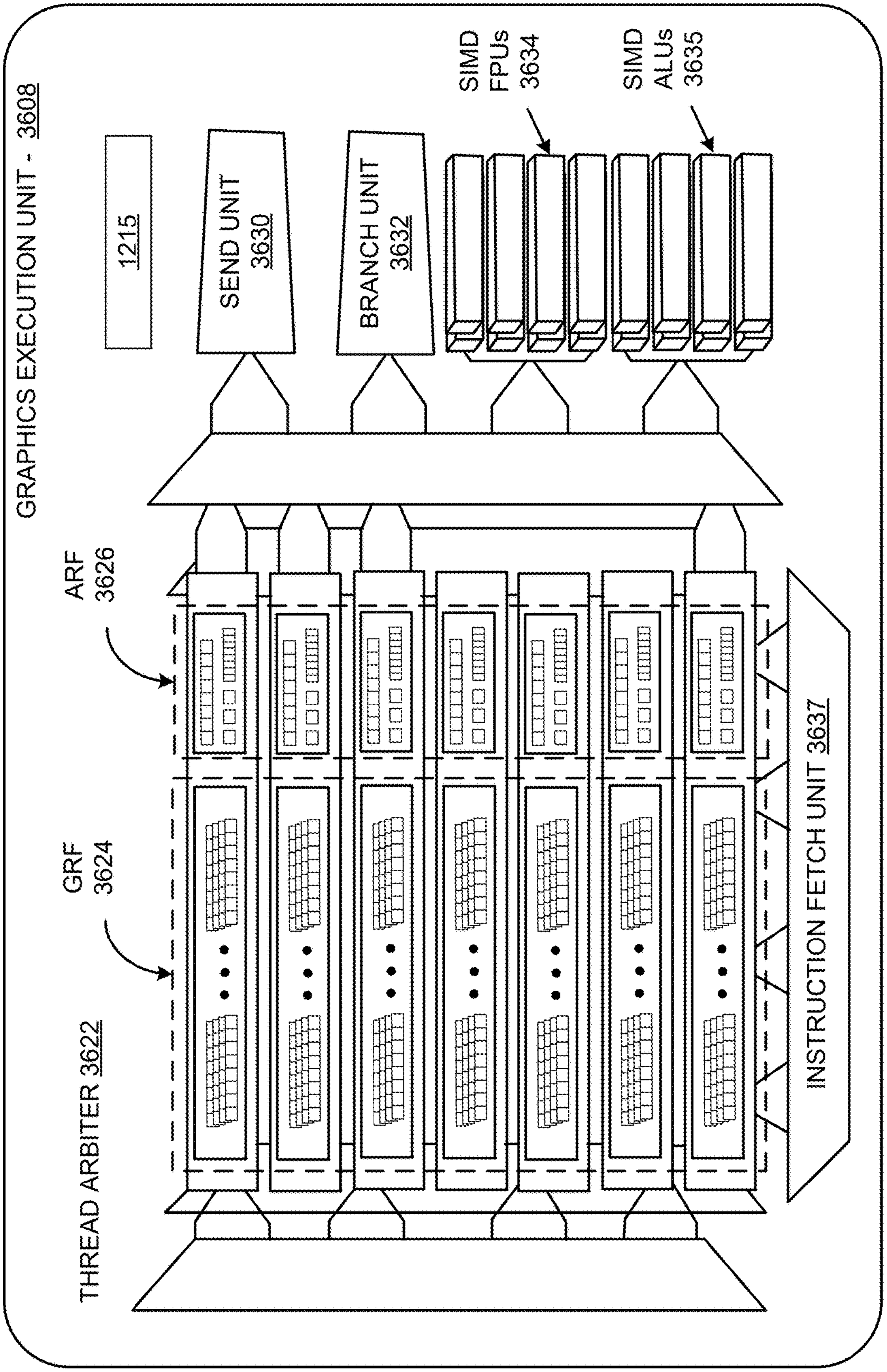

FIGS. 36A-36B illustrate thread execution logic 3600 including an array of processing elements of a graphics processor core according to at least one embodiment. FIG. 36A illustrates at least one embodiment, in which thread execution logic 3600 is used. FIG. 36B illustrates exemplary internal details of a graphics execution unit 3608, according to at least one embodiment.

As illustrated in FIG. 36A, in at least one embodiment, thread execution logic 3600 includes a shader processor 3602, a thread dispatcher 3604, an instruction cache 3606, a scalable execution unit array including a plurality of execution units 3607A-3607N and 3608A-3608N, a sampler 3610, a data cache 3612, and a data port 3614. In at least one embodiment, a scalable execution unit array can dynamically scale by enabling or disabling one or more execution units (e.g., any of execution unit 3608A-N or 3607A-N) based on computational requirements of a workload, for example. In at least one embodiment, scalable execution units are interconnected via an interconnect fabric that links to each execution unit. In at least one embodiment, thread execution logic 3600 includes one or more connections to memory, such as system memory or cache memory, through one or more of instruction cache 3606, data port 3614, sampler 3610, and execution units 3607 or 3608. In at least one embodiment, each execution unit (e.g., 3607A) is a stand-alone programmable general-purpose computational unit that is capable of executing multiple simultaneous hardware threads while processing multiple data elements in parallel for each thread. In at least one embodiment, array of execution units 3607 and/or 3608 is scalable to include any number individual execution units.

In at least one embodiment, execution units 3607 and/or 3608 are primarily used to execute shader programs. In at least one embodiment, shader processor 3602 can process various shader programs and dispatch execution threads associated with shader programs via a thread dispatcher 3604. In at least one embodiment, thread dispatcher 3604 includes logic to arbitrate thread initiation requests from graphics and media pipelines and instantiate requested threads on one or more execution units in execution units 3607 and/or 3608. For example, in at least one embodiment, a geometry pipeline can dispatch vertex, tessellation, or geometry shaders to thread execution logic for processing. In at least one embodiment, thread dispatcher 3604 can also process runtime thread spawning requests from executing shader programs.

In at least one embodiment, execution units 3607 and/or 3608 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 3607 and/or 3608, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3607 and/or 3608 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3607 and/or 3608 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 3607 and/or 3608 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3609A-3609N having thread control logic (3611A-3611N) that is common to fused EUs such as execution unit 3607A fused with execution unit 3608A into fused execution unit 3609A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 3609A-3609N includes at least two execution units. For example, in at least one embodiment, fused execution unit 3609A includes a first EU 3607A, second EU 3608A, and thread control logic 3611A that is common to first EU 3607A and second EU 3608A. In at least one embodiment, thread control logic 3611A controls threads executed on fused graphics execution unit 3609A, allowing each EU within fused execution units 3609A-3609N to execute using a common instruction pointer register.

In at least one embodiment, one or more internal instruction caches (e.g., 3606) are included in thread execution logic 3600 to cache thread instructions for execution units. In at least one embodiment, one or more data caches (e.g., 3612) are included to cache thread data during thread execution. In at least one embodiment, sampler 3610 is included to provide texture sampling for 3D operations and media sampling for media operations. In at least one embodiment, sampler 3610 includes specialized texture or media sampling functionality to process texture or media data during sampling process before providing sampled data to an execution unit.

During execution, in at least one embodiment, graphics and media pipelines send thread initiation requests to thread execution logic 3600 via thread spawning and dispatch logic. In at least one embodiment, once a group of geometric objects has been processed and rasterized into pixel data, pixel processor logic (e.g., pixel shader logic, fragment shader logic, etc.) within shader processor 3602 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 3602 then executes an application programming interface (API)-supplied pixel or fragment shader program. In at least one embodiment, to execute a shader program, shader processor 3602 dispatches threads to an execution unit (e.g., 3608A) via thread dispatcher 3604. In at least one embodiment, shader processor 3602 uses texture sampling logic in sampler 3610 to access texture data in texture maps stored in memory. In at least one embodiment, arithmetic operations on texture data and input geometry data compute pixel color data for each geometric fragment, or discards one or more pixels from further processing.

In at least one embodiment, data port 3614 provides a memory access mechanism for thread execution logic 3600 to output processed data to memory for further processing on a graphics processor output pipeline. In at least one embodiment, data port 3614 includes or couples to one or more cache memories (e.g., data cache 3612) to cache data for memory access via a data port.

As illustrated in FIG. 36B, in at least one embodiment, a graphics execution unit 3608 can include an instruction fetch unit 3637, a general register file array (GRF) 3624, an architectural register file array (ARF) 3626, a thread arbiter 3622, a send unit 3630, a branch unit 3632, a set of SIMD floating point units (FPUs) 3634, and a set of dedicated integer SIMD ALUs 3635. In at least one embodiment, GRF 3624 and ARF 3626 includes a set of general register files and architecture register files associated with each simultaneous hardware thread that may be active in graphics execution unit 3608. In at least one embodiment, per thread architectural state is maintained in ARF 3626, while data used during thread execution is stored in GRF 3624. In at least one embodiment, execution state of each thread, including instruction pointers for each thread, can be held in thread-specific registers in ARF 3626.

In at least one embodiment, graphics execution unit 3608 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3608 can co-issue multiple instructions, which may each be different instructions. In at least one embodiment, thread arbiter 3622 of graphics execution unit thread 3608 can dispatch instructions to one of send unit 3630, branch unit 3632, or SIMD FPU(s) 3634 for execution. In at least one embodiment, each execution thread can access 128 general-purpose registers within GRF 3624, where each register can store 32 bytes, accessible as a SIMD 8-element vector of 32-bit data elements. In at least one embodiment, each execution unit thread has access to 4 kilobytes within GRF 3624, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 3624 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 3630. In at least one embodiment, branch instructions are dispatched to branch unit 3632 to facilitate SIMD divergence and eventual convergence.

In at least one embodiment, graphics execution unit 3608 includes one or more SIMD floating point units (FPU(s)) 3634 to perform floating-point operations. In at least one embodiment, FPU(s) 3634 also support integer computation. In at least one embodiment, FPU(s) 3634 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 3635 are also present, and may be specifically optimized to perform operations associated with machine learning computations.

In at least one embodiment, arrays of multiple instances of graphics execution unit 3608 can be instantiated in a graphics sub-core grouping (e.g., a sub-slice). In at least one embodiment, execution unit 3608 can execute instructions across a plurality of execution channels. In at least one embodiment, each thread executed on graphics execution unit 3608 is executed on a different channel.

Logic 1215 are used to perform inferencing and/or training operations associated with one or more embodiments. Details regarding logic 1215 are provided herein in conjunction with FIGS. 12A and/or 12B. In at least one embodiment, portions or all of logic 1215 may be incorporated into thread execution logic 3600. Moreover, in at least one embodiment, inferencing and/or training operations described herein may be done using logic other than logic illustrated in FIG. 12A or 12B. In at least one embodiment, weight parameters may be stored in on-chip or off-chip memory and/or registers (shown or not shown) that configure ALUs thread of execution logic 3600 to perform one or more machine learning algorithms, neural network architectures, use cases, or training techniques described herein.

In at least one embodiment, one or more systems depicted in FIGS. 36A-36B are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 36A-36B are utilized to perform operations discussed herein such as selectively using one or more neural network layers based, at least in part, on one or more iteratively increasing neural network performance metrics. In at least one embodiment, one or more systems depicted in FIGS. 36A-36B are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 36A-36B are utilized to implement one or more systems and/or processes such as those described in connection with FIGS. 1-11.

Figure 37:
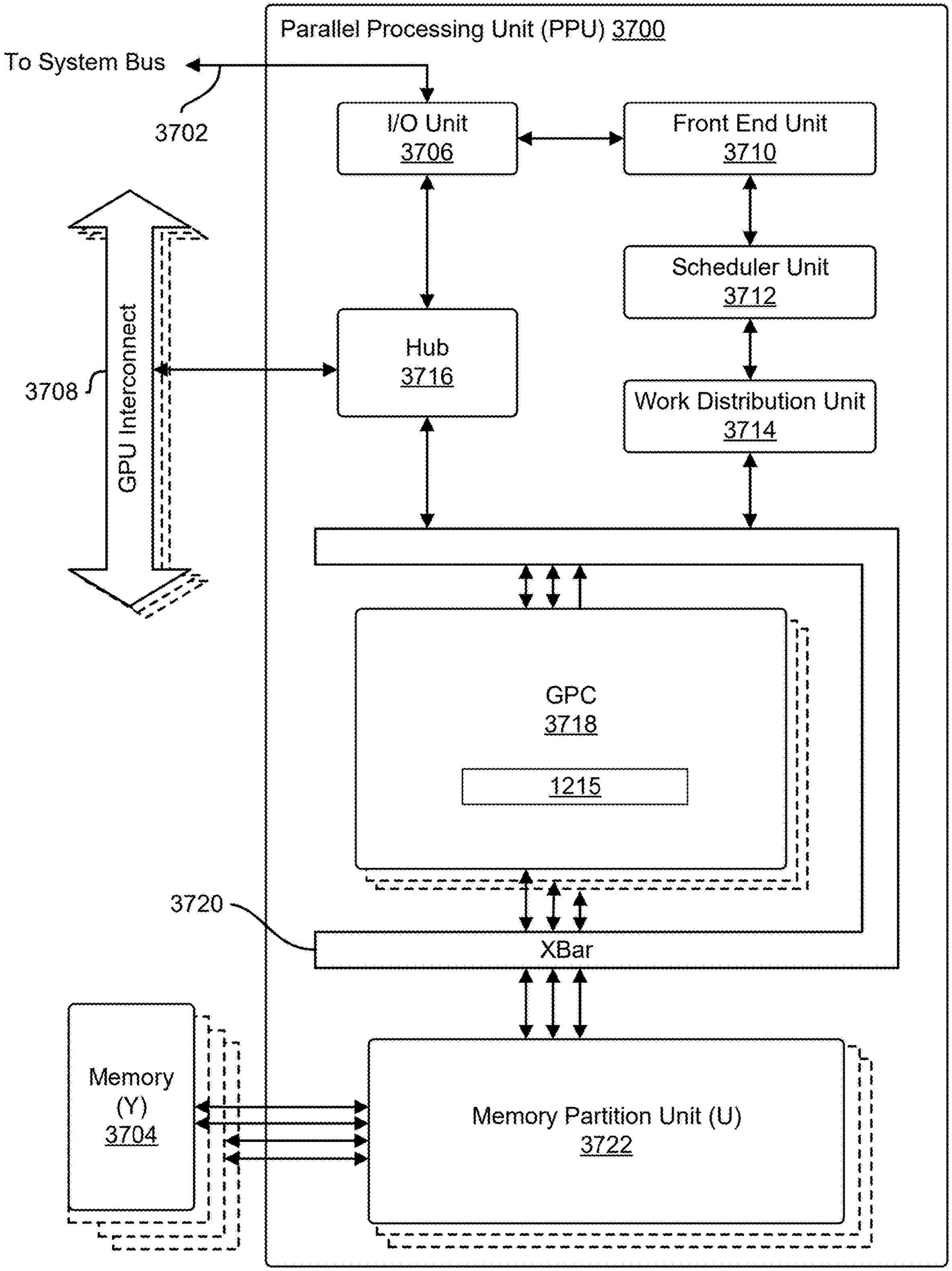
FIG. 37 illustrates a parallel processing unit ("PPU"), according to at least one embodiment.

FIG. 37 illustrates a parallel processing unit ("PPU") 3700, according to at least one embodiment. In at least one embodiment, PPU 3700 is configured with machine-readable code that, if executed by PPU 3700, causes PPU 3700 to perform some or all of processes and techniques described throughout this disclosure. In at least one embodiment, PPU 3700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, PPU 3700 includes one or more graphics cores 2300 In at least one embodiment, a thread refers to a thread of execution and is an instantiation of a set of instructions configured to be executed by PPU 3700. In at least one embodiment, PPU 3700 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3700 is utilized to perform computations such as linear algebra operations and machine-learning operations. FIG. 37 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3700 are configured to accelerate High Performance Computing ("HPC"), data center, and machine learning applications. In at least one embodiment, PPU 3700 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3700 includes, without limitation, an Input/Output ("I/O") unit 3706, a front-end unit 3710, a scheduler (sequencer) unit 3712, a work distribution unit 3714, a hub 3716, a crossbar ("XBar") 3720, one or more general processing clusters ("GPCs") 3718, and one or more partition units ("memory partition units") 3722. In at least one embodiment, PPU 3700 is connected to a host processor or other PPUs 3700 via one or more high-speed GPU interconnects ("GPU interconnects") 3708. In at least one embodiment, PPU 3700 is connected to a host processor or other peripheral devices via a system bus 3702. In at least one embodiment, PPU 3700 is connected to a local memory comprising one or more memory devices ("memory") 3704. In at least one embodiment, memory devices 3704 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3708 may refer to a wire-based multi-lane communications link that is used by systems to scale and include one or more PPUs 3700 combined with one or more central processing units ("CPUs"), supports cache coherence between PPUs 3700 and CPUs, and CPU mastering. In at least one embodiment, data and/or commands are transmitted by high-speed GPU interconnect 3708 through hub 3716 to/from other units of PPU 3700 such as one or more copy engines, video encoders, video decoders, power management units, and other components which may not be explicitly illustrated in FIG. 37.

In at least one embodiment, I/O unit 3706 is configured to transmit and receive communications (e.g., commands, data) from a host processor (not illustrated in FIG. 37) over system bus 3702. In at least one embodiment, I/O unit 3706 communicates with host processor directly via system bus 3702 or through one or more intermediate devices such as a memory bridge. In at least one embodiment, I/O unit 3706 may communicate with one or more other processors, such as one or more of PPUs 3700 via system bus 3702. In at least one embodiment, I/O unit 3706 implements a Peripheral Component Interconnect Express ("PCIe") interface for communications over a PCIe bus. In at least one embodiment, I/O unit 3706 implements interfaces for communicating with external devices.

In at least one embodiment, I/O unit 3706 decodes packets received via system bus 3702. In at least one embodiment, at least some packets represent commands configured to cause PPU 3700 to perform various operations. In at least one embodiment, I/O unit 3706 transmits decoded commands to various other units of PPU 3700 as specified by commands. In at least one embodiment, commands are transmitted to front-end unit 3710 and/or transmitted to hub 3716 or other units of PPU 3700 such as one or more copy engines, a video encoder, a video decoder, a power management unit, etc. (not explicitly illustrated in FIG. 37). In at least one embodiment, I/O unit 3706 is configured to route communications between and among various logical units of PPU 3700.

In at least one embodiment, a program executed by host processor encodes a command stream in a buffer that provides workloads to PPU 3700 for processing. In at least one embodiment, a workload comprises instructions and data to be processed by those instructions. In at least one embodiment, a buffer is a region in a memory that is accessible (e.g., read/write) by both a host processor and PPU 3700—a host interface unit may be configured to access that buffer in a system memory connected to system bus 3702 via memory requests transmitted over system bus 3702 by I/O unit 3706. In at least one embodiment, a host processor writes a command stream to a buffer and then transmits a pointer to a start of a command stream to PPU 3700 such that front-end unit 3710 receives pointers to one or more command streams and manages one or more command streams, reading commands from command streams and forwarding commands to various units of PPU 3700.

In at least one embodiment, front-end unit 3710 is coupled to scheduler unit 3712 (which may be referred to as a sequencer unit, a thread sequencer, and/or an asynchronous compute engine) that configures various GPCs 3718 to process tasks defined by one or more command streams. In at least one embodiment, scheduler unit 3712 is configured to track state information related to various tasks managed by scheduler unit 3712 where state information may indicate which of GPCs 3718 a task is assigned to, whether task is active or inactive, a priority level associated with task, and so forth. In at least one embodiment, scheduler unit 3712 manages execution of a plurality of tasks on one or more of GPCs 3718.

In at least one embodiment, scheduler unit 3712 is coupled to work distribution unit 3714 that is configured to dispatch tasks for execution on GPCs 3718. In at least one embodiment, work distribution unit 3714 tracks a number of scheduled tasks received from scheduler unit 3712 and work distribution unit 3714 manages a pending task pool and an active task pool for each of GPCs 3718. In at least one embodiment, pending task pool comprises a number of slots (e.g., 32 slots) that contain tasks assigned to be processed by a particular GPC 3718; an active task pool may comprise a number of slots (e.g., 4 slots) for tasks that are actively being processed by GPCs 3718 such that as one of GPCs 3718 completes execution of a task, that task is evicted from that active task pool for GPC 3718 and another task from a pending task pool is selected and scheduled for execution on GPC 3718. In at least one embodiment, if an active task is idle on GPC 3718, such as while waiting for a data dependency to be resolved, then that active task is evicted from GPC 3718 and returned to that pending task pool while another task in that pending task pool is selected and scheduled for execution on GPC 3718.

In at least one embodiment, work distribution unit 3714 communicates with one or more GPCs 3718 via XBar 3720. In at least one embodiment, XBar 3720 is an interconnect network that couples many of units of PPU 3700 to other units of PPU 3700 and can be configured to couple work distribution unit 3714 to a particular GPC 3718. In at least one embodiment, one or more other units of PPU 3700 may also be connected to XBar 3720 via hub 3716.

In at least one embodiment, tasks are managed by scheduler unit 3712 and dispatched to one of GPCs 3718 by work distribution unit 3714. In at least one embodiment, GPC 3718 is configured to process task and generate results. In at least one embodiment, results may be consumed by other tasks within GPC 3718, routed to a different GPC 3718 via XBar 3720, or stored in memory 3704. In at least one embodiment, results can be written to memory 3704 via partition units 3722, which implement a memory interface for reading and writing data to/from memory 3704. In at least one embodiment, results can be transmitted to another PPU or CPU via high-speed GPU interconnect 3708. In at least one embodiment, PPU 3700 includes, without limitation, a number U of partition units 3722 that is equal to a number of separate and distinct memory devices 3704 coupled to PPU 3700, as described in more detail herein in conjunction with FIG. 39.

In at least one embodiment, a host processor executes a driver kernel that implements an application programming interface ("API") that enables one or more applications executing on a host processor to schedule operations for execution on PPU 3700. In at least one embodiment, multiple compute applications are simultaneously executed by PPU 3700 and PPU 3700 provides isolation, quality of service ("QoS"), and independent address spaces for multiple compute applications. In at least one embodiment, an application generates instructions (e.g., in form of API calls) that cause a driver kernel to generate one or more tasks for execution by PPU 3700 and that driver kernel outputs tasks to one or more streams being processed by PPU 3700. In at least one embodiment, each task comprises one or more groups of related threads, which may be referred to as a warp, wavefront, and/or wave. In at least one embodiment, a warp, wavefront, and/or wave comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 39.

Logic 1215 are used to perform inferencing and/or training operations associated with one or more embodiments. Details regarding logic 1215 are provided herein in conjunction with FIGS. 12A and/or 12B. In at least one embodiment, deep learning application processor is used to train a machine learning model, such as a neural network, to predict or infer information provided to PPU 3700. In at least one embodiment, deep learning application processor is used to infer or predict information based on a trained machine learning model (e.g., neural network) that has been trained by another processor or system or by PPU 3700. In at least one embodiment, PPU 3700 may be used to perform one or more neural network use cases described herein.

In at least one embodiment, one or more systems depicted in FIG. 37 are utilized to perform operations discussed herein such as using a neural architecture search (NAS)

algorithm to iteratively generate one or more hyperparameters to be used by one or more neural networks, wherein said one or more hyperparameters are to be generated before being used by said one or more neural networks. In at least one embodiment, one or more systems depicted in FIG. 37 are utilized to perform operations discussed herein such as selectively using one or more neural network layers based, at least in part, on one or more iteratively increasing neural network performance metrics. In at least one embodiment, one or more systems depicted in FIG. 37 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 37 are utilized to implement one or more systems and/or processes such as those described in connection with FIGS. 1-11.

Figure 38:
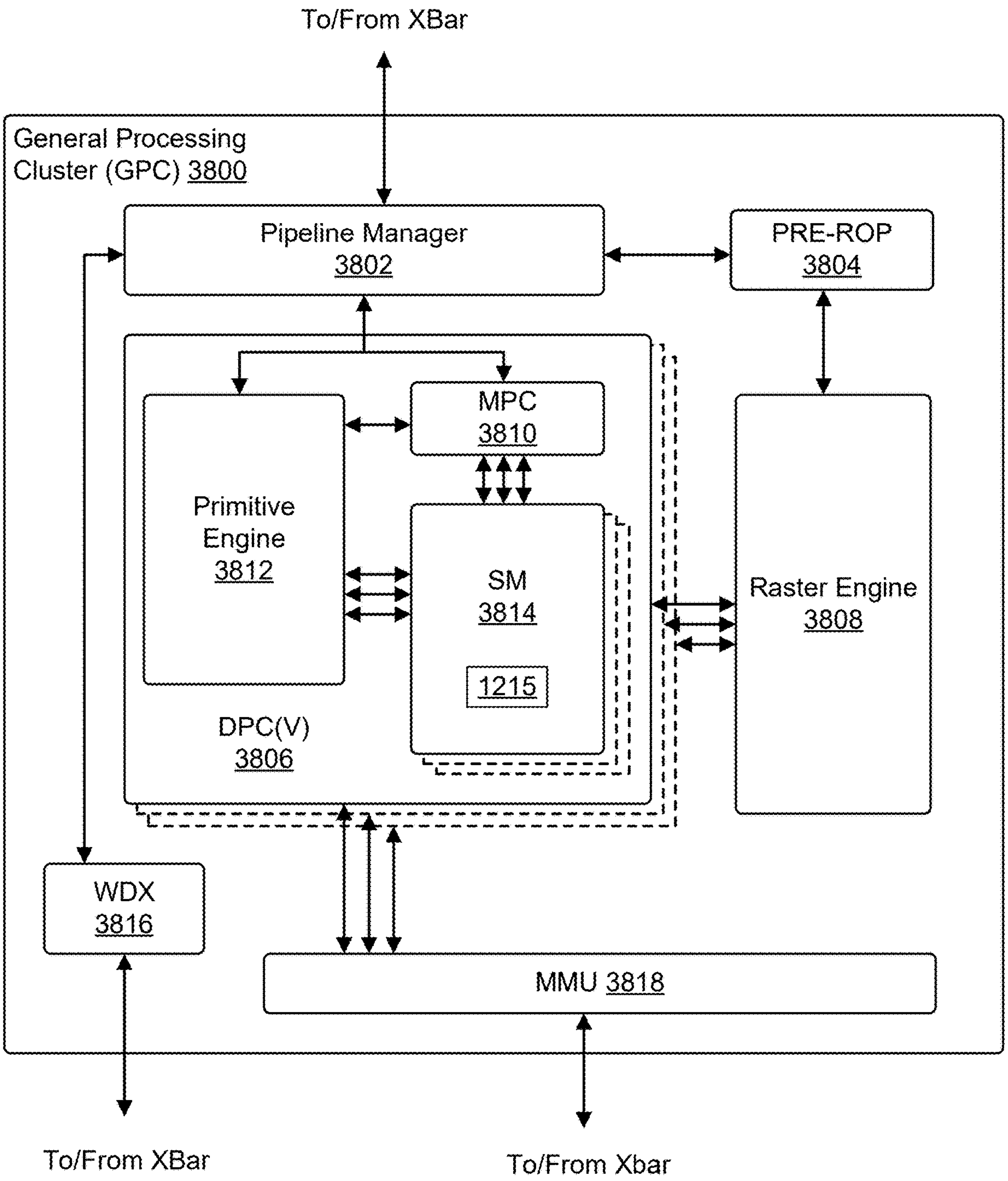
FIG. 38 illustrates a general processing cluster ("GPC"), according to at least one embodiment.

FIG. 38 illustrates a general processing cluster ("GPC") 3800, according to at least one embodiment. In at least one embodiment, GPC 3800 is GPC 3718 of FIG. 37. In at least one embodiment, each GPC 3800 includes, without limitation, a number of hardware units for processing tasks and each GPC 3800 includes, without limitation, a pipeline manager 3802, a pre-raster operations unit ("preROP") 3804, a raster engine 3808, a work distribution crossbar ("WDX") 3816, a memory management unit ("MMU") 3818, one or more Data Processing Clusters ("DPCs") 3806, and any suitable combination of parts.

In at least one embodiment, operation of GPC 3800 is controlled by pipeline manager 3802. In at least one embodiment, pipeline manager 3802 manages configuration of one or more DPCs 3806 for processing tasks allocated to GPC 3800. In at least one embodiment, pipeline manager 3802 configures at least one of one or more DPCs 3806 to implement at least a portion of a graphics rendering pipeline. In at least one embodiment, DPC 3806 is configured to execute a vertex shader program on a programmable streaming multi-processor ("SM") 3814. In at least one embodiment, pipeline manager 3802 is configured to route packets received from a work distribution unit to appropriate logical units within GPC 3800, in at least one embodiment, and some packets may be routed to fixed function hardware units in preROP 3804 and/or raster engine 3808 while other packets may be routed to DPCs 3806 for processing by a primitive engine 3812 or SM 3814. In at least one embodiment, pipeline manager 3802 configures at least one of DPCs 3806 to implement a neural network model and/or a computing pipeline.

In at least one embodiment, preROP unit 3804 is configured, in at least one embodiment, to route data generated by raster engine 3808 and DPCs 3806 to a Raster Operations ("ROP") unit in partition unit 3722, described in more detail above in conjunction with FIG. 37. In at least one embodiment, preROP unit 3804 is configured to perform optimizations for color blending, organize pixel data, perform address translations, and more. In at least one embodiment, raster engine 3808 includes, without limitation, a number of fixed function hardware units configured to perform various raster operations, in at least one embodiment, and raster engine 3808 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 3808 comprises fragments to be processed by any suitable entity, such as by a fragment shader implemented within DPC 3806.

In at least one embodiment, each DPC 3806 included in GPC 3800 comprises, without limitation, an M-Pipe Controller ("MPC") 3810; primitive engine 3812; one or more SMs 3814; and any suitable combination thereof. In at least one embodiment, MPC 3810 controls operation of DPC 3806, routing packets received from pipeline manager 3802 to appropriate units in DPC 3806. In at least one embodiment, packets associated with a vertex are routed to primitive engine 3812, which is configured to fetch vertex attributes associated with a vertex from memory; in contrast, packets associated with a shader program may be transmitted to SM 3814.

In at least one embodiment, SM 3814 comprises, without limitation, a programmable streaming processor that is configured to process tasks represented by a number of threads. In at least one embodiment, SM 3814 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp, wavefront, wave) is configured to process a different set of data based on same set of instructions. In at least one embodiment, all threads in group of threads execute a common set of instructions. In at least one embodiment, SM 3814 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp (which may be referred to as wavefronts and/or waves), enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 3814 is described in more detail herein.

In at least one embodiment, MMU 3818 provides an interface between GPC 3800 and a memory partition unit (e.g., partition unit 3722 of FIG. 37) and MMU 3818 provides translation of virtual addresses into physical addresses, memory protection, and arbitration of memory requests. In at least one embodiment, MMU 3818 provides one or more translation lookaside buffers ("TLBs") for performing translation of virtual addresses into physical addresses in memory.

Logic 1215 are used to perform inferencing and/or training operations associated with one or more embodiments. Details regarding logic 1215 are provided herein in conjunction with FIGS. 12A and/or 12B. In at least one embodiment, deep learning application processor is used to train a machine learning model, such as a neural network, to predict or infer information provided to GPC 3800. In at least one embodiment, GPC 3800 is used to infer or predict information based on a trained machine learning model (e.g., neural network) that has been trained by another processor or system or by GPC 3800. In at least one embodiment, GPC 3800 may be used to perform one or more neural network use cases described herein.

In at least one embodiment, one or more systems depicted in FIG. 38 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 38 are utilized to perform operations discussed herein such as selectively using one or more neural network layers based, at least in part, on one or more iteratively increasing neural network performance metrics. In at least one embodiment, one or more systems depicted in FIG. 38 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 38 are utilized to implement one or more systems and/or processes such as those described in connection with FIGS. 1-11.

Figure 39:
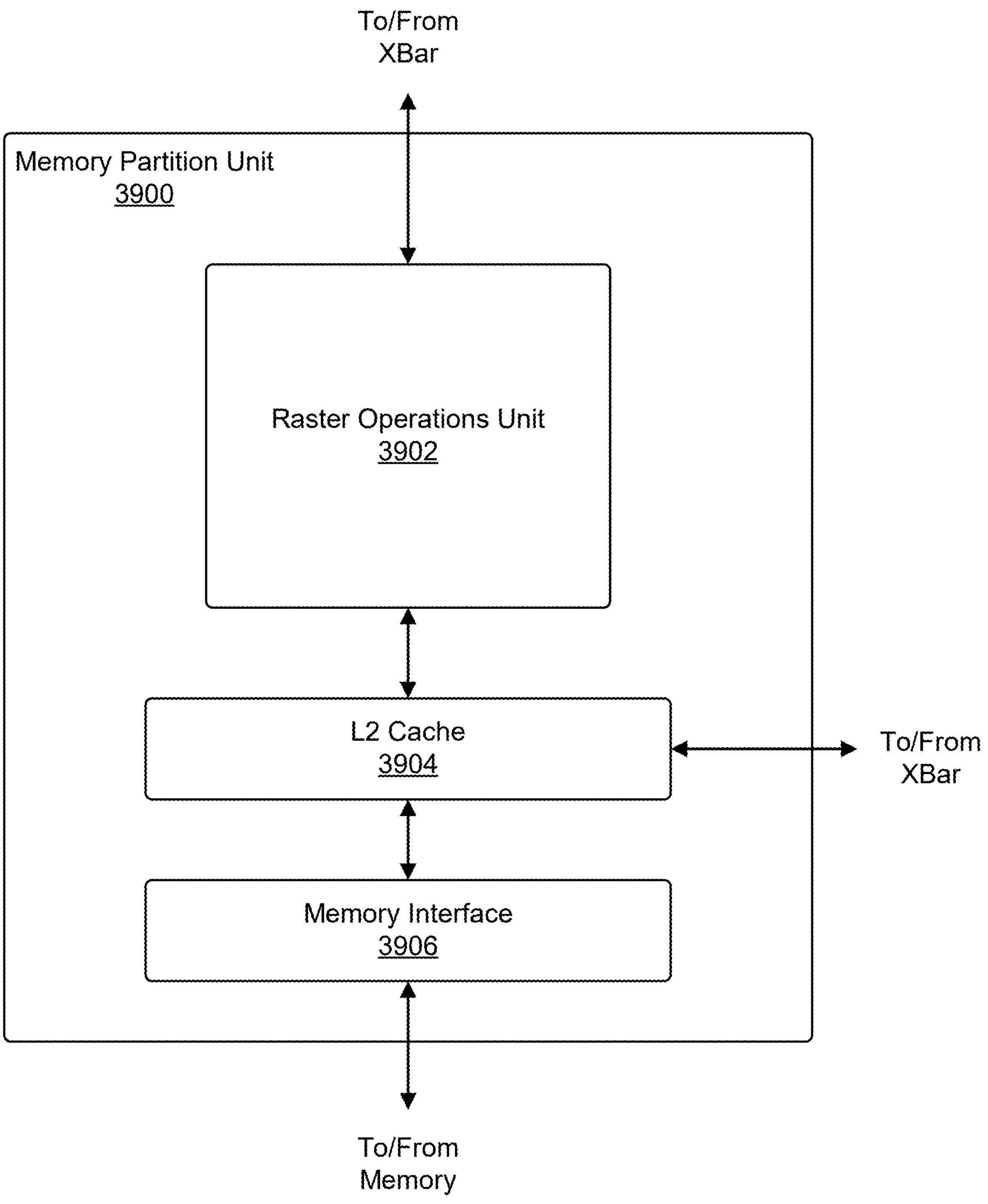
FIG. 39 illustrates a memory partition unit of a parallel processing unit ("PPU"), according to at least one embodiment.

FIG. 39 illustrates a memory partition unit 3900 of a parallel processing unit ("PPU"), in accordance with at least one embodiment. In at least one embodiment, memory partition unit 3900 includes, without limitation, a Raster Operations ("ROP") unit 3902, a level two ("L2") cache 3904, a memory interface 3906, and any suitable combination thereof. In at least one embodiment, memory interface 3906 is coupled to memory. In at least one embodiment, memory interface 3906 may implement 32, 64, 128, 1024-bit data buses, or like, for high-speed data transfer. In at least one embodiment, PPU incorporates U memory interfaces 3906 where U is a positive integer, with one memory interface 3906 per pair of partition units 3900, where each pair of partition units 3900 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3906 implements a high bandwidth memory second generation ("HBM2") memory interface and Y equals half of U. In at least one embodiment, HBM2 memory stacks are located on a physical package with a PPU, providing substantial power and area savings compared with conventionalGDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 3900 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 3708 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 3900 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 3704 of FIG. 37 or other system memory is fetched by memory partition unit 3900 and stored in L2 cache 3904, which is located on-chip and is shared between various GPCs, in accordance with at least one embodiment. Each memory partition unit 3900, in at least one embodiment, includes, without limitation, at least a portion of L2 cache associated with a corresponding memory device. In at least one embodiment, lower level caches are implemented in various units within GPCs. In at least one embodiment, each of SMs 3814 in FIG. 38 may implement a Level 1 ("L1") cache wherein that L1 cache is private memory that is dedicated to a particular SM 3814 and data from L2 cache 3904 is fetched and stored in each L1 cache for processing in functional units of SMs 3814. In at least one embodiment, L2 cache 3904 is coupled to memory interface 3906 and XBar 3720 shown in FIG. 37.

ROP unit 3902 performs graphics raster operations related to pixel color, such as color compression, pixel blending, and more, in at least one embodiment. ROP unit 3902, in at least one embodiment, implements depth testing in conjunction with raster engine 3808, receiving a depth for a sample location associated with a pixel fragment from a culling engine of raster engine 3808. In at least one embodiment, depth is tested against a corresponding depth in a depth buffer for a sample location associated with a fragment. In at least one embodiment, if that fragment passes that depth test for that sample location, then ROP unit 3902 updates depth buffer and transmits a result of that depth test to raster engine 3808. It will be appreciated that a number of partition units 3900 may be different than a number of GPCs and, therefore, each ROP unit 3902 can, in at least one embodiment, be coupled to each GPC. In at least one embodiment, ROP unit 3902 tracks packets received from different GPCs and determines whether a result generated by ROP unit 3902 is to be routed to through XBar 3720.

In at least one embodiment, one or more systems depicted in FIG. 39 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 39 are utilized to perform operations discussed herein such as selectively using one or more neural network layers based, at least in part, on one or more iteratively increasing neural network performance metrics. In at least one embodiment, one or more systems depicted in FIG. 39 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 39 are utilized to implement one or more systems and/or processes such as those described in connection with FIGS. 1-11.

Figure 40:
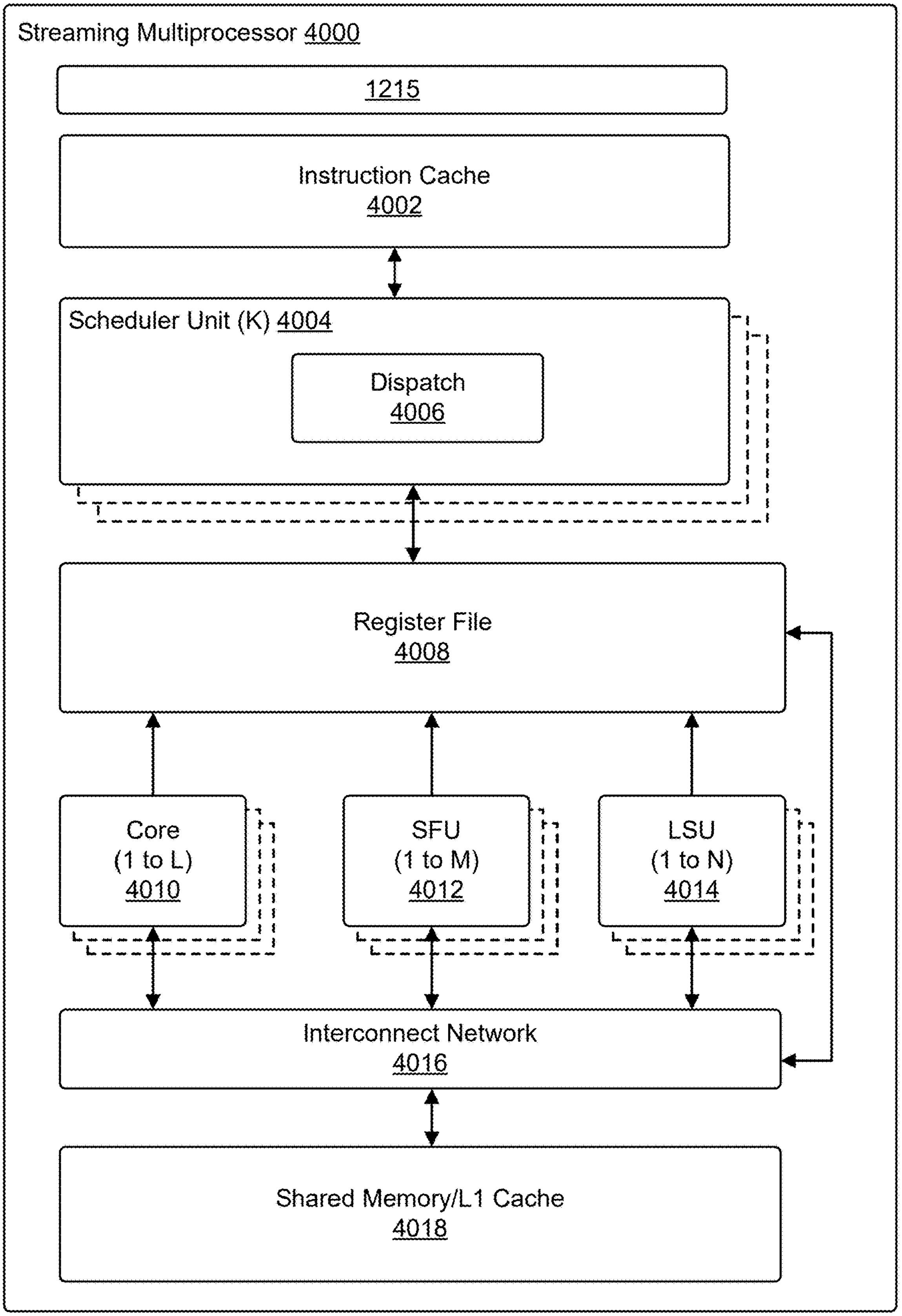
FIG. 40 illustrates a streaming multi-processor, according to at least one embodiment.

FIG. 40 illustrates a streaming multi-processor ("SM") 4000, according to at least one embodiment. In at least one embodiment, SM 4000 is SM of FIG. 38. In at least one embodiment, SM 4000 includes, without limitation, an instruction cache 4002, one or more scheduler units 4004 (which may be referred to as sequencer units), a register file 4008, one or more processing cores ("cores") 4010, one or more special function units ("SFUs") 4012, one or more load/store units ("LSUs") 4014, an interconnect network 4016, a shared memory/level one ("L1") cache 4018, and/or any suitable combination thereof. In at least one embodiment, LSUs 4014 perform load of store operations corresponding to loading/storing data (e.g., instructions) to perform an operation (e.g., perform an API, an API call).

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 4000 (which may be referred to as CUs and/or slices). In at least one embodiment, scheduler unit 4004 (which may be referred to as a sequencer and/or asynchronous compute engine) receives tasks from a work distribution unit and manages instruction scheduling for one or more thread blocks assigned to SM 4000. In at least one embodiment, scheduler unit 4004 schedules thread blocks for execution as warps (which may be referred to as wavefronts and/or waves) of parallel threads, wherein each thread block is allocated at least one warp. In at least one embodiment, each warp executes threads. In at least one embodiment, scheduler unit 4004 manages a plurality of different thread blocks, allocating warps to different thread blocks and then dispatching instructions from plurality of different cooperative groups to various functional units (e.g., processing cores 4010, SFUs 4012, and LSUs 4014) during each clock cycle.

In at least one embodiment, Cooperative Groups (which may also be referred to as wavefronts and/or waves) may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4006 is configured to transmit instructions to one or more functional units and scheduler unit 4004 and includes, without limitation, two dispatch units 4006 that enable two different instructions from a common warp to be dispatched during each clock cycle. In at least one embodiment, each scheduler unit 4004 includes a single dispatch unit 4006 or additional dispatch units 4006.

In at least one embodiment, each SM 4000 (which may be referred to as a CU and/or slice), in at least one embodiment, includes, without limitation, register file 4008 that provides a set of registers for functional units of SM 4000. In at least one embodiment, register file 4008 is divided between each functional unit such that each functional unit is allocated a dedicated portion of register file 4008. In at least one embodiment, register file 4008 is divided between different warps being executed by SM 4000 and register file 4008 provides temporary storage for operands connected to data paths of functional units. In at least one embodiment, each SM 4000 comprises, without limitation, a plurality of L processing cores 4010, where L is a positive integer. In at least one embodiment, SM 4000 includes, without limitation, a large number (e.g., 128 or more) of distinct processing cores 4010. In at least one embodiment, each processing core 4010 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4010 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4010. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp (which may be referred to as a wavefront and/or wave).

In at least one embodiment, each SM 4000 comprises, without limitation, M SFUs 4012 that perform special functions (e.g., attribute evaluation, reciprocal square root, and like). In at least one embodiment, SFUs 4012 include, without limitation, a tree traversal unit configured to traverse a hierarchical tree data structure. In at least one embodiment, SFUs 4012 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4000. In at least one embodiment, texture maps are stored in shared memory/L1 cache 4018. In at least one embodiment, texture units implement texture operations such as filtering operations using mip-maps (e.g., texture maps of varying levels of detail), in accordance with at least one embodiment. In at least one embodiment, each SM 4000 includes, without limitation, two texture units.

Each SM 4000 comprises, without limitation, N LSUs 4014 that implement load and store operations between shared memory/L1 cache 4018 and register file 4008, in at least one embodiment. Interconnect network 4016 connects each functional unit to register file 4008 and LSU 4014 to register file 4008 and shared memory/L1 cache 4018 in at least one embodiment. In at least one embodiment, interconnect network 4016 is a crossbar that can be configured to connect any functional units to any registers in register file 4008 and connect LSUs 4014 to register file 4008 and memory locations in shared memory/L1 cache 4018.

In at least one embodiment, shared memory/L1 cache 4018 is an array of on-chip memory that allows for data storage and communication between SM 4000 and primitive engine and between threads in SM 4000, in at least one embodiment. In at least one embodiment, shared memory/L1 cache 4018 comprises, without limitation, 128 KB of storage capacity and is in a path from SM 4000 to a partition unit. In at least one embodiment, shared memory/L1 cache 4018, in at least one embodiment, is used to cache reads and writes. In at least one embodiment, one or more of shared memory/L1 cache 4018, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 4018 enables shared memory/L1 cache 4018 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 4000 to execute program and perform calculations, shared memory/L1 cache 4018 to communicate between threads, and LSU 4014 to read and write global memory through shared memory/L1 cache 4018 and memory partition unit. In at least one embodiment, when configured for general purpose parallel computation, SM 4000 writes commands that scheduler unit 4004 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Logic 1215 are used to perform inferencing and/or training operations associated with one or more embodiments. Details regarding logic 1215 are provided herein in conjunction with FIGS. 12A and/or 12B. In at least one embodiment, deep learning application processor is used to train a machine learning model, such as a neural network, to predict or infer information provided to SM 4000. In at least one embodiment, SM 4000 is used to infer or predict information based on a trained machine learning model (e.g., neural network) that has been trained by another processor or system or by SM 4000. In at least one embodiment, SM 4000 may be used to perform one or more neural network use cases described herein.

In at least one embodiment, one or more systems depicted in FIG. 40 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 40 are utilized to perform operations discussed herein such as selectively using one or more neural network layers based, at least in part, on one or more iteratively increasing neural network performance metrics. In at least one embodiment, one or more systems depicted in FIG. 40 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 40 are utilized to implement one or more systems and/or processes such as those described in connection with FIGS. 1-11.

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 41:
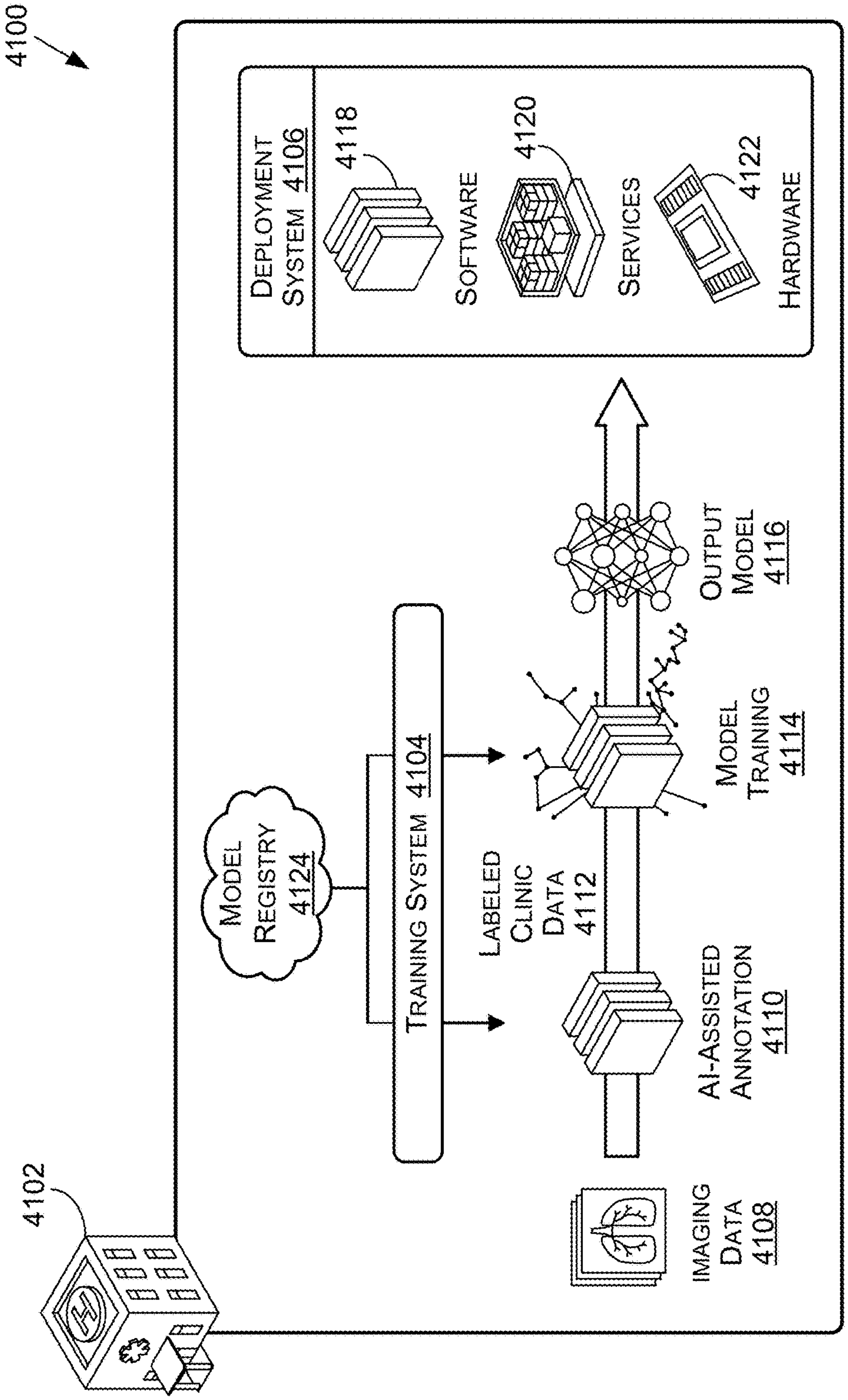
FIG. 41 is an example data flow diagram for an advanced computing pipeline, in accordance with at least one embodiment.

With reference to FIG. 41, FIG. 41 is an example data flow diagram for a process 4100 of generating and deploying an image processing and inferencing pipeline, in accordance with at least one embodiment. In at least one embodiment, process 4100 may be deployed for use with imaging devices, processing devices, genomics devices, gene sequencing devices, radiology devices, and/or other device types at one or more facilities 4102, such as medical facilities, hospitals, healthcare institutes, clinics, research or diagnostic labs, etc. In at least one embodiment, process 4100 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 4100 may be executed within a training system 4104 and/or a deployment system 4106. In at least one embodiment, training system 4104 may be used to perform training, deployment, and implementation of machine learning models (e.g., neural networks, object detection algorithms, computer vision algorithms, etc.) for use in deployment system 4106. In at least one embodiment, deployment system 4106 may be configured to offload processing and compute resources among a distributed computing environment to reduce infrastructure requirements at facility 4102. In at least one embodiment, deployment system 4106 may provide a streamlined platform for selecting, customizing, and implementing virtual instruments for use with imaging devices (e.g., MRI, CT Scan, X-Ray, Ultrasound, etc.) or sequencing devices at facility 4102. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 4106 during execution of applications.

In at least one embodiment, some of applications used in advanced processing and inferencing pipelines may use machine learning models or other AI to perform one or more processing steps. In at least one embodiment, machine learning models may be trained at facility 4102 using data 4108 (such as imaging data) generated at facility 4102 (and stored on one or more picture archiving and communication system (PACS) servers at facility 4102), may be trained using imaging or sequencing data 4108 from another facility or facilities (e.g., a different hospital, lab, clinic, etc.), or a combination thereof. In at least one embodiment, training system 4104 may be used to provide applications, services, and/or other resources for generating working, deployable machine learning models for deployment system 4106.

In at least one embodiment, a model registry 4124 may be backed by object storage that may support versioning and object metadata. In at least one embodiment, object storage may be accessible through, for example, a cloud storage (e.g., a cloud 4226 of FIG. 42) compatible application programming interface (API) from within a cloud platform. In at least one embodiment, machine learning models within model registry 4124 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 4204 (FIG. 42) may include a scenario where facility 4102 is training their own machine learning model, or has an existing machine learning model that needs to be optimized or updated. In at least one embodiment, imaging data 4108 generated by imaging device(s), sequencing devices, and/or other device types may be received. In at least one embodiment, once imaging data 4108 is received, AI-assisted annotation 4110 may be used to aid in generating annotations corresponding to imaging data 4108 to be used as ground truth data for a machine learning model. In at least one embodiment, AI-assisted annotation 4110 may include one or more machine learning models (e.g., convolutional neural networks (CNNs)) that may be trained to generate annotations corresponding to certain types of imaging data 4108 (e.g., from certain devices) and/or certain types of anomalies in imaging data 4108. In at least one embodiment, AI-assisted annotations 4110 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 4112 (e.g., annotations provided by a clinician, doctor, scientist, technician, etc.) may be used as ground truth data for training a machine learning model. In at least one embodiment, AI-assisted annotations 4110, labeled clinic data 4112, or a combination thereof may be used as ground truth data for training a machine learning model. In at least one embodiment, a trained machine learning model may be referred to as an output model 4116, and may be used by deployment system 4106, as described herein.

In at least one embodiment, training pipeline 4204 (FIG. 42) may include a scenario where facility 4102 needs a machine learning model for use in performing one or more processing tasks for one or more applications in deployment system 4106, but facility 4102 may not currently have such a machine learning model (or may not have a model that is optimized, efficient, or effective for such purposes). In at least one embodiment, an existing machine learning model may be selected from model registry 4124. In at least one embodiment, model registry 4124 may include machine learning models trained to perform a variety of different inference tasks on imaging data. In at least one embodiment, machine learning models in model registry 4124 may have been trained on imaging data from different facilities than facility 4102 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained- or partially trained—at one location, a machine learning model may be added to model registry 4124. In at least one embodiment, a machine learning model may then be retrained, or updated, at any number of other facilities, and a retrained or updated model may be made available in model registry 4124. In at least one embodiment, a machine learning model may then be selected from model registry 4124—and referred to as output model 4116—and may be used in deployment system 4106 to perform one or more processing tasks for one or more applications of a deployment system.

In at least one embodiment, training pipeline 4204 (FIG. 42) may be used in a scenario that includes facility 4102 requiring a machine learning model for use in performing one or more processing tasks for one or more applications in deployment system 4106, but facility 4102 may not currently have such a machine learning model (or may not have a model that is optimized, efficient, or effective for such purposes). In at least one embodiment, a machine learning model selected from model registry 4124 might not be fine-tuned or optimized for imaging data 4108 generated at facility 4102 because of differences in populations, genetic variations, robustness of training data used to train a machine learning model, diversity in anomalies of training data, and/or other issues with training data. In at least one embodiment, AI-assisted annotation 4110 may be used to aid in generating annotations corresponding to imaging data 4108 to be used as ground truth data for retraining or updating a machine learning model. In at least one embodiment, labeled clinic data 4112 (e.g., annotations provided by a clinician, doctor, scientist, etc.) may be used as ground truth data for training a machine learning model. In at least one embodiment, retraining or updating a machine learning model may be referred to as model training 4114. In at least one embodiment, model training 4114—e.g., AI-assisted annotations 4110, labeled clinic data 4112, or a combination thereof—may be used as ground truth data for retraining or updating a machine learning model.

In at least one embodiment, deployment system 4106 may include software 4118, services 4120, hardware 4122, and/or other components, features, and functionality. In at least one embodiment, deployment system 4106 may include a software "stack," such that software 4118 may be built on top of services 4120 and may use services 4120 to perform some or all of processing tasks, and services 4120 and software 4118 may be built on top of hardware 4122 and use hardware 4122 to execute processing, storage, and/or other compute tasks of deployment system 4106.

In at least one embodiment, software 4118 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 4108 (or other data types, such as those described herein) generated by a device. In at least one embodiment, an advanced processing and inferencing pipeline may be defined based on selections of different containers that are desired or required for processing imaging data 4108, in addition to containers that receive and configure imaging data for use by each container and/or for use by facility 4102 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 4102). In at least one embodiment, a combination of containers within software 4118 (e.g., that make up a pipeline) may be referred to as a virtual instrument (as described in more detail herein), and a virtual instrument may leverage services 4120 and hardware 4122 to execute some or all processing tasks of applications instantiated in containers.

In at least one embodiment, a data processing pipeline may receive input data (e.g., imaging data 4108) in a DICOM, RIS, CIS, REST compliant, RPC, raw, and/or other format in response to an inference request (e.g., a request from a user of deployment system 4106, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 4116 of training system 4104.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 4124 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 4120 as a system (e.g., system 4200 of FIG. 42). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 4200 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 42:
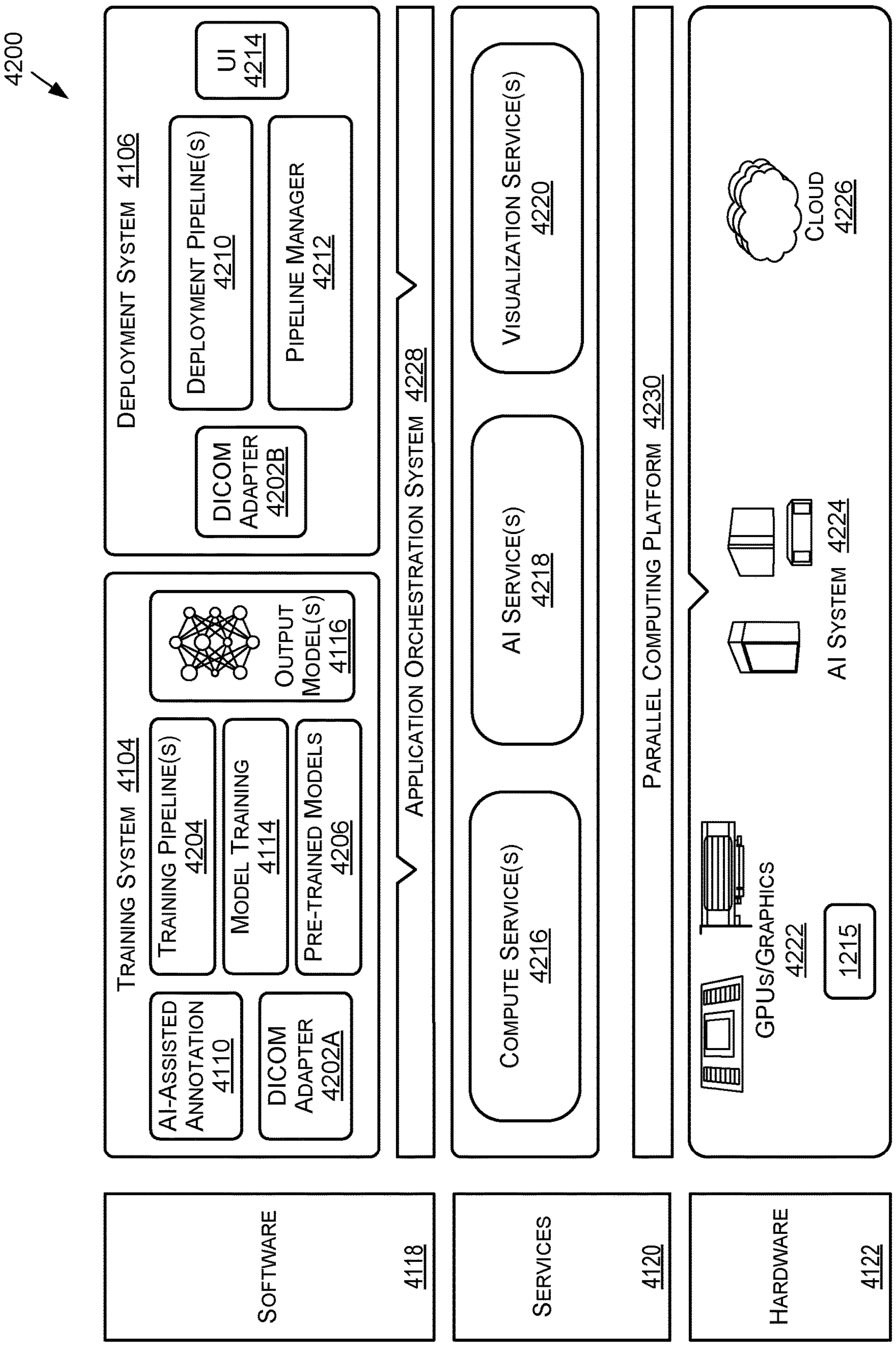
FIG. 42 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 4200 of FIG. 42). In at least one embodiment, completed and validated applications or containers may be stored in a container registry and associated machine learning models may be stored in model registry 4124. In at least one embodiment, a requesting entity (e.g., a user at a medical facility)—who provides an inference or image processing request—may browse a container registry and/or model registry 4124 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 4106 (e.g., a cloud) to perform processing of data processing pipeline. In at least one embodiment, processing by deployment system 4106 may include referencing selected elements (e.g., applications, containers, models, etc.) from a container registry and/or model registry 4124. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 4120 may be leveraged. In at least one embodiment, services 4120 may include compute services, artificial intelligence (AI) services, visualization services, and/or other service types. In at least one embodiment, services 4120 may provide functionality that is common to one or more applications in software 4118, so functionality may be abstracted to a service that may be called upon or leveraged by applications. In at least one embodiment, functionality provided by services 4120 may run dynamically and more efficiently, while also scaling well by allowing applications to process data in parallel (e.g., using a parallel computing platform 4230 (FIG. 42)). In at least one embodiment, rather than each application that shares a same functionality offered by a service 4120 being required to have a respective instance of service 4120, service 4120 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 4120 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 4118 implementing advanced processing and inferencing pipeline that includes segmentation application and anomaly detection application may be streamlined because each application may call upon a same inference service to perform one or more inferencing tasks.

In at least one embodiment, hardware 4122 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 4122 may be used to provide efficient, purpose-built support for software 4118 and services 4120 in deployment system 4106. In at least one embodiment, use of GPU processing may be implemented for processing locally (e.g., at facility 4102), within an AI/deep learning system, in a cloud system, and/or in other processing components of deployment system 4106 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 4118 and/or services 4120 may be optimized for GPU processing with respect to deep learning, machine learning, and/or high-performance computing, as non-limiting examples. In at least one embodiment, at least some of computing environment of deployment system 4106 and/or training system 4104 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 4122 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, one or more systems depicted in FIG. 41 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 41 are utilized to perform operations discussed herein such as selectively using one or more neural network layers based, at least in part, on one or more iteratively increasing neural network performance metrics. In at least one embodiment, one or more systems depicted in FIG. 41 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 41 are utilized to implement one or more systems and/or processes such as those described in connection with FIGS. 1-11.

FIG. 42 is a system diagram for an example system 4200 for generating and deploying an imaging deployment pipeline, in accordance with at least one embodiment. In at least one embodiment, system 4200 may be used to implement process 4100 of FIG. 41 and/or other processes including advanced processing and inferencing pipelines. In at least one embodiment, system 4200 may include training system 4104 and deployment system 4106. In at least one embodiment, training system 4104 and deployment system 4106 may be implemented using software 4118, services 4120, and/or hardware 4122, as described herein.

In at least one embodiment, system 4200 (e.g., training system 4104 and/or deployment system 4106) may implemented in a cloud computing environment (e.g., using cloud 4226). In at least one embodiment, system 4200 may be implemented locally with respect to a healthcare services facility, or as a combination of both cloud and local computing resources. In at least one embodiment, in embodiments where cloud computing is implemented, patient data may be separated from, or unprocessed by, by one or more components of system 4200 that would render processing non-compliant with HIPAA and/or other data handling and privacy regulations or laws. In at least one embodiment, access to APIs in cloud 4226 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 4200, may be restricted to a set of public IPs that have been vetted or authorized for interaction.

In at least one embodiment, various components of system 4200 may communicate between and among one another using any of a variety of different network types, including but not limited to local area networks (LANs) and/or wide area networks (WANs) via wired and/or wireless communication protocols. In at least one embodiment, communication between facilities and components of system 4200 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 4104 may execute training pipelines 4204, similar to those described herein with respect to FIG. 41. In at least one embodiment, where one or more machine learning models are to be used in deployment pipelines 4210 by deployment system 4106, training pipelines 4204 may be used to train or retrain one or more (e.g., pre-trained) models, and/or implement one or more of pre-trained models 4206 (e.g., without a need for retraining or updating). In at least one embodiment, as a result of training pipelines 4204, output model(s) 4116 may be generated. In at least one embodiment, training pipelines 4204 may include any number of processing steps, such as but not limited to imaging data (or other input data) conversion or adaption (e.g., using DICOM adapter 4202A to convert DICOM images to another format suitable for processing by respective machine learning models, such as Neuroimaging Informatics Technology Initiative (NIfTI) format), AI-assisted annotation 4110, labeling or annotating of imaging data 4108 to generate labeled clinic data 4112, model selection from a model registry, model training 4114, training, retraining, or updating models, and/or other processing steps. In at least one embodiment, for different machine learning models used by deployment system 4106, different training pipelines 4204 may be used. In at least one embodiment, training pipeline 4204 similar to a first example described with respect to FIG. 41 may be used for a first machine learning model, training pipeline 4204 similar to a second example described with respect to FIG. 41 may be used for a second machine learning model, and training pipeline 4204 similar to a third example described with respect to FIG. 41 may be used for a third machine learning model. In at least one embodiment, any combination of tasks within training system 4104 may be used depending on what is required for each respective machine learning model. In at least one embodiment, one or more of machine learning models may already be trained and ready for deployment so machine learning models may not undergo any processing by training system 4104, and may be implemented by deployment system 4106.

In at least one embodiment, output model(s) 4116 and/or pre-trained model(s) 4206 may include any types of machine learning models depending on implementation or embodiment. In at least one embodiment, and without limitation, machine learning models used by system 4200 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 45A:
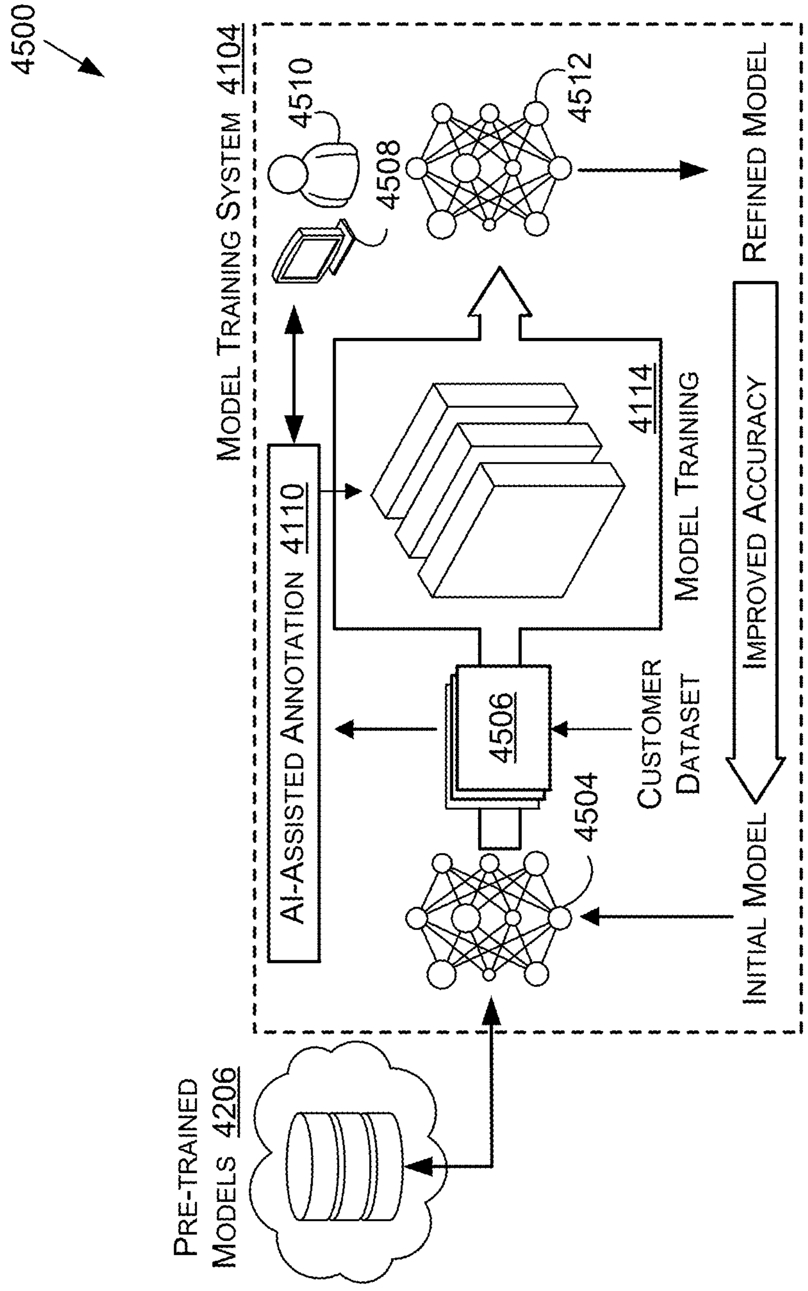
FIG. 45A illustrates a data flow diagram for a process to train a machine learning model, in accordance with at least one embodiment.
Figure 45B:
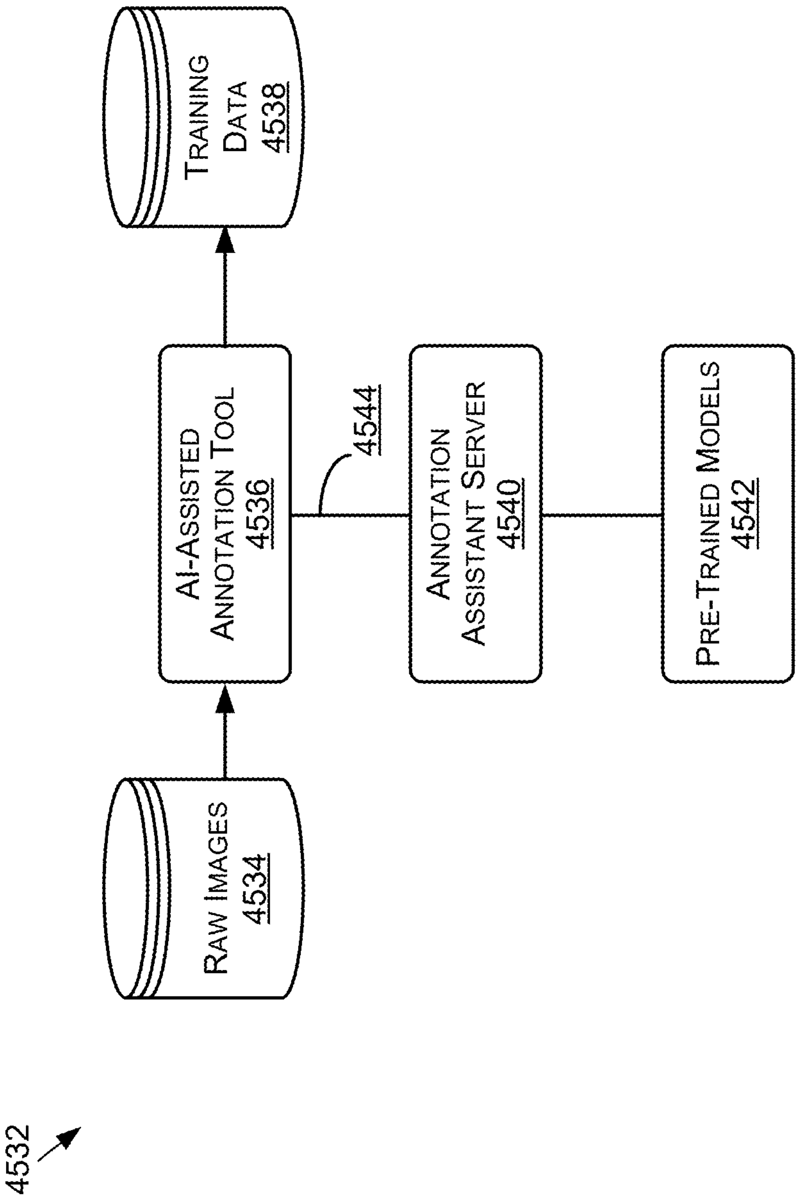
FIG. 45B is an example illustration of a client-server architecture to enhance annotation tools with pre-trained annotation models, in accordance with at least one embodiment.

In at least one embodiment, training pipelines 4204 may include AI-assisted annotation, as described in more detail herein with respect to at least FIG. 45B. In at least one embodiment, labeled clinic data 4112 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 4108 (or other data type used by machine learning models), there may be corresponding ground truth data generated by training system 4104. In at least one embodiment, AI-assisted annotation may be performed as part of deployment pipelines 4210; either in addition to, or in lieu of AI-assisted annotation included in training pipelines 4204. In at least one embodiment, system 4200 may include a multi-layer platform that may include a software layer (e.g., software 4118) of diagnostic applications (or other application types) that may perform one or more medical imaging and diagnostic functions. In at least one embodiment, system 4200 may be communicatively coupled to (e.g., via encrypted links) PACS server networks of one or more facilities. In at least one embodiment, system 4200 may be configured to access and referenced data (e.g., DICOM data, RIS data, raw data, CIS data, REST compliant data, RPC data, raw data, etc.) from PACS servers (e.g., via a DICOM adapter 4202, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 4102). In at least one embodiment, applications may then call or execute one or more services 4120 for performing compute, AI, or visualization tasks associated with respective applications, and software 4118 and/or services 4120 may leverage hardware 4122 to perform processing tasks in an effective and efficient manner.

In at least one embodiment, deployment system 4106 may execute deployment pipelines 4210. In at least one embodiment, deployment pipelines 4210 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 4210 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 4210 depending on information desired from data generated by a device. In at least one embodiment, where detections of anomalies are desired from an MRI machine, there may be a first deployment pipeline 4210, and where image enhancement is desired from output of an MRI machine, there may be a second deployment pipeline 4210.

In at least one embodiment, applications available for deployment pipelines 4210 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 4106 may define constructs for each of applications, such that users of deployment system 4106 (e.g., medical facilities, labs, clinics, etc.) may understand constructs and adapt applications for implementation within their respective facility. In at least one embodiment, an application for image reconstruction may be selected for inclusion in deployment pipeline 4210, but data type generated by an imaging device may be different from a data type used within an application. In at least one embodiment, DICOM adapter 4202B (and/or a DICOM reader) or another data type adapter or reader (e.g., RIS, CIS, REST compliant, RPC, raw, etc.) may be used within deployment pipeline 4210 to convert data to a form useable by an application within deployment system 4106. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 4120) may be used to accelerate these operations. In at least one embodiment, to avoid bottlenecks of conventional processing approaches that rely on CPU processing, parallel computing platform 4230 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 4124. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 4200—such as services 4120 and hardware 4122—deployment pipelines 4210 may be even more user friendly, provide for easier integration, and produce more accurate, efficient, and timely results.

In at least one embodiment, deployment system 4106 may include a user interface 4214 (e.g., a graphical user interface, a web interface, etc.) that may be used to select applications for inclusion in deployment pipeline(s) 4210, arrange applications, modify or change applications or parameters or constructs thereof, use and interact with deployment pipeline(s) 4210 during set-up and/or deployment, and/or to otherwise interact with deployment system 4106. In at least one embodiment, although not illustrated with respect to training system 4104, user interface 4214 (or a different user interface) may be used for selecting models for use in deployment system 4106, for selecting models for training, or retraining, in training system 4104, and/or for otherwise interacting with training system 4104.

Figure 43:
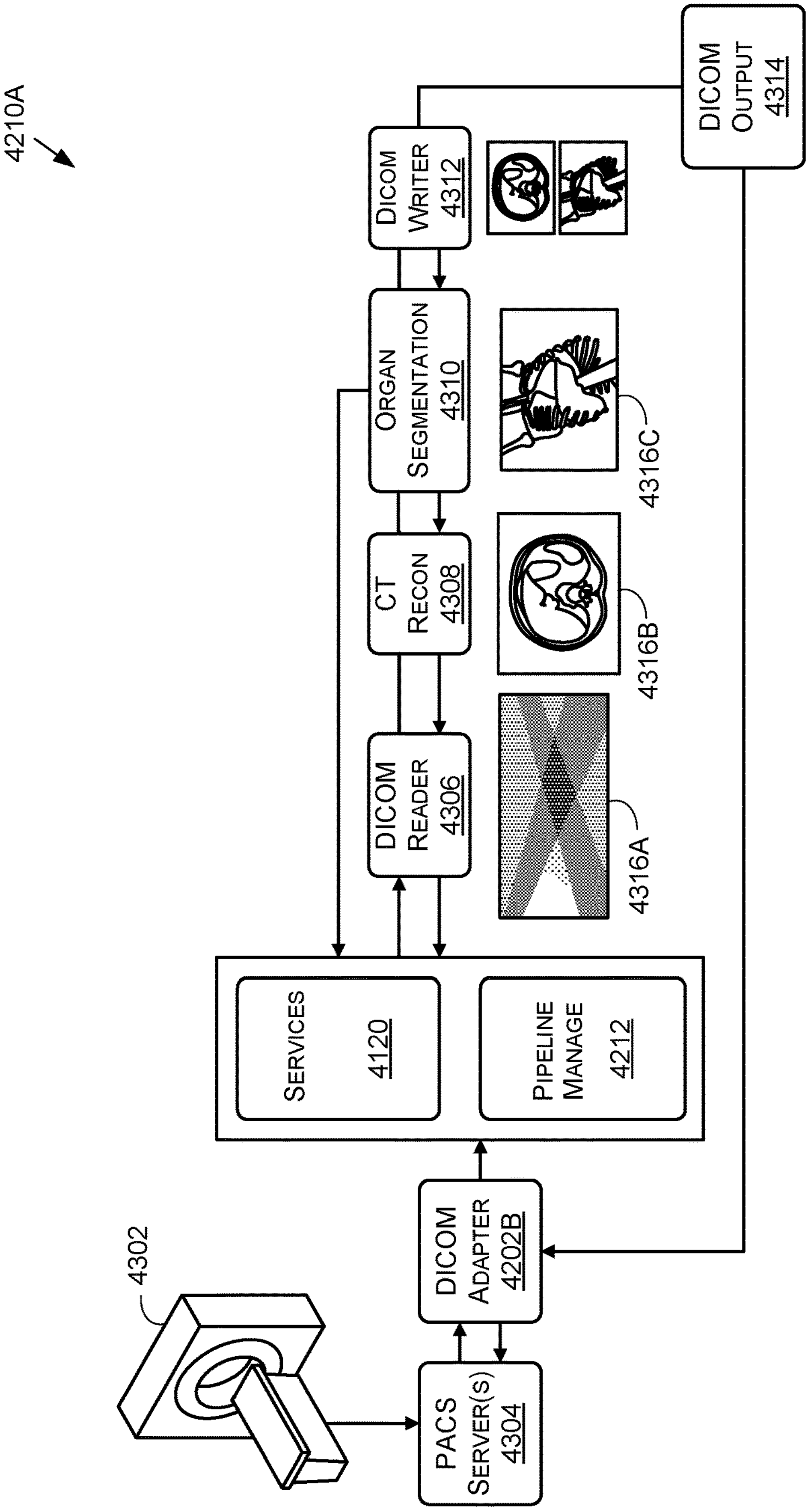
FIG. 43 includes an example illustration of an advanced computing pipeline 4210A for processing imaging data, in accordance with at least one embodiment.

In at least one embodiment, pipeline manager 4212 may be used, in addition to an application orchestration system 4228, to manage interaction between applications or containers of deployment pipeline(s) 4210 and services 4120 and/or hardware 4122. In at least one embodiment, pipeline manager 4212 may be configured to facilitate interactions from application to application, from application to service 4120, and/or from application or service to hardware 4122. In at least one embodiment, although illustrated as included in software 4118, this is not intended to be limiting, and in some examples (e.g., as illustrated in FIG. 43) pipeline manager 4212 may be included in services 4120. In at least one embodiment, application orchestration system 4228 (e.g., Kubernetes, DOCKER, etc.) may include a container orchestration system that may group applications into containers as logical units for coordination, management, scaling, and deployment. In at least one embodiment, by associating applications from deployment pipeline(s) 4210 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 4212 and application orchestration system 4228. In at least one embodiment, so long as an expected input and/or output of each container or application is known by a system (e.g., based on constructs of applications or containers), application orchestration system 4228 and/or pipeline manager 4212 may facilitate communication among and between, and sharing of resources among and between, each of applications or containers. In at least one embodiment, because one or more of applications or containers in deployment pipeline(s) 4210 may share same services and resources, application orchestration system 4228 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 4228 such as a sequencer and/or asynchronous compute engine) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 4120 leveraged by and shared by applications or containers in deployment system 4106 may include compute services 4216, AI services 4218, visualization services 4220, and/or other service types. In at least one embodiment, applications may call (e.g., execute) one or more of services 4120 to perform processing operations for an application. In at least one embodiment, compute services 4216 may be leveraged by applications to perform super-computing or other high-performance computing (HPC) tasks. In at least one embodiment, compute service(s) 4216 may be leveraged to perform parallel processing (e.g., using a parallel computing platform 4230) for processing data through one or more of applications and/or one or more tasks of a single application, substantially simultaneously. In at least one embodiment, parallel computing platform 4230 (e.g., NVIDIA's CUDA) may enable general purpose computing on GPUs (GPGPU) (e.g., GPUs 4222). In at least one embodiment, a software layer of parallel computing platform 4230 may provide access to virtual instruction sets and parallel computational elements of GPUs, for execution of compute kernels. In at least one embodiment, parallel computing platform 4230 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 4230 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 4218 may be leveraged to perform inferencing services for executing machine learning model(s) associated with applications (e.g., tasked with performing one or more processing tasks of an application). In at least one embodiment, AI services 4218 may leverage AI system 4224 to execute machine learning model(s) (e.g., neural networks, such as CNNs) for segmentation, reconstruction, object detection, feature detection, classification, and/or other inferencing tasks. In at least one embodiment, applications of deployment pipeline(s) 4210 may use one or more of output models 4116 from training system 4104 and/or other models of applications to perform inferencing on imaging data (e.g., DICOM data, RIS data, CIS data, REST compliant data, RPC data, raw data, etc.). In at least one embodiment, two or more examples of inferencing using application orchestration system 4228 (e.g., a scheduler, sequencer, and/or asynchronous compute engine) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 4228 may distribute resources (e.g., services 4120 and/or hardware 4122) based on priority paths for different inferencing tasks of AI services 4218.

In at least one embodiment, shared storage may be mounted to AI services 4218 within system 4200. In at least one embodiment, shared storage may operate as a cache (or other storage device type) and may be used to process inference requests from applications. In at least one embodiment, when an inference request is submitted, a request may be received by a set of API instances of deployment system 4106, and one or more instances may be selected (e.g., for best fit, for load balancing, etc.) to process a request. In at least one embodiment, to process a request, a request may be entered into a database, a machine learning model may be located from model registry 4124 if not already in a cache, a validation step may ensure appropriate machine learning model is loaded into a cache (e.g., shared storage), and/or a copy of a model may be saved to a cache. In at least one embodiment, a scheduler (e.g., of pipeline manager 4212) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inferencing on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inferencing as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 4120 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 4226, and an inference service may perform inferencing on a GPU.

In at least one embodiment, visualization services 4220 may be leveraged to generate visualizations for viewing outputs of applications and/or deployment pipeline(s) 4210. In at least one embodiment, GPUs 4222 may be leveraged by visualization services 4220 to generate visualizations. In at least one embodiment, rendering effects, such as ray-tracing, may be implemented by visualization services 4220 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 4220 may include an internal visualizer, cinematics, and/or other rendering or image processing capabilities or functionality (e.g., ray tracing, rasterization, internal optics, etc.).

In at least one embodiment, hardware 4122 may include GPUs 4222, AI system 4224, cloud 4226, and/or any other hardware used for executing training system 4104 and/or deployment system 4106. In at least one embodiment, GPUs 4222 (e.g., NVIDIA's TESLA and/or QUADRO GPUs) may include any number of GPUs that may be used for executing processing tasks of compute services 4216, AI services 4218, visualization services 4220, other services, and/or any of features or functionality of software 4118. For example, with respect to AI services 4218, GPUs 4222 may be used to perform pre-processing on imaging data (or other data types used by machine learning models), post-processing on outputs of machine learning models, and/or to perform inferencing (e.g., to execute machine learning models). In at least one embodiment, cloud 4226, AI system 4224, and/or other components of system 4200 may use GPUs 4222. In at least one embodiment, cloud 4226 may include a GPU-optimized platform for deep learning tasks. In at least one embodiment, AI system 4224 may use GPUs, and cloud 4226—or at least a portion tasked with deep learning or inferencing—may be executed using one or more AI systems 4224. As such, although hardware 4122 is illustrated as discrete components, this is not intended to be limiting, and any components of hardware 4122 may be combined with, or leveraged by, any other components of hardware 4122.

In at least one embodiment, AI system 4224 may include a purpose-built computing system (e.g., a super-computer or an HPC) configured for inferencing, deep learning, machine learning, and/or other artificial intelligence tasks. In at least one embodiment, AI system 4224 (e.g., NVIDIA's DGX) may include GPU-optimized software (e.g., a software stack) that may be executed using a plurality of GPUs 4222, in addition to CPUs, RAM, storage, and/or other components, features, or functionality. In at least one embodiment, one or more AI systems 4224 may be implemented in cloud 4226 (e.g., in a data center) for performing some or all of AI-based processing tasks of system 4200.

In at least one embodiment, cloud 4226 may include a GPU-accelerated infrastructure (e.g., NVIDIA's NGC) that may provide a GPU-optimized platform for executing processing tasks of system 4200. In at least one embodiment, cloud 4226 may include an AI system(s) 4224 for performing one or more of AI-based tasks of system 4200 (e.g., as a hardware abstraction and scaling platform). In at least one embodiment, cloud 4226 may integrate with application orchestration system 4228 leveraging multiple GPUs to enable seamless scaling and load balancing between and among applications and services 4120. In at least one embodiment, cloud 4226 may tasked with executing at least some of services 4120 of system 4200, including compute services 4216, AI services 4218, and/or visualization services 4220, as described herein. In at least one embodiment, cloud 4226 may perform small and large batch inference (e.g., executing NVIDIA's TENSOR RT), provide an accelerated parallel computing API and platform 4230 (e.g., NVIDIA's CUDA), execute application orchestration system 4228 (e.g., KUBERNETES), provide a graphics rendering API and platform (e.g., for ray-tracing, 2D graphics, 3D graphics, and/or other rendering techniques to produce higher quality cinematics), and/or may provide other functionality for system 4200.

In at least one embodiment, in an effort to preserve patient confidentiality (e.g., where patient data or records are to be used off-premises), cloud 4226 may include a registry-such as a deep learning container registry. In at least one embodiment, a registry may store containers for instantiations of applications that may perform pre-processing, post-processing, or other processing tasks on patient data. In at least one embodiment, cloud 4226 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, one or more systems depicted in FIG. 42 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 42 are utilized to perform operations discussed herein such as selectively using one or more neural network layers based, at least in part, on one or more iteratively increasing neural network performance metrics. In at least one embodiment, one or more systems depicted in FIG. 42 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 42 are utilized to implement one or more systems and/or processes such as those described in connection with FIGS. 1-11.

FIG. 43 includes an example illustration of a deployment pipeline 4210A for processing imaging data, in accordance with at least one embodiment. In at least one embodiment, system 4200—and specifically deployment system 4106—may be used to customize, update, and/or integrate deployment pipeline(s) 4210A into one or more production environments. In at least one embodiment, deployment pipeline 4210A of FIG. 43 includes a non-limiting example of a deployment pipeline 4210A that may be custom defined by a particular user (or team of users) at a facility (e.g., at a hospital, clinic, lab, research environment, etc.). In at least one embodiment, to define deployment pipelines 4210A for a CT scanner 4302, a user may select—from a container registry, for example—one or more applications that perform specific functions or tasks with respect to imaging data generated by CT scanner 4302. In at least one embodiment, applications may be applied to deployment pipeline 4210A as containers that may leverage services 4120 and/or hardware 4122 of system 4200. In addition, deployment pipeline 4210A may include additional processing tasks or applications that may be implemented to prepare data for use by applications (e.g., DICOM adapter 4202B and DICOM reader 4306 may be used in deployment pipeline 4210A to prepare data for use by CT reconstruction 4308, organ segmentation 4310, etc.). In at least one embodiment, deployment pipeline 4210A may be customized or selected for consistent deployment, one time use, or for another frequency or interval. In at least one embodiment, a user may desire to have CT reconstruction 4308 and organ segmentation 4310 for several subjects over a specific interval, and thus may deploy pipeline 4210A for that period of time. In at least one embodiment, a user may select, for each request from system 4200, applications that a user wants to perform processing on that data for that request. In at least one embodiment, deployment pipeline 4210A may be adjusted at any interval and, because of adaptability and scalability of a container structure within system 4200, this may be a seamless process.

In at least one embodiment, deployment pipeline 4210A of FIG. 43 may include CT scanner 4302 generating imaging data of a patient or subject. In at least one embodiment, imaging data from CT scanner 4302 may be stored on a PACS server(s) 4304 associated with a facility housing CT scanner 4302. In at least one embodiment, PACS server(s) 4304 may include software and/or hardware components that may directly interface with imaging modalities (e.g., CT scanner 4302) at a facility. In at least one embodiment, DICOM adapter 4202B may enable sending and receipt of DICOM objects using DICOM protocols. In at least one embodiment, DICOM adapter 4202B may aid in preparation or configuration of DICOM data from PACS server(s) 4304 for use by deployment pipeline 4210A. In at least one embodiment, once DICOM data is processed through DICOM adapter 4202B, pipeline manager 4212 may route data through to deployment pipeline 4210A. In at least one embodiment, DICOM reader 4306 may extract image files and any associated metadata from DICOM data (e.g., raw sinogram data, as illustrated in visualization 4316A). In at least one embodiment, working files that are extracted may be stored in a cache for faster processing by other applications in deployment pipeline 4210A. In at least one embodiment, once DICOM reader 4306 has finished extracting and/or storing data, a signal of completion may be communicated to pipeline manager 4212. In at least one embodiment, pipeline manager 4212 may then initiate or call upon one or more other applications or containers in deployment pipeline 4210A.

In at least one embodiment, CT reconstruction 4308 application and/or container may be executed once data (e.g., raw sinogram data) is available for processing by CT reconstruction 4308 application. In at least one embodiment, CT reconstruction 4308 may read raw sinogram data from a cache, reconstruct an image file out of raw sinogram data (e.g., as illustrated in visualization 4316B), and store resulting image file in a cache. In at least one embodiment, at completion of reconstruction, pipeline manager 4212 may be signaled that reconstruction task is complete. In at least one embodiment, once reconstruction is complete, and a reconstructed image file may be stored in a cache (or other storage device), organ segmentation 4310 application and/or container may be triggered by pipeline manager 4212. In at least one embodiment, organ segmentation 4310 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 4310 application and/or container may rely on services 4120, and pipeline manager 4212 and/or application orchestration system 4228 may facilitate use of services 4120 by organ segmentation 4310 application and/or container. In at least one embodiment, for example, organ segmentation 4310 application and/or container may leverage AI services 4218 to perform inferencing on a normalized image, and AI services 4218 may leverage hardware 4122 (e.g., AI system 4224) to execute AI services 4218. In at least one embodiment, a result of an inference may be a mask file (e.g., as illustrated in visualization 4316C) that may be stored in a cache (or other storage device).

In at least one embodiment, once applications that process DICOM data and/or data extracted from DICOM data have completed processing, a signal may be generated for pipeline manager 4212. In at least one embodiment, pipeline manager 4212 may then execute DICOM writer 4312 to read results from a cache (or other storage device), package results into a DICOM format (e.g., as DICOM output 4314) for use by users at a facility who generated a request. In at least one embodiment, DICOM output 4314 may then be transmitted to DICOM adapter 4202B to prepare DICOM output 4314 for storage on PACS server(s) 4304 (e.g., for viewing by a DICOM viewer at a facility). In at least one embodiment, in response to a request for reconstruction and segmentation, visualizations 4316B and 4316C may be generated and available to a user for diagnoses, research, and/or for other purposes.

Although illustrated as consecutive application in deployment pipeline 4210A, CT reconstruction 4308 and organ segmentation 4310 applications may be processed in parallel in at least one embodiment. In at least one embodiment, where applications do not have dependencies on one another, and data is available for each application (e.g., after DICOM reader 4306 extracts data), applications may be executed at a same time, substantially at a same time, or with some overlap. In at least one embodiment, where two or more applications require similar services 4120, a scheduler of system 4200 may be used to load balance and distribute compute or processing resources between and among various applications. In at least one embodiment, in some embodiments, parallel computing platform 4230 may be used to perform parallel processing for applications to decrease run-time of deployment pipeline 4210A to provide real-time results.

Figure 44A:
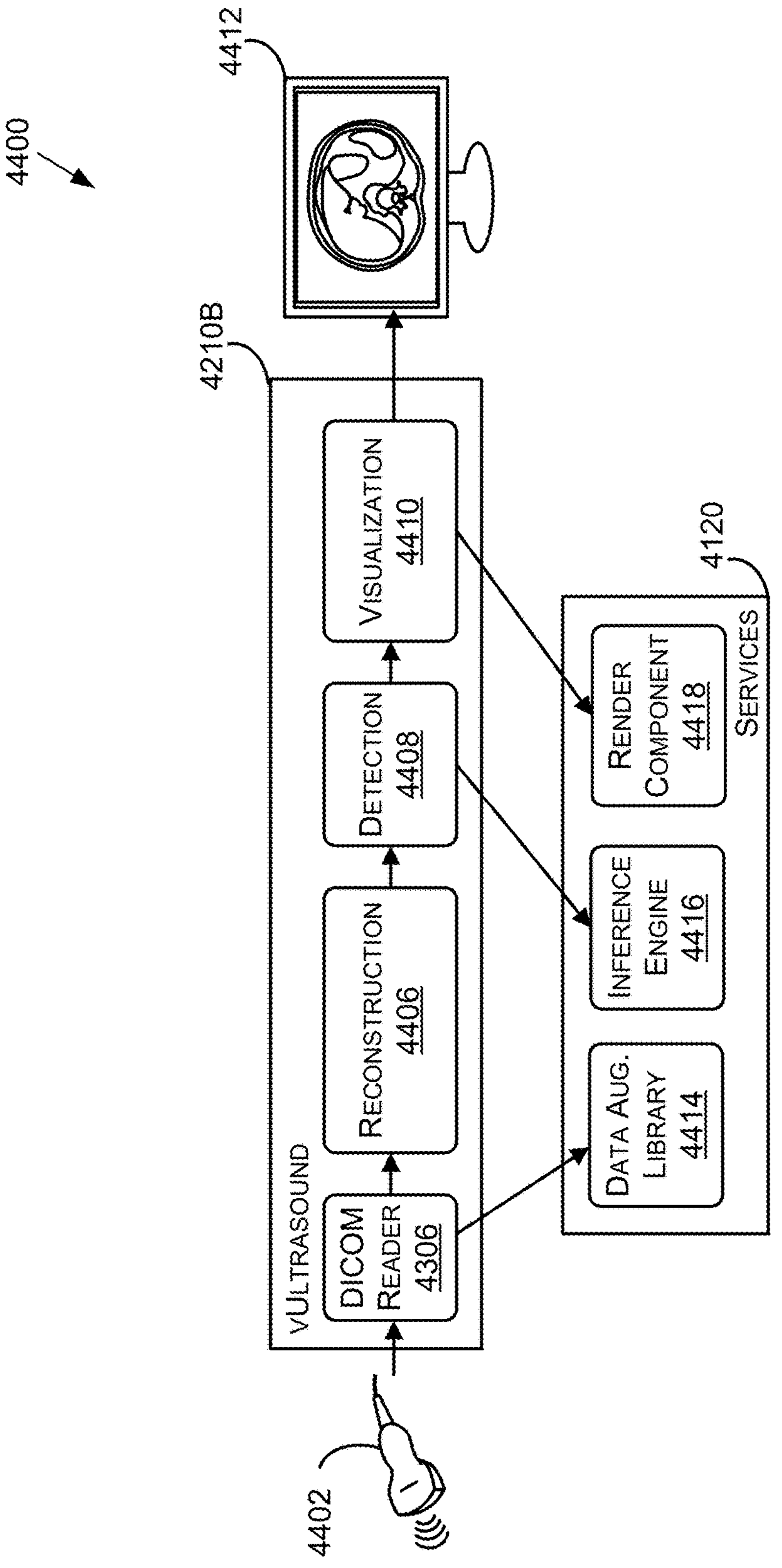
FIG. 44A includes an example data flow diagram of a virtual instrument supporting an ultrasound device, in accordance with at least one embodiment.
Figure 44B:
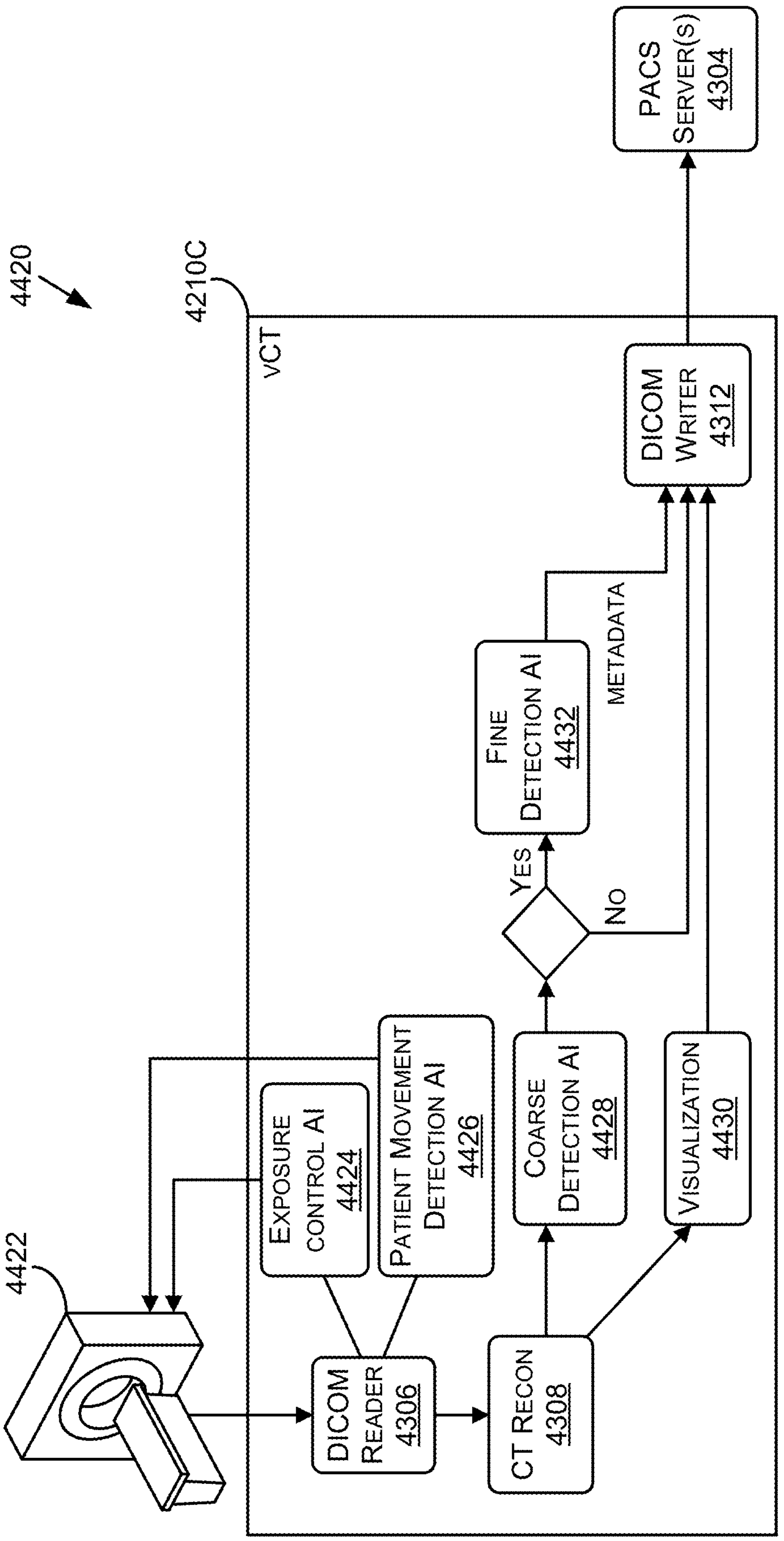
FIG. 44B includes an example data flow diagram of a virtual instrument supporting an CT scanner, in accordance with at least one embodiment.

In at least one embodiment, and with reference to FIGS. 44A-44B, deployment system 4106 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 4200 may allow for creation and provision of virtual instruments that may include a software-defined deployment pipeline 4210 that may receive raw/unprocessed input data generated by a device(s) and output processed/reconstructed data. In at least one embodiment, deployment pipelines 4210 (e.g., 4210A and 4210B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 4210 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 4200 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 4226). In at least one embodiment, deployment system 4106, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 4104. In at least one embodiment, with training pipelines in place, machine learning models may continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 4122 described herein, and hardware 4122 may be distributed in any of a number of ways including within a device, as part of a computing device coupled to and located proximate a device, in a local datacenter at a facility, and/or in cloud 4226. In at least one embodiment, because deployment system 4106 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, one or more systems depicted in FIG. 43 are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIG. 43 are utilized to perform operations discussed herein such as selectively using one or more neural network layers based, at least in part, on one or more iteratively increasing neural network performance metrics. In at least one embodiment, one or more systems depicted in FIG. 43 are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIG. 43 are utilized to implement one or more systems and/or processes such as those described in connection with FIGS. 1-11.

FIG. 44A includes an example data flow diagram of a virtual instrument supporting an ultrasound device, in accordance with at least one embodiment. In at least one embodiment, deployment pipeline 4210B may leverage one or more of services 4120 of system 4200. In at least one embodiment, deployment pipeline 4210B and services 4120 may leverage hardware 4122 of a system either locally or in cloud 4226. In at least one embodiment, although not illustrated, process 4400 may be facilitated by pipeline manager 4212, application orchestration system 4228, and/or parallel computing platform 4230.

In at least one embodiment, process 4400 may include receipt of imaging data from an ultrasound device 4402. In at least one embodiment, imaging data may be stored on PACS server(s) in a DICOM format (or other format, such as RIS, CIS, REST compliant, RPC, raw, etc.), and may be received by system 4200 for processing through deployment pipeline 4210 selected or customized as a virtual instrument (e.g., a virtual ultrasound) for ultrasound device 4402. In at least one embodiment, imaging data may be received directly from an imaging device (e.g., ultrasound device 4402) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 4306 to extract data for use by applications or containers of deployment pipeline 4210B. In at least one embodiment, DICOM reader 4306 may leverage data augmentation library 4414 (e.g., NVIDIA's DALI) as a service 4120 (e.g., as one of compute service(s) 4216) for extracting, resizing, rescaling, and/or otherwise preparing data for use by applications or containers.

In at least one embodiment, once data is prepared, a reconstruction 4406 application and/or container may be executed to reconstruct data from ultrasound device 4402 into an image file. In at least one embodiment, after reconstruction 4406, or at a same time as reconstruction 4406, a detection 4408 application and/or container may be executed for anomaly detection, object detection, feature detection, and/or other detection tasks related to data. In at least one embodiment, an image file generated during reconstruction 4406 may be used during detection 4408 to identify anomalies, objects, features, etc. In at least one embodiment, detection 4408 application may leverage an inference engine 4416 (e.g., as one of AI service(s) 4218) to perform inferencing on data to generate detections. In at least one embodiment, one or more machine learning models (e.g., from training system 4104) may be executed or called by detection 4408 application.

In at least one embodiment, once reconstruction 4406 and/or detection 4408 is/are complete, data output from these application and/or containers may be used to generate visualizations 4410, such as visualization 4412 (e.g., a grayscale output) displayed on a workstation or display terminal. In at least one embodiment, visualization may allow a technician or other user to visualize results of deployment pipeline 4210B with respect to ultrasound device 4402. In at least one embodiment, visualization 4410 may be executed by leveraging a render component 4418 of system 4200 (e.g., one of visualization service(s) 4220). In at least one embodiment, render component 4418 may execute a 2D, OpenGL, or ray-tracing service to generate visualization 4412.

FIG. 44B includes an example data flow diagram of a virtual instrument supporting a CT scanner, in accordance with at least one embodiment. In at least one embodiment, deployment pipeline 4210C may leverage one or more of services 4120 of system 4200. In at least one embodiment, deployment pipeline 4210C and services 4120 may leverage hardware 4122 of a system either locally or in cloud 4226. In at least one embodiment, although not illustrated, process 4420 may be facilitated by pipeline manager 4212, application orchestration system 4228, and/or parallel computing platform 4230.

In at least one embodiment, process 4420 may include CT scanner 4422 generating raw data that may be received by DICOM reader 4306 (e.g., directly, via a PACS server 4304, after processing, etc.). In at least one embodiment, a Virtual CT (instantiated by deployment pipeline 4210C) may include a first, real-time pipeline for monitoring a patient (e.g., patient movement detection AI 4426) and/or for adjusting or optimizing exposure of CT scanner 4422 (e.g., using exposure control AI 4424). In at least one embodiment, one or more of applications (e.g., 4424 and 4426) may leverage a service 4120, such as AI service(s) 4218. In at least one embodiment, outputs of exposure control AI 4424 application (or container) and/or patient movement detection AI 4426 application (or container) may be used as feedback to CT scanner 4422 and/or a technician for adjusting exposure (or other settings of CT scanner 4422) and/or informing a patient to move less.

In at least one embodiment, deployment pipeline 4210C may include a non-real-time pipeline for analyzing data generated by CT scanner 4422. In at least one embodiment, a second pipeline may include CT reconstruction 4308 application and/or container, a coarse detection AI 4428 application and/or container, a fine detection AI 4432 application and/or container (e.g., where certain results are detected by coarse detection AI 4428), a visualization 4430 application and/or container, and a DICOM writer 4312 (and/or other data type writer, such as RIS, CIS, REST compliant, RPC, raw, etc.) application and/or container. In at least one embodiment, raw data generated by CT scanner 4422 may be passed through pipelines of deployment pipeline 4210C (instantiated as a virtual CT instrument) to generate results. In at least one embodiment, results from DICOM writer 4312 may be transmitted for display and/or may be stored on PACS server(s) 4304 for later retrieval, analysis, or display by a technician, practitioner, or other user.

In at least one embodiment, one or more systems depicted in FIGS. 44A-44B are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 44A-44B are utilized to perform operations discussed herein such as selectively using one or more neural network layers based, at least in part, on one or more iteratively increasing neural network performance metrics. In at least one embodiment, one or more systems depicted in FIGS. 44A-44B are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 44A-44B are utilized to implement one or more systems and/or processes such as those described in connection with FIGS. 1-11.

FIG. 45A illustrates a data flow diagram for a process 4500 to train, retrain, or update a machine learning model, in accordance with at least one embodiment. In at least one embodiment, process 4500 may be executed using, as a non-limiting example, system 4200 of FIG. 42. In at least one embodiment, process 4500 may leverage services 4120 and/or hardware 4122 of system 4200, as described herein. In at least one embodiment, refined models 4512 generated by process 4500 may be executed by deployment system 4106 for one or more containerized applications in deployment pipelines 4210.

In at least one embodiment, model training 4114 may include retraining or updating an initial model 4504 (e.g., a pre-trained model) using new training data (e.g., new input data, such as customer dataset 4506, and/or new ground truth data associated with input data). In at least one embodiment, to retrain, or update, initial model 4504, output or loss layer(s) of initial model 4504 may be reset, or deleted, and/or replaced with an updated or new output or loss layer(s). In at least one embodiment, initial model 4504 may have previously fine-tuned parameters (e.g., weights and/or biases) that remain from prior training, so training or retraining 4114 may not take as long or require as much processing as training a model from scratch. In at least one embodiment, during model training 4114, by having reset or replaced output or loss layer(s) of initial model 4504, parameters may be updated and re-tuned for a new data set based on loss calculations associated with accuracy of output or loss layer(s) at generating predictions on new, customer dataset 4506 (e.g., image data 4108 of FIG. 41).

In at least one embodiment, pre-trained models 4206 may be stored in a data store, or registry (e.g., model registry 4124 of FIG. 41). In at least one embodiment, pre-trained models 4206 may have been trained, at least in part, at one or more facilities other than a facility executing process 4500. In at least one embodiment, to protect privacy and rights of patients, subjects, or clients of different facilities, pre-trained models 4206 may have been trained, on-premise, using customer or patient data generated on-premise. In at least one embodiment, pre-trained models 4206 may be trained using cloud 4226 and/or other hardware 4122, but confidential, privacy protected patient data may not be transferred to, used by, or accessible to any components of cloud 4226 (or other off premise hardware). In at least one embodiment, where a pre-trained model 4206 is trained at using patient data from more than one facility, pre-trained model 4206 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 4206 on-premise and/or off premise, such as in a datacenter or other cloud computing infrastructure.

In at least one embodiment, when selecting applications for use in deployment pipelines 4210, a user may also select machine learning models to be used for specific applications. In at least one embodiment, a user may not have a model for use, so a user may select a pre-trained model 4206 to use with an application. In at least one embodiment, pre-trained model 4206 may not be optimized for generating accurate results on customer dataset 4506 of a facility of a user (e.g., based on patient diversity, demographics, types of medical imaging devices used, etc.). In at least one embodiment, prior to deploying pre-trained model 4206 into deployment pipeline 4210 for use with an application(s), pre-trained model 4206 may be updated, retrained, and/or fine-tuned for use at a respective facility.

In at least one embodiment, a user may select pre-trained model 4206 that is to be updated, retrained, and/or fine-tuned, and pre-trained model 4206 may be referred to as initial model 4504 for training system 4104 within process 4500. In at least one embodiment, customer dataset 4506 (e.g., imaging data, genomics data, sequencing data, or other data types generated by devices at a facility) may be used to perform model training 4114 (which may include, without limitation, transfer learning) on initial model 4504 to generate refined model 4512. In at least one embodiment, ground truth data corresponding to customer dataset 4506 may be generated by training system 4104. In at least one embodiment, ground truth data may be generated, at least in part, by clinicians, scientists, doctors, practitioners, at a facility (e.g., as labeled clinic data 4112 of FIG. 41).

In at least one embodiment, AI-assisted annotation 4110 may be used in some examples to generate ground truth data. In at least one embodiment, AI-assisted annotation 4110 (e.g., implemented using an AI-assisted annotation SDK) may leverage machine learning models (e.g., neural networks) to generate suggested or predicted ground truth data for a customer dataset. In at least one embodiment, user 4510 may use annotation tools within a user interface (a graphical user interface (GUI)) on computing device 4508.

In at least one embodiment, user 4510 may interact with a GUI via computing device 4508 to edit or fine-tune annotations or auto-annotations. In at least one embodiment, a polygon editing feature may be used to move vertices of a polygon to more accurate or fine-tuned locations.

In at least one embodiment, once customer dataset 4506 has associated ground truth data, ground truth data (e.g., from AI-assisted annotation, manual labeling, etc.) may be used by during model training 4114 to generate refined model 4512. In at least one embodiment, customer dataset 4506 may be applied to initial model 4504 any number of times, and ground truth data may be used to update parameters of initial model 4504 until an acceptable level of accuracy is attained for refined model 4512. In at least one embodiment, once refined model 4512 is generated, refined model 4512 may be deployed within one or more deployment pipelines 4210 at a facility for performing one or more processing tasks with respect to medical imaging data.

In at least one embodiment, refined model 4512 may be uploaded to pre-trained models 4206 in model registry 4124 to be selected by another facility. In at least one embodiment, his process may be completed at any number of facilities such that refined model 4512 may be further refined on new datasets any number of times to generate a more universal model.

FIG. 45B is an example illustration of a client-server architecture 4532 to enhance annotation tools with pre-trained annotation models, in accordance with at least one embodiment. In at least one embodiment, AI-assisted annotation tools 4536 may be instantiated based on a client-server architecture 4532. In at least one embodiment, annotation tools 4536 in imaging applications may aid radiologists, for example, identify organs and abnormalities. In at least one embodiment, imaging applications may include software tools that help user 4510 to identify, as a non-limiting example, a few extreme points on a particular organ of interest in raw images 4534 (e.g., in a 3D MRI or CT scan) and receive auto-annotated results for all 2D slices of a particular organ. In at least one embodiment, results may be stored in a data store as training data 4538 and used as (for example and without limitation) ground truth data for training. In at least one embodiment, when computing device 4508 sends extreme points for AI-assisted annotation 4110, a deep learning model, for example, may receive this data as input and return inference results of a segmented organ or abnormality. In at least one embodiment, pre-instantiated annotation tools, such as AI-Assisted Annotation Tool 4536B in FIG. 45B, may be enhanced by making API calls (e.g., API Call 4544) to a server, such as an Annotation Assistant Server 4540 that may include a set of pre-trained models 4542 stored in an annotation model registry, for example. In at least one embodiment, an annotation model registry may store pre-trained models 4542 (e.g., machine learning models, such as deep learning models) that are pre-trained to perform AI-assisted annotation on a particular organ or abnormality. In at least one embodiment, these models may be further updated by using training pipelines 4204. In at least one embodiment, pre-installed annotation tools may be improved over time as new labeled clinic data 4112 is added.

Logic 1215 are used to perform inferencing and/or training operations associated with one or more embodiments. Details regarding logic 1215 are provided herein in conjunction with FIGS. 12A and/or 12B.

In at least one embodiment, one or more systems depicted in FIGS. 45A-45B are utilized to perform operations discussed herein such as using a neural architecture search (NAS) algorithm to iteratively generate one or more hyperparameters to be used by one or more neural networks, wherein said one or more hyperparameters are to be generated before being used by said one or more neural networks. In at least one embodiment, one or more systems depicted in FIGS. 45A-45B are utilized to perform operations discussed herein such as selectively using one or more neural network layers based, at least in part, on one or more iteratively increasing neural network performance metrics. In at least one embodiment, one or more systems depicted in FIGS. 45A-45B are utilized to perform operations discussed herein such as using a neural architecture search (NAS) to determine whether to remove one or more neural network layers based, at least in part, on a comparison between at least one performance metric of a neural network when said one or more neural network layers is removed and said at least one performance metric when said one or more neural network layers is not removed. In at least one embodiment, one or more systems depicted in FIGS. 45A-45B are utilized to implement one or more systems and/or processes such as those described in connection with FIGS. 1-11.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 18, computer programs in form of machine-readable executable code or computer control logic algorithms are stored in main memory 1804 and/or secondary storage. Computer programs, if executed by one or more processors, enable system 1800 to perform various functions in accordance with at least one embodiment. In at least one embodiment, memory 1804, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1802, parallel processing system 1812, an integrated circuit capable of at least a portion of capabilities of both CPU 1802, parallel processing system 1812, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1800 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic. In at least one embodiment, a computer system 1800 comprises or refers to any devices in FIGS. 12A-45B In at least one embodiment, parallel processing system 1812 includes, without limitation, a plurality of parallel processing units ("PPUs") 1814 and associated memories 1816. In at least one embodiment, PPUs 1814 are connected to a host processor or other peripheral devices via an interconnect 1818 and a switch 1820 or multiplexer. In at least one embodiment, parallel processing system 1812 distributes computational tasks across PPUs 1814 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1814, although such shared memory may incur performance penalties relative to use of local memory and registers resident to a PPU 1814. In at least one embodiment, operation of PPUs 1814 is synchronized through use of a command such as _syncthreads( ) wherein all threads in a block (e.g., executed across multiple PPUs 1814) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications.

In at least one embodiment, oneVPL implements various video decoding, encoding, and processing functions. In at least one embodiment, one VPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processors 3300, graphics cores 2300, parallel processor 2500, processor 2800, processor core 2800, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

At least one embodiment of the disclosure can be described in view of the following clauses:

Clause 1. A processor, comprising:

one or more circuits to use a neural architecture search (NAS) algorithm to iteratively generate one or more hyperparameters to be used by one or more neural networks, wherein the one or more hyperparameters are to be generated before being used by the one or more neural networks.

Clause 2. The processor of clause 1, wherein the one or more circuits are to:

generate a first variant of an operation;

generate a second variant of the operation; and update the first variant and the second variant based, at least in part, on results of one or more training processes to generate the one or more hyperparameters.

Clause 3. The processor of any of the clauses 1-2, wherein the one or more circuits are to use the NAS algorithm to update one or more masks based, at least in part, on training data to calculate the one or more hyperparameters.

Clause 4. The processor of any of clauses 1-3, wherein the one or more circuits are to generate a hyperparameter by at least generating one or more masks to calculate the hyperparameter.

Clause 5. The processor of any of clauses 1-4, wherein the one or more circuits are to use the one or more neural networks to perform one or more computer vision tasks.

Clause 6. The processor of any of clauses 1-5, wherein a first hyperparameter of the one or more hyperparameters corresponds to a dimension of an operation to be used in the one or more neural networks.

Clause 7. The processor of any of clauses 1-6, wherein the one or more circuits are to use one or more graphics processing units (GPUs) to perform the NAS algorithm.

Clause 8. A system, comprising:

one or more computers having one or more processors to use a neural architecture search (NAS) algorithm to iteratively generate one or more hyperparameters to be used by one or more neural networks, wherein the one or more hyperparameters are to be generated before being used by the one or more neural networks.

Clause 9. The system of clause 8, wherein the one or more processors are further to:

generate a first variant and a second variant of an operation;

perform at least a portion of the NAS algorithm to calculate a first weight corresponding to the first variant and a second weight corresponding to the second variant; and update the first variant and the second variant based, at least in part, on the first weight and the second weight to generate the one or more hyperparameters.

Clause 10. The system of any of clauses 8-9, wherein the one or more processors are further to:

calculate a first set of hyperparameters;

perform at least a portion of the NAS algorithm based, at least in part, on the first set of hyperparameters; and calculate a second set of hyperparameters based, at least in part, on results from at least the portion of the NAS algorithm.

Clause 11. The system of any of clauses 8-10, wherein the one or more processors are further to generate the one or more hyperparameters by at least iteratively updating one or more masks based, at least in part, on one or more results of one or more training processes in connection with the one or more masks.

Clause 12. The system of any of clauses 8-11, wherein a first hyperparameter of the one or more hyperparameters corresponds to a number of channels in one or more tensors of the one or more neural networks.

Clause 13. The system of any of clauses 8-12, wherein the one or more processors are further to use the one or more neural networks to perform one or more natural language processing (NLP) tasks.

Clause 14. The system of any of clauses 8-13, wherein the one or more processors are further to use one or more parallel processing units (PPUs) to perform the NAS algorithm.

Clause 15. A method, comprising:

using a neural architecture search (NAS) algorithm to iteratively generate one or more hyperparameters to be used by one or more neural networks, wherein the one or more hyperparameters are to be generated before being used by the one or more neural networks.

Clause 16. The method of clause 15, further comprising iteratively generating the one or more hyperparameters by at least:

generating one or more variants of an operation to be used in the one or more neural networks;

iteratively updating the one or more variants through one or more training processes based, at least in part, on training data; and calculating a first hyperparameter of the one or more hyperparameters based, at least in part, on the one or more variants.

Clause 17. The method of any of clauses 15-16, further comprising: updating at least a first variant and a second variant of an operation; and calculating a third variant from the first variant and the second variant to generate the one or more hyperparameters.

Clause 18. The method of any of clauses 15-17, further comprising performing the NAS algorithm in connection with training data comprising at least one or more images.

Clause 19. The method of any of clauses 15-18, wherein the one or more hyperparameters indicate at least a manner in which one or more weights are to be applied in the one or more neural networks.

Clause 20. A non-transitory computer readable medium having stored thereon a set of instructions, which if performed by one or more processors, cause the one or more processors to at least perform the method of clause 15.

At least one embodiment of the disclosure can be described in view of the following clauses:

Clause 1. A processor, comprising:

one or more circuits to selectively use one or more neural network layers based, at least in part, on one or more iteratively increasing neural network performance metrics.

Clause 2. The processor of clause 1, wherein the one or more circuits are to calculate the one or more iteratively increasing neural network performance metrics based on a current training epoch.

Clause 3. The processor of any of the clauses 1-2, wherein the one or more circuits are further to:

calculate one or more weights corresponding to the one or more neural network layers; and select the one or more neural network layers based, at least in part, on the one or more weights.

Clause 4. The processor of any of clauses 1-3, wherein the one or more circuits are to selectively use the one or more neural network layers by at least:

removing a subset of a first set of neural network layers based on the one or more iteratively increasing neural network performance metrics; and obtaining a first neural network layer of the one or more neural network layers from the first set of neural network layers.

Clause 5. The processor of any of clauses 1-4, wherein the one or more circuits are to linearly increase the one or more iteratively increasing neural network performance metrics.

Clause 6. The processor of any of clauses 1-5, wherein the processor is part of one or more graphics processing units (GPUs).

Clause 7. The processor of any of clauses 1-6, wherein the one or more circuits are further to generate a neural network comprising the one or more neural network layers.

Clause 8. A system, comprising:

one or more computers having one or more processors to selectively use one or more neural network layers based, at least in part, on one or more iteratively increasing neural network performance metrics.

Clause 9. The system of clause 8, wherein the one or more processors are further to:

obtain a set of candidate neural network layers;

iteratively reduce the set of candidate neural network layers based, at least in part, on the one or more iteratively increasing neural network performance metrics; and select the one or more neural network layers from the set of candidate neural network layers.

Clause 10. The system of any of clauses 8-9, wherein the one or more processors are further to, at each training epoch, calculate a value of the one or more iteratively increasing neural network performance metrics.

Clause 11. The system of any of clauses 8-10, wherein the one or more processors are to selectively use the one or more neural network layers based, at least in part, on one or more latency constraints.

Clause 12. The system of any of clauses 8-11, wherein the one or more processors are to:

iteratively update a set of weights based, at least in part, on training data; and selectively use the one or more neural network layers based, at least in part, on the set of weights.

Clause 13. The system of any of clauses 8-12, wherein the one or more processors are to use the one or more neural network layers to perform one or more computer vision tasks.

Clause 14. The system of any of clauses 8-13, wherein the one or more iteratively increasing neural network performance metrics are based on training progress.

Clause 15. A method, comprising: selectively using one or more neural network layers based, at least in part, on one or more iteratively increasing neural network performance metrics.

Clause 16. The method of clause 15, further comprising: calculating a set of values corresponding to a set of candidate neural network layers;

reducing the set of candidate neural network layers based, at least in part, on the set of values and the one or more iteratively increasing neural network performance metrics; and selecting the one or more neural network layers from the set of candidate neural network layers.

Clause 17. The method of any of clauses 15-16, further comprising using the one or more neural network layers to perform one or more natural language processing (NLP) tasks.

Clause 18. The method of any of clauses 15-17, wherein the one or more neural network layers correspond to one or more blocks of a data structure.

Clause 19. The method of any of clauses 15-18, further comprising calculating the one or more neural network layers by at least, at one or more times during training, reducing a set of candidate neural network layers.

Clause 20. A non-transitory computer readable medium having stored thereon a set of instructions, which if performed by one or more processors, cause the one or more processors to at least perform the method of clause 15.

At least one embodiment of the disclosure can be described in view of the following clauses:

Clause 1. A processor, comprising:

one or more circuits to use a neural architecture search (NAS) to determine whether to remove one or more neural network layers based, at least in part, on a comparison between at least one performance metric of a neural network when the one or more neural network layers is removed and the at least one performance metric when the one or more neural network layers is not removed.

Clause 2. The processor of clause 1, wherein the one or more circuits are to determine whether to remove the one or more neural network layers as a result of calculating the one or more neural network layers from a set of candidate neural network layers.

Clause 3. The processor of any of the clauses 1-2, wherein the one or more circuits are to determine whether to remove the one or more neural network layers by at least scaling an output of the one or more neural network layers.

Clause 4. The processor of any of clauses 1-3, wherein the one or more circuits are to remove the one or more neural network layers by at least selecting a skip connection operation associated with the one or more neural network layers.

Clause 5. The processor of any of clauses 1-4, wherein the one or more circuits are to generate one or more neural networks based, at least in part, on the determination of whether to remove the one or more neural network layers.

Clause 6. The processor of any of clauses 1-5, wherein the one or more circuits are to compare the at least one performance metric when the one or more neural network layers is removed and the at least one performance metric when the one or more neural network layers is not removed with a threshold value to determine whether to remove the one or more neural network layers.

Clause 7. The processor of any of clauses 1-6, wherein the one or more circuits are to use the NAS in connection with one or more graphics processing units (GPUs).

Clause 8. A system, comprising:

one or more computers having one or more processors to use a neural architecture search (NAS) to determine whether to remove one or more neural network layers based, at least in part, on a comparison between at least one performance metric of a neural network when the one or more neural network layers is removed and the at least one performance metric when the one or more neural network layers is not removed.

Clause 9. The system of clause 8, wherein the one or more processors are further to determine whether to remove the one or more neural network layers as a result of reducing a set of candidate neural network layers to the one or more neural network layers.

Clause 10. The system of any of clauses 8-9, wherein the one or more processors are further to use the NAS to:

calculate a first value of the at least one performance metric when the one or more neural network layers is removed based, at least in part, on a training dataset;

calculate a second value of the at least one performance metric when the one or more neural network layers is not removed based, at least in part, on the training dataset; and determine whether to remove the one or more neural network layers through at least a comparison between the first value and the second value, and a threshold value.

Clause 11. The system of any of clauses 8-10, wherein the one or more processors are further to remove the one or more neural network layers as a result of calculating a value of the at least one performance metric when the one or more neural network layers is not removed that is below a threshold.

Clause 12. The system of any of clauses 8-11, wherein the one or more processors are further to scale data that bypasses the one or more neural network layers to determine whether to remove the one or more neural network layers.

Clause 13. The system of any of clauses 8-12, wherein the one or more processors are further to, as a result of determining to use the one or more neural network layers, output one or more neural networks comprising the one or more neural network layers.

Clause 14. The system of any of clauses 8-13, wherein the one or more processors are further to perform the NAS in connection with one or more parallel processing units (PPUs).

Clause 15. A method, comprising:

using a neural architecture search (NAS) to determine whether to remove one or more neural network layers based, at least in part, on a comparison between at least one performance metric of a neural network when the one or more neural network layers is removed and the at least one performance metric when the one or more neural network layers is not removed.

Clause 16. The method of clause 15, further comprising:

calculating one or more values of the at least one performance metric;

comparing the one or more values with a threshold value; and determining whether to remove the one or more neural network layers based, at least in part, on the comparison of the one or more values with the threshold value.

Clause 17. The method of any of clauses 15-16, further comprising:

multiplying an output of the one or more neural network layers by a first value;

multiplying data that bypasses the one or more neural network layers by a second value; and calculating one or more weight values based, at least in part, on the output and the data to determine whether to remove the one or more neural network layers.

Clause 18. The method of any of clauses 15-17, wherein the NAS is based, at least in part, on one or more latency constraints.

Clause 19. The method of any of clauses 15-18, further comprising, as a result of determining to remove the one or more neural network layers, outputting one or more neural networks without the one or more neural network layers.

Clause 20. A non-transitory computer readable medium having stored thereon a set of instructions, which if performed by one or more processors, cause the one or more processors to at least perform the method of clause 15.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:

one or more circuits to use a neural architecture search (NAS) algorithm to iteratively generate one or more hyperparameters to be used by one or more neural networks to perform one or more tasks, wherein the one or more hyperparameters are to be generated before being used by the one or more neural networks, wherein to perform an iteration of the NAS algorithm the one or more circuits are to:

generate a first variant of a neural network operation according to a first hyperparameter value for a first hyperparameter of the one or more hyperparameters;

generate a second variant of the neural network operation according to a second hyperparameter value for the first hyperparameter, wherein the second hyperparameter value is greater than the first hyperparameter value; and change the first hyperparameter value and the second hyperparameter value to update the first variant and the second variant respectively based, at least in part, on results of one or more training processes to generate the one or more hyperparameters, wherein the first hyperparameter value and the second hyperparameter value are both decreased when performance of the first variant is greater than performance of the second variant for the iteration, and both increased when performance of the second variant is greater than performance of the first variant for the iteration.

2. The processor of claim 1, wherein the one or more circuits are to use the NAS algorithm to update one or more masks based, at least in part, on training data to calculate the one or more hyperparameters.

3. The processor of claim 1, wherein the one or more circuits are to generate a hyperparameter by at least generating one or more masks to calculate the hyperparameter.

4. The processor of claim 1, wherein the one or more circuits are to use the one or more neural networks to perform one or more computer vision tasks.

5. The processor of claim 1, wherein a first hyperparameter of the one or more hyperparameters corresponds to a dimension of an operation to be used in the one or more neural networks.

6. The processor of claim 1, wherein the one or more circuits are to use one or more graphics processing units (GPUs) to perform the NAS algorithm.

7. A system, comprising:

one or more computers having one or more processors to use a neural architecture search (NAS) algorithm to iteratively generate one or more hyperparameters to be used by one or more neural networks to perform one or more tasks, wherein the one or more hyperparameters are to be generated before being used by the one or more neural networks, wherein an iteration of the NAS algorithm comprises to:

generate a first variant and a second variant of a neural network operation according to different hyperparameter values for a first hyperparameter of the one or more hyperparameters, the first variant generated based on a hyperparameter value for the first hyperparameter smaller than a hyperparameter value for the first hyperparameter used to generate the second variant;

perform at least a portion of the NAS algorithm to calculate a first weight corresponding to the first variant and a second weight corresponding to the second variant; and update the first variant and the second variant based, at least in part, on the first weight and the second weight according to different updated hyperparameter values for the first hyperparameter to generate the one or more hyperparameters, wherein the different updated hyperparameter values for the first variant and the second variant are both decreased when the first weight is greater than the second weight, and are both increased when the second weight is greater than the first weight.

8. The system of claim 7, wherein the one or more processors are further to:

calculate a first set of hyperparameters;

perform at least a portion of the NAS algorithm based, at least in part, on the first set of hyperparameters; and calculate a second set of hyperparameters based, at least in part, on results from at least the portion of the NAS algorithm.

9. The system of claim 7, wherein the one or more processors are further to generate the one or more hyperparameters by at least iteratively updating one or more masks based, at least in part, on one or more results of one or more training processes in connection with the one or more masks.

10. The system of claim 7, wherein a first hyperparameter of the one or more hyperparameters corresponds to a number of channels in one or more tensors of the one or more neural networks.

11. The system of claim 7, wherein the one or more processors are further to use the one or more neural networks to perform one or more natural language processing (NLP) tasks.

12. The system of claim 7, wherein the one or more processors are further to use one or more parallel processing units (PPUs) to perform the NAS algorithm.

13. A method, comprising:

using a neural architecture search (NAS) algorithm to iteratively generate one or more hyperparameters to be used by one or more neural networks to perform one or more tasks, wherein the one or more hyperparameters are to be generated before being used by the one or more neural networks, wherein the NAS algorithm comprises:

generating, according to different hyperparameter values for a first hyperparameter of the one or more hyperparameters, variants of an operation to be used in the one or more neural networks, wherein a first variant of the variants is generated based on a hyperparameter value for the first hyperparameter smaller than a hyperparameter value for the first hyperparameter used to generate a second variant of the variants;

updating the different hyperparameter values to update the variants through one or more training processes based, at least in part, on training data, wherein the different hyperparameter values for the first variant and the second variant are both decreased when performance of the first variant is greater than performance of the second variant, and the different hyperparameter values for the first variant and the second variant are both increased when performance of the second variant is greater than performance of the first variant; and calculating a first hyperparameter of the one or more hyperparameters based, at least in part, on one or more of the variants.

14. The method of claim 13, further comprising:

updating at least a first variant and a second variant of an operation; and calculating a third variant from the first variant and the second variant to generate the one or more hyperparameters.

15. The method of claim 13, further comprising performing the NAS algorithm in connection with training data comprising at least one or more images.

16. The method of claim 13, wherein the one or more hyperparameters indicate at least a manner in which one or more weights are to be applied in the one or more neural networks.

17. A non-transitory computer readable medium having stored thereon a set of instructions, which if performed by one or more processors, cause the one or more processors to at least perform the method of claim 13.

* * * * *